US009457666B2

(12) United States Patent
Caldeira et al.

(10) Patent No.: US 9,457,666 B2
(45) Date of Patent: Oct. 4, 2016

(54) METHOD AND APPARATUS FOR SUPPLYING AUXILIARY ELECTRICAL POWER TO AN ELECTRIC OR HYBRID VEHICLE

(75) Inventors: Kenneth G. Caldeira, Redwood City, CA (US); Alistair K. Chan, Bainbridge Island, WA (US); Daniel B. Cook, Seattle, WA (US); William David Duncan, Kirkland, WA (US); Roderick A. Hyde, Redmond, WA (US); Muriel Y. Ishikawa, Livermore, CA (US); Jordin T. Kare, Seattle, WA (US); John Latham, Boulder, CO (US); Stephen H. Salter, Edinburgh (GB); Clarence T. Tegreene, Bellevue, WA (US); David B. Tuckerman, Lafayette, CA (US); Thomas A. Weaver, San Mateo, CA (US); Charles Whitmer, North Bend, WA (US); Victoria Y. H. Wood, Livermore, CA (US); Lowell L. Wood, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 1018 days.

(21) Appl. No.: 13/436,316

(22) Filed: Mar. 30, 2012

(65) Prior Publication Data

US 2013/0257145 A1 Oct. 3, 2013

Related U.S. Application Data

(63) Continuation-in-part of application No. 13/436,290, filed on Mar. 30, 2012.

(51) Int. Cl.
*B60L 1/00* (2006.01)
*B60L 3/00* (2006.01)
(Continued)

(52) U.S. Cl.
CPC ............... *B60L 3/0046* (2013.01); *B60L 7/18* (2013.01); *B60L 11/123* (2013.01); *B60L 11/126* (2013.01);
(Continued)

(58) Field of Classification Search
CPC .. B60L 11/123; B60L 11/126; B60L 3/0046; Y02T 90/14
USPC ......................................................... 307/9.1
See application file for complete search history.

(56) References Cited

U.S. PATENT DOCUMENTS 3,690,397 A 9/1972 Parker
3,858,907 A * 1/1975 Van Raden ............. B60D 1/62
280/422

(Continued)

FOREIGN PATENT DOCUMENTS

CN 101817342 (A) 9/2010
CN 102255113 A 11/2011
(Continued)

OTHER PUBLICATIONS

PCT International Search Report; International App. No. PCT/US2013/034580; Jun. 28, 2013; pp. 1-2.
(Continued)

*Primary Examiner* — Jared Fureman
*Assistant Examiner* — Alfonso Perez Borroto

(57) ABSTRACT

The present invention may include a towable trailer being mechanically couplable to a vehicle, the towable trailer including an auxiliary battery housing unit, a wheel being rotatably connected to the towable trailer, an auxiliary battery disposed within the auxiliary battery housing unit of the towable trailer, the vehicle including a storage battery, the auxiliary battery of the towable trailer being electrically couplable with the storage battery of the vehicle via a bidirectional pathway, and a control system configured to control a transfer of electrical energy between the auxiliary battery of the towable trailer and the storage battery of the vehicle along the bidirectional pathway.

44 Claims, 91 Drawing Sheets

(51) Int. Cl.
*B60L 7/18* (2006.01)
*B60L 11/12* (2006.01)
*B60L 11/14* (2006.01)
*B60L 11/18* (2006.01)

(52) U.S. Cl.
CPC ............ *B60L 11/14* (2013.01); *B60L 11/1816* (2013.01); *B60L 11/1861* (2013.01); *B60L 11/1864* (2013.01); *B60L 2200/12* (2013.01); *B60L 2200/18* (2013.01); *B60L 2200/26* (2013.01); *B60L 2200/28* (2013.01); *B60L 2200/40* (2013.01); *B60L 2240/545* (2013.01); *B60L 2240/622* (2013.01); *B60L 2250/16* (2013.01); *B60L 2270/40* (2013.01); *Y02T 10/6217* (2013.01); *Y02T 10/7005* (2013.01); *Y02T 10/7044* (2013.01); *Y02T 10/7061* (2013.01); *Y02T 10/7072* (2013.01); *Y02T 10/7077* (2013.01); *Y02T 10/7291* (2013.01); *Y02T 90/14* (2013.01); *Y02T 90/16* (2013.01); *Y02T 90/162* (2013.01)

(56) References Cited

U.S. PATENT DOCUMENTS

| | | | |
|---|---|---|---|
| 4,199,037 A | 4/1980 | White | |
| 4,269,280 A | 5/1981 | Rosen | |
| 4,283,072 A * | 8/1981 | Deloach, Jr. | B60D 1/06 200/61.58 R |
| 5,283,513 A | 2/1994 | Fujita et al. | |
| 5,346,239 A * | 9/1994 | Wohlhuter | B62D 53/125 280/420 |
| 5,488,352 A * | 1/1996 | Jasper | H01R 13/6633 280/423.1 |
| 5,559,420 A | 9/1996 | Kohchi | |
| 5,963,013 A | 10/1999 | Watson et al. | |
| 6,127,798 A | 10/2000 | Lansang et al. | |
| 6,222,443 B1 * | 4/2001 | Beeson | B60D 1/065 307/10.1 |
| 6,366,054 B1 * | 4/2002 | Hoenig et al. | 320/132 |
| 6,390,215 B1 | 5/2002 | Kodama et al. | |
| 6,445,080 B1 | 9/2002 | Daqoa et al. | |
| 6,456,040 B1 | 9/2002 | Hamilton | |
| 6,481,738 B1 * | 11/2002 | Duncan | B60D 1/06 280/420 |
| 6,831,221 B2 | 12/2004 | Hulen | |
| 6,866,350 B2 | 3/2005 | Palmer et al. | |
| 6,938,400 B2 * | 9/2005 | Fillman et al. | 56/10.6 |
| 7,049,792 B2 * | 5/2006 | King | 320/126 |
| 7,193,393 B1 | 3/2007 | Payne | |
| 7,224,132 B2 | 5/2007 | Cho et al. | |
| 7,279,640 B2 | 10/2007 | White et al. | |
| 7,449,793 B2 | 11/2008 | Cho et al. | |
| 7,475,747 B2 | 1/2009 | Plishner | |
| 7,497,757 B2 | 3/2009 | Hamasaki | |
| 7,514,803 B2 | 4/2009 | Wilks | |
| 7,537,070 B2 | 5/2009 | Maslov et al. | |
| 7,547,980 B2 | 6/2009 | Harrison | |
| 7,667,416 B2 | 2/2010 | Queveau et al. | |
| 8,308,181 B2 * | 11/2012 | Riibe | B60D 1/64 280/422 |
| 2002/0084121 A1 | 7/2002 | Hulen | |
| 2002/0163249 A1 | 11/2002 | Palmer et al. | |
| 2005/0136726 A1 | 6/2005 | Kohchi | |
| 2005/0162106 A1 | 7/2005 | Cho et al. | |
| 2005/0179262 A1 | 8/2005 | Cho et al. | |
| 2005/0279542 A1 | 12/2005 | Maslov et al. | |
| 2006/0054209 A1 | 3/2006 | Hulen | |
| 2006/0076836 A1 | 4/2006 | Plishner | |
| 2006/0219448 A1 | 10/2006 | Grieve et al. | |
| 2007/0013244 A1 | 1/2007 | Kinkaid | |
| 2007/0069586 A1 | 3/2007 | Queveau et al. | |
| 2008/0090109 A1 | 4/2008 | McLean | |
| 2009/0090573 A1 | 4/2009 | Boone | |
| 2010/0065344 A1 | 3/2010 | Collings, III | |
| 2010/0187031 A1 * | 7/2010 | Waszak et al. | 180/65.265 |
| 2010/0252339 A1 * | 10/2010 | Bibeau et al. | 180/12 |
| 2011/0025267 A1 * | 2/2011 | Kamen et al. | 320/109 |
| 2011/0253463 A1 * | 10/2011 | Smith | 180/11 |
| 2012/0061163 A1 * | 3/2012 | Musser | 180/333 |

FOREIGN PATENT DOCUMENTS

| | | |
|---|---|---|
| EP | 2434609 A2 | 3/2012 |
| WO | WO 2010/002644 A1 | 1/2010 |
| WO | WO 2010002644 A1 * | 1/2010 |

OTHER PUBLICATIONS

PCT International Search Report; International App. No. PCT/US2013/034588; Jul. 1, 2013; pp. 1-2; Search History (6 pages).
Chinese State Intellectual Property Office, Non-Final Rejection, App. No. 2013/80022490.9 (Based on PCT Patent Application No. PCT/US2013/034580); May 25, 2016 (received by our Agent on Jun. 2, 2016); pp. 1-22 (no machine translation provided).

* cited by examiner

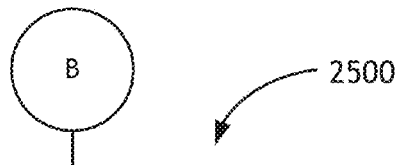

```
                              ┌───┐
                              │ B │         ─ 2500
                              └─┬─┘
                                │
┌───────────────────────────────┴───────────────────────────────┐
│ 2510 providing one or more auxiliary batteries disposed within an auxiliary │
│ battery housing unit of a towable trailer, the towable trailer including at least │
│ one wheel being rotatably connected to the towable trailer, the at least one │
│ wheel being configured to translate the towable trailer utilizing a pulling force │
│ from the vehicle │
└───────────────────────────────┬───────────────────────────────┘
                                │
┌───────────────────────────────┴───────────────────────────────┐
│ 2520 mechanically coupling the towable trailer to a vehicle, the vehicle including │
│ one or more storage batteries │
└───────────────────────────────┬───────────────────────────────┘
                                │
┌───────────────────────────────┴───────────────────────────────┐
│ 2530 establishing a pathway between the one or more auxiliary batteries of the │
│ towable trailer and the one or more storage batteries of the vehicle │
└───────────────────────────────┬───────────────────────────────┘
```

2540 controlling a transfer of electrical energy between the one or more auxiliary batteries and the one or more storage batteries along the pathway 3602 establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by one or more parameters 3802 establishing at least one of a charge state of the one or more storage batteries of the vehicle or a charge state of the one or more auxiliary batteries, wherein at least one of the charge state of the one or more storage batteries or the charge state of the one or more auxiliary batteries are determined by a difference between a first parameter and a second parameter 3808 establishing at least one of a charge state of the one or more storage batteries of the vehicle or a charge state of the one or more auxiliary batteries, wherein at least one of the charge state of the one or more storage batteries or the charge state of the one or more auxiliary batteries are determined by a difference between a charging efficiency associated with the one or more storage batteries of the vehicle and a charging efficiency associated with the one or more auxiliary batteries of the towable trailer

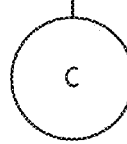

FIG. 38C

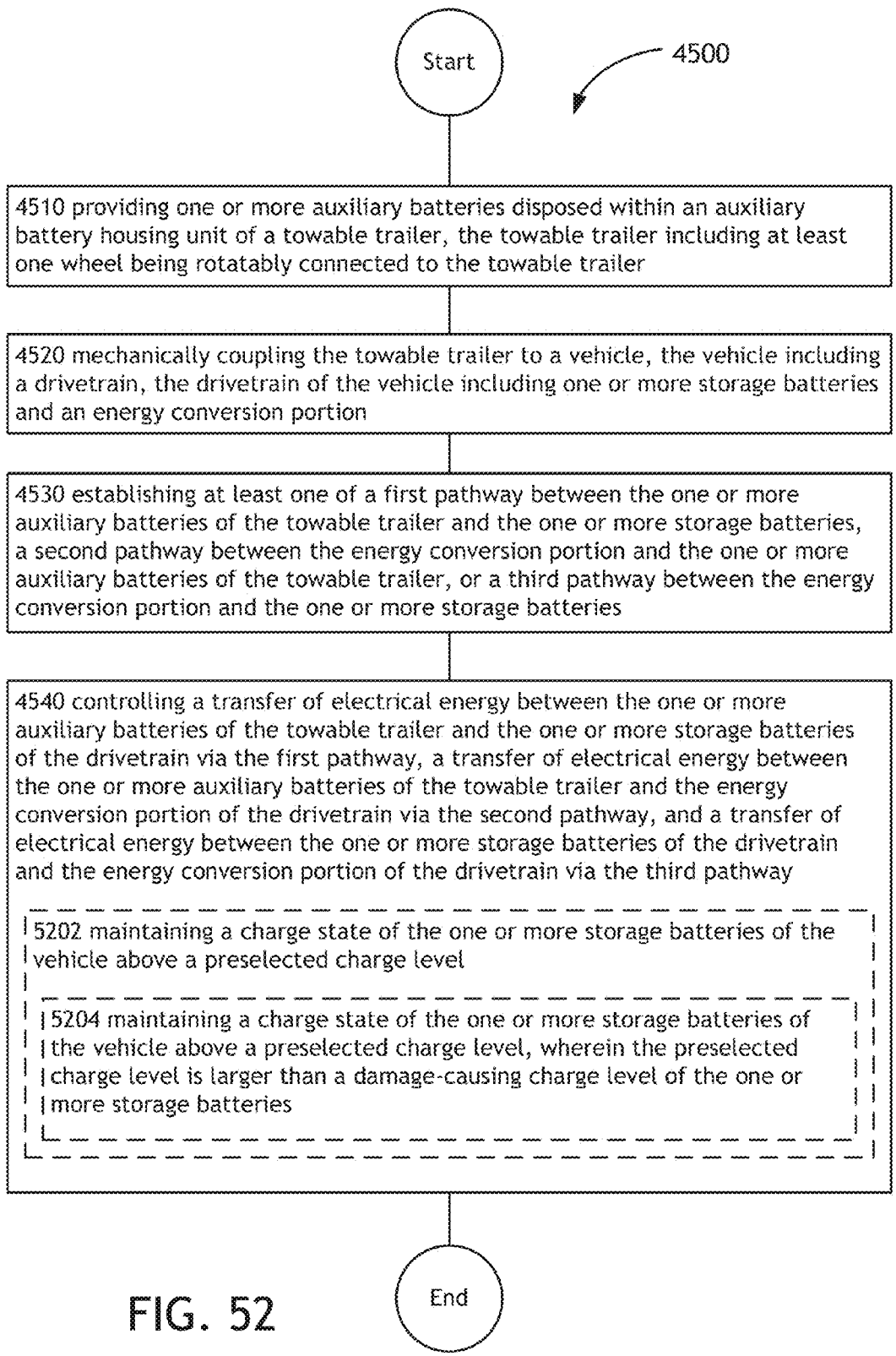

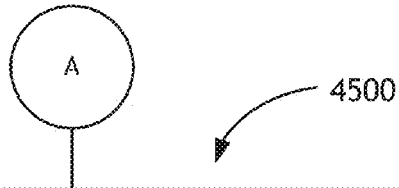

4540 controlling a transfer of electrical energy between the one or more auxiliary batteries of the towable trailer and the one or more storage batteries of the drivetrain via the first pathway, a transfer of electrical energy between the one or more auxiliary batteries of the towable trailer and the energy conversion portion of the drivetrain via the second pathway, and a transfer of electrical energy between the one or more storage batteries of the drivetrain and the energy conversion portion of the drivetrain via the third pathway 5602 establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by one or more parameters 5802 establishing at least one of a charge state of the one or more storage batteries of the vehicle or a charge state of the one or more auxiliary batteries, wherein at least one of the charge state of the one or more storage batteries or the charge state of the one or more auxiliary batteries are determined by a difference between a first parameter and a second parameter 6002 establishing at least one of a charge state of the one or more storage batteries of the vehicle or a charge state of the one or more auxiliary batteries, wherein at least one of the charge state of the one or more storage batteries or the charge state of the one or more auxiliary batteries are determined by a difference between a charging efficiency associated with the one or more storage batteries of the vehicle and a charging efficiency associated with the one or more auxiliary batteries of the towable trailer

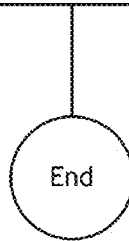

FIG. 60B

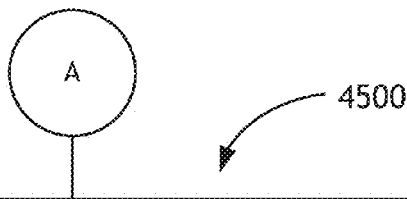

4500

4540 controlling a transfer of electrical energy between the one or more auxiliary batteries of the towable trailer and the one or more storage batteries of the drivetrain via the first pathway, a transfer of electrical energy between the one or more auxiliary batteries of the towable trailer and the energy conversion portion of the drivetrain via the second pathway, and a transfer of electrical energy between the one or more storage batteries of the drivetrain and the energy conversion portion of the drivetrain via the third pathway 5602 establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by one or more parameters 5802 establishing at least one of a charge state of the one or more storage batteries of the vehicle or a charge state of the one or more auxiliary batteries, wherein at least one of the charge state of the one or more storage batteries or the charge state of the one or more auxiliary batteries are determined by a difference between a first parameter and a second parameter 6102 establishing at least one of a charge state of the one or more storage batteries of the vehicle or a charge state of the one or more auxiliary batteries, wherein at least one of the charge state of the one or more storage batteries or the charge state of the one or more auxiliary batteries are determined by a difference between a discharging efficiency associated with the one or more storage batteries of the vehicle and a discharging efficiency associated with the one or more auxiliary batteries of the towable trailer

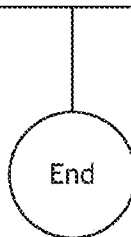

FIG. 61B

METHOD AND APPARATUS FOR SUPPLYING AUXILIARY ELECTRICAL POWER TO AN ELECTRIC OR HYBRID VEHICLE

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application entitled METHOD AND APPARATUS FOR SUPPLYING AUXILIARY ELECTRICAL POWER TO AN ELECTRIC OR HYBRID VEHICLE, naming Kenneth G. Caldeira, Alistair K. Chan, Daniel B. Cook, William David Duncan, Roderick A. Hyde, Muriel Y. Ishikawa, Jordin T. Kare, John Latham, Stephen H. Salter, Clarence T. Tegreene, David B. Tuckerman, Thomas A. Weaver, Charles Whitmer, Victoria Y.H. Wood, and Lowell L. Wood, Jr. as inventors, filed Mar. 30, 2012, application Ser. No. 13/436,290, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

TECHNICAL FIELD

The present disclosure generally relates to supplying auxiliary or supplemental electrical energy to a storage battery of a drivetrain of an electric or hybrid vehicle.

SUMMARY

In one aspect, a method includes, but is not limited to, providing one or more auxiliary batteries disposed within an auxiliary battery housing unit of a towable trailer, the towable trailer including at least one wheel being rotatably connected to the towable trailer; mechanically coupling the towable trailer to a vehicle, the vehicle including one or more storage batteries; establishing a bidirectional electrical pathway between the one or more auxiliary batteries of the towable trailer and the one or more storage batteries of the vehicle; and controlling a transfer of electrical energy between the one or more auxiliary batteries and the one or more storage batteries along the bidirectional pathway.

In another aspect, a method includes, but is not limited to, providing one or more auxiliary batteries disposed within an auxiliary battery housing unit of a towable trailer, the towable trailer including at least one wheel being rotatably connected to the towable trailer, the at least one wheel being configured to translate the towable trailer utilizing a pulling force from the vehicle; mechanically coupling the towable trailer to a vehicle, the vehicle including one or more storage batteries; establishing an electrical pathway between the one or more auxiliary batteries of the towable trailer and the one or more storage batteries of the vehicle; and controlling a transfer of electrical energy between the one or more auxiliary batteries and the one or more storage batteries along the pathway.

In another aspect, a method includes, but is not limited to, providing one or more auxiliary batteries disposed within an auxiliary battery housing unit of a towable trailer, the towable trailer including at least one wheel being rotatably connected to the towable trailer; mechanically coupling the towable trailer to a vehicle, the vehicle including a drivetrain, the drivetrain of the vehicle including one or more storage batteries and an energy conversion portion; establishing a first pathway between the one or more auxiliary batteries of the towable trailer and the one or more storage batteries, a second pathway between the energy conversion portion and the one or more auxiliary batteries of the towable trailer, and a third pathway between the energy conversion portion and the one or more storage batteries; and controlling at least one of a transfer of electrical energy between the one or more auxiliary batteries of the towable trailer and the one or more storage batteries of the drivetrain via the first pathway, a transfer of electrical energy between the one or more auxiliary batteries of the towable trailer and the energy conversion portion of the drivetrain via the second pathway, or a transfer of electrical energy between the one or more storage batteries of the drivetrain and the energy conversion portion of the drivetrain via the third pathway. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, an apparatus includes, but is not limited to, a towable trailer being mechanically couplable to a vehicle, the towable trailer including an auxiliary battery housing unit; at least one wheel being rotatably connected to the towable trailer; one or more auxiliary batteries disposed within the auxiliary battery housing unit of the towable trailer, the vehicle including one or more storage batteries, the one or more auxiliary batteries of the towable trailer being electrically couplable with the one or more storage batteries of the vehicle via a bidirectional pathway; and a control system configured to control a transfer of electrical energy between the one or more auxiliary batteries and the one or more storage batteries of the vehicle along the bidirectional pathway.

In another aspect, an apparatus includes, but is not limited to, a towable trailer being mechanically couplable to a vehicle, the towable trailer including an auxiliary battery housing unit; at least one wheel being rotatably connected to the towable trailer, wherein the at least one wheel is configured to translate the towable trailer utilizing a pulling force from the vehicle; one or more auxiliary batteries disposed within the auxiliary battery housing unit of the towable trailer, the vehicle including one or more storage batteries, the one or more auxiliary batteries of the towable trailer being electrically couplable with the one or more storage batteries of the vehicle via a pathway; and a control system configured to control a transfer of electrical energy between the one or more auxiliary batteries and the one or more storage batteries of the vehicle along the pathway.

In another aspect, an apparatus includes, but is not limited to, a towable trailer being mechanically couplable to a vehicle, the towable trailer including an auxiliary battery housing unit; at least one wheel being rotatably connected to the towable trailer; one or more auxiliary batteries disposed within the auxiliary battery housing unit of the towable trailer, the vehicle including a drivetrain, the drivetrain of the vehicle including one or more storage batteries and an energy conversion portion, the one or more auxiliary batteries of the towable trailer being electrically couplable with the one or more storage batteries via a first pathway, the energy conversion portion being electrically couplable with the one or more auxiliary batteries of the towable trailer via a second pathway, the energy conversion portion being electrically couplable with the one or more storage batteries via a third pathway; and a control system configured to control at least one of a transfer of electrical energy between the one or more auxiliary batteries of the towable trailer and the one or more storage batteries of the drivetrain via the first pathway, a transfer of electrical energy between the one or more auxiliary batteries of the towable trailer and the energy conversion portion of the drivetrain via the second pathway, or a transfer of electrical energy between the one or more storage batteries of the drivetrain and the energy conversion portion of the drivetrain via the third pathway. In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIGS. 46 through 66 are high-level flowcharts depicting alternate implementations of FIG. 45.

DETAILED DESCRIPTION

Figure 1A:
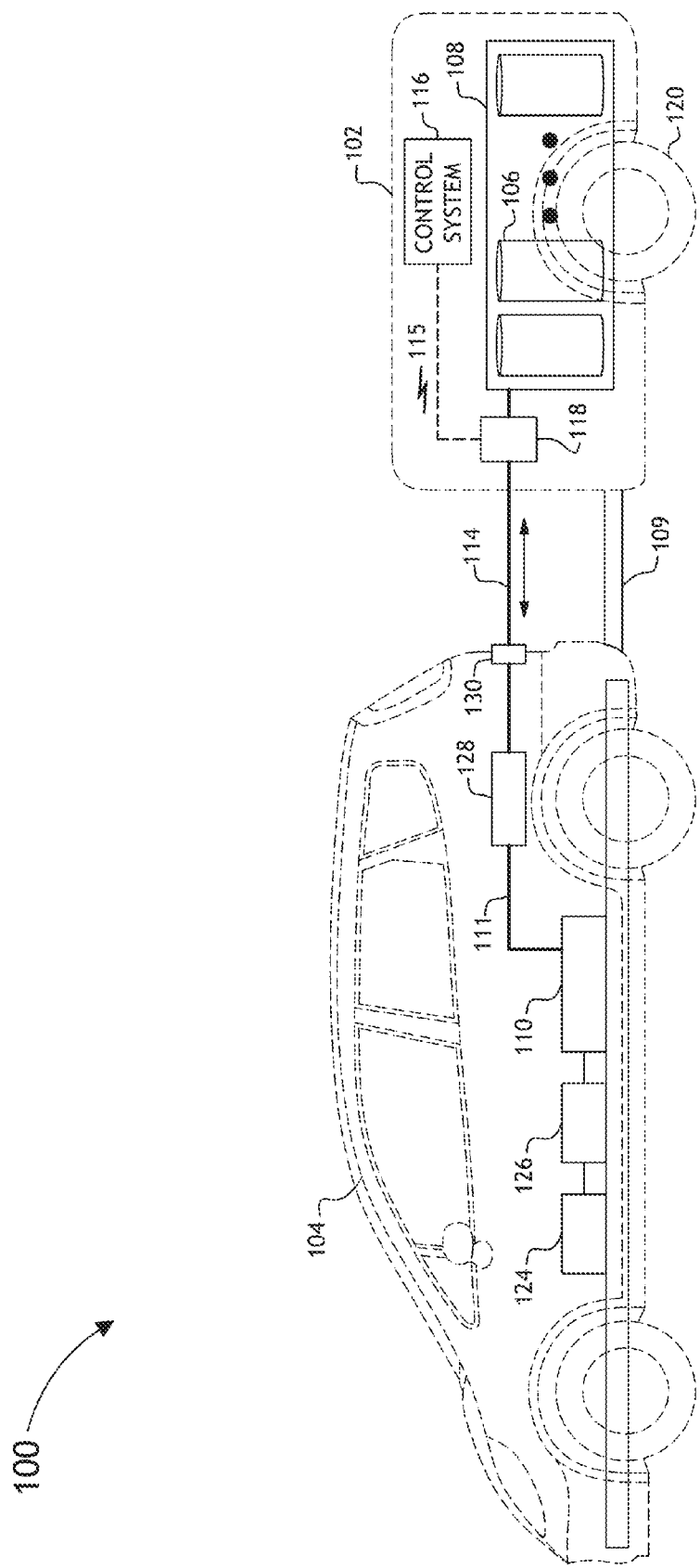
FIG. 1A is a schematic illustration of a system for supplying auxiliary electrical power to an electric or hybrid vehicle.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring generally to FIGS. 1A through 4, an auxiliary power system for supplying auxiliary electrical power to an electric or hybrid vehicle is described in accordance with the present disclosure.

Figure 1B:
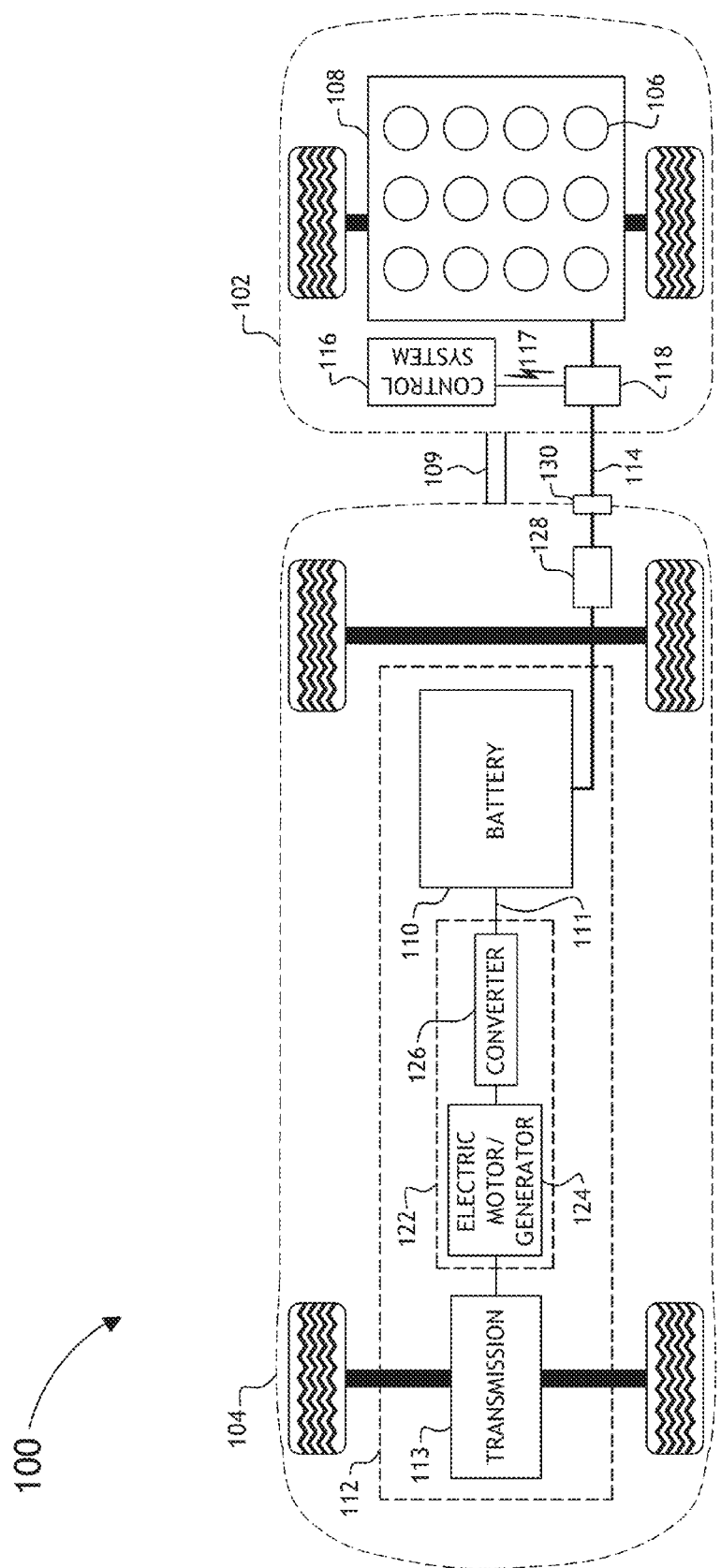
FIG. 1B is a schematic illustration of a system for supplying auxiliary electrical power to an electric or hybrid vehicle.

FIGS. 1A and 1B illustrate schematic views of an auxiliary power system 100 in accordance with the present disclosure. In one aspect, the auxiliary power system 100 for supplying auxiliary electrical power to a vehicle 104 may include a towable trailer 102 suitable for transporting one or more auxiliary batteries 106. In a further aspect, the one or more auxiliary batteries 106 are disposed within an auxiliary battery housing unit 108 of the towable trailer 102. In another aspect, the towable trailer 102 is mechanically couplable to the vehicle 104 (e.g., electric vehicle or hybrid vehicle) via a coupling unit 109 (e.g., mechanical coupling unit or an electromagnetic coupling unit). In this regard, the towable trailer 102 may be reversibly coupled, or attached, to a portion of the vehicle 104 (e.g., rear portion of the vehicle 104). Further, the towable trailer 102 includes one or more wheels 120 rotatably connected to a portion of a chassis (not shown) of the towable trailer 102.

In an additional aspect, the one or more auxiliary batteries 104 are electrically couplable to one or more storage batteries 110 of a drivetrain 112 of the vehicle 104 via a bidirectional electrical pathway 114 (e.g., pluggable electrical cable). In this regard, the bidirectional electrical pathway 114 may be utilized to reversibly establish an electrical connection between the one or more auxiliary batteries 106 of the towable trailer 102 and the one or more storage batteries 110 of the vehicle 104. It is noted herein that the electrical connection between the one or more auxiliary batteries 106 and the one or more storage batteries 110 may be established indirectly using intermingling circuitry components coupled between the one or more auxiliary batteries 106 and the one or more storage batteries 110. For example, along the pathway 114 there may reside power conversion circuitry (not shown) suitable for converting the voltage and/or current such that the electrical energy from the auxiliary batteries 106 may be efficiently transferred to the one or more storage batteries 110. Various types of power conversion circuitry elements are described in more detail further herein.

In a further aspect, the bidirectional electrical pathway 114 is configured to selectively transfer electrical energy between the one or more auxiliary batteries 106 and the one or more storage batteries of the vehicle 110. In this regard, the bidirectional electrical pathway 114 may transfer electrical energy from the one or more auxiliary batteries 106 to the one or more storage batteries 110 or conversely from the one or more storage batteries 110 to the one or more auxiliary batteries 106. In another aspect, the auxiliary power system 100 may include a control system 116 configured to control the transfer of electrical energy between the one or more auxiliary batteries 106 disposed within the towable trailer 102 and the one or more storage batteries 110 of the vehicle 104 along the bidirectional electrical pathway 114.

In some embodiments of the present invention, the bidirectional electrical pathway 114 of the system 100 may include, but is not limited to, a pluggable electrical cable configured for physically connecting, or "plugging," into an electrical port of the vehicle 104. In this manner, at least one portion of the pluggable electrical cable may include an adaptor suitable for interfacing with the electrical port, or "socket," of the vehicle 104. In a further embodiment, the electric cable utilized to establish the electrical pathway 114 between the one or more storage batteries 110 and the one or more auxiliary batteries 106 may be configured for plugging into a portion of the charging/discharging circuitry 128 of the one or more storage batteries 110 of the drivetrain 112 of the vehicle 104. Even further, the electric cable may be configured for plugging into a charging socket 130 of the charging/discharging circuitry 128 of the one or more storage batteries 110 of the drivetrain 112 of the vehicle 104.

In some embodiments of the present invention, the one or more auxiliary batteries 106 of the towable trailer 102 and the one or more storage battery 110 of the vehicle 104 may include one or more rechargeable electric batteries. In a general sense, the one or more auxiliary batteries 106 or the one or more storage batteries 110 of the present invention may include any suitable rechargeable electric battery know in the art. For example, the one or more auxiliary batteries 106 of the towable trailer 102 or the one or more storage batteries 110 of the vehicle 104 may include one or more lithium ion batteries. Further, batteries suitable for implementation in the present invention may include, but are not limited to, lithium-ion polymer batteries, nickel metal hydride batteries, nickel cadmium batteries, lead-acid batteries, and the like. It is noted herein that the enumerated battery types provided above should not be interpreted as a limitation, but merely as an illustration as it is anticipated that a variety of other rechargeable battery types may be suitable for implementation in the present invention. It is further noted herein that the one or more auxiliary batteries 106 and the one or more storage batteries 110 need not be the same type of rechargeable battery.

In some embodiments of the present invention, the towable trailer 102 of the system 100 may include a plurality of auxiliary batteries 106. In one aspect, some of the auxiliary batteries 106 of the plurality of auxiliary batteries may be coupled in a parallel configuration. In another aspect, some of the auxiliary batteries 106 of the plurality of auxiliary batteries may be coupled in a series configuration. In a further aspect, some of the auxiliary batteries 106 of the plurality of auxiliary batteries may be coupled in a series/parallel configuration. Those skilled in the art will recognize that various combinations of parallel and/or series configurations may be utilized in order to build up the voltage and current output of the plurality of auxiliary batteries.

In a general sense, the vehicle 104 may include any electric vehicle or a hybrid electric vehicle known in the art. In this regard, the vehicle 104 may be propelled utilizing one or more of electricity or a combustible fuel. A combustible fuel may include any fuel capable of producing heat upon reacting with an oxidizing element. In one embodiment, a combustible fuel may include an organic-based fuel. For example, an organic-based fuel may include, but is not limited to, an alcohol (i.e., compound having a hydroxyl group bonded to a carbon atom of an alkyl or substituted alkyl group), such as ethyl alcohol (i.e., ethanol), methyl alcohol (i.e., methanol), and isopropyl alcohol, and the like. In another example, an organic-based fuel may include, but is not limited to, a ketone (i.e., compound having a carbonyl group bonded to two other carbon atoms), such as acetone, acetophenone, and methyl ethyl ketone, and the like. In an additional example, an organic-based fuel may include, but is not limited to, a hydrocarbon-based fuel. Hydrocarbon-based fuels may include, but are not limited to, gasoline, diesel, natural gas or liquid petroleum gas, mixtures of gaseous hydrocarbons associated with petroleum deposits, kerosene, naphtha, and various oils and bio-fuels. It is further contemplated herein that the hydrocarbon-based fuels may include fuel additives, such as hybrid compound blends (e.g., polymerization agents for increases fuel ignition surface area, stabilizers, catalysts, or detergents), alcohols (e.g., methanol, ethanol, or isopropyl alcohol), ethers, antioxidants, antiknock agents, lead scavengers, or fuel dyes and the like. In a general sense, the combustible fuel may include any additional fuel capable of chemical combustion. For example, the combustible fuel may include hydrogen.

As illustrated in FIGS. 1A and 1B, the vehicle 104 may include an electric vehicle propelled via drivetrain 112. The electric drivetrain 112 of the electric vehicle 104 may include, but is not limited to, a transmission 113, one or more storage batteries 110, and an energy conversion portion 122 (e.g., power conversion circuitry 126 or electric motor/generator 124) configured to convert the electrical energy stored in the one or more storage batteries 110 to mechanical energy for utilization by the transmission 113 to propel the vehicle 104. For instance, the one or more storage batteries 110 may be electrically coupled via electrical pathway 111 to an electric machine, such as an electric motor/generator 124, and configured to provide electrical energy to the electric motor/generator 124. Further, the transmission 113 may be mechanically coupled with the electric motor/generator 124 such that the mechanical energy produced by the electric motor 124 may be transferred to the transmission 113 in order to rotate, or drive, one or more wheels of the vehicle 104, thereby propelling the vehicle 104.

As described in more detail further herein, the electric machine may operate in two modes, as a generator and as a motor. In a first configuration, the electric machine may operate as an electric motor 124 suitable for converting electrical energy from the one or more storage batteries 110 to mechanical energy used to propel the vehicle 104. In another configuration, the electric machine may operate as an electric generator 124 suitable for converting rotational energy associated with the rotation of one or more wheels of the vehicle 104 to electrical energy, which may be stored in either the one or more storage batteries 110 or the one or more auxiliary batteries 106. For the purposes of the present disclosure the electric machine is referred to a electric motor/generator 124.

In a further embodiment, the drivetrain 112 may include power conversion circuitry 126 coupled between the one or more storage batteries 110 and the electric motor/generator 124. In this manner, the electric motor/generator 124, along with power conversion circuitry 126, may form the energy conversion portion 122 of the electric drive train 112 configured to convert electric energy from the one or more storage batteries 110 to mechanical energy supplied to the transmission 113. For instance, the power conversion circuitry 126, such as voltage conversion circuitry (e.g., DC-DC) or voltage inversion circuitry (DC-AC), of the energy conversion portion 122 of the drivetrain 112 may receive electricity from the one or more storage batteries 110 and convert the received electricity to a state suitable for use by the electric motor/generator 124. Following power conversion, the electricity may act to power the electric motor 124, thereby providing mechanical energy to the transmission 113.

It is further contemplated herein that the electric vehicle or the hybrid electric vehicle of the present invention may further include a regenerative braking system configured to perform a regenerative braking process. In this manner, the electric motor/generator 124 may act as a generator, converting a portion of the rotational mechanical energy of the one or more wheels of the vehicle 104 (via the transmission 113) to electrical energy. This electrical energy may then be stored in the one or more storage batteries 110 or the one or more auxiliary batteries 106 of the system 100. Those skilled in the art will recognize that any regenerative breaking means known in the art may be implemented in the present invention. In a further embodiment, the power conversion circuitry 126 of the drivetrain 112 may further be configured to receive electricity from the generator 124 and convert the received electricity to a state suitable for use by the one or more storage batteries 110 or the one or more auxiliary batteries 106. Following power conversion, the generated electricity may act to charge at least one of the one or more storage batteries 110 of the vehicle 104 or the one or more auxiliary batteries 106 of the towable trailer 102.

Figure 1C:
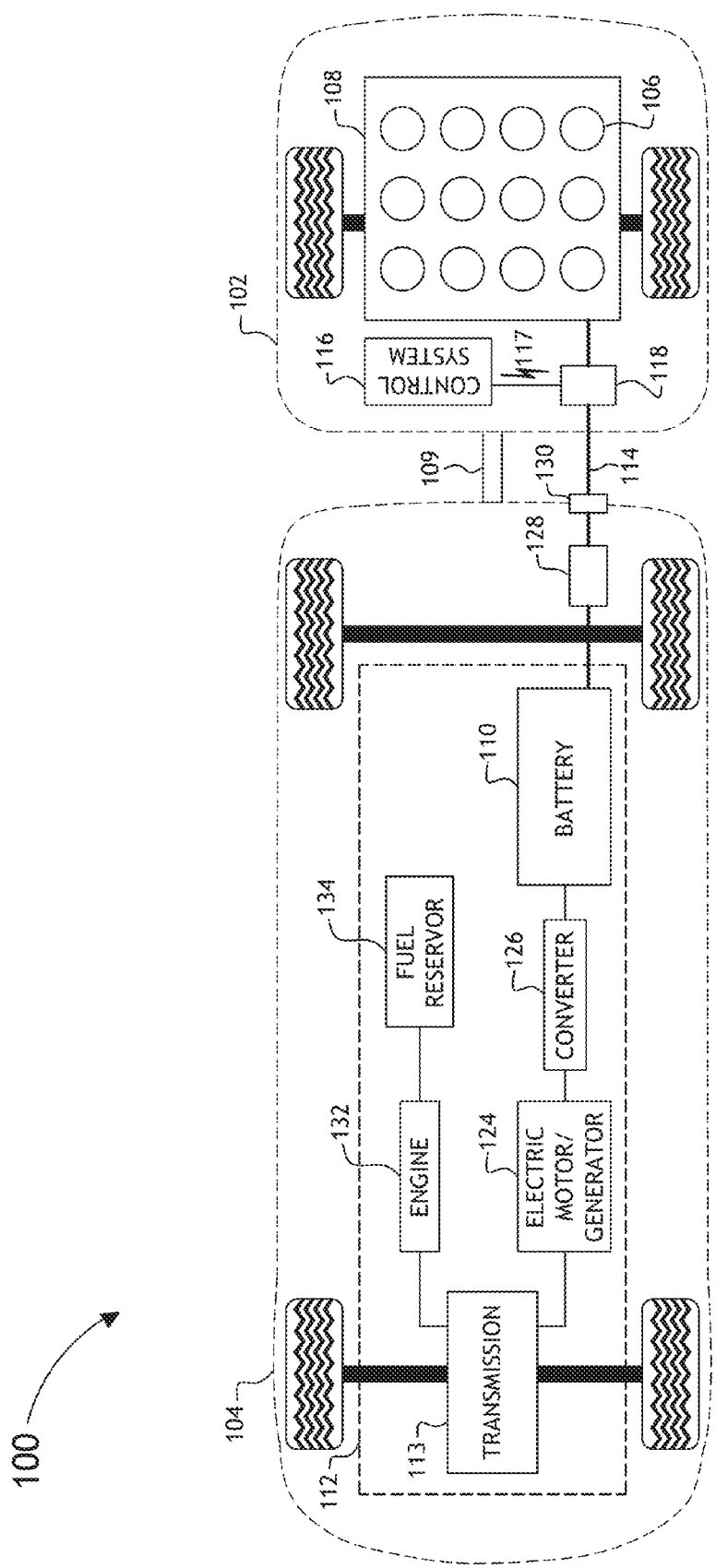
FIG. 1C is a schematic illustration of a system for supplying auxiliary electrical power to an electric or hybrid vehicle.

As illustrated in FIG. 1C, the vehicle 104 may include a hybrid vehicle propelled via a hybrid drivetrain. The hybrid drivetrain 112 may include, but is not limited to, a transmission 113, one or more storage batteries 110, an energy conversion portion (electric motor/generator 124 and power conversion circuitry 126) configured to convert the electrical energy stored in the one or more storage batteries 110 to mechanical energy for utilization by the transmission to propel the vehicle 104. The hybrid drivetrain 112 may further include a fuel reservoir 134 (e.g., gasoline tank) and an internal combustion engine 132 configured to provide propulsive energy to the transmission 113 utilizing the fuel stored in the fuel reservoir 134. It should be recognized that the hybrid vehicle 104 of FIG. 1C is configured as a "parallel" hybrid vehicle as the combustion portion and the electric portion of the drivetrain 112 are arranged in parallel with one another and both are configured to provide propulsive energy to the transmission 113 of the vehicle 100.

Figure 1D:
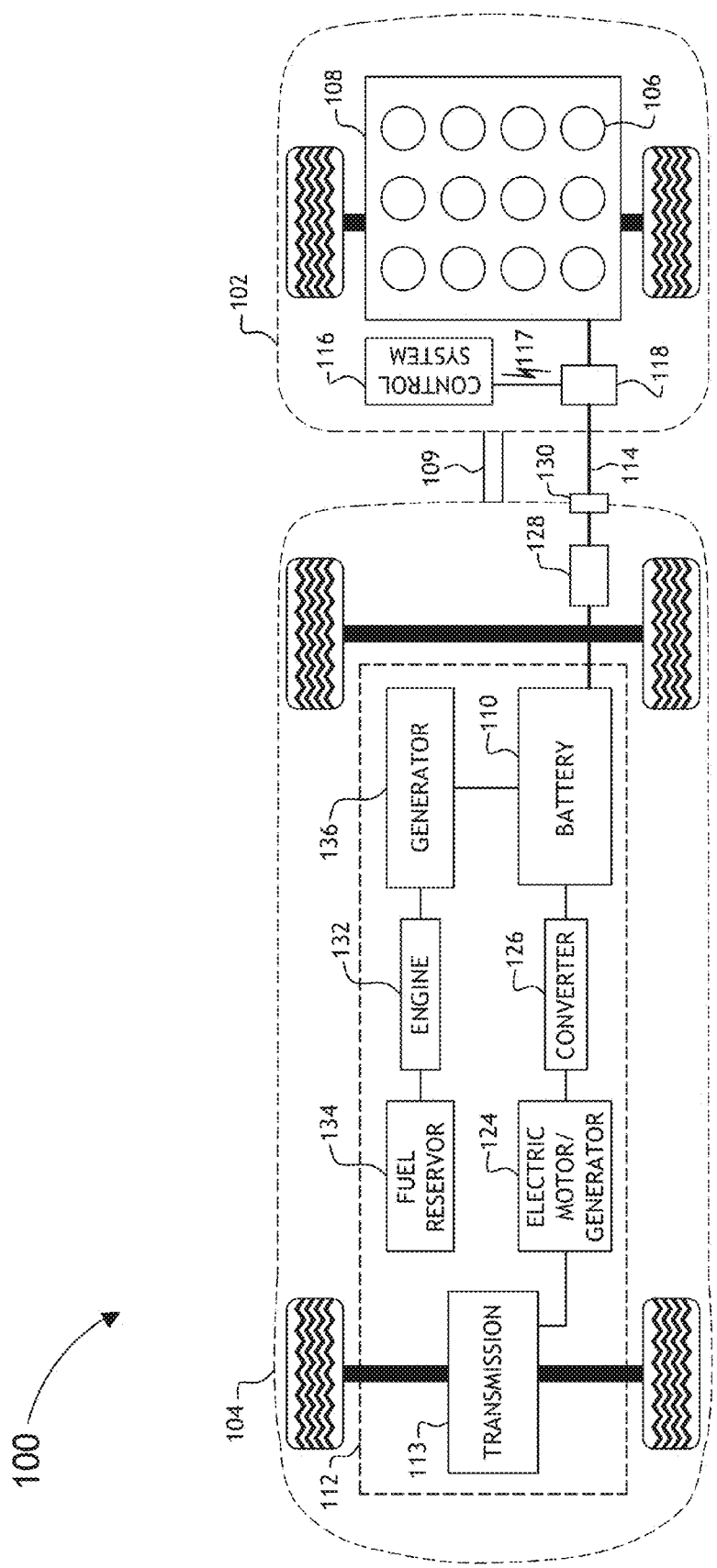
FIG. 1D is a schematic illustration of a system for supplying auxiliary electrical power to an electric or hybrid vehicle.

As illustrated in FIG. 1D, the vehicle 104 may include a series hybrid vehicle propelled via a series hybrid drivetrain. The hybrid drivetrain 112 may include, but is not limited to, a transmission 113, one or more storage batteries 110, an energy conversion portion (electric motor/generator 124 and power conversion circuitry 126) configured to convert the electrical energy stored in the one or more storage batteries 110 to mechanical energy for utilization by the transmission to propel the vehicle 104. The hybrid drivetrain 112 may further include a fuel reservoir 134 (e.g., gasoline tank), an internal combustion engine 132, and a generator 136 configured to provide electrical energy to the one or more storage batteries 110 of the drivetrain 112. In this regard, the engine 132 may produce mechanical energy utilizing the fuel of the fuel reservoir 134. The engine 132 may be further configured to provide the mechanical energy to the generator 136. In turn, the generator 136 may convert the mechanical energy from the engine 132 to electrical energy, which may then be stored in the one or more storage batteries 110. It should be recognized that the hybrid vehicle 104 of FIG. 1D is configured as a "series" hybrid vehicle as the combustion portion of the drivetrain 112 is connected in series with the electric portion of the drivetrain 112.

Figure 1E:
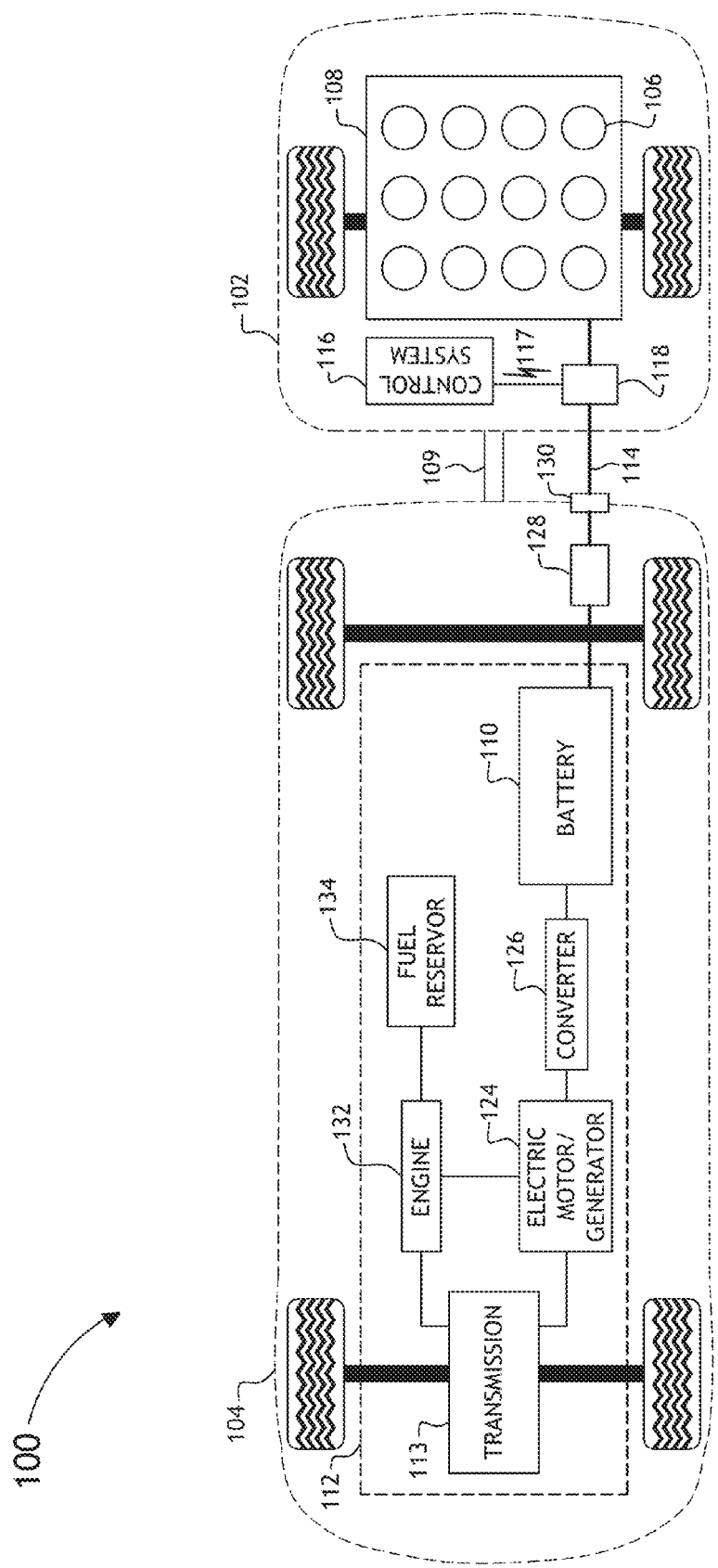
FIG. 1E is a schematic illustration of a system for supplying auxiliary electrical power to an electric or hybrid vehicle.

As illustrated in FIG. 1E, the vehicle 104 may include a series-parallel hybrid vehicle propelled via a series-parallel hybrid drivetrain. The series-parallel hybrid drivetrain 112 may include, but is not limited to, a transmission 113, one or more storage batteries 110, an energy conversion portion (electric motor/generator 124 and power conversion circuitry 126) configured to convert the electrical energy stored in the one or more storage batteries 110 to mechanical energy for utilization by the transmission to propel the vehicle 104. The hybrid drivetrain 112 may further include a fuel reservoir 134 (e.g., gasoline tank), and an internal combustion engine 132 configured to provide mechanical energy to the transmission 113 or the electric motor/generator 124. In this regard, the engine 132 may produce mechanical energy utilizing the fuel of the fuel reservoir 134. The engine 132 may be further configured to provide the mechanical energy to either the transmission 113 for propelling the vehicle 104 or the electric motor/generator for producing electricity (utilizing the generator mode of the electric motor/generator 124). In turn, the generator 124 may convert the mechanical energy from the engine 132 to electrical energy, which may then be stored in the one or more storage batteries 110. It should be recognized that the hybrid vehicle 104 of FIG. 1E is configured as a "series-parallel" hybrid vehicle as the configuration of the combustion portion of the drivetrain 112 and the electric portion of the drivetrain possesses both parallel and series characteristics. It is noted herein that the vehicle 104 configurations described above are not limiting and should be merely interpreted as illustrative. It is recognized that there exist a large number of electric and/or hybrid vehicle configurations suitable for implementation in the present invention.

Throughout the present disclosure, reference will be made to the electric vehicle embodiment (FIG. 1A and FIG. 1B) described above in order to describe the various aspects of the present invention. It should be recognized, however, by those skilled the art that the foregoing illustrations and embodiments may be extended to various electric vehicle and electric/hybrid vehicle configurations, such as those described above.

Referring again to FIGS. 1A and 1B, the control system 116 of system 100 may control the transfer of electrical energy between the one or more auxiliary batteries 106 and the one or more storage batteries 110 of the vehicle 104 by selectively electrically coupling the one or more auxiliary batteries 106 of the trailer 102 with the one or more storage batteries 110 of the vehicle 104. In one embodiment, the control system 116 may act to control the coupling circuitry 118 in order to selectively electrically couple the one or more auxiliary batteries 106 of the trailer 102 with the one or more storage batteries 110 of the vehicle 104 in order to control the transfer of electrical charge between the one or more auxiliary batteries 106 and the one or more storage batteries 110. In a further embodiment, the coupling control circuitry 118 may be positioned along the bidirectional pathway 114 and between the one or more auxiliary batteries 106 of the trailer 102 and the one or more storage batteries 110 of the vehicle 104. In this regard, the control circuitry 118 may be communicatively coupled to the control system 116 via a communication link in order to control the coupling state (e.g., open circuit or closed circuit) of the coupling circuitry 118. For example, the coupling circuitry 118 may be configured to close the bidirectional pathway 114, thereby allowing charge to flow along the pathway 114, in response to a signal indicative of a transmission command from the control system 116. By way of another example, the coupling circuitry 118 may be configured to open, or "break," the bidirectional pathway 114, thereby stopping charge flow along the bidirectional pathway 114, in response to a signal indicative of a non-transmission command from the control system 116.

It will be appreciated by those skilled in the art that the communicative coupling between the control system 116 and the control circuitry 118 may be achieved in various manners. In some embodiments, the components may be communicatively coupled via a digital or analog signal transmitted along a transmission line (e.g., copper wire, coaxial cable, or fiber optic cable) or via a digital or analog wireless signal (e.g., radio frequency signal). It should also be appreciated that the communicative coupling may be achieved via a network connection, wherein the control system 116, the coupling circuitry 118, and the various subsystem control modules of the system 100 are connected to a common digital network.

For example, the control system 106 may be configured to transmit and/or receive digital or analog signals to/from the control circuitry 118. In response to the control signal 115 transmitted by the control system 116, the control circuitry 118 may couple or decouple the electrical connection between the one or more auxiliary batteries 106 and the one or more storage batteries 110, thereby controlling the charge transfer or charge transfer rate between the one or more auxiliary batteries 106 and the one or more storage batteries 110.

It is further recognized that the control system 116 may execute a computer programmed algorithm in order to determine a coupling configuration (e.g., open switch or closed switch) of the coupling circuitry 118. As will be described in greater detail further herein, the selection of a given coupling configuration (e.g., open circuit or closed circuit) may depend on a variety of parameters and factors (e.g., charge level, charge capacity, battery lifetime, and the like) related to at least the one or more auxiliary batteries 106 of the towable trailer 102 or the one or more storage batteries 110 of the vehicle 104. For example, the processor of the control system 116 may determine the electrical energy/charge transfer requirements needed to achieve a selected charge distribution in the one or more auxiliary batteries of the trailer 102 and the one or more storage batteries of the vehicle 104.

Figure 2A:
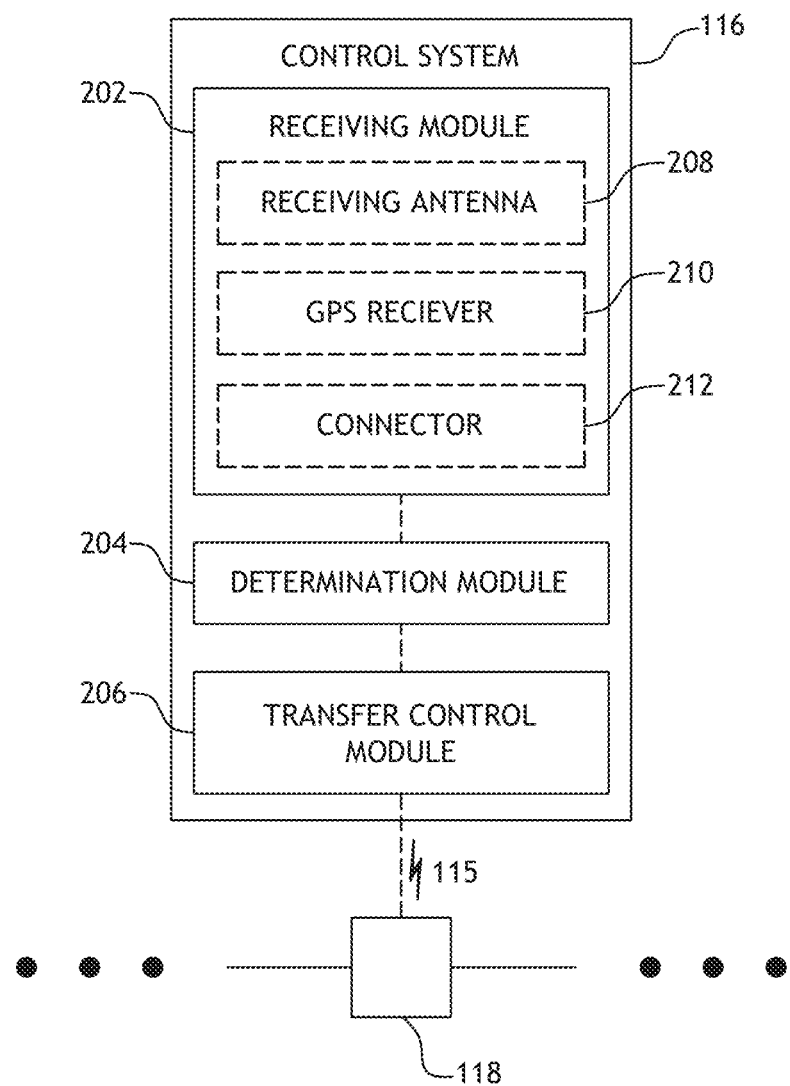
FIG. 2A is a block diagram illustrating a control system of a system for supplying auxiliary electrical power to an electric or hybrid vehicle.

In a further embodiment, illustrated in FIG. 2A, the control system 116 may include a receiving module 202, a determination module 204, and a transfer control module 206.

In one aspect of the control system 116, the receiving module 202 of the control system 116 may be configured to receive a signal transmitted from one or more data sources, as discussed further herein. In one embodiment, the receiving module 202 may include one or more receiving antennas configured to receive one or more wireless signals transmitted by one or more data sources. For example, the one or more receiving antennas (i.e., receivers) of the receiving module 202 may be configured to receive a wireless transmission from an off-site entity. For instance, the receiving module 202 may be configured to receive one or more data transmissions (e.g., radio frequency, microwave frequency data transmissions, and the like) from an information service provider, such as, but not limited to, a weather service provider, a road condition information service provider, a wireless internet provider, and the like. By way of another example, the receiving module 202 may include a GPS receiver configured for receiving GPS data. In a general sense, the receiving module 202 may be configured to receive data encoded wireless signals from any suitable information source known in the art.

In another embodiment, the receiving module 202 of the control system 116 may be configured to receive a wireless or wireline transmission from an additional sub-system of the system 100. For example, the receiving module 202 may include a receiver 208 configured to receive a wireless transmission (e.g., RF signal) from a sub-system (e.g., battery monitoring system 236) of the system 100. By way of another example, the receiving module 202 may include a physical connector 212 (e.g., data port) configured for establishing a wireline connection between the control system 116 and a sub-system (e.g., battery monitoring system 236) of the system 100.

Figure 2B:
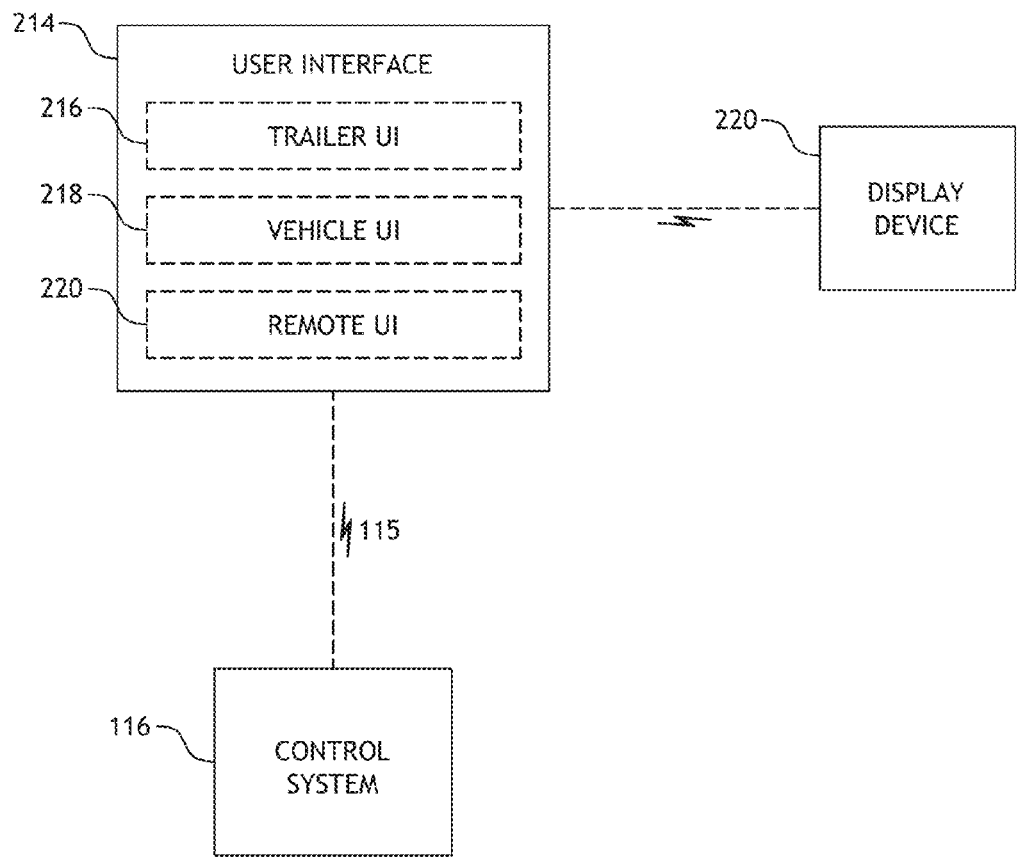
FIG. 2B is a block diagram illustrating a control system, a user interface device, and a display device of a system for supplying auxiliary electrical power to an electric or hybrid vehicle.

In another embodiment, as shown in FIGS. 2A and 2B, the receiving module 202 may be configured to receive a signal (e.g., wireless or wireline) transmitted by a user interface device 214. For example, the receiving module 202 may be configured to receive a wireless signal transmitted from a portable user interface device 220 communicatively coupled with the receiving module 202 of the control system 116. For instance, the receiving module 202 may be communicatively coupled with a portable, or "remote," user interface device 220 (i.e., remote control device) via a RF signal, IR signal, and the like. By way of another example, the receiving module 202 may be configured to directly receive data input (e.g., instruction commands) from a hardwired user interface device (e.g., touchscreen, mouse, trackball, keyboard, bezel mounted entry device and the like). For example, the user interface device 214 may include a user interface device disposed within or on the towable trailer 216 (e.g., touchscreen, keyboard, or display device bezel input system mounted on trailer 104), or a user interface device disposed within the vehicle 218 (e.g., touchscreen, keyboard, or display device bezel input system mounted within vehicle 104).

In another embodiment, as shown in FIG. 2B, the control system 116 may be communicatively coupled to a display device 220. In a general sense, the display device 220 may include any display device known in the art. In one embodiment, the display device 220 may include an audio display device (e.g., speaker). In this regard, information related to one or more characteristics of at least the one or more auxiliary batteries 106 or the one or more storage batteries 110 may be relayed to a user via an audible signal, such as, but not limited to, an audible announcement, a tone, a simulated voice, or a series of tones. In another embodiment, the display device 220 may include a visual display. For example, the visual display may include, but is not limited to, a liquid crystal display (LCD), one or more light emitting diodes (LEDs), one or more organic LEDs (OLEDs), or a cathode rate tube (CRT). In another embodiment, the display device 220 may be configured to utilize text-based messages, symbols, indicia, or other identifiable visual characters, or symbols. In a further embodiment, the display device 220 may include a display device positioned within or on the towable trailer 102, a display device positioned within the vehicle 104, or on a portable communications device (e.g., tablet, PDA, smartphone, and the like).

In an additional embodiment, the user interface device 214 and the display device 220 may be integrated such that a display device 220 may display information to the user, allowing the user to utilize a user interface device 214 to input information into the control system 116 in response to the displayed information. For example, the user interface 214/display device 220 sub-system may comprise an integrated touchscreen device configured to display information to a user and further configured to receive input information from the user via tactile feedback from the user.

In another aspect of the control system 116, the determination module 204 of the control system 116 may include one or more processing units configured to receive a signal from the receiving module 202 and further configured to execute a preprogrammed algorithm stored as a set of instructions in an associated carrier medium (not shown). Upon receiving a signal from the receiving module 202, the one or more processing units of the determination module 204 may execute the selected preprogrammed algorithm in order to determine the coupling configuration of the communicatively coupled coupling circuitry 118. As will be discussed in greater detail further herein, the results generated by the determination module 204 may depend upon a variety of parameters and factors associated with at least the one or more auxiliary batteries 106 or the one or more storage batteries 110.

It is further recognized that the control system 116 of the system 100 may be equipped with memory (not shown) for storing data associated with at least data received by the receiving module 202 as well as results generated by the processor of the determination module 204. For example, the memory of the control system 116 may store data regarding road condition information received by the receiving module 202. By way of another example, the memory of the control system 116 may store data regarding user preference information received from a user input device by the receiving module 202. Even further, the memory of the control system 116 may store output data generated via the execution of preprogrammed instructions by the processor of the determination module 204. In a general sense, the memory of the control system 116 may store data related to any function of the system 100 (and like systems 300 and 400) as described in any portion of the present disclosure.

In another aspect of the control system 116, the transfer control module 206 of the control system 116 may control the coupling control circuitry 118 in response to a result generated by the determination module 204. For example, upon receiving a signal indicative of a generated coupling configuration result from the determination module 204, the transfer control module 206 may in turn transmit a control signal 115 to the coupling control circuitry 118. In response to the control signal 115 transmitted by the transfer control module 206 of the control system 116, the control circuitry 118 may couple or decouple the electrical connection between the one or more auxiliary batteries 106 and the one or more storage batteries 110 in accordance with the control signal 115. In a further embodiment, the transfer control module 206 of the control system 116 may include any suitable signal transmission means known in the art. For example, the transfer control module 206 may include a transmitter configured to transmit a signal (e.g., wireless signal) to the coupling circuitry 118. By way of another example, the transfer control module 206 may include a physical connector configured to communicatively couple the determination module 204 and the coupling circuitry 118. Further, the transfer control module 206 may include any suitable signal switching devices known in the art.

Figure 2C:
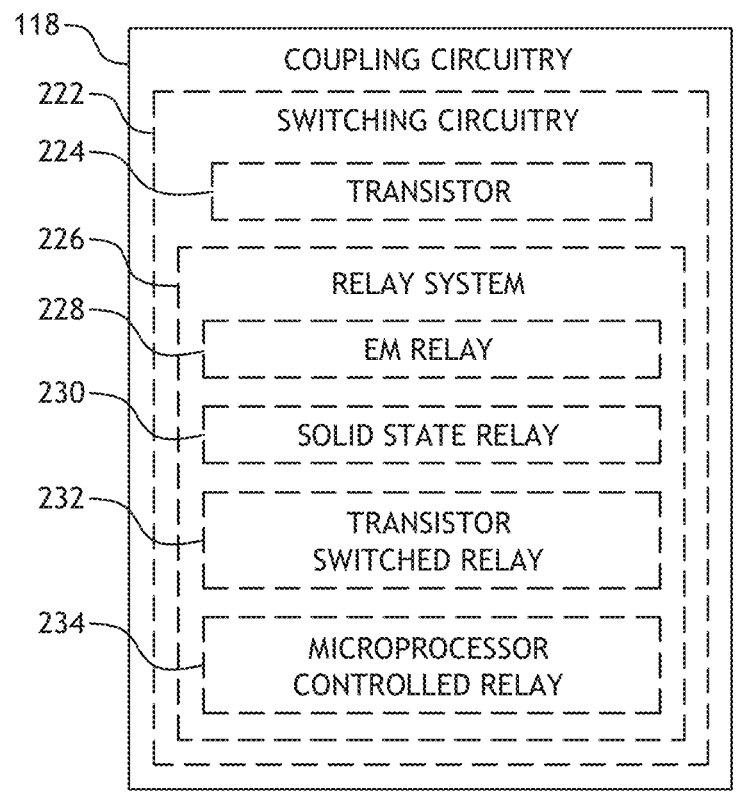
FIG. 2C is a block diagram illustrating the types of coupling circuitry suitable for implementation in a system for supplying auxiliary electrical power to an electric or hybrid vehicle.

Referring now to FIG. 2C, the coupling circuitry 118 may include switching circuitry 222. In one embodiment, the control system 116 may be configured to control the switching state of switching circuitry 222 positioned along the bidirectional pathway 114 in order to control the transfer of charge between the one or more auxiliary batteries 106 and the storage battery 110. In a further embodiment, the switching circuitry 222 may include, but is not limited to, one or more transistors 224 (e.g., NPN transistor or PNP transistor) or one or more relay systems 226. For example, the relay system 226 may include, but is not limited to, an electromagnetic relay system 228 (e.g., a solenoid based relay system), a solid state relay system 230, or a transistor switched electromagnetic relay system 232.

While the above description has focused on the direct control of the coupling circuitry 118 (e.g., switching circuitry 222) utilizing the control system 116, it is further contemplated that the coupling circuitry 118 may be equipped with an independent computer data processing system having signal receiving and processing hardware and software configured to receive and process a control signal transmitted by the control system 116. For example, the coupling circuitry 118 may include a microprocessor controlled relay system 234 configured such that a signal transmitted by the control system 116 may be received by a receiver (not shown) of the coupling circuitry 118 and analyzed utilizing a processor (not shown) of the coupling circuitry 118. Upon analysis of the signal received from the control system 116, the processor of the coupling circuitry 118 may act to control the switching state (e.g., open switch or closed switch) of the associated relay system 234 positioned along the bidirectional pathway 114.

By way of an additional example, the microprocessor controlled relay system, may include, but is not limited to a microprocessor controlled relay system programmed to respond to one or more conditions (e.g., a signal transmitted from control system 116 or a signal transmitted directly from an additional sub-system (e.g., battery monitoring system)).

Applicant notes that the preceding description related to the components of the control system 116 is not limiting, but should merely be interpreted as illustrative as those skilled in the art will appreciate that numerous similar or analogous control system (or "controller") architectures may be implemented within the context of the present invention It is recognized herein that the one or more auxiliary batteries 106 of the trailer 102 may be coupled with the one or more storage batteries 110 of the vehicle 104 in a variety of configurations. In one embodiment, coupling circuitry 118 may be configured to electrically couple the one or more auxiliary batteries 106 of the trailer in a parallel configuration with the one or more storage batteries 110 of the vehicle 104. In another embodiment, coupling circuitry 118 may be configured to electrically couple the one or more auxiliary batteries 106 of the trailer in a series configuration with the one or more storage batteries 110 of the vehicle 104. Even further, the coupling circuitry 118 may be configured to electrically couple the one or more auxiliary batteries 106 of the trailer in a series/parallel configuration with the one or more storage batteries 110 of the vehicle 104.

Figure 2D:
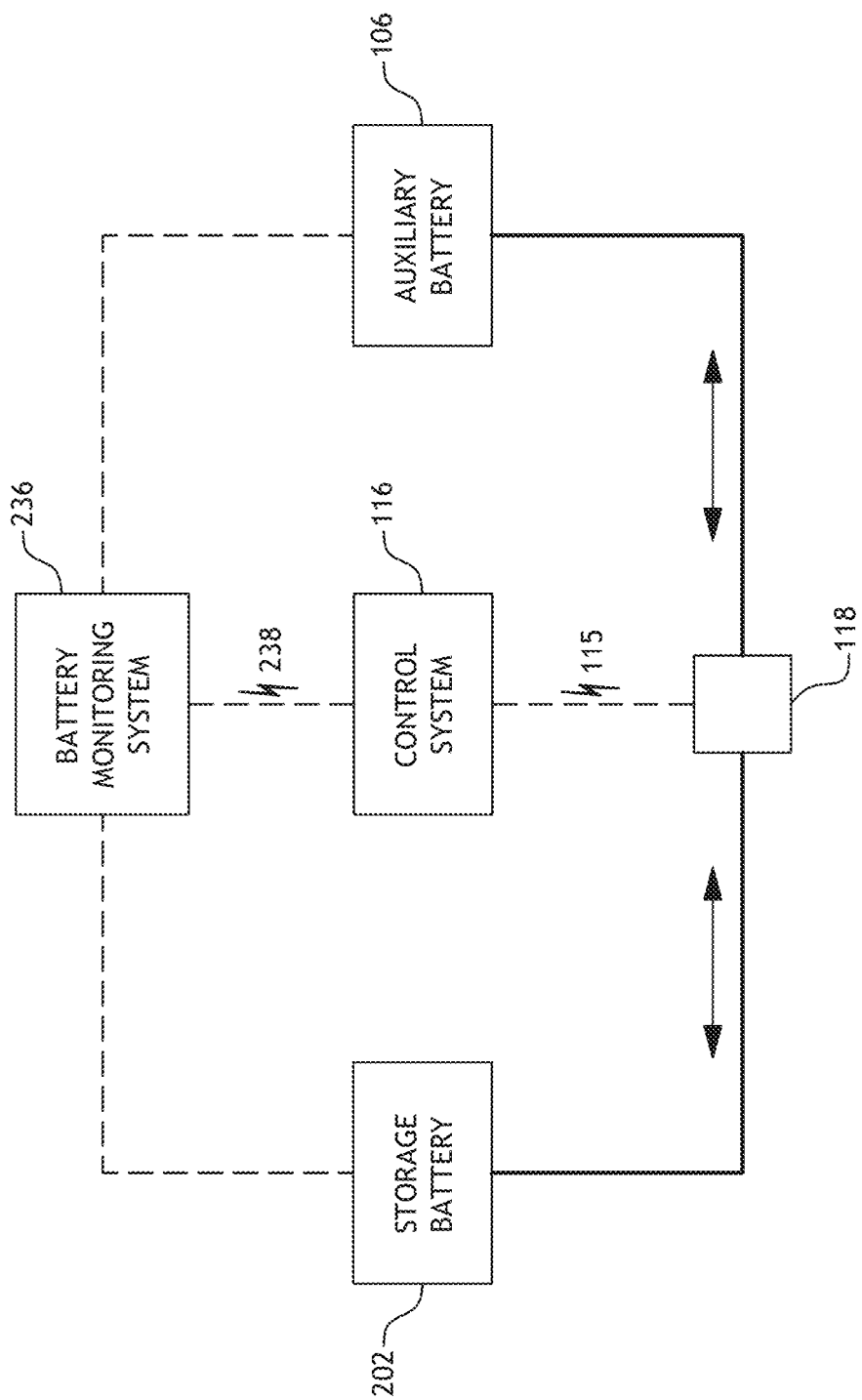
FIG. 2D is a block diagram illustrating a battery monitoring system of a system for supplying auxiliary electrical power to an electric or hybrid vehicle.

Referring now to FIG. 2D, the system 100 may further include one or more battery monitoring systems 236 configured to monitor one or more characteristics of at least one of the one or more storage batteries of the vehicle 104 or the one or more auxiliary batteries 106 of the towable trailer 102. In one embodiment, the battery monitoring system 236 may measure one or more characteristics of the one or more storage batteries 110 of the vehicle 104. Then, the battery monitoring system 236 may transmit one or more signals 238 (e.g., wireless signal or wireline signal) indicative of the monitored characteristics of the one or more storage batteries 110 to the control system 116. In another embodiment, the battery monitoring system 236 may measure one or more characteristics of the one or more auxiliary batteries 106 of the towable trailer 102. Then, the battery monitoring system 236 may transmit one or more signals 238 (e.g., wireless signal or wireline signal) indicative of the monitored characteristics of the one or more auxiliary batteries 106 to the control system 116. In a further embodiment, the battery monitoring system 236 may be configured to measure one or more characteristics of the one or more storage batteries 110 or the one or more auxiliary batteries 106 at a preselected time interval (e.g., selected by user or determined by control system 116).

In a general sense, the battery monitoring system 236 may include any known system or device suitable for monitoring or measuring one or more characteristics of a battery. In one embodiment, the battery monitoring system 236 may include a system configured for measuring the state of charge (SOC) of one or more batteries. In a further embodiment, the battery monitoring system 236 may include, but is not limited to, a current-based SOC measurement device configured to measure the amount of charge discharged from the one or more batteries (e.g., auxiliary batteries 106 and/or storage batteries 110). Then, utilizing the measured discharge the battery monitor system 236 or the control system 116 may calculate the level of charge remaining in the battery by comparing the discharged charge to the expected charge level of the battery when in the freshly charged state. In another embodiment, the battery monitoring system 236 may include, but is not limited to, a voltage-based SOC measurement device configured to determine the amount of remaining charge in the one or more batteries by measuring the open circuit voltage of the battery. In an additional embodiment, the battery monitoring system 236 may include, but is not limited to, an impedance-based SOC measurement device configured to determine the amount of charge/discharge of a battery by monitoring the internal impedance of the battery.

In another embodiment, the battery monitoring system 236 may include a time elapsed-based SOC system. Those skilled in the art will recognize that at least some battery systems (e.g., Lithium cells) suitable for implementation in the present invention possess a linear discharge characteristic over time. As such, the SOC of the one or more batteries of the batteries may be estimated utilizing the elapsed time of travel since the last charging cycle of the one or more batteries. In a further embodiment, the battery monitoring system 236 may include a distance travelled-based SOC system configured to determine the SOC of the one or more batteries utilizing the total distance travelled since the last charging cycle of the one or more batteries.

In another embodiment, the battering monitoring system 236 may include a digital specific gravity (SG) based measurement device. For example a SG-based battery monitoring system may be configured to determine the charge state of a battery by measuring the changes in the weight of the active chemicals of the battery. For instance, the batteries (e.g., auxiliary batteries 106 or storage batteries 110) of the system 100 may be equipped with a digital sensor configured to measure and monitor the SG of the electrolyte of the given battery.

In another embodiment, the battery monitoring system 236 may include a temperature monitoring system, such as a thermocouple device or a RTD element. Those skilled in the art will recognize that various charge measurement devices, such as those described above, may depend on the temperature of the measurement process. As such, it is contemplated herein that the addition of temperature information may aid in more precisely determining the amount of charge remaining in a given battery. For example, those skilled in the art should recognize that a voltage-based SOC measure process is highly temperature dependent. Therefore, by inputting known temperatures, both at the time of measurement and during the discharge cycle of the battery, the estimated remaining charge level of the one or more batteries may be improved.

It is further recognized herein that a variety of charge estimation algorithms may be utilized by the present invention in order to determine or estimate the amount of charge remaining in either the one or more auxiliary batteries 106 or the one or more storage batteries 110 of the system 100. An implemented charge estimation algorithm may base the charge estimation on a variety of factors including, but not limited to, number or accumulated charge cycles, level of discharging in previous discharge cycles, level of charging in previous charging cycles, temperature, time since last charge cycle, distance traveled since last charge cycle, and the like.

In some embodiments of the present invention, the control system 116 may be configured to maintain a charge state of the one or more storage batteries 110 of the vehicle 104 above a preselected charge level. In this regard, the control system 116 may control the coupling circuitry 118 such that the electric charge of the one or more storage batteries 110 is maintained above a preselected charge level. For example, upon receiving a signal 238 from a battery monitoring system 236 indicative of the charge level of the one or more storage batteries 110 is at, below, or approaching the preselected charge level, the control system 116 may transmit a signal to the coupling circuitry 118 directing the coupling circuitry 118 to close the switch between the one or more auxiliary batteries 106 and the one or more storage batteries 110, thereby allowing charge stored in the one or more auxiliary batteries 106 to flow into the one or more storage batteries 110. In another example, the charge transfer may be initiated by the control system 116 upon a metric-based (e.g., time-based or distance-based) determination by the control system 116 indicative of a depletion of the charge stored in the one or more storage batteries 110 below a preselected level. For instance, the control system 116 may monitor the time or distance driven by the vehicle 104 since the last charging cycle of the one or more storage batteries 110. Then, utilizing stored historical data, the control system 116 may estimate the amount of discharge experienced by the one or more the storage batteries 110. Upon determining a critical time or distance (i.e., the time or distance corresponding to the preselected charge level), the control system 116 may transmit a signal to the coupling circuitry 118 directing the coupling circuitry 118 to close the switch between the auxiliary batteries 106 and the storage batteries 110.

In a further embodiment, the control system 116 may be configured to maintain a charge state of the one or more storage batteries 110 of the vehicle 104 above a damage-causing level of the one or more storage batteries 110. In this sense, the preselected charge level may consist of the charge level of the one or more storage batteries 110 required to avoid damaging the operational capability of the one or more storage batteries 110. For example, the damage-causing charge level may be entered into a memory of the control system 116 via user input. By way of another example, the damage-causing charge level may be determined by the control system 116 utilizing a database configured to associate storage battery types and the damage-causing charge level of the storage batteries types. For instance, the database may be preloaded into the memory of a control system 116. In another instance, the database stored in the control system 116 memory may be continually updated utilizing an off-site database server placed in communication with the control system 116 (e.g., control system is communicatively coupled with the database server via a wireless internet connection).

In some embodiments of the present invention, the control system 116 may be configured to establish a charge state of the one or more storage batteries 110 of the vehicle 104 above a preselected charge level upon disconnection of the one or more storage batteries 110 from the one or more auxiliary batteries 106. For example, the preselected charge level may include a charge level required to allow the vehicle 104 to travel a selected distance upon disconnection of the one or more storage batteries 110 from the one or more auxiliary batteries 106. In a further embodiment, the control system 116 may be configured to receive an input from a user (e.g., input received from user interface device 214) indicative of the desired driving distance upon disconnection of the one or more auxiliary batteries 106. Then, the control system 116 may determine a minimum charge level needed to achieve the selected driving distance requirements. For instance, the minimum charge level may be determined utilizing historical data (e.g., historical data received from off-site data base or historical data generated by the control system 116) configured to correlate charge level of the storage batteries 110 with driving distance. Based on the charge level determination, the control system 116 may control the coupling circuitry 118 in order to achieve the required charge level in the one or more storage batteries 110 of the vehicle 104.

In some embodiments of the present invention, the control system 116 may be configured to maintain a charge state of the one or more auxiliary batteries 106 of the towable trailer 102 above a preselected charge level. In this regard, the control system 116 may control the coupling circuitry 118 such that the electric charge of the one or more auxiliary batteries 106 is maintained above a preselected charge level. For example, upon receiving a signal 238 from a battery monitoring system 236 indicative of the charge level of the one or more auxiliary batteries 106 being at, below, or approaching the preselected charge level, the control system 116 may transmit a signal to the coupling circuitry 118 suitable for directing the coupling circuitry 118 to close the switch between the one or more auxiliary batteries 106 and the one or more storage batteries 110, thereby allowing charge stored in the one or more storage batteries 110 to flow into the one or more auxiliary batteries 106. In another example, the charge transfer may be initiated by the control system 116 in response to a metric-based (e.g., time-based or distance-based) determination by the control system 116 indicative of a depletion of the charge stored in the one or more auxiliary batteries 106 below a preselected level. For instance, the control system 116 may monitor the time or distance driven by the vehicle 104 since the last charging cycle of the one or more storage batteries 110. Then, utilizing stored historical data, the control system 116 may estimate the amount of discharge experienced by the one or more the auxiliary batteries 106. Upon determining a critical time or distance (i.e., the time or distance corresponding to the preselected charge level), the control system 116 may transmit a signal to the coupling circuitry 118 directing the coupling circuitry 118 to close the switch between the auxiliary batteries 106 and the storage batteries 110.

In a further embodiment, the control system 116 may be configured to maintain a charge state of the one or more auxiliary batteries 106 of the towable trailer 102 above a damage-causing level of the one or more auxiliary batteries 106. In this sense, the preselected charge level may consist of the charge level of the one or more auxiliary batteries 106 required to avoid damaging the operational capability of the one or more auxiliary batteries 106. It is further noted that the damage-causing charge level of the one or more auxiliary batteries 106 may be determined in a manner similar to that of the one or more storage batteries 110, as described previously herein.

In some embodiments of the present invention, the control system 116 may be configured to establish a charge state of the one or more auxiliary batteries 106 of the towable trailer 102 above a preselected charge level upon disconnection of the one or more auxiliary batteries 106 from the one or more storage batteries 110. For example, the preselected charge level may include a charge level required to return the one or more auxiliary batteries 106 to an initial charge state. It is contemplated herein that there may exist scenarios wherein a user may desire the ability to establish a charge in the one or more auxiliary batteries 106 above a predetermined charge level. For instance, a user may rent the one or more auxiliary batteries 106 (along with the trailer 102) from a rental company. In addition, the rental company may charge a fee to the user upon returning the rented auxiliary batteries 106 to the rental facility with a charge level below a preselected level (e.g., below initial charge level). As such, it may be economically efficient for the user, prior to returning the auxiliary batteries 106 to the rental facility, to distribute charge stored on the one or more storage batteries 110 of the vehicle 104 to the one or more auxiliary 106 of the towable trailer 102. In a further embodiment, the control system 116 may be configured to receive an input from a user (e.g., input received from user interface device 214) indicative of the desired charge level of the one or more auxiliary batteries 106 upon disconnection of the one or more auxiliary batteries 106 from the one or more storage batteries 110. Based on the selected charge level, the control system 116 may control the coupling circuitry 118 in order to achieve the selected charge level in the one or more auxiliary batteries 106 of the towable trailer 102.

In some embodiments of the present invention, the control system 116 may be configured to establish a charge state of the one or more storage batteries 110 of the vehicle 104 and/or a charge state of the one or more auxiliary batteries 106 of the towable trailer 102 based on one or more parameters. In a further embodiment, the charge state of the one or more storage batteries 110 and/or a charge state of the one or more auxiliary batteries 106 may be established based on one or more external parameters. For example, the one or more external parameters may include, but are not limited to, a received set of driving conditions. For instance, the one or more external parameters may include, but are not limited to, current driving conditions, future driving conditions (i.e., anticipated driving conditions), or past driving conditions. Further, the driving conditions may include, but are not limited to, road conditions, weather conditions, location information, and the like. For example, the charge state of the one or more storage batteries 110 and/or a charge state of the one or more auxiliary batteries 106 may be established based on road condition parameters (e.g., road surface conditions, road construction status, terrain (e.g., road grade) and the like) received from a road condition information service and spatial position data received from a received GPS signal. It is further recognized that any combination of known external parameters (e.g., road conditions, weather conditions, vehicle location (via GPS), and the like) may be used to determine the charging state for the one or more storage batteries 110 and/or the one or more auxiliary batteries 106. Based on the determined charge levels for the one or more storage batteries 110 and/or the one or more auxiliary batteries 106, the control system 116 may control the coupling circuitry 118 in order to establish the selected charge level in the one or more auxiliary batteries 106 and/or the one or more storage batteries 110.

In another embodiment, the charge state of the one or more storage batteries 110 and/or a charge state of the one or more auxiliary batteries 106 may be established based on one or more internal parameters. In a further embodiment, the one or more internal parameters may include, but are not limited to, one or more parameters associated with the operational status of at least one of the one or more storage batteries 110 or the one or more auxiliary batteries 106. For example, the one or more internal parameters may include, but are not limited to, the ability of the one or more storage batteries 110 and/or the one or more auxiliary batteries 106 to retain charge. In another example, the one or more internal parameters may include, but are not limited to, the inter-battery transfer rate between the one or more storage batteries 110 and the one or more auxiliary batteries 106. For example, the charge state of the one or more storage batteries 110 and/or a charge state of the one or more auxiliary batteries 106 may be established based on the inter-battery transfer rate between the one or more storage batteries 110 and the one or more auxiliary batteries 106. It is recognized herein that determining the charging level of the one or more auxiliary batteries 106 and/or the one or more storage batteries 110 based on one or more internal parameters may aid in assuring that sufficient charge is stored in the one or more storage batteries 110 to overcome future more rigorous driving conditions (e.g., increased road grade, decreased road surface quality, and the like), which may require an increased discharge rate to meet the increased performance requirements on the electric motor 124 of the vehicle 104. It is further recognized that determining the charging level of the one or more auxiliary batteries 106 and/or the one or more storage batteries 110 based on one or more internal parameters may aid in assuring that the one or more storage batteries 110 of the vehicle 104 have sufficient charge storage ability to recapture electrical charge generated during a regenerative breaking process of the vehicle 104.

In another embodiment, the charge state of the one or more storage batteries 110 and/or a charge state of the one or more auxiliary batteries 106 may be established based on a comparison between a first parameter and a second parameter. In a further embodiment, the charge state of the one or more storage batteries 110 and/or a charge state of the one or more auxiliary batteries 106 may be established based on a difference between a first parameter and a second parameter. For example, the charge state of the one or more storage batteries 110 and/or a charge state of the one or more auxiliary batteries 106 may be established based on a difference between a cost of electricity associated with charging the one or more storage batteries 110 of the vehicle 104 and a cost of electricity associated with charging the one or more auxiliary batteries 106 of the towable trailer 102. By way of another example, the charge state of the one or more storage batteries 110 and/or a charge state of the one or more auxiliary batteries 106 may be established based on a difference between an expected lifetime of the one or more storage batteries 110 of the vehicle 104 and an expected lifetime of the one or more auxiliary batteries 106 of the towable trailer 102. In another example, the charge state of the one or more storage batteries 110 and/or a charge state of the one or more auxiliary batteries 106 may be established based on a difference between a charging efficiency associated with the one or more storage batteries 110 of the vehicle 104 and a charging efficiency associated with the one or more auxiliary batteries 106 of the towable trailer 102. In another example, the charge state of the one or more storage batteries 110 and/or a charge state of the one or more auxiliary batteries 106 may be established based on a difference between a discharging efficiency associated with the one or more storage batteries 110 of the vehicle 104 and a discharging efficiency associated with the one or more auxiliary batteries 106 of the towable trailer 102. It is noted herein that the list of parameter differences described above should not be interpreted as limiting, but is merely provided for illustrative purposes. It is anticipated that control system 116 may render a charge state determination for the auxiliary batteries 106 and the storage batteries 110 based on a number of parameters and parameter differences. For example, it is further contemplated that the charge state of the one or more auxiliary batteries 106 and/or the charge state of the storage batteries 110 may be determined based on at least one of a difference between the age of the one or more auxiliary batteries 106 and the one or more storage batteries 110, a difference between the number of accumulated charging cycles of the one or more auxiliary batteries 106 and the one or more storage batteries 110, a difference between the available charging capacity of the one or more auxiliary batteries 106 and the one or more storage batteries 110, a difference between the measured discharge of the one or more auxiliary batteries 106 and the one or more storage batteries 110, and the like.

In some embodiments of the present invention, the control system 116 may be configured to establish a charge state of the one or more storage batteries 110 of the vehicle 104 and/or a charge state of the one or more auxiliary batteries 106 of the towable trailer 102 based on user input. In a further embodiment, the control system 116 may transmit a signal indicative of user selected charge level query to the display device 220. In response to the displayed query, a user may select the preferred charge level of at least one of the one or more storage batteries 110 of the vehicle or the one or more auxiliary batteries 106 of the towable trailer 102 via user interface device 214. Based on the user selected charge levels for the one or more storage batteries 110 and/or the one or more auxiliary batteries 106, the control system 116 may control the coupling circuitry 118 in order to establish the selected charge level in the one or more auxiliary batteries 106 and the one or more storage batteries 110.

In some embodiments of the present invention, the control system 116 may be configured to control a rate of transfer of electrical energy between the one or more auxiliary batteries 106 of the towable trailer 102 and the one or more storage batteries 110 of the vehicle 104. In a further embodiment, the control system 116 may be configured to limit a rate of transfer of electrical energy between the one or more auxiliary batteries 106 of the towable trailer 102 and the one or more storage batteries 110 of the vehicle 104 below a preselected or predetermined level. It is anticipated herein that it may be desirable to control the rate of transfer of charge between the one or more auxiliary batteries 106 and the one or more storage batteries 110 in order to avoid damage (e.g., heating damage) to either the one or more storage batteries 110 or the auxiliary batteries 106.

Referring again to FIGS. 1A and 1B, in some embodiments of the present invention, the coupling unit 109 of the system 100 may include a mechanical-based coupling unit configured to reversibly attach the towable trailer 102 to the rear portion of the vehicle 104. For example, the mechanical coupling unit may include, but is not limited to, a hitch (e.g., ball hitch), one or more latches, one or more clamps, one or more suction disks, and the like. In another embodiment, the coupling unit 109 an electromagnetic-based coupling unit configured to reversibly attach the towable trailer 102 to the rear portion of the vehicle 104. For example, one or more magnetic (e.g., permanent magnets or electromagnets) may be utilized in a magnetic coupling device to mechanically secure the towable trailer 102 to the rear portion of the vehicle 104. For instance, an electromagnet positioned in or on the towable trailer 102 may be energized by either electrical energy form the auxiliary batteries 106, the storage batteries 110, or another portion of the vehicle drivetrain 112 and then magnetically coupled with a magnetizable portion of the rear portion of the vehicle 104. It is further recognized herein that a portion of the vehicle 104 may be equipped with a magnetized portion to enhance coupling between the electromagnet of the towable trailer 102 and the vehicle 104.

In some embodiments of the present invention, the one or more wheels 120 rotatably connected to the chassis of the towable trailer 102 may include, but are not limited to, one or more wheels 120 configured to passively translate the towable trailer 102 utilizing a pulling force provided by the vehicle 104. In alternative embodiments, the one or more wheels 120 rotatably connected to the chassis of the towable trailer 102 may include, but is not limited to, one or more wheels 120 operatively connected to a drivetrain (not shown) of the towable trailer 102. Further, the drivetrain of the towable trailer 102 is configured to supply mechanical energy to the wheel 120 in such a manner to rotate the one or more wheels 120, thereby translating the towable trailer 102. For instance, the drivetrain of the towable trailer 102 may include an electric motor configured to receive electrical energy from an energy source (e.g., batteries, output of a generator, and the like) and further configured to convert the received electrical energy into rotational mechanical energy usable by the rotatably attached wheel 120. In this regard, the drivetrain of the towable trailer 102 is configured to provide propulsive energy to the towable trailer 102. In a further embodiment, the drivetrain of the trailer 102 is configured to receive electrical energy from the one or more storage batteries 110 of the vehicle and further configured to supply propulsive energy to the trailer 102 by converting the received electrically energy to mechanical energy. In an additional embodiment, the drivetrain of the trailer 102 is configured to receive electrical energy from the one or more auxiliary batteries 106 of the towable trailer 102 and further configured to supply propulsive energy to the trailer 102 by converting the received electrically energy to mechanical energy.

While the present disclosure has focused on the implementation of the present invention in the context of a wheeled vehicle, it is contemplated herein that the vehicle 104 of the present invention may include any vehicle known in the art. For example, the vehicle 104 may include, but is not limited to, a railed vehicle (e.g., trolley, train, and the like), a tracked vehicle (e.g., bulldozer, tank, tracked tractor type vehicle, snow mobile, and the like), or a skied vehicle (e.g., snow mobile).

Figure 2E:
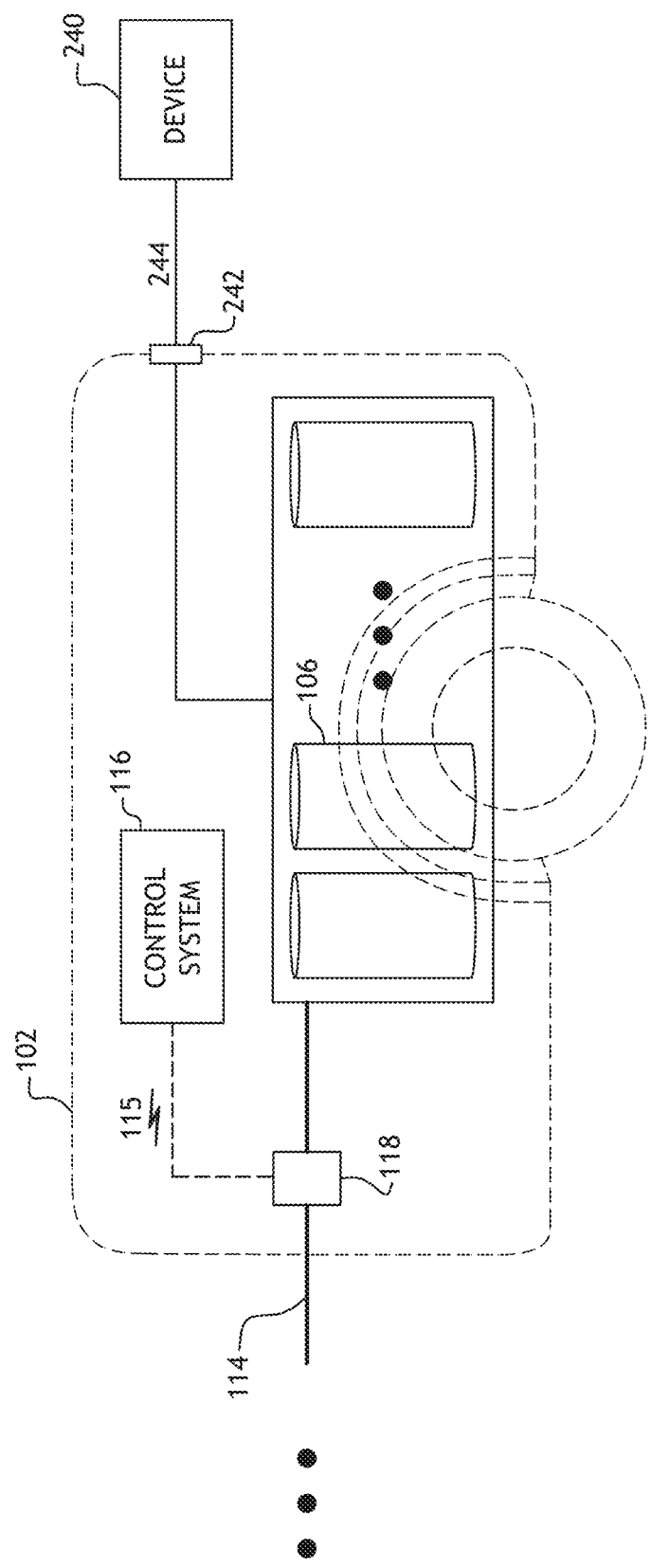
FIG. 2E is a block diagram illustrating a towable trailer of a system for supplying auxiliary electrical power to an electric or hybrid vehicle equipped with an auxiliary output.

Referring now to FIG. 2E, the towable trailer 102 of the system 100 may further include one or more auxiliary electrical outputs 242 operatively coupled to the one or more auxiliary batteries 106 of the towable trailer 102. In this regard, the auxiliary electrical output 242 may be configured to supply electrical energy to an additional device 240. Further, the additional device 240 may be coupled to the auxiliary output 242 via an auxiliary pathway 244. For example, the auxiliary pathway 244 may consist of a reversibly pluggable cable configured to allow the additional device 240 to be "plugged into" the auxiliary output 242 of the towable trailer 102. In this manner it is contemplated herein that the auxiliary output 242 may include an output port, a "socket," configured to receive an electrical male prong suitable for use in a variety of electrical devices. It should be noted herein that this electrical coupling configuration is not limiting as is provided merely for illustrative purposes. It is anticipated that any electrical coupling configuration known in the art is suitable for implementation in the present invention.

Figure 2F:
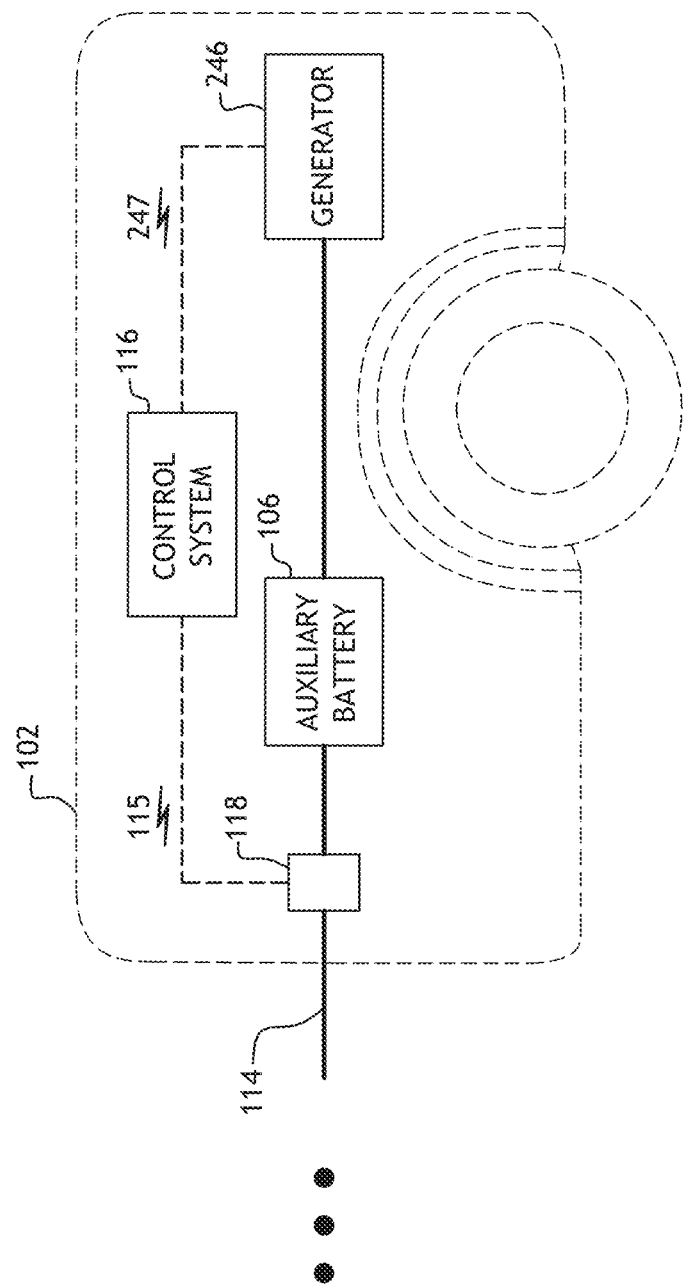
FIG. 2F is a block diagram illustrating a towable trailer of a system for supplying auxiliary electrical power to an electric or hybrid vehicle equipped with a generator.
Figure 2G:
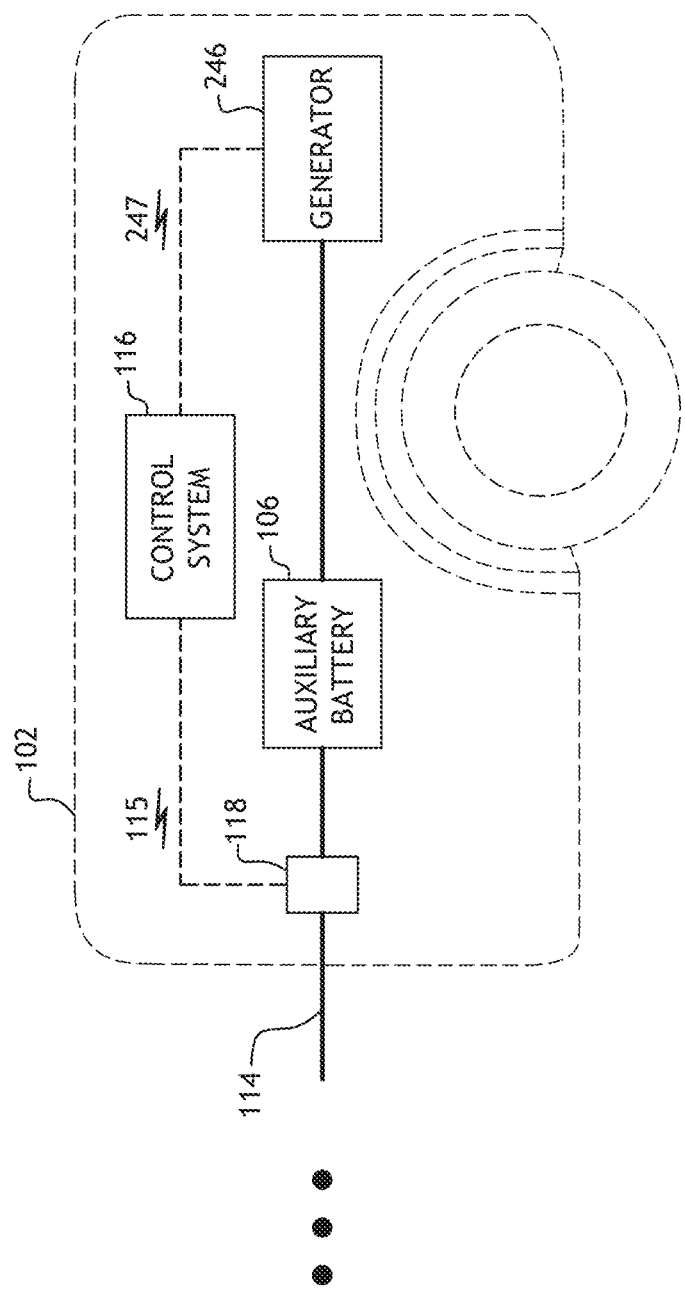
FIG. 2G is a block diagram illustrating a towable trailer of a system for supplying auxiliary electrical power to an electric or hybrid vehicle equipped with a generator.

Referring now to FIGS. 2F and 2G, the towable trailer 102 of the system 100 may further include one or more generators 246. The one or more generators 246 may be disposed within the interior of the towable trailer 102 and configured for supplying supplemental or auxiliary electrical energy to the one or more storage batteries 110 of the vehicle and/or the one or more auxiliary batteries 106 of the trailer 102. In one embodiment, as shown in FIG. 2F, the one or more generators 246 may be arranged in parallel with the one or more auxiliary batteries 106. In this manner, the one or more generators 246 and the one or more auxiliary batteries 106 may individually or simultaneously provide electrically energy to the one or more storage batteries 110 of the vehicle 104 via the pathway 114. Those skilled in the art should recognize that this may be particularly useful in settings where it may be advantageous to supplement the charge storage of the one or more storage batteries 110. In an additional embodiment, as shown in FIG. 2G, the one or more generators 246 may be arranged in series with the one or more auxiliary batteries 106. In this manner, the one or more generators 246 may be utilized to supply supplemental electrical energy to the one or more auxiliary batteries 106 of the towable trailer 102. Those skilled in the art should recognize that this may be particularly useful in settings where it may be advantageous to supplement the charge storage of the one or more auxiliary batteries 106. It is further contemplated herein that the one or more generators 246 may be arranged in a series/parallel configuration (not shown) with the one or more auxiliary batteries 106.

In a further embodiment, as shown in FIGS. 2F and 2G, the one or more generators may be controlled via control system 116. In this regard, the control system 116 may transmit a generator control signal 247 to the generator 246. For example, the control system 116 may control the ON/OFF state of the generator 247. By way of another example, the control system 116 may control the output level of the generator 247 by controlling the generator capacity (e.g., controlling the throttle of an internal combustion based generator) of the generator 246. In a general sense, it is contemplated herein that the generator 246 may include any suitable generator known in the art. For example, the generator 246 may include an internal combustion based generator (e.g., gasoline generator or diesel generator). By way of another example, the generator 246 may include a fuel cell generator, such as, but not limited to, a proton exchange membrane (PEM) fuel cell generator configured to utilize hydrogen fuel.

Figure 3:
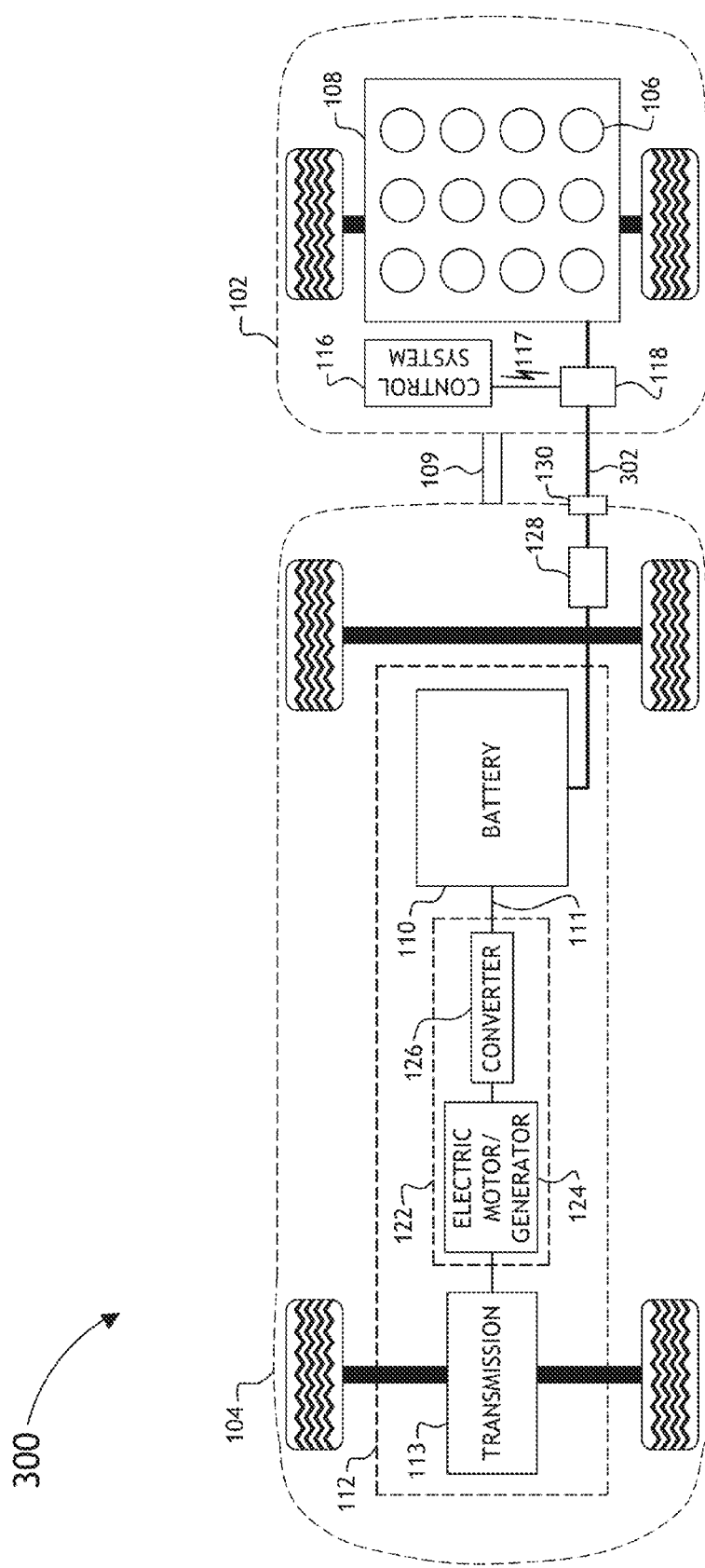
FIG. 3 is a schematic illustration of a system for supplying auxiliary electrical power to an electric or hybrid vehicle.

Referring generally to FIG. 3, an alternative embodiment of an auxiliary power system 300 for supplying auxiliary electrical power to an electric or hybrid vehicle is described in accordance with the present disclosure. Similar to system 100, the auxiliary power system 300 for supplying auxiliary electrical power to a vehicle 104 may include a towable trailer 102 suitable for transporting one or more auxiliary batteries 106. In another aspect, the one or more auxiliary batteries 106 are disposed within an auxiliary battery housing unit 108 of the towable trailer 102. In another aspect, the towable trailer 102 is mechanically couplable to the vehicle 104 (e.g., electric vehicle or hybrid vehicle) via a coupling unit 109. In this regard, the towable trailer 102 may be reversibly coupled to a portion of the vehicle 104. Further, the towable trailer 102 includes one or more wheels 120 rotatably connected to a portion of a chassis (not shown) of the towable trailer 102 and configured to passively translate the towable trailer 102 utilizing a pulling force from the vehicle.

In an additional aspect, the one or more auxiliary batteries 104 are electrically couplable to one or more storage batteries 110 of a drivetrain 112 of the vehicle 104 via an electrical pathway 302 (e.g., pluggable electrical cable). In this regard, the electrical pathway 302 may be utilized to reversibly establish an electrical connection (e.g., unidirectional connection or a bidirectional connection) between the one or more auxiliary batteries 106 of the towable trailer 102 and the storage battery 110 of the vehicle 104. Further, the electrical pathway 302 is configured to selectively transfer electrical energy between the one or more auxiliary batteries 106 and the one or more storage batteries of the vehicle 110. In one embodiment, the electrical pathway 302 may transfer electrical energy from the one or more auxiliary batteries 106 to the one or more storage batteries 110. In another embodiment, the electrical pathway 302 may transfer electrical energy from the one or more storage batteries 110 to the one or more auxiliary batteries 106. In another aspect, the auxiliary power system 100 may include a control system 116 configured to control the transfer of electrical energy between the one or more auxiliary batteries 106 disposed within the towable trailer 102 and the one or more storage batteries 110 of the vehicle 104 along the electrical pathway 302.

In one embodiment, the electrical pathway 302 of the system 300 may include, but is not limited to, a bidirectional pathway. For example, the one or more auxiliary batteries 104 are electrically couplable to one or more storage batteries 110 of a drivetrain 112 of the vehicle 104 via a bidirectional electrical pathway. In this regard, the bidirectional electrical pathway may be utilized to reversibly establish an electrical connection between the one or more auxiliary batteries 106 of the towable trailer 102 and the storage battery 110 of the vehicle 104. Further, the bidirectional electrical pathway may be configured to selectively transfer electrical energy between the one or more auxiliary batteries 106 and the one or more storage batteries 110 of the vehicle 104. In this sense, the bidirectional electrical pathway may transfer electrical energy from the one or more auxiliary batteries 106 to the one or more storage batteries 110 or conversely from the one or more storage batteries 110 to the one or more auxiliary batteries 106. Various aspects of a bidirectional electrical pathway have been described previously herein and should be interpreted to apply to the bidirectional pathway of system 300.

In another embodiment, the electrical pathway 302 of the system 300 may include, but is not limited to, a unidirectional pathway. For example, the one or more auxiliary batteries 104 are electrically couplable to one or more storage batteries 110 of a drivetrain 112 of the vehicle 104 via a unidirectional electrical pathway. In this regard, the unidirectional electrical pathway may be utilized to reversibly establish an electrical connection from the one or more auxiliary batteries 106 of the towable trailer 102 to the storage battery 110 of the vehicle 104. Further, the unidirectional electrical pathway may be configured to selectively transfer electrical energy from the one or more auxiliary batteries 106 to the one or more storage batteries 110 of the vehicle 104.

It is noted herein that preceding description related to system 100 (see FIGS. 1A through 2G) of the present invention should be interpreted to extend to system 300 of FIG. 3. In this sense, the various embodiments and components of system 100 as described above throughout the preceding portions of the present disclosure should be interpreted to apply to system 300 unless otherwise noted.

Figure 4:
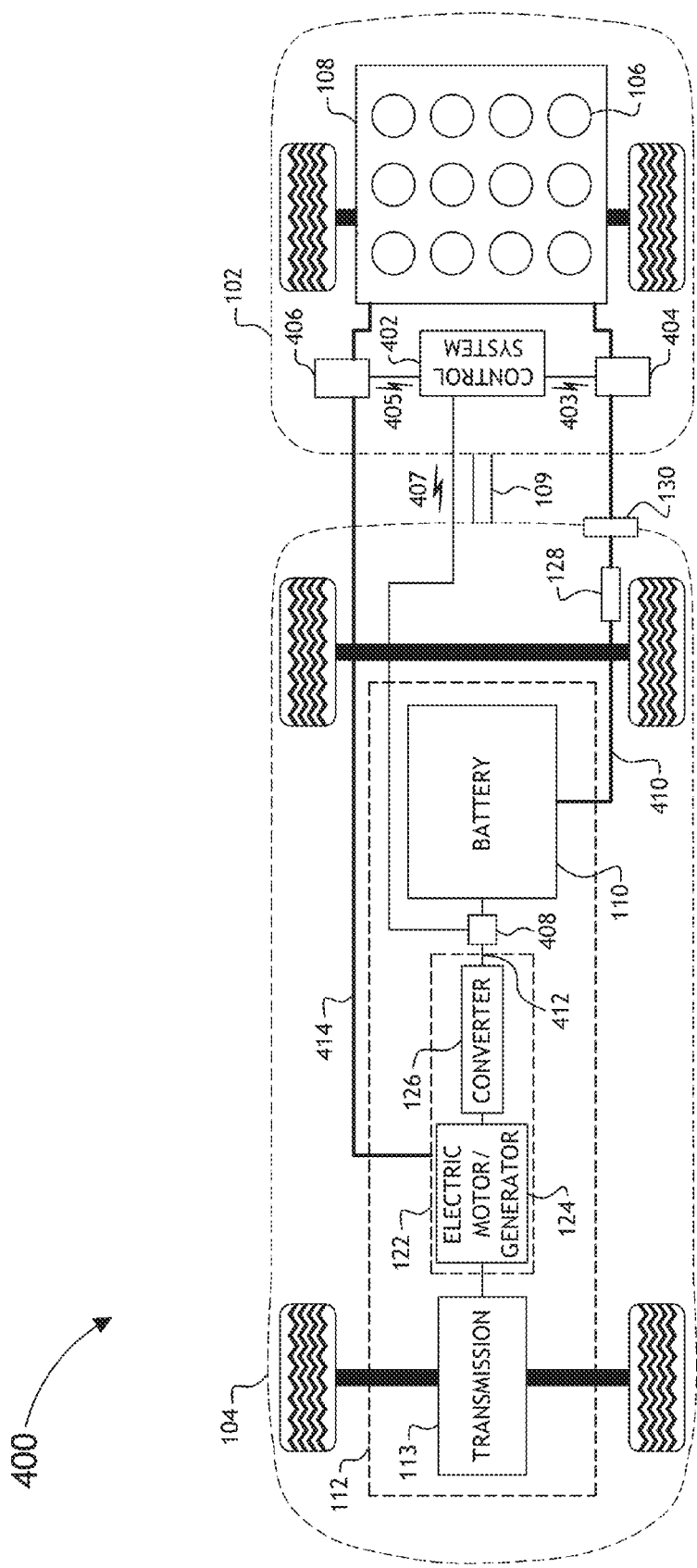
FIG. 4 is a schematic illustration of a system for supplying auxiliary electrical power to an electric or hybrid vehicle.

Referring generally to FIG. 4, an alternative embodiment of an auxiliary power system 400 for supplying auxiliary electrical power to an electric or hybrid vehicle is described in accordance with the present disclosure. It is noted herein that the preceding disclosure related to system 100 and system 300 (FIGS. 1A through 3) should be interpreted to apply to system 400 unless otherwise noted. In this sense, the embodiments, implementations, various components, and configurations described previously herein should be interpreted to extend to system 400 for the purposes of the present disclosure. Similar to system 100 and 300, the auxiliary power system 400 for supplying auxiliary electrical power to a vehicle 104 may include a towable trailer 102 suitable for transporting one or more auxiliary batteries 106. In another aspect, the one or more auxiliary batteries 106 are disposed within an auxiliary battery housing unit 108 of the towable trailer 102. In another aspect, the towable trailer 102 is mechanically couplable to the vehicle 104 (e.g., electric vehicle or hybrid vehicle) via a coupling unit 109. In this regard, the towable trailer 102 may be reversibly coupled to a portion of the vehicle 104. Further, the towable trailer 102 includes one or more wheels 120 rotatably connected to a portion of a chassis (not shown) of the towable trailer 102.

In an additional aspect, the one or more auxiliary batteries 104 are electrically couplable to one or more storage batteries 110 of the drivetrain 112 via a first electrical pathway 410 (e.g., a first pluggable electrical cable). In this regard, the a first electrical pathway 410 may be utilized to reversibly establish an electrical connection between the one or more auxiliary batteries 106 of the towable trailer 102 and the one or more storage batteries 110 of the vehicle 104. Further, the electrical pathway 410 (e.g., unidirectional pathway or bidirectional pathway) is configured to selectively transfer electrical energy between the one or more auxiliary batteries 106 and the one or more storage batteries of the vehicle 110. In one embodiment, the electrical pathway 410 may transfer electrical energy from the one or more auxiliary batteries 106 to the one or more storage batteries 110. In another embodiment, the electrical pathway 410 may transfer electrical energy from the one or more storage batteries 110 to the one or more auxiliary batteries 106. It is noted herein that the first electrical pathway 410 may be configured in a manner similar to the electrical pathway 114 of system 100 or pathway 302 of system 300 described previously herein.

In another aspect, the one or more auxiliary batteries 104 are electrically couplable to an energy conversion portion 122 (e.g., electric motor/generator 124 or power conversion circuitry 126) of the drivetrain 112 via a second electrical pathway 414 (e.g., a second pluggable electrical cable). In this regard, the a second electrical pathway 414 may be utilized to reversibly establish an electrical connection between the one or more auxiliary batteries 106 of the towable trailer 102 and an energy conversion portion 122, such as the electric motor 124 or the power conversion circuitry 126, of the vehicle 104. Further, the second electrical pathway 414 (e.g., unidirectional pathway or bidirectional pathway) is configured to selectively transfer electrical energy between the one or more auxiliary batteries 106 and the energy conversion portion 122 of the drivetrain 112. In one embodiment, the electrical pathway 414 may transfer electrical energy from the one or more auxiliary batteries 106 to the energy conversion portion 122 of the drivetrain 112. For instance, the electrical pathway 414 may transfer electrical energy directly from the one or more auxiliary batteries 106 to the electric motor 124 or the converter 126 (i.e., power conversion circuitry) of the drivetrain 112. In another embodiment, the electrical pathway 414 may transfer electrical energy from the energy conversion portion 122 of the drivetrain 112 to the one or more auxiliary batteries 106 of the trailer 102. For instance, the electrical pathway 414 may transfer electrical energy directly from the electric motor 124 or the converter 126 (i.e., power conversion circuitry) of the drivetrain 112 to the one or more auxiliary batteries 106.

In another aspect, the one or more storage batteries 110 of the vehicle 104 are electrically couplable to an energy conversion portion 122 (e.g., electric motor/generator 124 or power conversion circuitry 126) of the drivetrain 112 via a third electrical pathway 412 (e.g., charge transfer circuitry preexisting in vehicle 104 upon manufacture of the vehicle 104). In this regard, the third electrical pathway 412 may establish an electrical connection between the one or more storage batteries 110 of the vehicle 104 and an energy conversion portion 122, such as the electric motor 124 or the power conversion circuitry 126, of the vehicle 104. Further, the third electrical pathway 414 (e.g., unidirectional pathway or bidirectional pathway) is configured to selectively transfer electrical energy between the one or more storage batteries 110 and the energy conversion portion 122 of the drivetrain 112. In one embodiment, the electrical pathway 412 may transfer electrical energy from the one or more storage batteries 110 to the energy conversion portion 122 of the drivetrain 112. For instance, the electrical pathway 412 may transfer electrical energy directly from the one or more storage batteries 110 to the electric motor 124 or the converter 126 (i.e., power conversion circuitry) of the drivetrain 112. In another embodiment, the electrical pathway 412 may transfer electrical energy from the energy conversion portion 122 of the drivetrain 112 to the one or more storage batteries 110 of the vehicle 104. For instance, during a regenerative braking process, the electrical pathway 412 may transfer electrical energy from the electrical output of electric motor/generator 124 or the converter 126 (i.e., power conversion circuitry) of the drivetrain 112 to the one or more storage batteries 110.

In another aspect, the auxiliary power system 100 may include a control system 402 configured to control at least one of (i) a transfer of electrical energy between the one or more auxiliary batteries 106 of the towable trailer 102 and the one or more storage batteries 110 of the drivetrain 112 via the first pathway 410, (ii) a transfer of electrical energy between the one or more auxiliary batteries 106 of the towable trailer 102 and the energy conversion portion 122 of the drivetrain 112 via the second pathway 414, or (iii) a transfer of electrical energy between the one or more storage batteries 110 of the drivetrain 112 and the energy conversion portion 122 of the drivetrain 122 via the third pathway 412.

In a further embodiment, the control system 402 of system 400 may be configured to at least one of (i) selectively electrically couple the one or more auxiliary batteries 106 of the towable trailer 102 with the one or more storage batteries 110 of the drivetrain 112, (ii) selectively electrically couple the one or more auxiliary batteries 106 of the towable trailer 102 and the energy conversion portion 122 of the drivetrain 112, or (iii) selectively electrically couple the one or more storage batteries 110 of the drivetrain 112 and the energy conversion portion 122 of the drivetrain 112.

In one embodiment, the control system 402 may act to control the coupling circuitry 404 so as to selectively electrically couple the one or more auxiliary batteries 106 of the trailer 102 with the one or more storage batteries 110 of the vehicle 104 in order to control the transfer of electrical charge between the one or more auxiliary batteries 106 and the one or more storage batteries 110. In a further embodiment, the coupling control circuitry 404 may be positioned along the pathway 410 and between the one or more auxiliary batteries 106 of the trailer 102 and the one or more storage batteries 110 of the vehicle 104. In this regard, the control circuitry 404 may be communicatively coupled to the control system 402 via a communication link in order to control the coupling state (e.g., open circuit or closed circuit) of the coupling circuitry 404. For example, the coupling circuitry 404 may be configured to close pathway 410, thereby allowing charge to flow along the pathway 410, in response to a signal 403 indicative of a transmission command from the control system 402. By way of another example, the coupling circuitry 404 may be configured to open, or "break," the pathway 410, thereby stopping charge flow along the pathway 410, in response to a signal 403 indicative of a non-transmission command from the control system 402.

In another embodiment, the control system 402 may act to control the coupling circuitry 406 so as to selectively electrically couple the one or more auxiliary batteries 106 of the trailer 102 with the energy conversion portion 122 (e.g., electric motor 124 or converter 126) of the drivetrain 112 of the vehicle 104 in order to control the transfer of electrical charge between the one or more auxiliary batteries 106 and the energy conversion portion 122 of the drivetrain 112. In a further embodiment, the coupling control circuitry 406 may be positioned along the pathway 414 and between the one or more auxiliary batteries 106 of the trailer 102 and the energy conversion portion 122 of the drivetrain 112 of the vehicle 104. In this regard, the control circuitry 406 may be communicatively coupled to the control system 402 via a communication link in order to control the coupling state of the coupling circuitry 406. For example, the coupling circuitry 406 may be configured to close the pathway 414, thereby allowing charge to flow along the pathway 414, in response to a signal 405 indicative of a transmission command from the control system 402. By way of another example, the coupling circuitry 406 may be configured to open, or "break," the pathway 414, thereby stopping charge flow along the pathway 414, in response to a signal 405 indicative of a non-transmission command from the control system 402.

In another embodiment, the control system 402 may act to control the coupling circuitry 408 so as to selectively electrically couple the one or more storage batteries 110 of the drivetrain 112 with the energy conversion portion 122 of the drivetrain 112 of the vehicle 104 in order to control the transfer of electrical charge between the one or more storage batteries 110 and the energy conversion portion 122 of the drivetrain 112. In a further embodiment, the coupling control circuitry 408 may be positioned along the pathway 412 and between the one or more storage batteries 110 of the drivetrain 112 and the energy conversion portion 122 of the drivetrain 112 of the vehicle 104. In this regard, the control circuitry 408 may be communicatively coupled to the control system 402 via a communication link in order to control the coupling state of the coupling circuitry 408. For example, the coupling circuitry 408 may be configured to close the pathway 412, thereby allowing charge to flow along the pathway 412, in response to a signal 407 indicative of a transmission command from the control system 402. By way of another example, the coupling circuitry 408 may be configured to open, or "break," the pathway 412, thereby stopping charge flow along the pathway 412, in response to a signal 407 indicative of a non-transmission command from the control system 402. It is recognized herein that the coupling circuitries 404, 406, and 408 and the communication means utilized to establish communication between the control system 402 and the coupling circuitries 404, 406, and 408 may be configured in a manner similar to the coupling circuitry 118 and control system 116 described in the context of system 100 and system 300 disclosed previously herein. As such, the embodiments and described implementations of the control system 116 and coupling circuitry 118 should be interpreted to extend to the coupling circuitries 404, 406, and 408 of system 400 of the present invention unless otherwise noted.

In another aspect of the control system 402, a determination module (not shown) of the control system 402 may include one or more processing units configured to receive a signal from the receiving module (not shown) of the control system 402 and further configured to execute a preprogrammed algorithm stored as a set of instructions in an associated carrier medium (not shown). Upon receiving a signal from the receiving module, the one or more processing units of the determination module may execute the selected preprogrammed algorithm in order to determine the electrical coupling configuration of the communicatively coupled coupling circuitries 404, 406, and 408. As discussed in greater detail further herein, the results generated by the determination module of the control system 402 may depend upon a variety of parameters and factors associated with at least the one or more auxiliary batteries 106, the one or more storage batteries 110, and/or the energy conversion portion 122 of the drivetrain 112. For example, the determination module may be configured to determine the electrical coupling configuration based on one or more intrinsic parameters (e.g., characteristic associated with the energy conversion portion 122 of the drivetrain 112, characteristic associated with one or more auxiliary batteries 106, or characteristic associated with one or more storage batteries 110). By way of another example, the determination module may be configured to determine the electrical coupling configuration based on one or more extrinsic parameters (e.g., fuel price information, cost of recharging one or more batteries of system 400, road condition information, weather information, and the like).

In another aspect of the control system 402, a transfer control module (not shown) of the control system 402 may control the coupling control circuitries 404, 406, and 408 in response to a result generated by the determination module of the control system 402. For example, upon receiving a signal indicative of a generated coupling configuration result from the determination module, the transfer control module of the control system 402 may in turn transmit one or more of the control signals 403, 405, and 407 to the coupling control circuitries 404, 406, and 408 respectively. In one embodiment, in response to the control signal 403 transmitted by the transfer control module of the control system 402, the control circuitry 404 may couple or decouple the electrical connection between the one or more auxiliary batteries 106 and the one or more storage batteries 110 in accordance with the control signal 403. In another embodiment, in response to the control signal 405 transmitted by the transfer control module of the control system 402, the control circuitry 406 may couple or decouple the electrical connection between the one or more auxiliary batteries 106 and the energy conversion portion 122 of the drivetrain 112 in accordance with the control signal 405. In an additional embodiment, in response to the control signal 407 transmitted by the transfer control module of the control system 402, the control circuitry 408 may couple or decouple the electrical connection between the one or more storage batteries 110 and the energy conversion portion 122 of the drivetrain 112 in accordance with the control signal 407. In a further embodiment, the transfer control module of the control system 402 may include any suitable signal transmission means known in the art. For example, the transfer control module may include a transmitter configured to transmit signals (e.g., wireless signals) to the coupling circuitries 404, 406, and 408. By way of another example, the transfer control module may include multiple physical connectors configured to communicatively couple the determination module and the coupling circuitries 404, 406, and 408. Further, the transfer control module may include any suitable signal switching devices known in the art.

While the above description has focused on the direct control of the coupling circuitries 404, 406, and 408 utilizing the control system 402, it is further contemplated that the coupling circuitries 404, 406, and 408 may each be equipped with an independent computer data processing system having signal receiving and processing hardware and software configured to receive and process a control signal transmitted by the control system 402. For example, each of the coupling circuitries 404, 406, and 408 may include a microprocessor controlled relay system configured such that a signal transmitted by the control system 402 may be received by a receiver (not shown) of at least one of the coupling circuitries 404, 406, and 408 and analyzed utilizing a processor (not shown) of each of the coupling circuitries 404, 406, and 408. Upon analysis of the signal received from the control system 402, the processor of a given coupling circuitry may act to control the switching state (e.g., open switch or closed switch) of the associated relay system positioned along the associated pathway (e.g., 410, 412, or 414).

Applicant notes that the preceding description related to the components of the control system 402 is not limiting, but should merely be interpreted as illustrative as those skilled in the art will appreciate that numerous similar or analogous control system (or "controller") architectures may be implemented within the context of the present invention.

In some embodiments of the present invention, the control system 402 may be configured to maintain a charge state of the one or more storage batteries 110 of the vehicle 104 above a preselected charge level. In this regard, the control system 402 may control the coupling circuitries 404, 406, and/or 408 such that the electric charge of the one or more storage batteries 110 is maintained above a preselected charge level. For example, upon receiving a signal 238 from a battery monitoring system 236 indicative of the charge level of the one or more storage batteries 110 is at, below, or approaching the preselected charge level, the control system 402 may transmit a signal to at least one of the coupling circuitries 404, 406, and/or 408 in order to allow charge to flow into the one or more storage batteries 110. In another example, the charge transfer may be initiated by the control system 402 upon a metric-based (e.g., time-based or distance-based) determination by the control system 402 indicative of a depletion of the charge stored in the one or more storage batteries 110 below a preselected level. For instance, the control system 402 may monitor the time or distance driven by the vehicle 104 since the last charging cycle of the one or more storage batteries 110. Then, utilizing stored historical data, the control system 402 may estimate the amount of discharge experienced by the one or more the storage batteries 110. Upon determining a critical time or distance (i.e., the time or distance corresponding to the preselected charge level), the control system 402 may transmit a signal to the coupling circuitries 404, 406, and/or 408 directing at least one of the coupling circuitries 404, 406, and/or 408 in order to allow charge to flow into the one or more storage batteries 110.

In a further embodiment, the control system 402 may be configured to maintain a charge state of the one or more storage batteries 110 of the vehicle 104 above a damage-causing level of the one or more storage batteries 110. In this sense, the preselected charge level may consist of the charge level of the one or more storage batteries 110 required to avoid damaging the operational capability of the one or more storage batteries 110.

In some embodiments of the present invention, the control system 402 may be configured to establish a charge state of the one or more storage batteries 110 of the vehicle 104 above a preselected charge level upon disconnection of the one or more auxiliary batteries 106 from a portion (e.g., energy conversion portion 122 or the one or more storage batteries 110) of the drivetrain 112 of the vehicle. For example, the preselected charge level may include a charge level required to allow the vehicle 104 to travel a selected distance upon disconnection of the one or more auxiliary batteries 106 from a portion (e.g., energy conversion portion 122 or the one or more storage batteries 110) of the drivetrain 112 of the vehicle. In a further embodiment, the control system 402 may be configured to receive an input from a user (e.g., input received from user interface device 214) indicative of the desired driving distance upon disconnection of the one or more auxiliary batteries 106 from a portion of the drivetrain 112. Then, the control system 402 may determine a minimum charge level needed to achieve the selected driving distance requirements. For instance, the minimum charge level may be determined utilizing historical data (e.g., historical data received from off-site data base or historical data generated by the control system 402) configured to correlate charge level of the storage batteries 110 with driving distance. Based on the charge level determination, the control system 402 may control the coupling circuitries 404, 406, and/or 408 in order to achieve the required charge level in the one or more storage batteries 110 of the vehicle 104.

In some embodiments of the present invention, the control system 402 may be configured to maintain a charge state of the one or more auxiliary batteries 106 of the towable trailer 102 above a preselected charge level. In this regard, the control system 402 may control the coupling circuitries 404, 406, and/or 408 such that the electric charge of the one or more auxiliary batteries 106 is maintained above a preselected charge level. For example, upon receiving a signal 238 from a battery monitoring system 236 indicative of the charge level of the one or more storage batteries 110 is at, below, or approaching the preselected charge level, the control system 402 may transmit a signal to at least one of the coupling circuitries 404, 406, and/or 408 in order to allow charge to flow into the one or more auxiliary batteries 106. In another example, the charge transfer may be initiated by the control system 402 upon a metric-based (e.g., time-based or distance-based) determination by the control system 402 indicative of a depletion of the charge stored in the one or more auxiliary batteries 106 below a preselected level. For instance, the control system 402 may monitor the time or distance driven by the vehicle 104 since the last charging cycle of the one or more auxiliary batteries 106. Then, utilizing stored historical data, the control system 402 may estimate the amount of discharge experienced by the one or more auxiliary batteries 106. Upon determining a critical time or distance, the control system 402 may transmit a signal to the coupling circuitries 404, 406, and/or 408 directing at least one of the coupling circuitries 404, 406, and/or 408 to allow charge flow into the one or more auxiliary batteries 106.

In a further embodiment, the control system 402 may be configured to maintain a charge state of the one or more auxiliary batteries of the trailer 102 above a damage-causing level of the one or more auxiliary batteries 106. In this sense, the preselected charge level may consist of the charge level of the one or more auxiliary batteries 106 required to avoid damaging the operational capability of the one or more auxiliary batteries 106.

In some embodiments of the present invention, the control system 402 may be configured to establish a charge state of the one or more auxiliary batteries 106 of the trailer 102 above a preselected charge level upon disconnection of the one or more auxiliary batteries 106 from a portion (e.g., energy conversion portion 122 or the one or more storage batteries 110) of the drivetrain 112 of the vehicle. For example, the preselected charge level may include a charge level required to return the one or more auxiliary batteries 106 to an initial charge state. In a further embodiment, the control system 402 may be configured to receive an input from a user (e.g., input received from user interface device 214) indicative of the desired charge level of the one or more auxiliary batteries 106 upon disconnection of the one or more auxiliary batteries 106 from the one or more storage batteries 110 and/or the energy conversion portion 122 of the drivetrain 112. Based on the selected charge level, the control system 402 may control the coupling circuitries 404, 406, and/or 408 in order to achieve the selected charge level in the one or more auxiliary batteries 106 of the towable trailer 102.

In some embodiments of the present invention, the control system 402 may be configured to establish a charge state of the one or more storage batteries 110 of the vehicle 104 and/or a charge state of the one or more auxiliary batteries 106 of the towable trailer 102 based on one or more parameters. In a further embodiment, the charge state of the one or more storage batteries 110 and/or a charge state of the one or more auxiliary batteries 106 may be established based on one or more external parameters. For example, the one or more external parameters may include, but are not limited to, a received set of driving conditions. For instance, the one or more external parameters may include, but are not limited to, current driving conditions, future driving conditions (i.e., anticipated driving conditions), or past driving conditions. Further, the driving conditions may include, but are not limited to, road conditions, weather conditions, location information, and the like. For example, the charge state of the one or more storage batteries 110 and/or a charge state of the one or more auxiliary batteries 106 may be established based on road condition parameters received from a road condition information service and spatial position data received from a received GPS signal. It is further recognized that any combination of known external parameters (e.g., road conditions, weather conditions, vehicle location (via GPS), and the like) may be used to determine the charging state for the one or more storage batteries 110 and the one or more auxiliary batteries 106. Based on the determined charge levels for the one or more storage batteries 110 and the one or more auxiliary batteries 106, the control system 402 may control the coupling circuitries 404, 406, and/or 408 in order to establish the selected charge level in the one or more auxiliary batteries 106 and the one or more storage batteries 110.

In another embodiment, the charge state of the one or more storage batteries 110 and/or a charge state of the one or more auxiliary batteries 106 may be established based on one or more internal parameters. In a further embodiment, the one or more internal parameters may include, but are not limited to, one or more parameters associated with the operational status of at least one of the one or more storage batteries 110, the one or more auxiliary batteries 106, or the energy conversion portion 122 of the drivetrain 112. For example, the one or more internal parameters may include, but are not limited to, the ability of the one or more storage batteries 110 and/or the one or more auxiliary batteries 106 to retain charge. By way of another example, the one or more internal parameters may include, but are not limited to, the status of a regenerative breaking system of the system 400. In another example, the one or more internal parameters may include, but are not limited to, the inter-battery transfer rate between the one or more storage batteries 110 and the one or more auxiliary batteries 106. It is further recognized that determining the charging level of the one or more auxiliary batteries 106 and/or the one or more storage batteries 110 based on one or more internal parameters may aid in assuring that the one or more storage batteries 110 of the vehicle 104 have sufficient charge storage ability to recapture electrical charge generated during a regenerative breaking process of the vehicle 104. Based on the determined charge levels, the control system 402 may control the coupling circuitries 404, 406, and/or 408 in order to establish the selected charge level in the one or more auxiliary batteries 106 and the one or more storage batteries 110.

In another embodiment, the charge state of the one or more storage batteries 110 and/or a charge state of the one or more auxiliary batteries 106 may be established based on a comparison between a first parameter and a second parameter. In a further embodiment, the charge state of the one or more storage batteries 110 and a charge state of the one or more auxiliary batteries 106 may be established based on a difference between a first parameter and a second parameter. It is anticipated that control system 402 may render a charge state determination for the auxiliary batteries 106 and the storage batteries 110 based on a number of parameters and parameter differences. Based on the determined charge levels, the control system 402 may control the coupling circuitries 404, 406, and/or 408 in order to establish the selected charge level in the one or more auxiliary batteries 106 and the one or more storage batteries 110.

In some embodiments of the present invention, the control system 402 may be configured to establish a charge state of the one or more storage batteries 110 of the vehicle 104 and/or a charge state of the one or more auxiliary batteries 106 of the towable trailer 102 based on user input. Based on the user selected charge levels for the one or more storage batteries 110 and/or the one or more auxiliary batteries 106, the control system 402 may control the coupling circuitries 404, 406, and/or 408 in order to establish the selected charge level in the one or more auxiliary batteries 106 and the one or more storage batteries 110.

In some embodiments of the present invention, the control system 402 may be configured to control a rate of transfer of electrical energy between the one or more auxiliary batteries 106, the one or more storage batteries 110, and/or the energy conversion portion 122 of the drivetrain 112. In a further embodiment, the control system 402 may be configured to limit a rate of transfer of electrical energy between the one or more auxiliary batteries 106 of the towable trailer 102 and the one or more storage batteries 110 of the vehicle 104 below a preselected or predetermined level. In another embodiment, the control system 402 may be configured to limit a rate of transfer of electrical energy between the one or more auxiliary batteries 106 of the towable trailer 102 and the energy conversion portion 122 of the drivetrain 112 below a preselected or predetermined level. In another embodiment, the control system 402 may be configured to limit a rate of transfer of electrical energy between the one or more storage batteries 110 of the towable trailer 102 and the energy conversion portion 122 of the drivetrain 112 below a preselected or predetermined level.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either subcomponent operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 5:
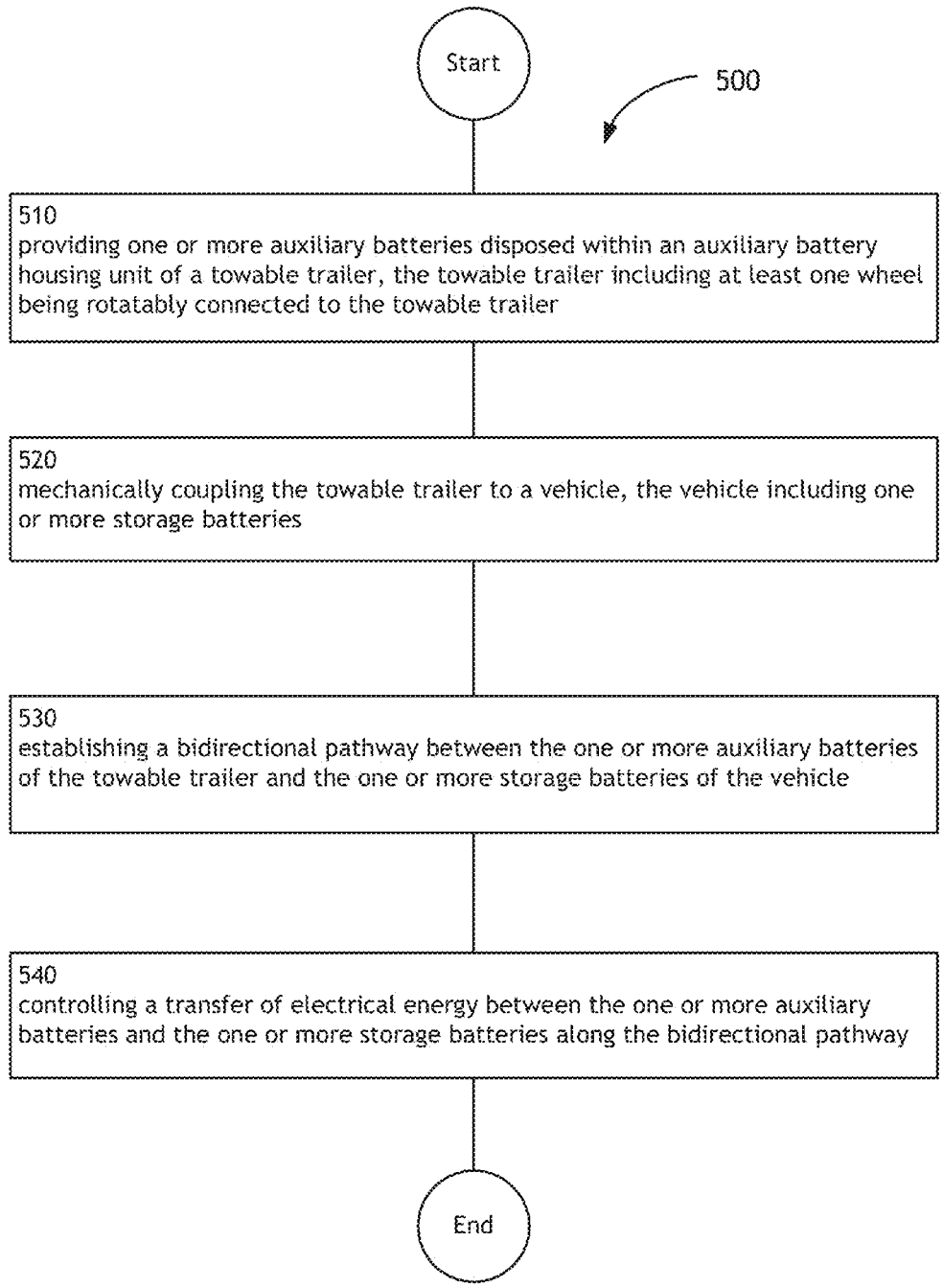
FIG. 5 is a high-level flowchart of a method for supplying auxiliary electrical power to an electric or hybrid vehicle.

FIG. 5 illustrates an operational flow 500 representing example operations related to supplying auxiliary electrical energy to an electric or hybrid vehicle. In FIG. 5 and in following figures that include various examples of operational flows, discussion and explanation may be provided with respect to the above-described examples of FIGS. 1A through 4, and/or with respect to other examples and contexts. However, it should be understood that the operational flows may be executed in a number of other environments and contexts, and/or in modified versions of FIGS. 1A through 4. Also, although the various operational flows are presented in the sequence(s) illustrated, it should be understood that the various operations may be performed in other orders than those which are illustrated, or may be performed concurrently.

After a start operation, the operational flow 500 moves to a providing operation 510. The providing operation 510 depicts providing one or more auxiliary batteries disposed within an auxiliary battery housing unit of a towable trailer, the towable trailer including at least one wheel being rotatably connected to the towable trailer. For example, as shown in FIGS. 1A through 2G, one or more auxiliary batteries 106 (e.g., lithium based batteries) may be provided and disposed within an auxiliary battery housing unit 108 of a towable trailer 102, the towable trailer 102 including at least one wheel 120 (e.g., one wheel, two wheels, or three wheels) being rotatably connected to the towable trailer 120.

Then, mechanical coupling operation 520 depicts mechanically coupling the towable trailer to a vehicle, the vehicle including one or more storage batteries. For example, as shown in FIGS. 1A through 2G, the towable trailer 102 may be mechanically coupled a vehicle 104 including one or more storage batteries 110 (e.g., lithium based batteries).

Then, bidirectional pathway establishing operation 530 depicts establishing a bidirectional electrical pathway between the one or more auxiliary batteries of the towable trailer and the one or more storage batteries of the vehicle. For example, as shown in FIGS. 1A through 4, a bidirectional electrical pathway 114 between the one or more auxiliary batteries 106 of the towable trailer 102 and the one or more storage batteries 110 of the vehicle 104 may be established utilizing an electrical connection (e.g., electrically conducting wire or cable) configured to couple the one or more auxiliary batteries 106 with an electrical port of the vehicle 104.

Then, controlling operation 540 depicts controlling a transfer of electrical energy between the one or more auxiliary batteries and the one or more storage batteries along the bidirectional pathway. For example, as shown in FIGS. 1A through 4, a control system 116 may be configured to control a transfer of electrical energy between the one or more auxiliary batteries 106 of the towable trailer 102 and the one or more storage batteries 110 of the vehicle 104 along the bidirectional pathway 114.

Figure 6:
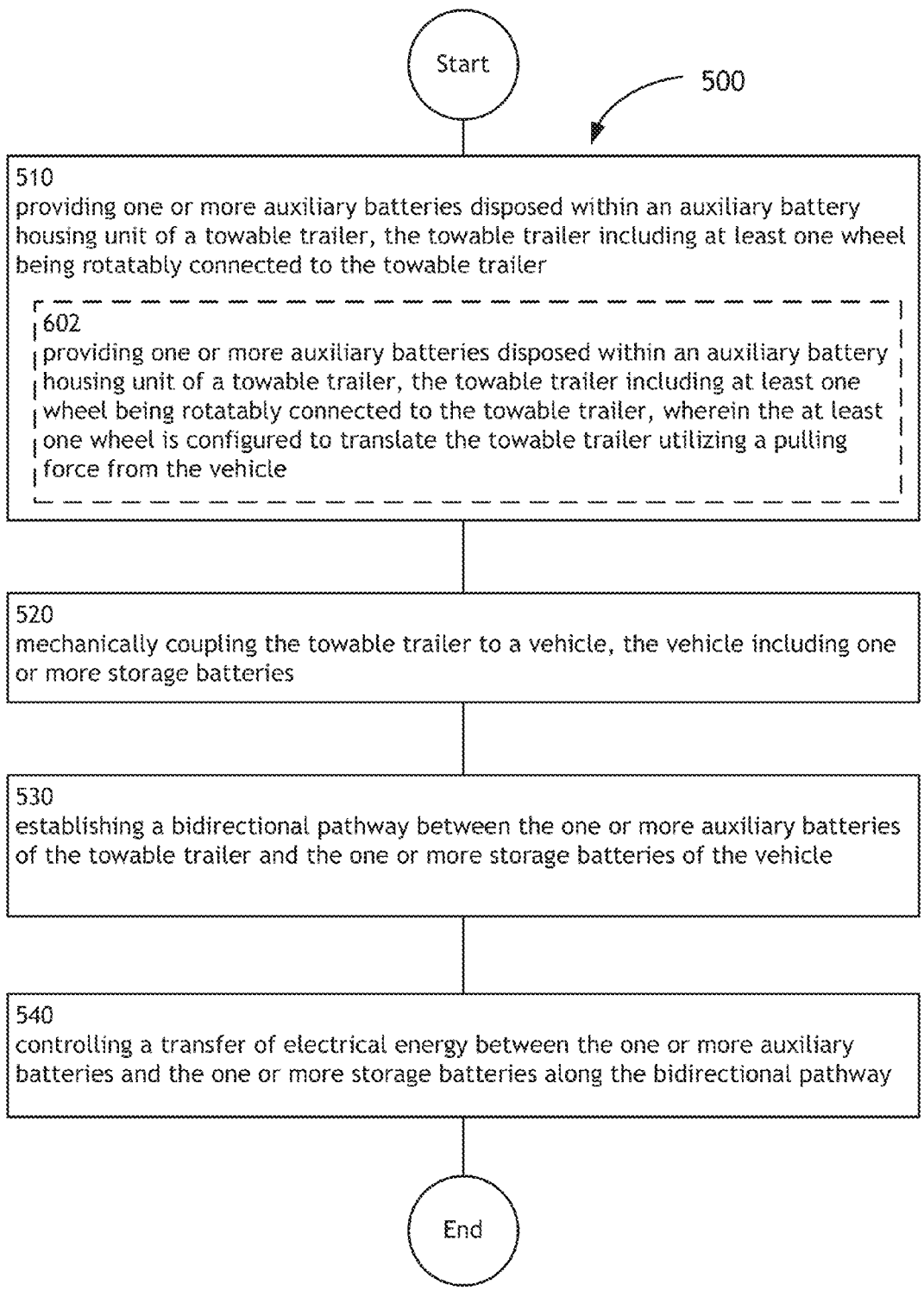
FIGS. 6 through 24 are high-level flowcharts depicting alternate implementations of FIG. 5.

FIG. 6 illustrates alternative embodiments of the example operational flow 500 of FIG. 5. FIG. 6 illustrates example embodiments where the providing operation 510 may include at least one additional operation. Additional operations may include an operation 602.

The operation 602 illustrates providing one or more auxiliary batteries disposed within an auxiliary battery housing unit of a towable trailer, the towable trailer including at least one wheel being rotatably connected to the towable trailer, wherein the at least one wheel is configured to translate the towable trailer utilizing a pulling force from the vehicle. For example, as shown in FIGS. 1A through 2G, one or more auxiliary batteries 106 may be provided and disposed within an auxiliary battery housing unit 108 of a towable trailer 102, the towable trailer 102 including at least one wheel 120 (e.g., one wheel, two wheels, three wheels, or four wheels) being rotatably connected to the towable trailer 120, wherein the at least one wheel 120 is configured to passively translate the towable trailer 102 utilizing a pulling force from the vehicle 102.

Figure 7:
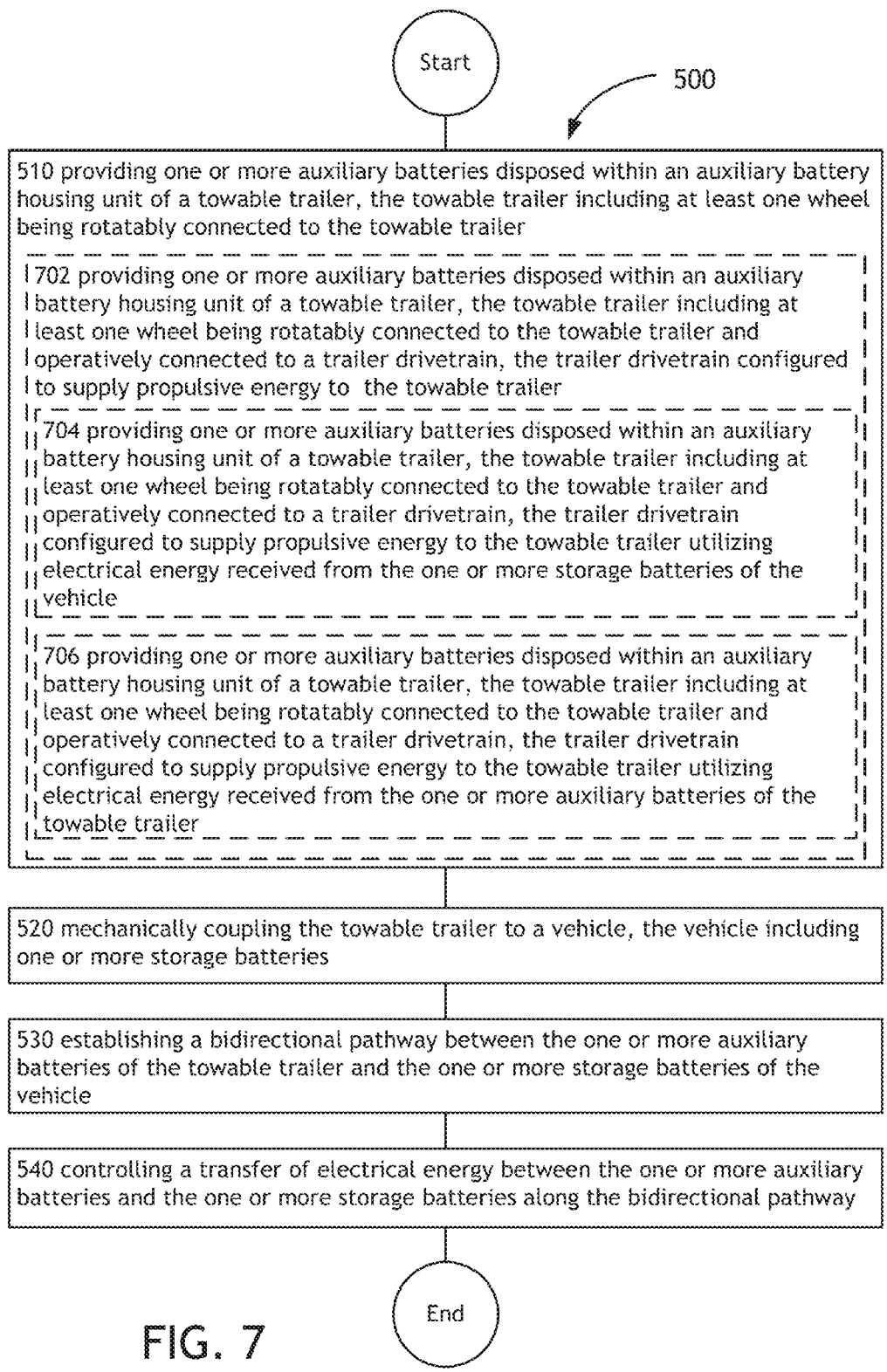

FIG. 7 illustrates alternative embodiments of the example operational flow 500 of FIG. 5. FIG. 7 illustrates example embodiments where the providing operation 510 may include at least one additional operation. Additional operations may include an operation 702, an operation 704, and/or an operation 706.

The operation 702 illustrates providing one or more auxiliary batteries disposed within an auxiliary battery housing unit of a towable trailer, the towable trailer including at least one wheel being rotatably connected to the towable trailer and operatively connected to a trailer drivetrain, the trailer drivetrain configured to supply propulsive energy to the towable trailer. For example, as shown in FIGS. 1A through 2G, one or more auxiliary batteries 106 may be provided and disposed within an auxiliary battery housing unit 108 of a towable trailer 102, the towable trailer 102 may include one or more wheels 120 rotatably connected to the towable trailer 102 and mechanically connected to a trailer drivetrain (e.g., connected to a transmission of the trailer drivetrain) such that the drivetrain of the trailer 102 may supply propulsive energy to the towable trailer 102.

Further, the operation 704 illustrates providing one or more auxiliary batteries disposed within an auxiliary battery housing unit of a towable trailer, the towable trailer including at least one wheel being rotatably connected to the towable trailer and operatively connected to a trailer drivetrain, the trailer drivetrain configured to supply propulsive energy to the towable trailer, the trailer drivetrain configured to supply propulsive energy to the towable trailer utilizing electrical energy received from the one or more storage batteries of the vehicle. For example, as shown in FIGS. 1A through 2G, one or more auxiliary batteries 106 may be provided and disposed within an auxiliary battery housing unit 108 of a towable trailer 102. The towable trailer 102 may include one or more wheels 120 rotatably connected to the towable trailer 102 and mechanically connected to a trailer drivetrain (e.g., connected to a transmission of the trailer drivetrain) such that an electric motor of the trailer 102 powered by electrical energy from the one or more storage batteries 110 of the vehicle 104 may supply propulsive energy to the towable trailer 102.

Further, the operation 706 illustrates providing one or more auxiliary batteries disposed within an auxiliary battery housing unit of a towable trailer, the towable trailer including at least one wheel being rotatably connected to the towable trailer and operatively connected to a trailer drivetrain, the trailer drivetrain configured to supply propulsive energy to the towable trailer, the trailer drivetrain configured to supply propulsive energy to the towable trailer utilizing electrical energy received from the one or more auxiliary batteries of the towable trailer. For example, as shown in FIGS. 1A through 2G, one or more auxiliary batteries 106 may be provided and disposed within an auxiliary battery housing unit 108 of a towable trailer 102. The towable trailer 102 may include one or more wheels 120 rotatably connected to the towable trailer 102 and mechanically connected to a trailer drivetrain (e.g., connected to a transmission of the trailer drivertrain) such that an electric motor of the trailer 102 powered by electrical energy from the one or more auxiliary batteries 106 of the trailer may supply propulsive energy to the towable trailer 102.

Figure 8:
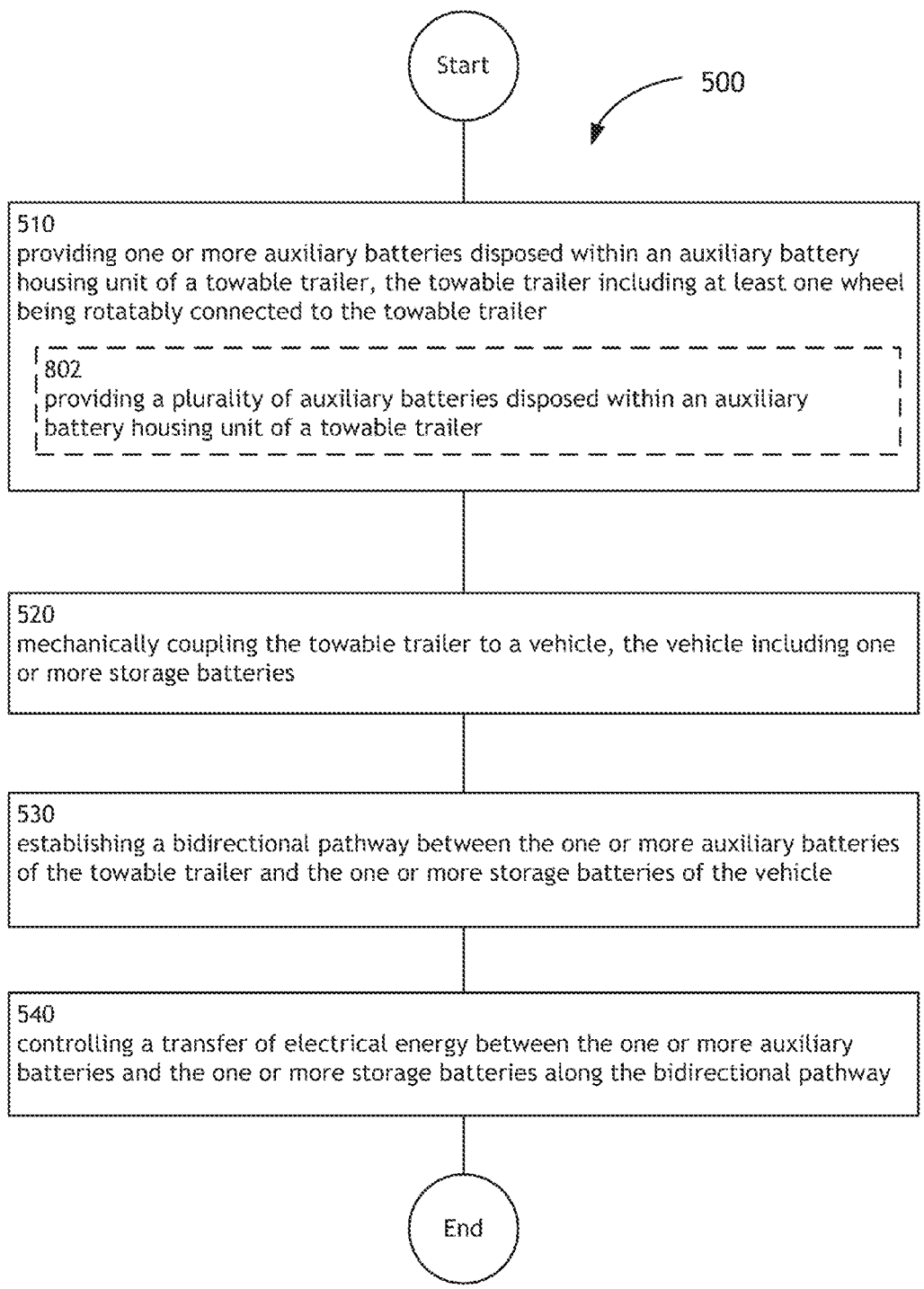

FIG. 8 illustrates alternative embodiments of the example operational flow 500 of FIG. 5. FIG. 8 illustrates example embodiments where the providing operation 510 may include at least one additional operation. Additional operations may include an operation 802.

The operation 802 illustrates providing a plurality of auxiliary batteries disposed within an auxiliary battery housing unit of a towable trailer, the towable trailer including at least one wheel being rotatably connected to the towable trailer. For example, as shown in FIGS. 1A through 2G, a plurality of auxiliary batteries 106 may be provided and disposed within an auxiliary battery housing unit 108 of a towable trailer 102, the towable trailer 102 may include one or more wheels 120 rotatably connected to the towable trailer 102. For instance, two or more series coupled batteries (e.g., lithium based batteries) auxiliary batteries may be provided and disposed with the battery housing unit 108 of the towable trailer 102. In another instance, two or more parallel coupled auxiliary batteries may be provided and disposed with the battery housing unit 108 of the towable trailer 102. Further, two or more series/parallel coupled auxiliary batteries may be provided and disposed with the battery housing unit 108 of the towable trailer 102.

Figure 9:
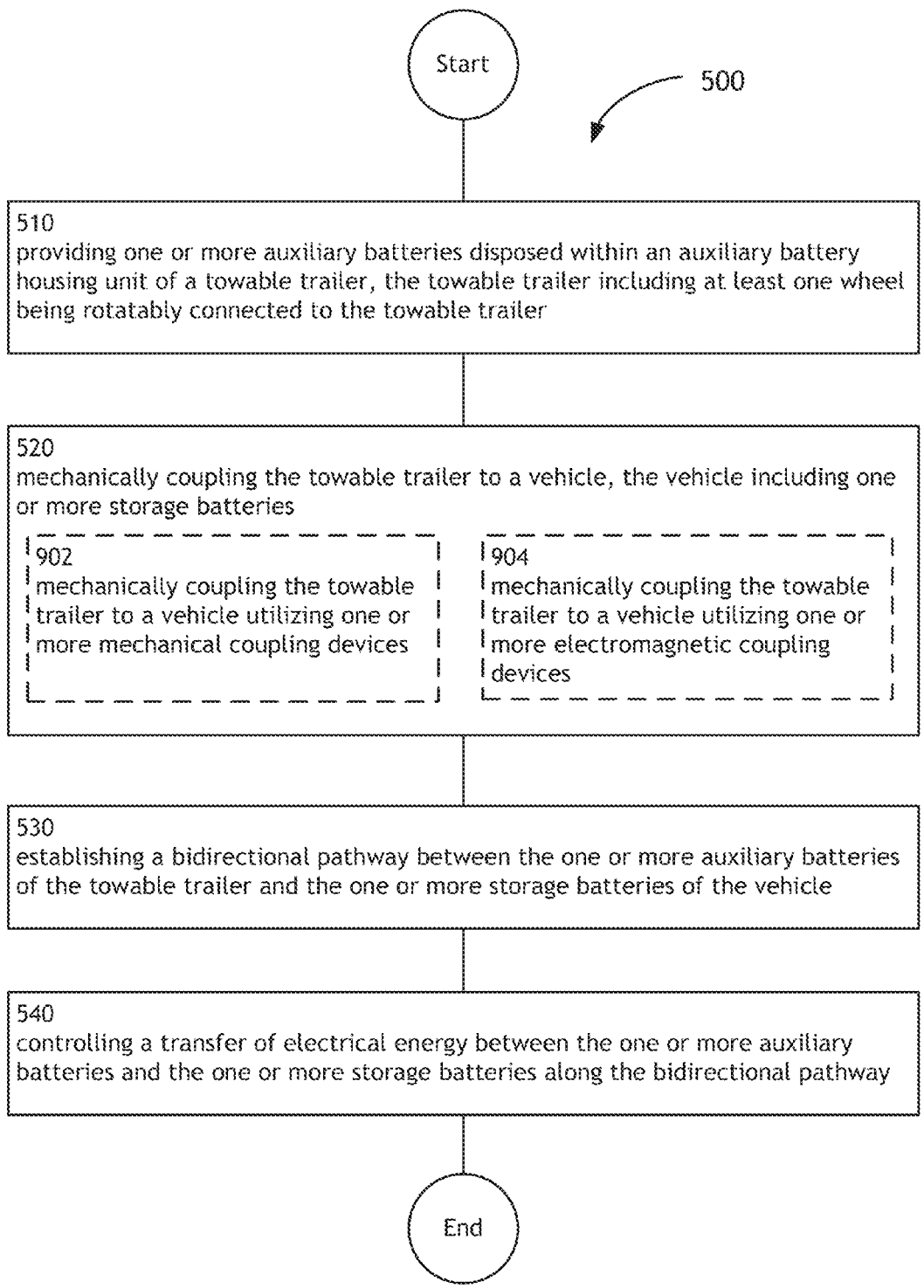

FIG. 9 illustrates alternative embodiments of the example operational flow 500 of FIG. 5. FIG. 9 illustrates example embodiments where the mechanical coupling operation 520 may include at least one additional operation. Additional operations may include an operation 902 and/or operation 904.

The operation 902 illustrates mechanically coupling the towable trailer to a vehicle utilizing one or more mechanical coupling devices. For example, as shown in FIGS. 1A through 2G, the towable trailer 102 may be mechanically coupled, or attached, to vehicle utilizing one or more mechanical coupling devices. For instance, the towable trailer 102 may be mechanically attached to a rear portion (e.g., bumper) of the vehicle 104 utilizing at least one of a hitch, a latch, or a suction device.

The operation 904 illustrates mechanically coupling the towable trailer to a vehicle utilizing one or more electromagnetic coupling devices. For example, as shown in FIGS. 1A through 2G, the towable trailer 102 may be mechanically coupled, or attached, to vehicle utilizing one or more electromagnetic coupling devices. For instance, the towable trailer 102 may be mechanically attached to a rear portion (e.g., bumper) of the vehicle 104 utilizing at least one of an electromagnet or a permanent magnet disposed within a front portion of the towable trailer 102.

Figure 10:
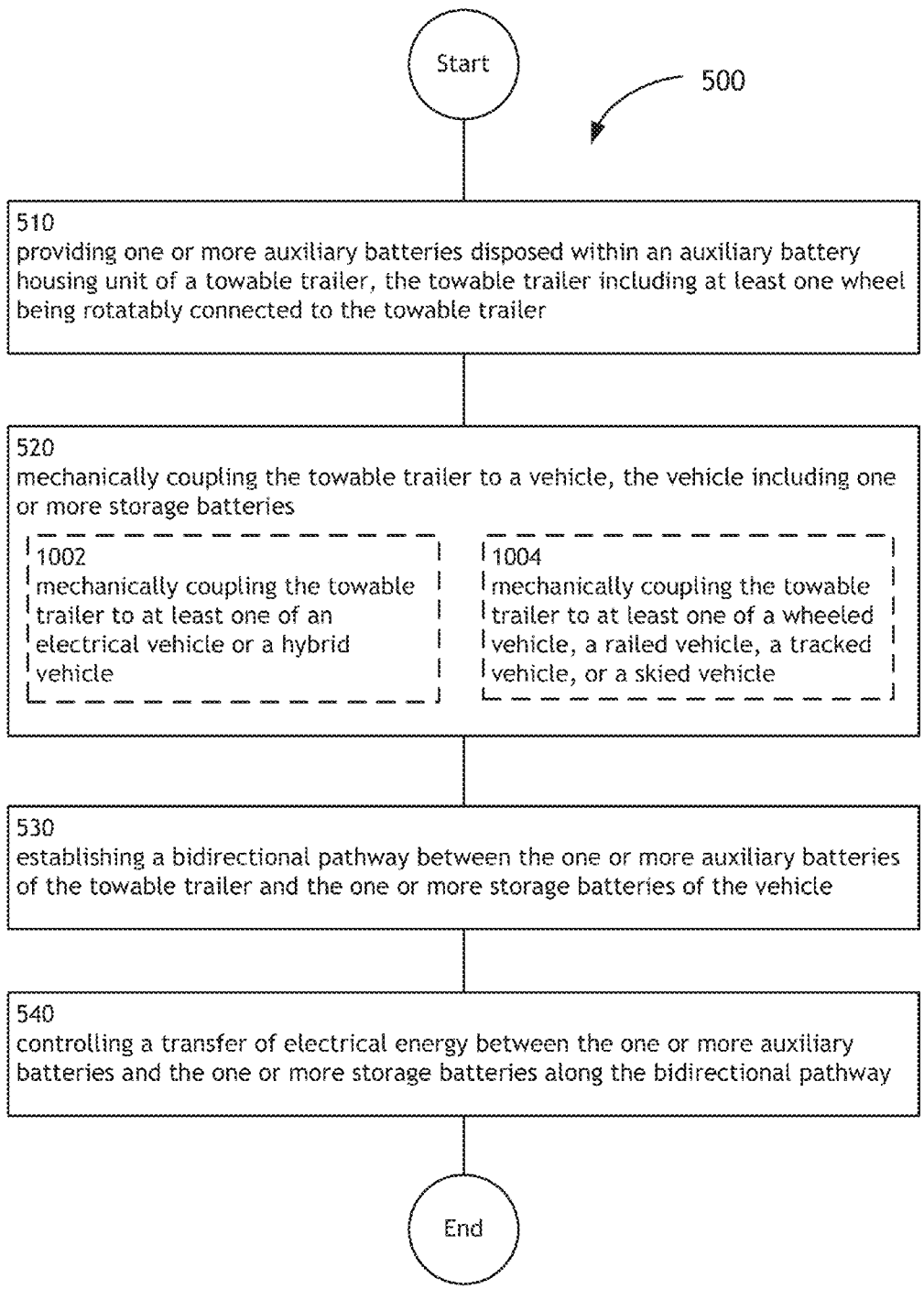

FIG. 10 illustrates alternative embodiments of the example operational flow 500 of FIG. 5. FIG. 10 illustrates example embodiments where the mechanical coupling operation 520 may include at least one additional operation. Additional operations may include an operation 1002 and/or operation 1004.

The operation 1002 illustrates mechanically coupling the towable trailer to at least one of an electrical vehicle or a hybrid vehicle. For example, as shown in FIGS. 1A through 2G, the towable trailer 102 may be mechanically coupled to a hybrid electric-gasoline vehicle (e.g., parallel configured hybrid electric-gasoline vehicle or series configured hybrid electric-gasoline vehicle). By way of another example, as shown in FIGS. 1A through 2G, the towable trailer 102 may be mechanically coupled to an electric vehicle, such as a purely electric vehicle or an electric vehicle including additional energy capture technology, such as a regenerative braking.

The operation 1004 illustrates mechanically coupling the towable trailer to at least one of a wheeled vehicle, a railed vehicle, a tracked vehicle, or a skied vehicle. For example, as shown in FIGS. 1A through 2G, the towable trailer 102 may be mechanically coupled to a wheeled vehicle, a railed vehicle, a tracked vehicle, or a skied vehicle. For instance, a wheeled vehicle may include an 2-wheeled or 4 wheeled vehicle, such as a motorcycle or car. In another instance, a railed vehicle may include a trolley, a train, or the like. In another instance, a tracked vehicle may include any vehicle equipped with tracking as a means of locomotion, such as a snow plow, a bulldozer, or the like. In another instance, a skied vehicle may include any vehicle equipped with skies, such as, but not limited to, a snow mobile.

Figure 11:
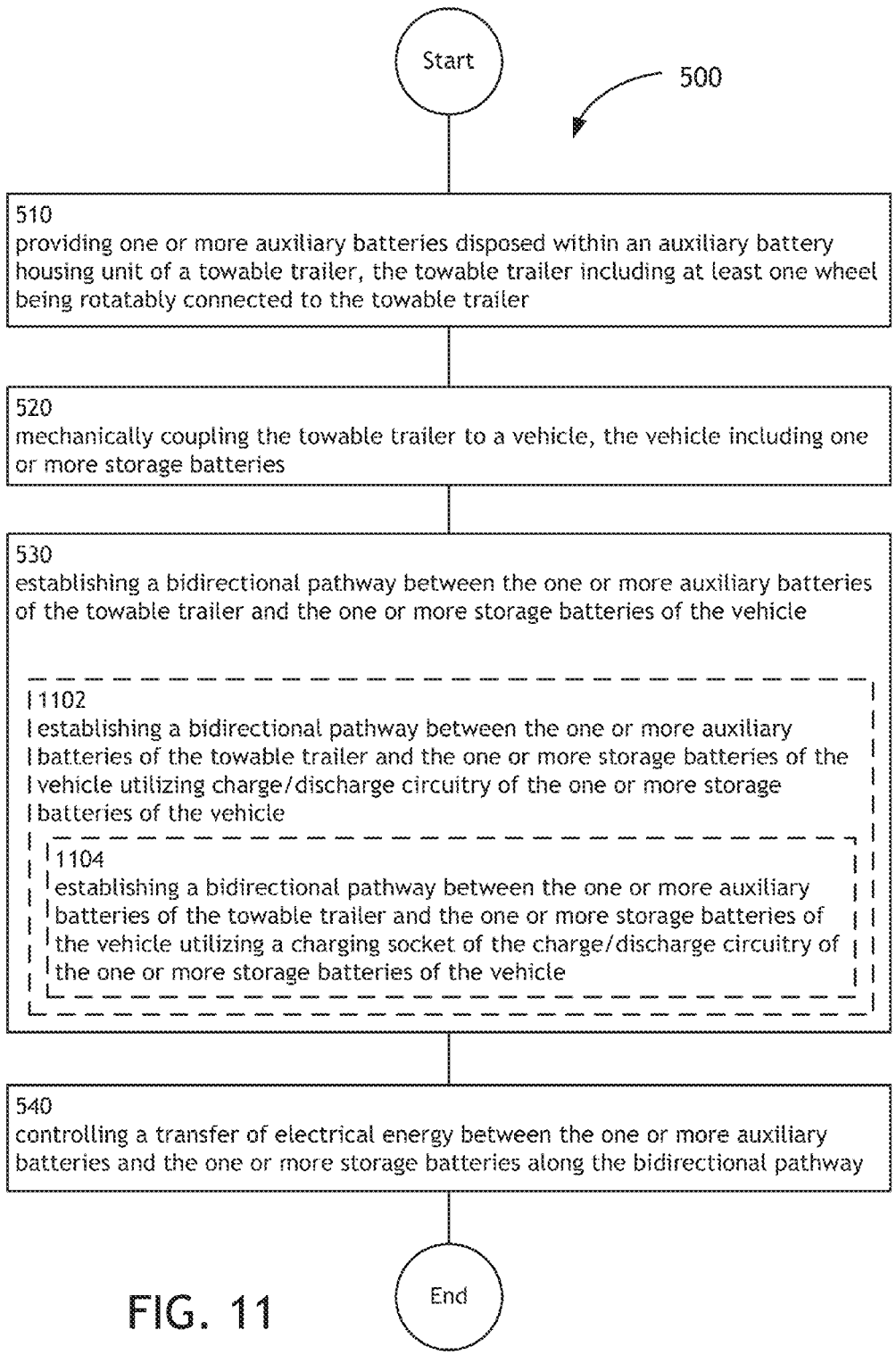

FIG. 11 illustrates alternative embodiments of the example operational flow 500 of FIG. 5. FIG. 11 illustrates example embodiments where the bidirectional establishing operation 530 may include at least one additional operation. Additional operations may include an operation 1102 and/or operation 1104.

The operation 1102 illustrates establishing a bidirectional pathway between the one or more auxiliary batteries of the towable trailer and the one or more storage batteries of the vehicle utilizing charge/discharge circuitry of the one or more storage batteries of the vehicle. For example, as shown in FIGS. 1A through 2G, a bidirectional electrical pathway 114 between the one or more auxiliary batteries 106 of the towable trailer 102 and the one or more storage batteries 110 of the vehicle 104 may be established utilizing an electrical connection configured to couple the one or more auxiliary batteries 106 with a portion of the charge/discharge circuitry 128 of the vehicle 104.

Further, the operation 1104 illustrates establishing a bidirectional pathway between the one or more auxiliary batteries of the towable trailer and the one or more storage batteries of the vehicle utilizing a charging socket of the charge/discharge circuitry of the one or more storage batteries of the vehicle. For example, as shown in FIGS. 1A through 2G, a bidirectional electrical pathway 114 between the one or more auxiliary batteries 106 of the towable trailer 102 and the one or more storage batteries 110 of the vehicle 104 may be established utilizing a reversibly connectable cable to to reversibly couple the one or more auxiliary batteries 106 with a portion of the charge/discharge circuitry 128 of the vehicle 104 via a charging socket 130 of the charge/discharge circuitry 128. In this regard, the charging socket 130 of the vehicle 104 may be configured to receive a connector portion of the pluggable electrical cable, allowing for the reversible electrical coupling of the one or more auxiliary batteries 106 and the one or more storage batteries 110.

Figure 12:
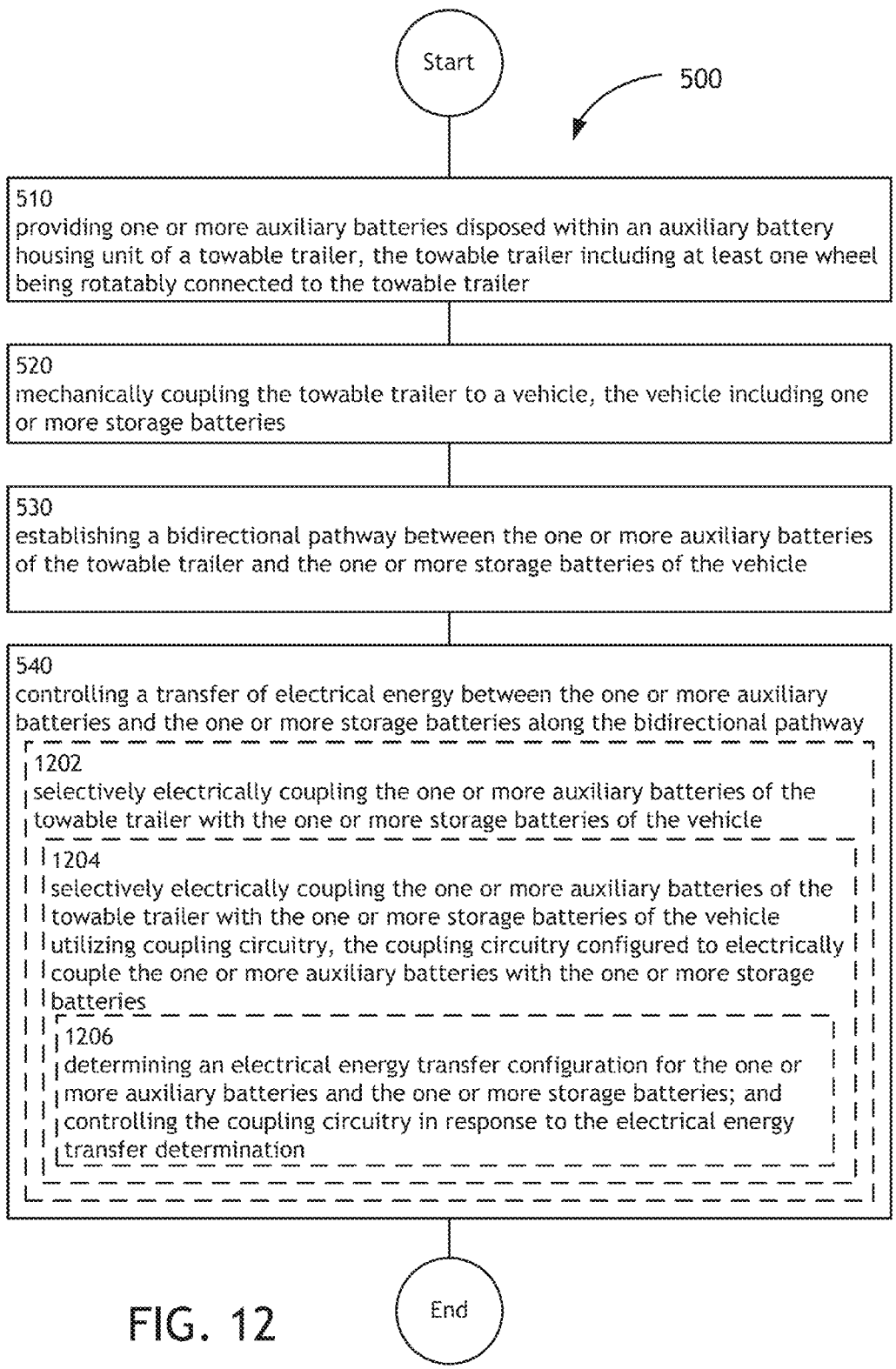

FIG. 12 illustrates alternative embodiments of the example operational flow 500 of FIG. 5. FIG. 12 illustrates example embodiments where the controlling operation 540 may include at least one additional operation. Additional operations may include an operation 1202, and operation 1204 and/or operation 1206.

The operation 1202 illustrates selectively electrically coupling the one or more auxiliary batteries of the towable trailer with the one or more storage batteries of the vehicle. For example, as shown in FIGS. 1A through 2G, the control system 116 may selectively electrically couple the one or more auxiliary batteries 106 of the towable trailer 102 with the one or more storage batteries 110 of the vehicle 104.

Further, the operation 1204 illustrates selectively electrically coupling the one or more auxiliary batteries of the towable trailer with the one or more storage batteries of the vehicle utilizing coupling circuitry, the coupling circuitry configured to electrically couple the one or more auxiliary batteries with the one or more storage batteries. For example, as shown in FIGS. 1A through 2G, the control system 116 may transmit a control signal 115 to control circuitry 118, wherein the control circuitry 118 is configured for selectively electrically coupling the one or more auxiliary batteries 106 of the towable trailer 102 with the one or more storage batteries 110 of the vehicle 104 in response to the received control signal 115.

Further, the operation 1206 illustrates determining an electrical energy transfer configuration for the one or more auxiliary batteries and the one or more storage batteries; and controlling the coupling circuitry in response to the electrical energy transfer determination. For example, as shown in FIGS. 1A through 2G, a determination module 204 (e.g., one or more processors configured to execute a preprogrammed algorithm) may determine an energy transfer configuration (i.e., a coupling circuitry configuration) utilizing one or more received signals from the receiving module 202. In response to the energy transfer configuration, the transfer control module 206 of the control system 116 may transmit a control signal 115 to control circuitry 118 in order to control the coupling state (e.g., OPEN circuit or CLOSED circuit) of the coupling circuitry 118.

Figure 13:
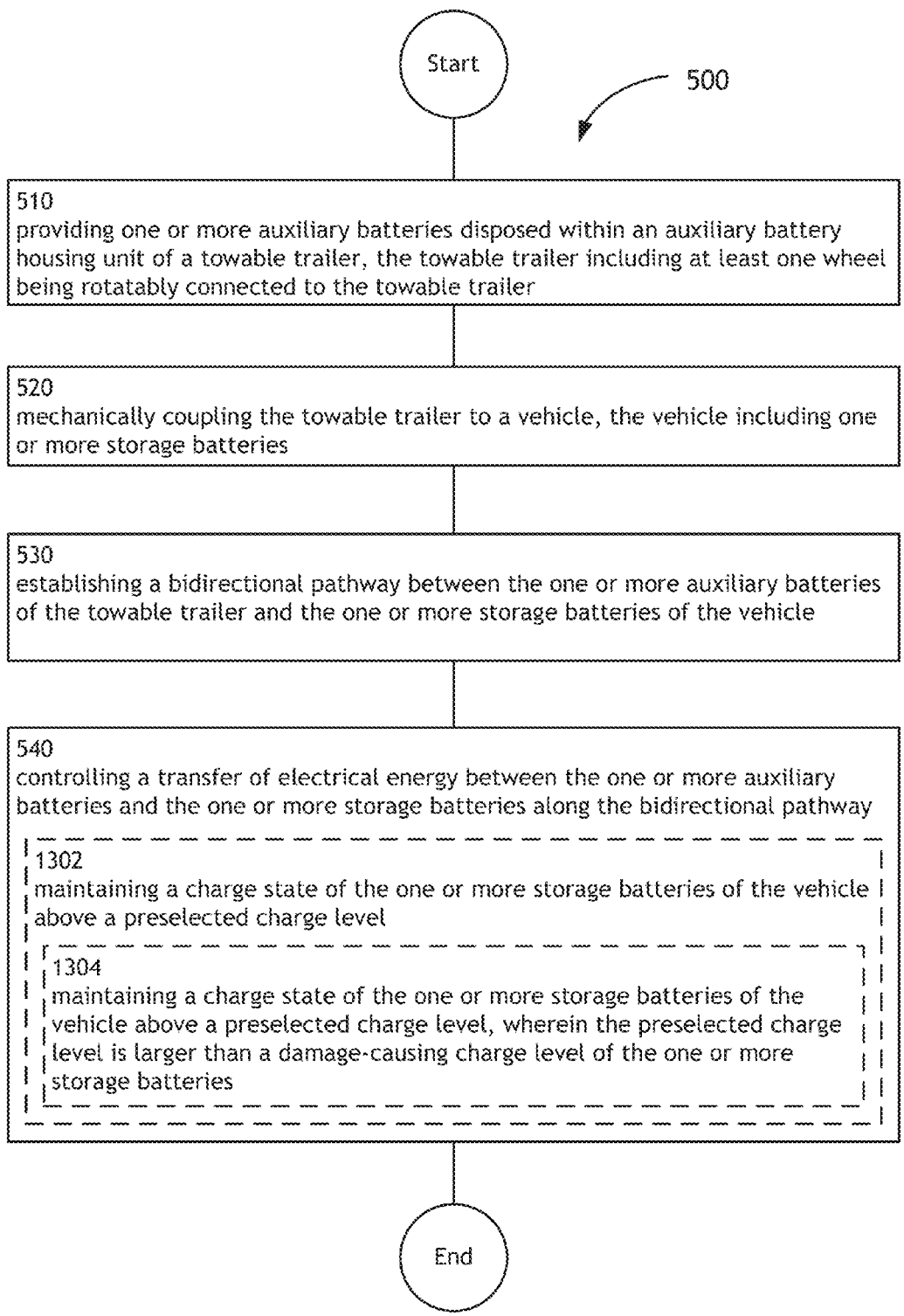

FIG. 13 illustrates alternative embodiments of the example operational flow 500 of FIG. 5. FIG. 13 illustrates example embodiments where the controlling operation 540 may include at least one additional operation. Additional operations may include an operation 1302 and/or operation 1304.

The operation 1302 illustrates maintaining a charge state of the one or more storage batteries of the vehicle above a preselected charge level. For example, as shown in FIGS. 1A through 2G, the control system 116 may control the coupling circuitry 118 so as to control the charge flow between the one or more auxiliary batteries 106 of the towable trailer 102 and the one or more storage batteries 110 of the vehicle 104 in order to maintain a charge state of the one or more storage batteries 110 above a selected charge level.

Further, the operation 1304 illustrates maintaining a charge state of the one or more storage batteries of the vehicle above a preselected charge level, wherein the preselected charge level is larger than a damage-causing charge level of the one or more storage batteries. For example, as shown in FIGS. 1A through 2G, the control system 116 may control the coupling circuitry 118 so as to control the charge flow between the one or more auxiliary batteries 106 of the towable trailer 102 and the one or more storage batteries 110 of the vehicle 104 in order to maintain a charge state of the one or more storage batteries 110 above a damage-causing charge level.

Figure 14:
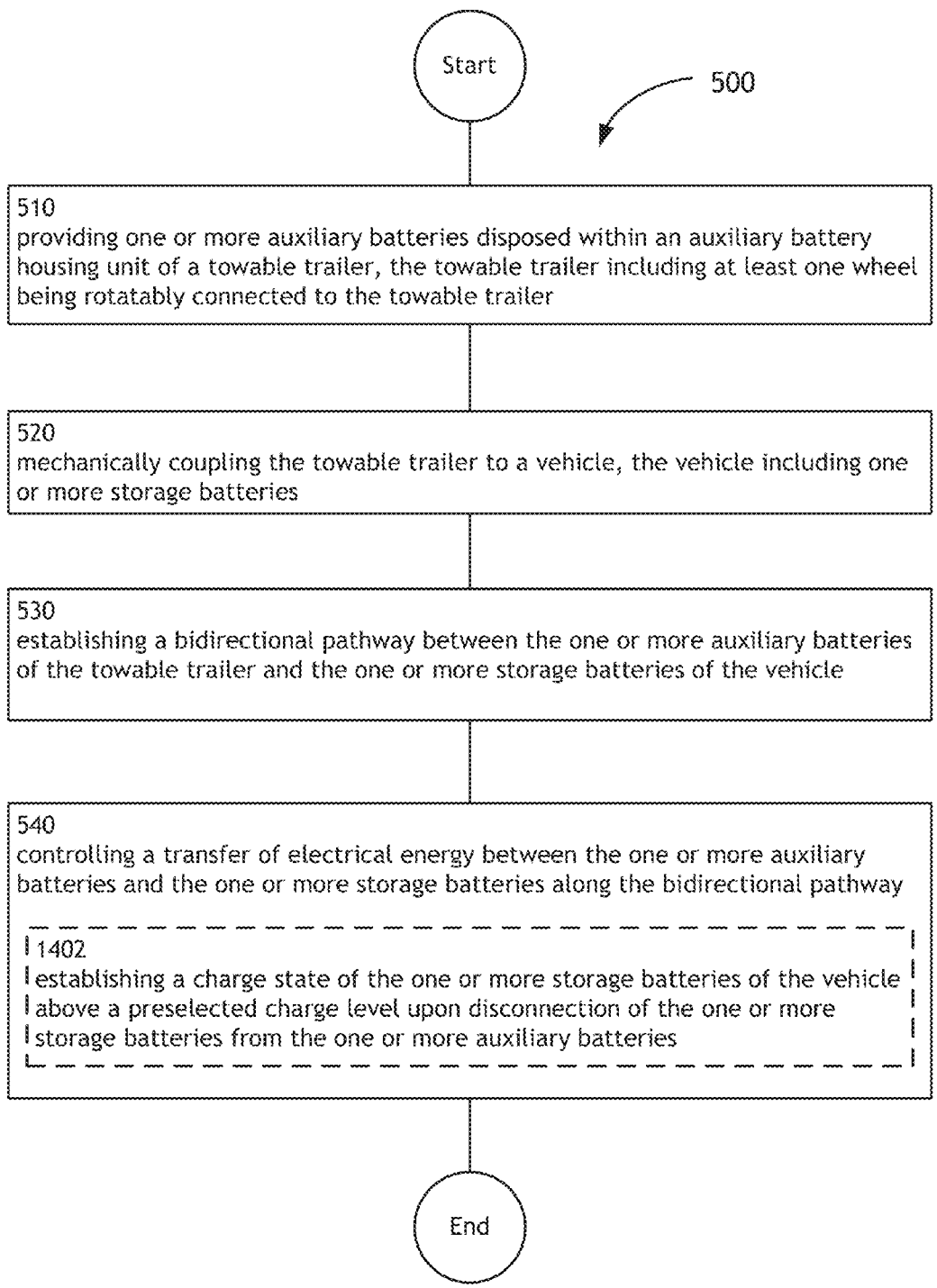

FIG. 14 illustrates alternative embodiments of the example operational flow 500 of FIG. 5. FIG. 14 illustrates example embodiments where the controlling operation 540 may include at least one additional operation. Additional operations may include an operation 1402.

The operation 1402 illustrates establishing a charge state of the one or more storage batteries of the vehicle above a preselected charge level upon disconnection of the one or more storage batteries from the one or more auxiliary batteries. For example, as shown in FIGS. 1A through 2G, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more storage batteries of the vehicle above a preselected charge level upon disconnection of the one or more storage batteries 110 from the one or more auxiliary batteries 106. In this regard, the control system 116 may be utilized in order to achieve a minimum charge state in the one or more storage batteries 110 of the vehicle required for driving the vehicle 104 for a selected distance (e.g., selectable via a user input device 224) upon disconnection of the one or more storage batteries 110 from the one or more auxiliary batteries 106.

Figure 15:
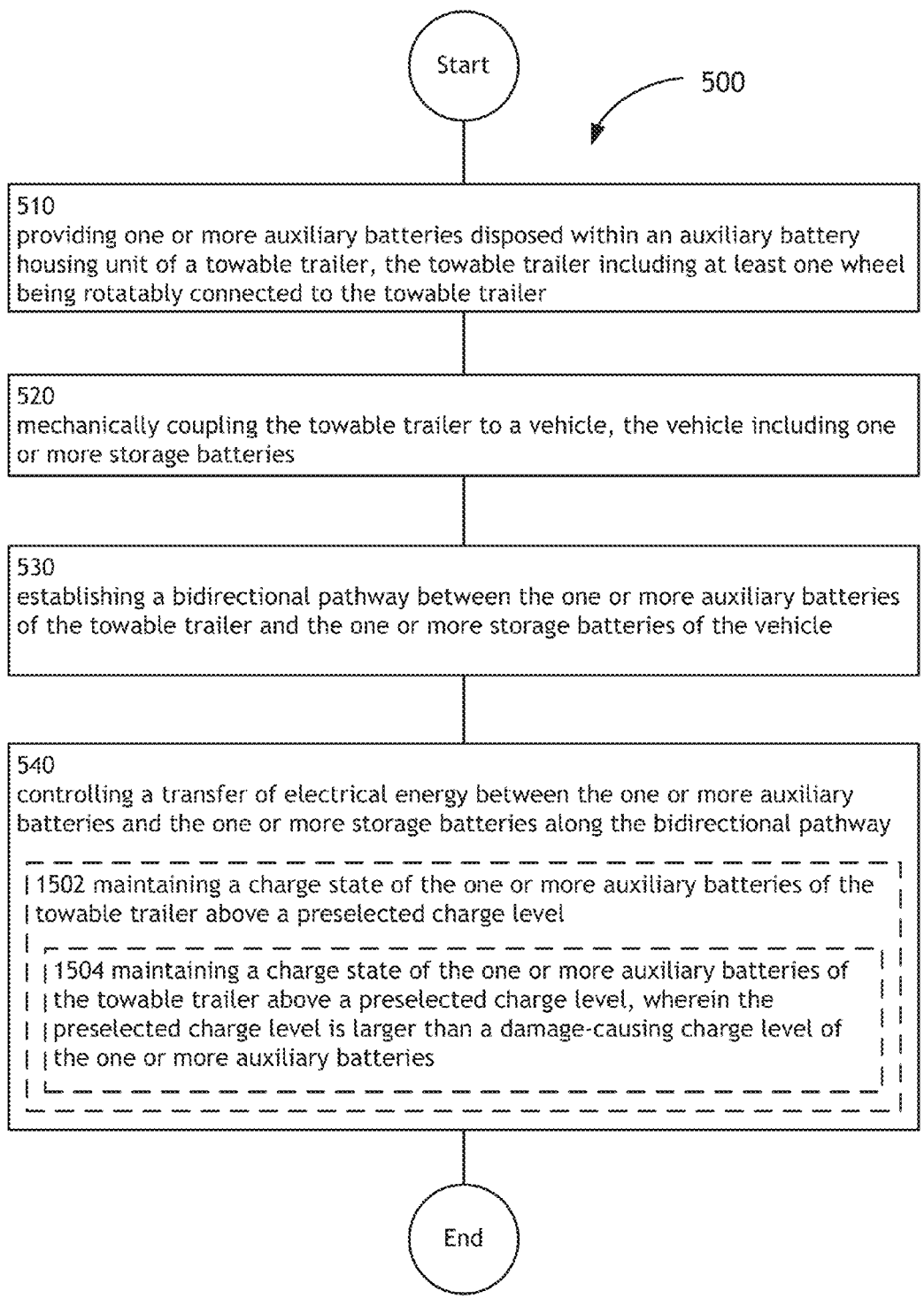

FIG. 15 illustrates alternative embodiments of the example operational flow 500 of FIG. 5. FIG. 15 illustrates example embodiments where the controlling operation 540 may include at least one additional operation. Additional operations may include an operation 1502 and/or operation 1504.

The operation 1502 illustrates maintaining a charge state of the one or more auxiliary batteries of the towable trailer above a preselected charge level. For example, as shown in FIGS. 1A through 2G, the control system 116 may control the coupling circuitry 118 so as to control the charge flow between the one or more auxiliary batteries 106 of the towable trailer 102 and the one or more storage batteries 110 of the vehicle 104 in order to maintain a charge state of the one or more auxiliary batteries 106 of the towable trailer 102 above a preselected charge level.

Further, the operation 1504 illustrates maintaining a charge state of the one or more auxiliary batteries of the towable trailer above a preselected charge level, wherein the preselected charge level is larger than a damage-causing charge level of the one or more auxiliary batteries. For example, as shown in FIGS. 1A through 2G, the control system 116 may control the coupling circuitry 118 so as to control the charge flow between the one or more auxiliary batteries 106 of the towable trailer 102 and the one or more storage batteries 110 of the vehicle 104 in order to maintain a charge state of the one or more auxiliary batteries 110 above a damage-causing charge level.

Figure 16:
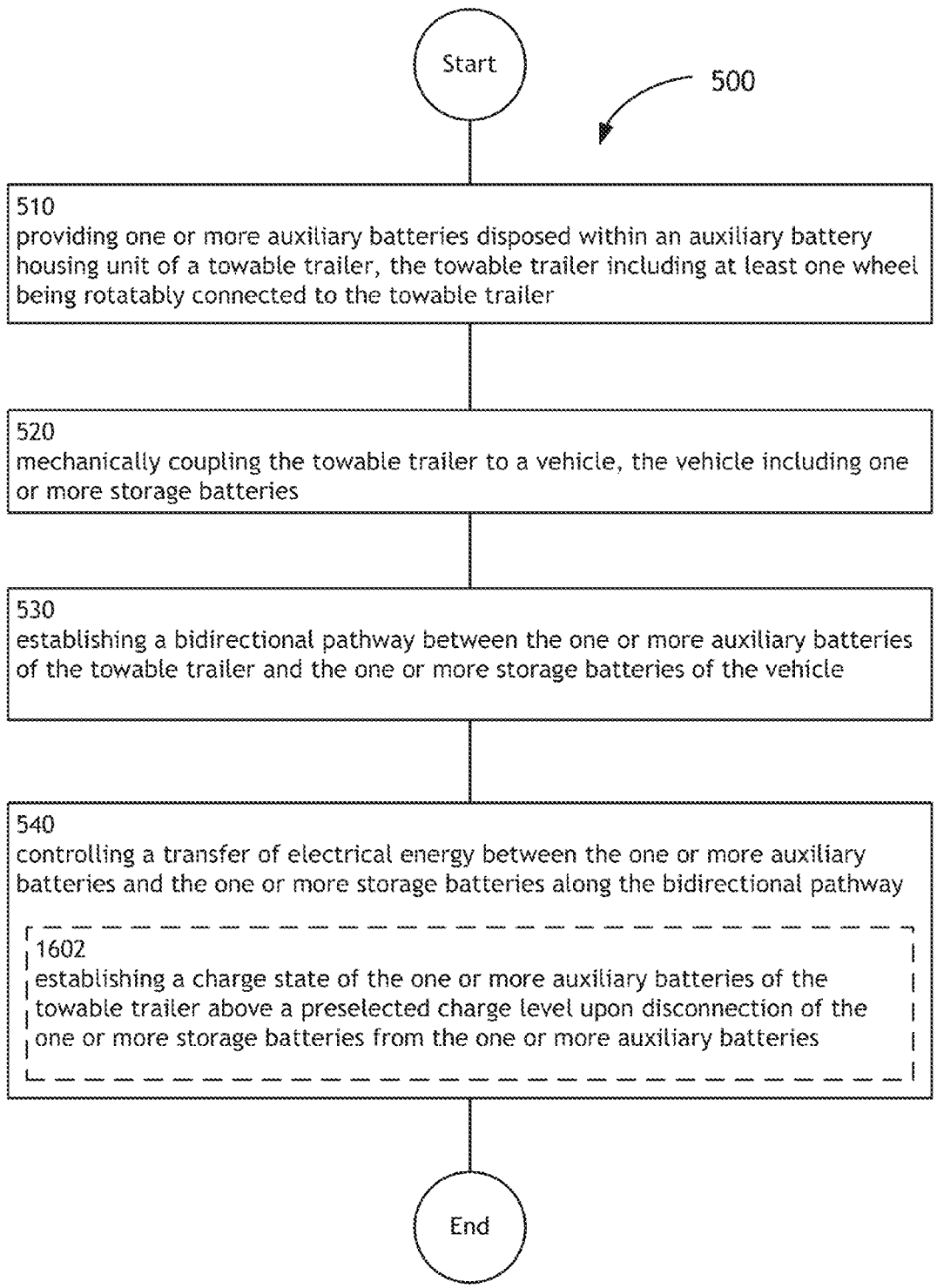

FIG. 16 illustrates alternative embodiments of the example operational flow 500 of FIG. 5. FIG. 16 illustrates example embodiments where the controlling operation 540 may include at least one additional operation. Additional operations may include an operation 1602.

The operation 1602 illustrates establishing a charge state of the one or more auxiliary batteries of the towable trailer above a preselected charge level upon disconnection of the one or more storage batteries from the one or more auxiliary batteries. For example, as shown in FIGS. 1A through 4, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more auxiliary batteries 106 of the trailer 102 above a preselected charge level upon disconnection of the one or more storage batteries 110 from the one or more auxiliary batteries 106. In this regard, the control system 116 may be utilized in order to achieve a minimum charge state in the one or more auxiliary batteries 106 of the vehicle 104 upon disconnection of the one or more storage batteries 110 from the one or more auxiliary batteries 106.

Figure 17:
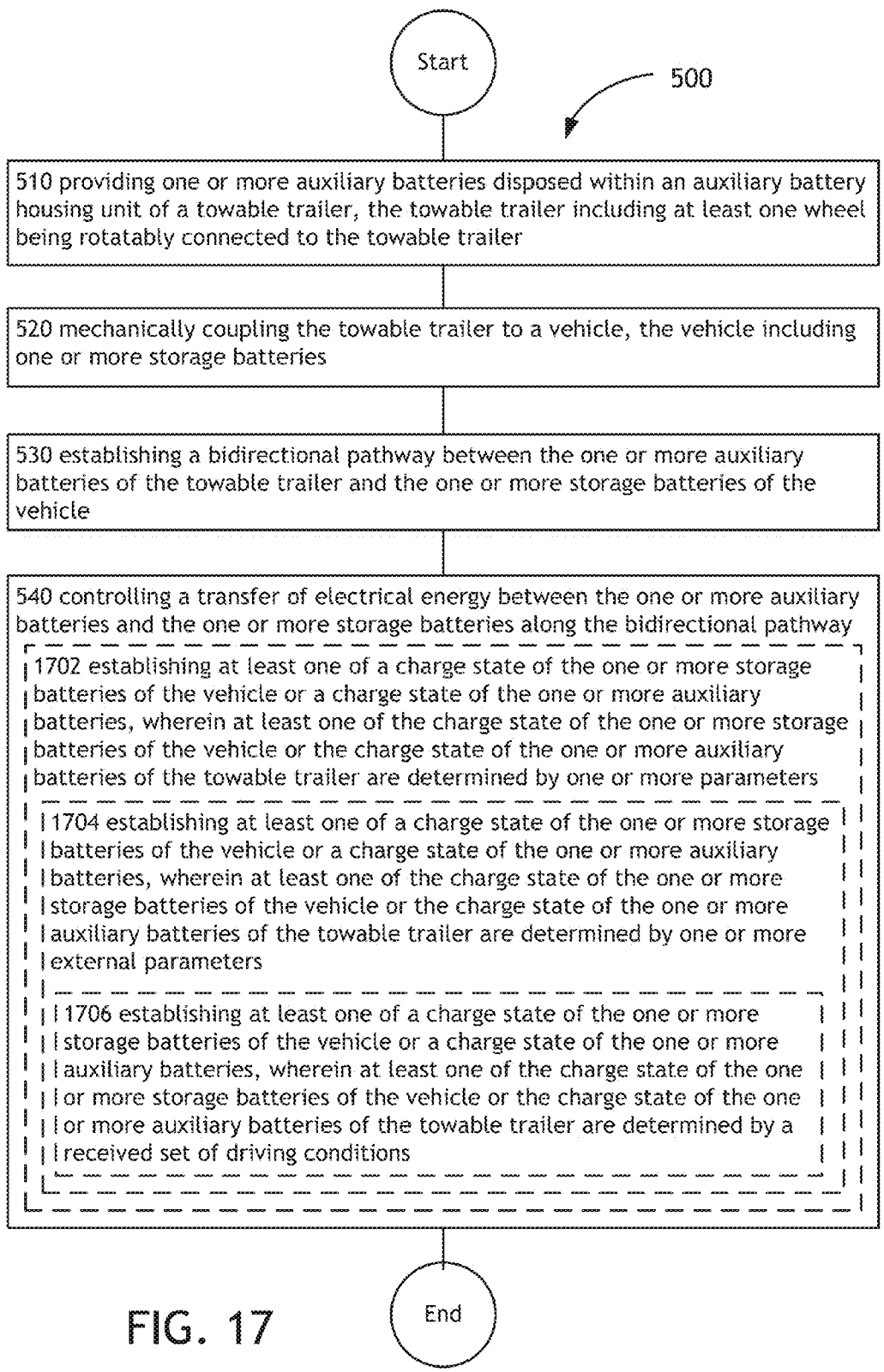

FIG. 17 illustrates alternative embodiments of the example operational flow 500 of FIG. 5. FIG. 17 illustrates example embodiments where the controlling operation 540 may include at least one additional operation. Additional operations may include an operation 1702, an operation 1704, and/or an operation 1706.

The operation 1702 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by one or more parameters. For example, as shown in FIGS. 1A through 4, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more auxiliary batteries 106 and a charge state of the one or more storage batteries 110 determined by the control system 116 using one or more parameters (e.g., internal parameters or external parameters).

Further, the operation 1704 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by one or more external parameters. For example, as shown in FIGS. 1A through 4, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more auxiliary batteries 106 and a charge state of the one or more storage batteries 110 determined by the control system 116 using one or more external parameters.

Further, the operation 1706 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by a received set of driving conditions. For example, as shown in FIGS. 1A through 4, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more auxiliary batteries 106 and a charge state of the one or more storage batteries 110 determined by the control system 116 using a received set of driving conditions (e.g., road conditions received from a road condition service or weather information received from a weather service via a wireless internet signal).

Figure 18:
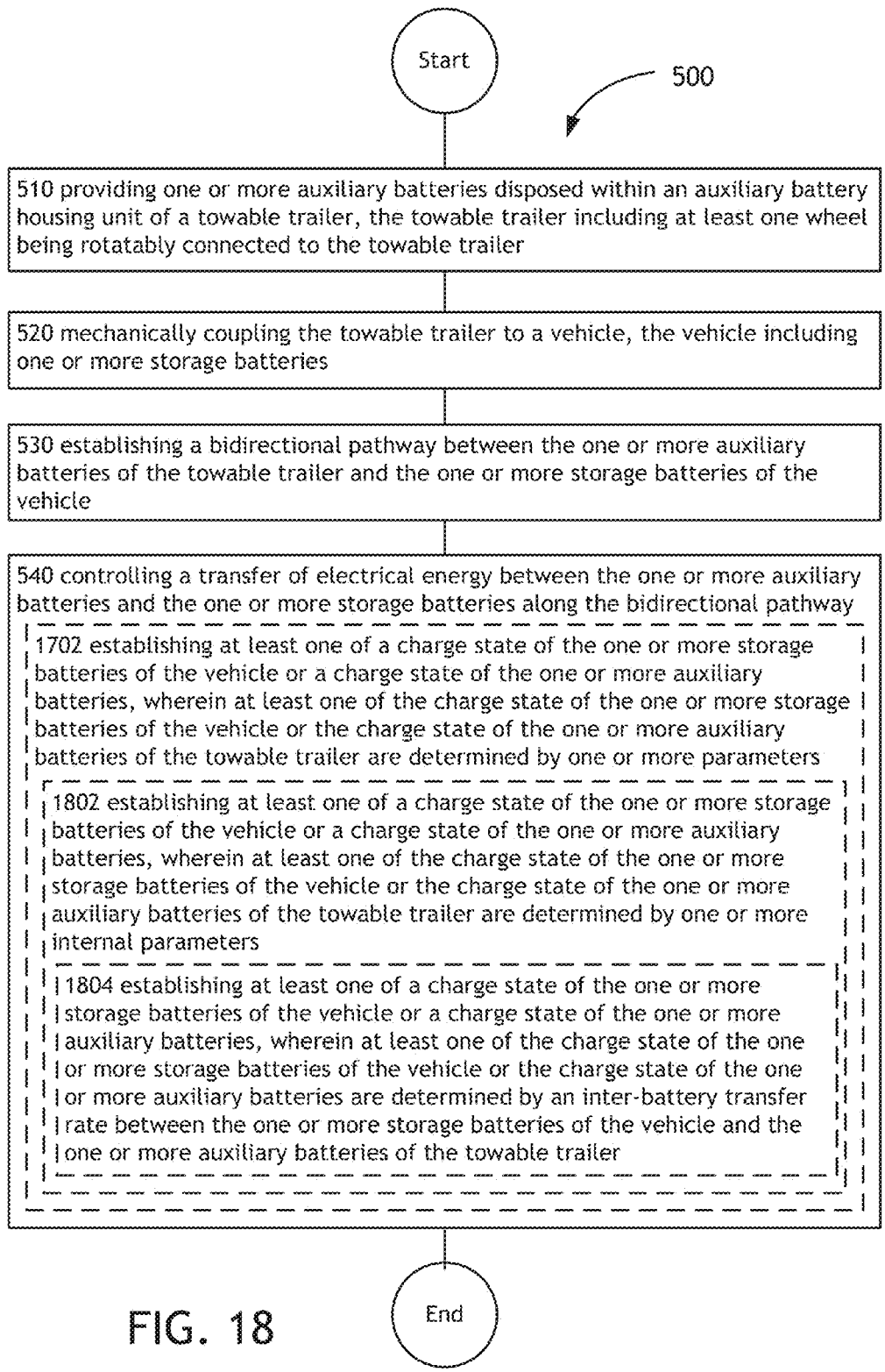
Figure 19A:
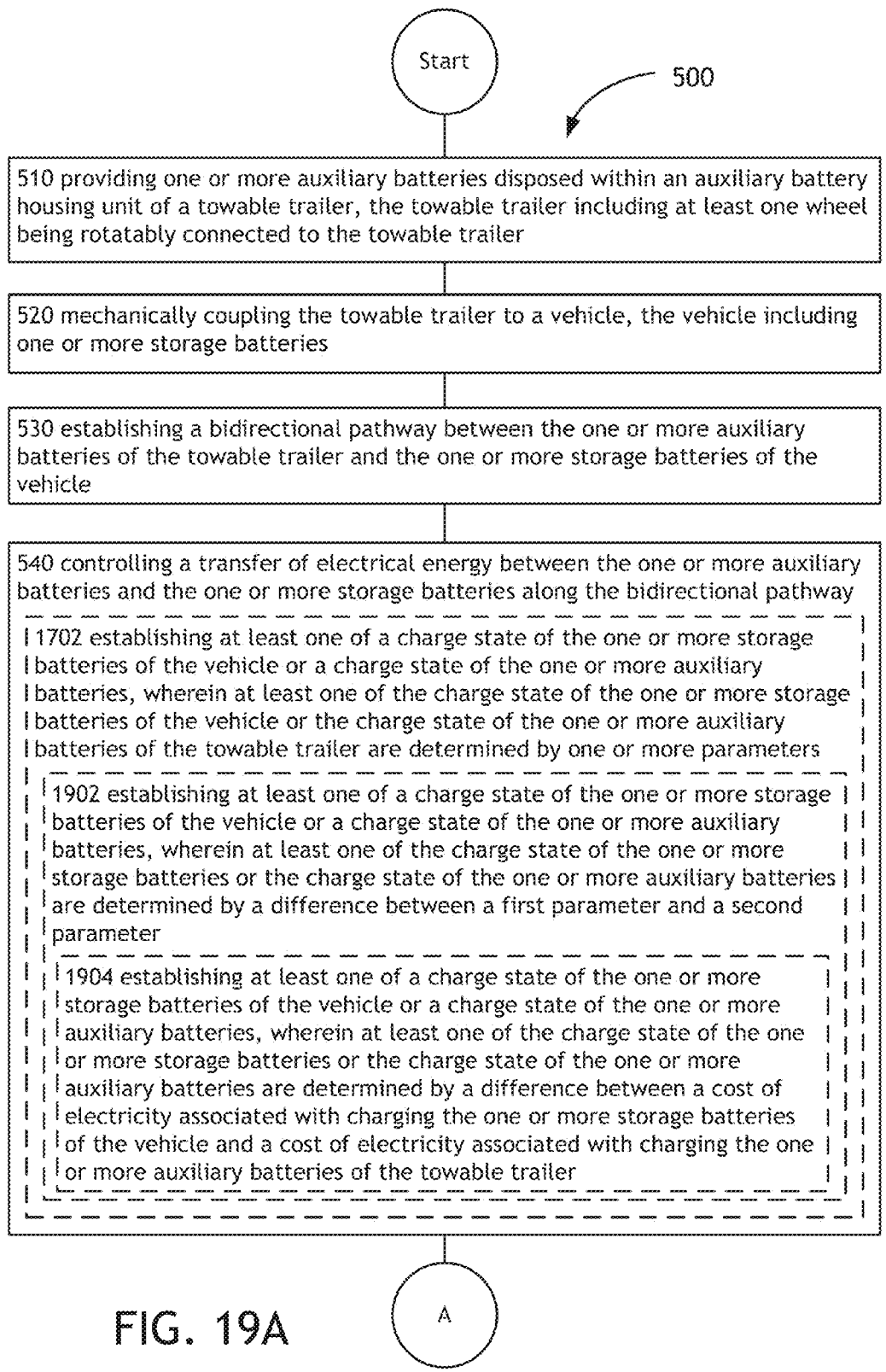
Figure 19B:
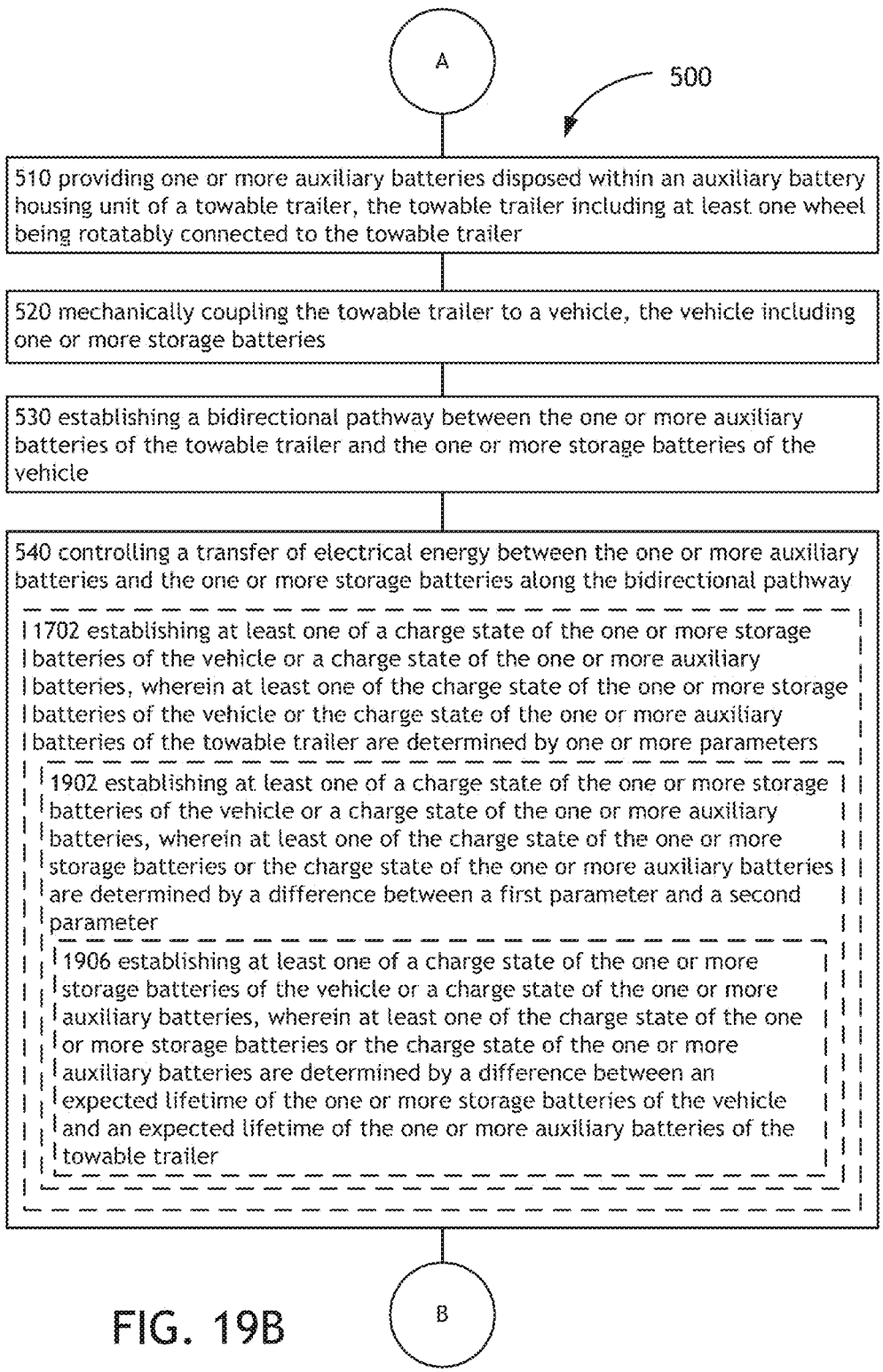
Figure 19C:
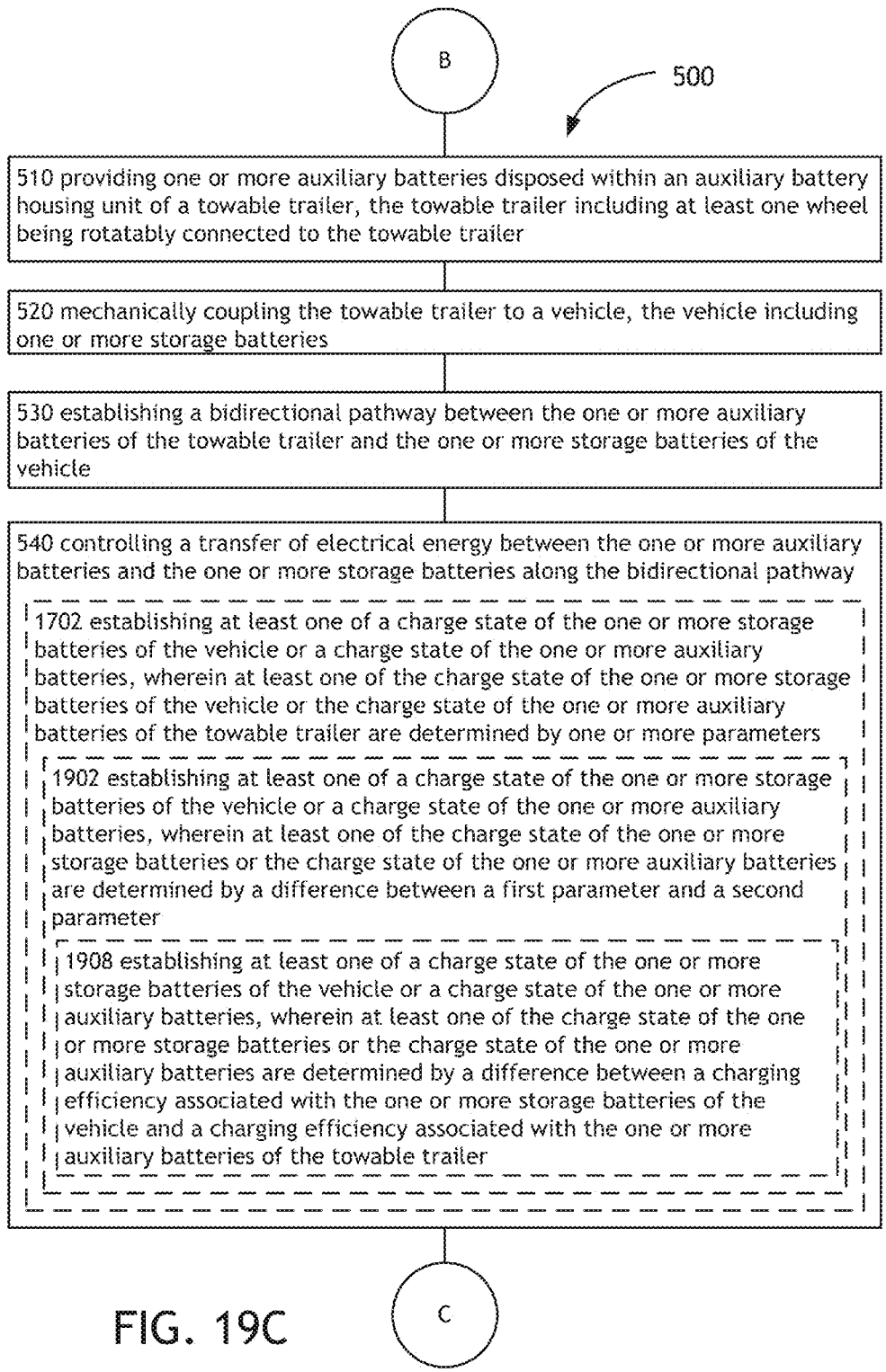
Figure 19D:
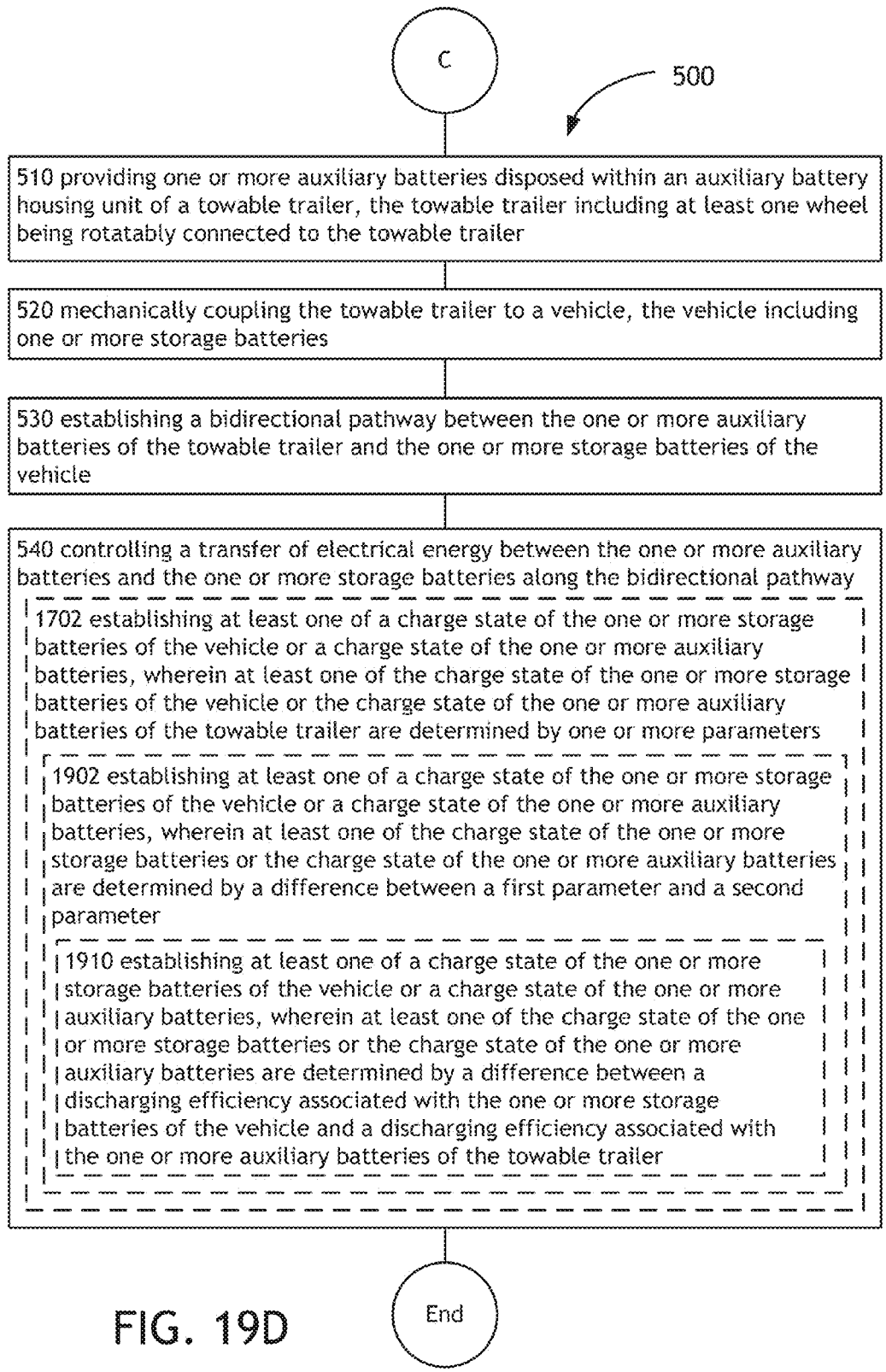

FIG. 18 illustrates alternative embodiments of the example operational flow 500 of FIG. 5. FIG. 18 illustrates example embodiments where the controlling operation 540 may include at least one additional operation. Additional operations may include an operation 1802, and/or an operation 1804.

Further, the operation 1802 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by one or more internal parameters. For example, as shown in FIGS. 1A through 4, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more auxiliary batteries 106 and a charge state of the one or more storage batteries 110 determined by the control system 116 using one or more internal parameters.

Further, the operation 1804 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by an inter-battery transfer rate between the one or more storage batteries of the vehicle and the one or more rechargeable auxiliary batteries of the towable trailer. For example, as shown in FIGS. 1A through 4, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more auxiliary batteries 106 and a charge state of the one or more storage batteries 110 determined by the control system 116 using a known or measured inter-battery transfer rate between the one or more storage batteries 110 and the one or more auxiliary batteries 106.

FIGS. 19A-19D illustrate alternative embodiments of the example operational flow 500 of FIG. 5. FIGS. 19A-19D illustrate example embodiments where the controlling operation 540 may include at least one additional operation. Additional operations may include an operation 1902, 1904, 1906, 1908, and/or an operation 1910.

The operation 1902 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by a difference between a first parameter and a second parameter. For example, as shown in FIGS. 1A through 4, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more auxiliary batteries 106 and a charge state of the one or more storage batteries 110 determined by the control system 116 using a difference between a first parameter and a second parameter.

Further, the operation 1904 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by a difference between a cost of electricity associated with charging the one or more storage batteries of the vehicle and a cost of electricity associated with charging the one or more auxiliary batteries of the towable trailer. For example, as shown in FIGS. 1A through 4, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more auxiliary batteries 106 and a charge state of the one or more storage batteries 110 determined by the control system 116 using a difference between a cost of electricity associated with charging the one or more storage batteries 110 of the vehicle 104 and a cost of electricity associated with charging the one or more auxiliary batteries 106 of the towable trailer 102.

Further, the operation 1906 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by a difference between an expected lifetime of the one or more storage batteries of the vehicle and an expected lifetime of the one or more auxiliary batteries of the towable trailer. For example, as shown in FIGS. 1A through 4, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more auxiliary batteries 106 and a charge state of the one or more storage batteries 110 determined by the control system 116 using a difference between an expected lifetime of the one or more storage batteries 110 of the vehicle 104 and an expected lifetime of the one or more auxiliary batteries 106 of the towable trailer 102.

Further, the operation 1908 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by a difference between a charging efficiency associated with the one or more storage batteries of the vehicle and a charging efficiency associated with the one or more rechargeable auxiliary batteries of the towable trailer. For example, as shown in FIGS. 1A through 4, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more auxiliary batteries 106 and a charge state of the one or more storage batteries 110 determined by the control system 116 using a difference between a charging efficiency associated with the one or more storage batteries of the vehicle and a charging efficiency associated with the one or more rechargeable auxiliary batteries of the towable trailer.

Further, the operation 1910 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by a difference between a discharging efficiency associated with the one or more storage batteries of the vehicle and a discharging efficiency associated with the one or more rechargeable auxiliary batteries of the towable trailer. For example, as shown in FIGS. 1A through 4, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more auxiliary batteries 106 and a charge state of the one or more storage batteries 110 determined by the control system 116 using a difference between a discharging efficiency associated with the one or more storage batteries 110 of the vehicle 104 and a discharging efficiency associated with the one or more rechargeable auxiliary batteries 106 of the towable trailer 102.

Figure 20:
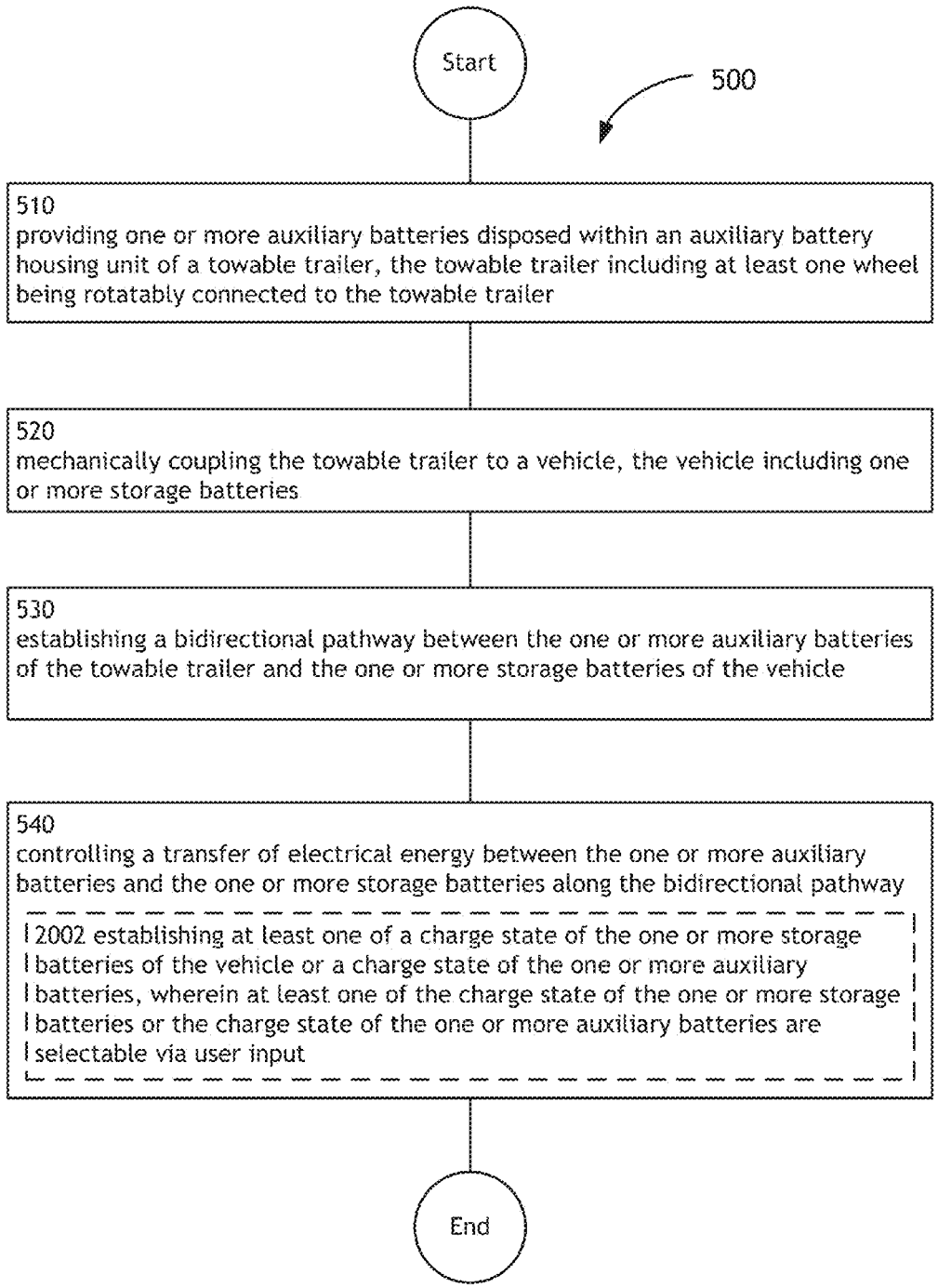

FIG. 20 illustrates alternative embodiments of the example operational flow 500 of FIG. 5. FIG. 20 illustrates example embodiments where the controlling operation 540 may include at least one additional operation. Additional operations may include an operation 2002.

The operation 2002 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are selectable via user input. For example, as shown in FIGS. 1A through 4, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more auxiliary batteries 106 and a charge state of the one or more storage batteries 110 selected by a user via user interface device (e.g., mouse, touchscreen, keyboard, and the like).

Figure 21:
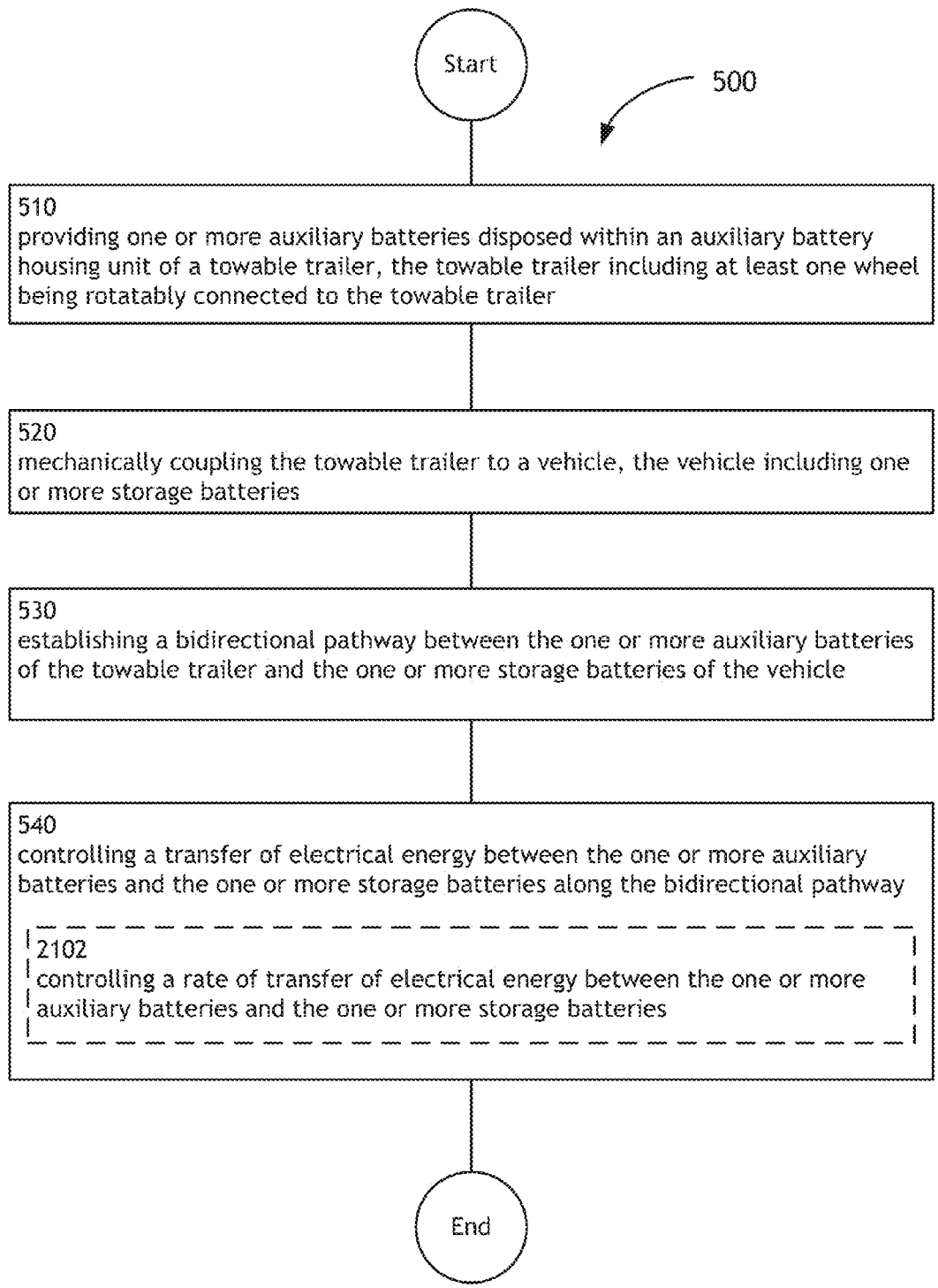

FIG. 21 illustrates alternative embodiments of the example operational flow 500 of FIG. 5. FIG. 21 illustrates example embodiments where the controlling operation 540 may include at least one additional operation. Additional operations may include an operation 2102.

The operation 2102 illustrates controlling a rate of transfer of electrical energy between the one or more auxiliary batteries and the one or more storage batteries. For example, as shown in FIGS. 1A through 4, the control system 116 may control the coupling circuitry 118 so as to control the rate of transfer (e.g., rate of transfer required to avoid overheating) of electrical energy between the one or more auxiliary batteries 106 of the towable trailer 102 and the one or more storage batteries 110 of the vehicle 104.

Figure 22:
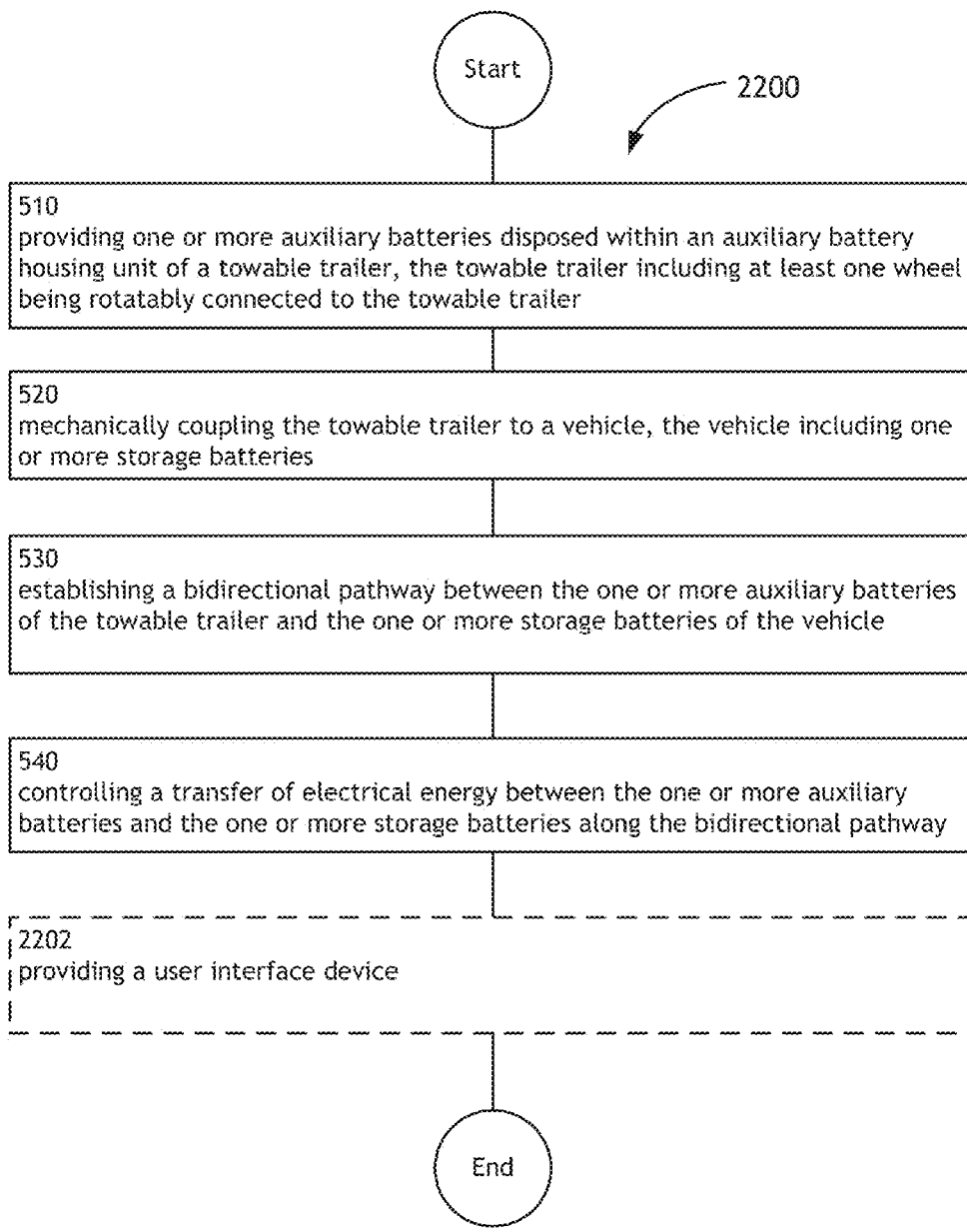

FIG. 22 illustrates an operational flow 2200 representing example operations related to supplying auxiliary electrical energy to an electric or hybrid vehicle. FIG. 22 illustrates an example embodiment where the example operational flow 500 of FIG. 5 may include at least one additional operation. Additional operations may include a user interface providing operation 2202.

After a start operation, a providing operation 510, a mechanically coupling operation 520, a bidirectional pathway establishing operation 530, and a controlling operation 540, the operation flow 2200 moves to user interface providing operation 2202.

The operation 2202 illustrates providing a user interface device. For example, as shown in FIGS. 1A through 4, a user interface 214 may be obtained. For instance, the user interface 214 may be disposed on the towable trailer 102. In another instance, the user interface 214 may be disposed within the vehicle 104. In another instance, the user interface 214 may be integrated into a remote communications device (e.g., smartphone or tablet).

Figure 23A:
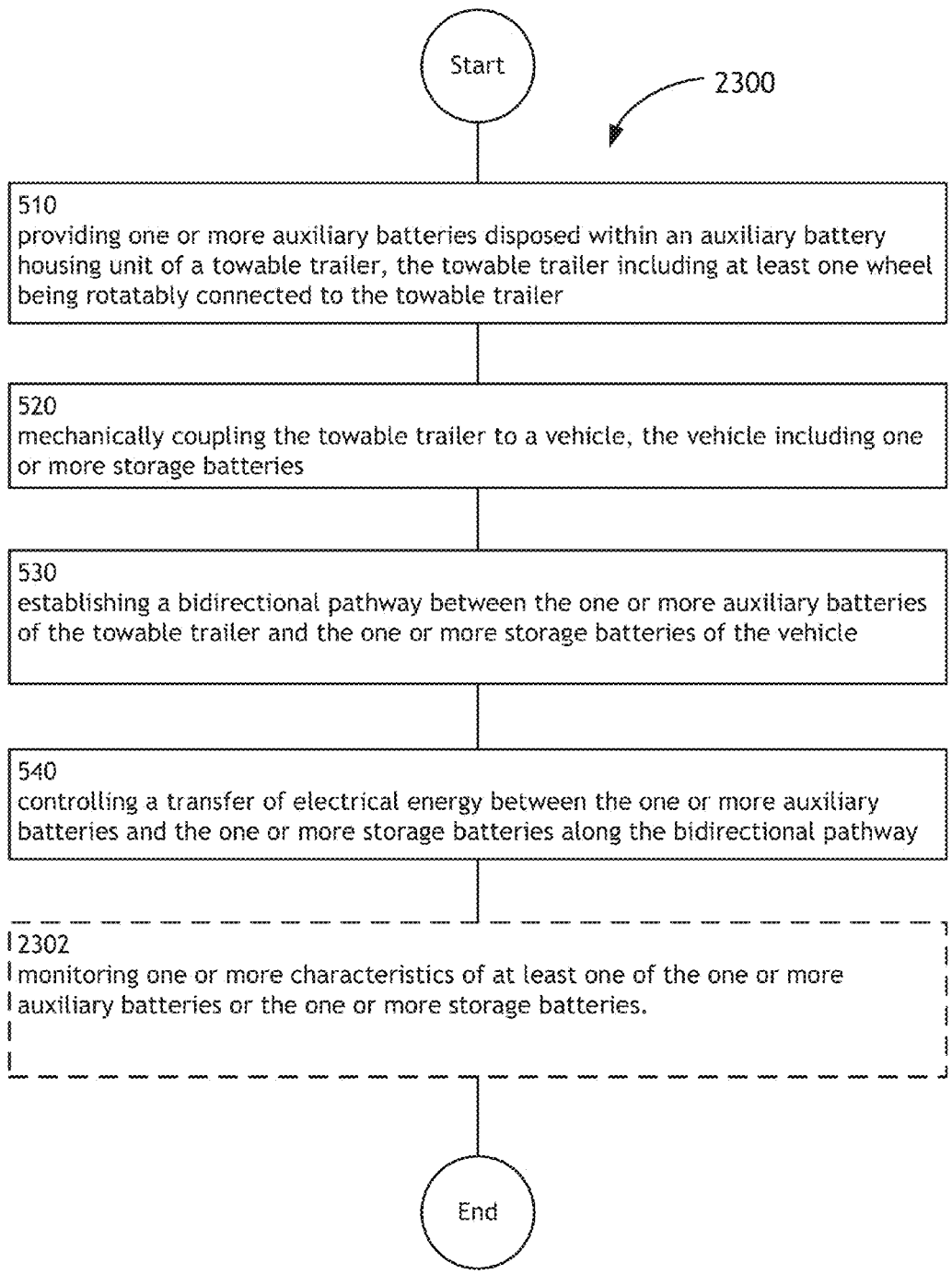

FIG. 23A illustrates an operational flow 2300 representing example operations related to supplying auxiliary electrical energy to an electric or hybrid vehicle. FIG. 23A illustrates an example embodiment where the example operational flow 500 of FIG. 5 may include at least one additional operation. Additional operations may include a battery monitoring operation 2302.

After a start operation, a providing operation 510, a mechanically coupling operation 520, a bidirectional pathway establishing operation 530, and a controlling operation 540, the operation flow 2300 moves to battery monitoring operation 2302.

The operation 2302 illustrates monitoring one or more characteristics of at least one of the one or more auxiliary batteries or the one or more storage batteries. For example, as shown in FIGS. 1A through 4, a battery monitoring system 236 (e.g., state of charge monitoring system) may be utilized to monitor one or more characteristics of at least one or more auxiliary batteries 106 or the one or more storage batteries 110.

Figure 23B:
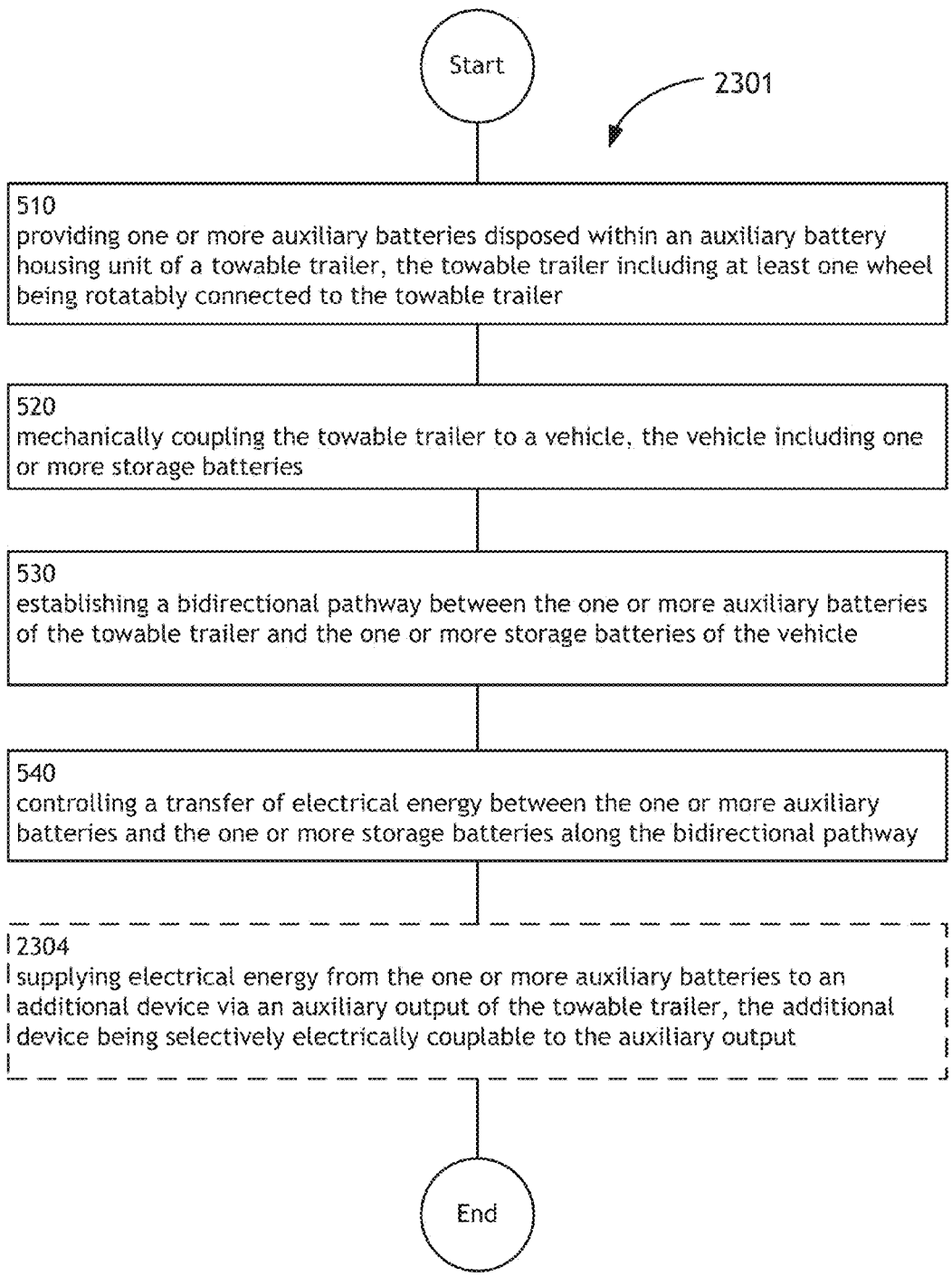

FIG. 23B illustrates an operational flow 2301 representing example operations related to supplying auxiliary electrical energy to an electric or hybrid vehicle. FIG. 23B illustrates an example embodiment where the example operational flow 500 of FIG. 5 may include at least one additional operation. Additional operations may include a supplying operation 2302.

After a start operation, a providing operation 510, a mechanically coupling operation 520, a bidirectional pathway establishing operation 530, and a controlling operation 540, the operation flow 2301 moves to supplying operation 2304.

The operation 2304 illustrates supplying electrical energy from the one or more auxiliary batteries to an additional device via an auxiliary output of the towable trailer, the additional device being selectively electrically couplable to the auxiliary output. For example, as shown in FIGS. 1A through 4, electrical energy stored within the one or more auxiliary batteries 106 may be transferred to an additional device 240 via an auxiliary port 242. For instance, the towable trailer 102 may be equipped with an auxiliary port 242 configured for receiving a connector (e.g., male end of an electric cable) from the additional device 240.

Figure 24:
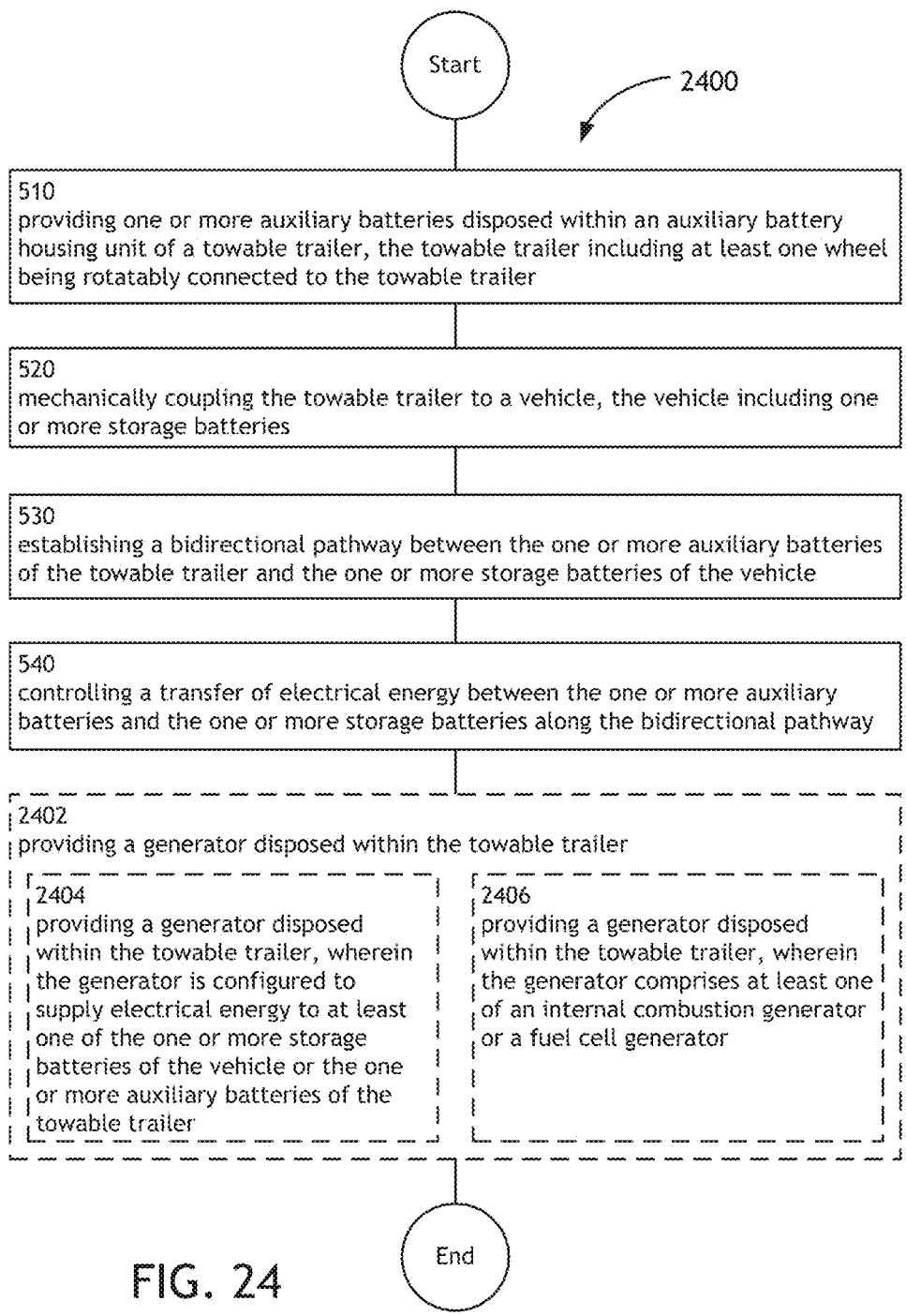

FIG. 24 illustrates an operational flow 2400 representing example operations related to supplying auxiliary electrical energy to an electric or hybrid vehicle. FIG. 24 illustrates an example embodiment where the example operational flow 500 of FIG. 5 may include at least one additional operation. Additional operations may include a generator providing operation 2402, operation 2404, and/or operation 2406.

After a start operation, a providing operation 510, a mechanically coupling operation 520, a bidirectional pathway establishing operation 530, and a controlling operation 540, the operation flow 2400 moves to generator providing operation 2402.

The operation 2402 illustrates providing a generator disposed within the towable trailer. For example, as shown in FIGS. 1A through 4, a generator 246 may be disposed within the towable trailer 102 and operatively connected to the one or more auxiliary batteries 102 and the control system 116. For instance, the generator 246 may be coupled in a parallel configuration with the auxiliary batteries 106 as shown in FIG. 2F. In another instance, the generator 246 may be coupled in a series configuration with the auxiliary batteries 106 as shown in FIG. 2G.

Further, the operation 2404 illustrates providing a generator disposed within the towable trailer, wherein the generator is configured to supply electrical energy to at least one of the one or more storage batteries of the vehicle or the one or more auxiliary batteries of the towable trailer. For example, as shown in FIGS. 1A through 4, a generator 246 disposed within the towable trailer 102 and operatively connected to the one or more auxiliary batteries 102 and the control system 116 may be configured to directly or indirectly supply auxiliary electrical energy to the one or more storage batteries 110 of the vehicle. For instance, the generator 246 may directly supply electrical energy to the one or more storage batteries 110 via electrical connection 114. In another instance, the generator 24 may indirectly supply electrical energy to the one or more storage batteries 110 by supplying electrical energy to the one or more auxiliary batteries 106 of the trailer 102, which in turn may supply auxiliary electrical energy to the one or more storage batteries 110 of the vehicle 104.

Further, the operation 2406 illustrates providing a generator disposed within the towable trailer, wherein the generator comprises at least one of an internal combustion generator or a fuel cell generator. For example, as shown in FIGS. 1A through 4, a generator 246 disposed within the towable trailer 102 and operatively connected to the one or more auxiliary batteries 102 and the control system 116 may include a gasoline or diesel generator. By way of another example, as shown in FIGS. 1A through 4, a generator 246 disposed within the towable trailer 102 and operatively connected to the one or more auxiliary batteries 102 and the control system 116 may include a PEM fuel cell configured to utilized hydrogen as a fuel source.

Figure 25:
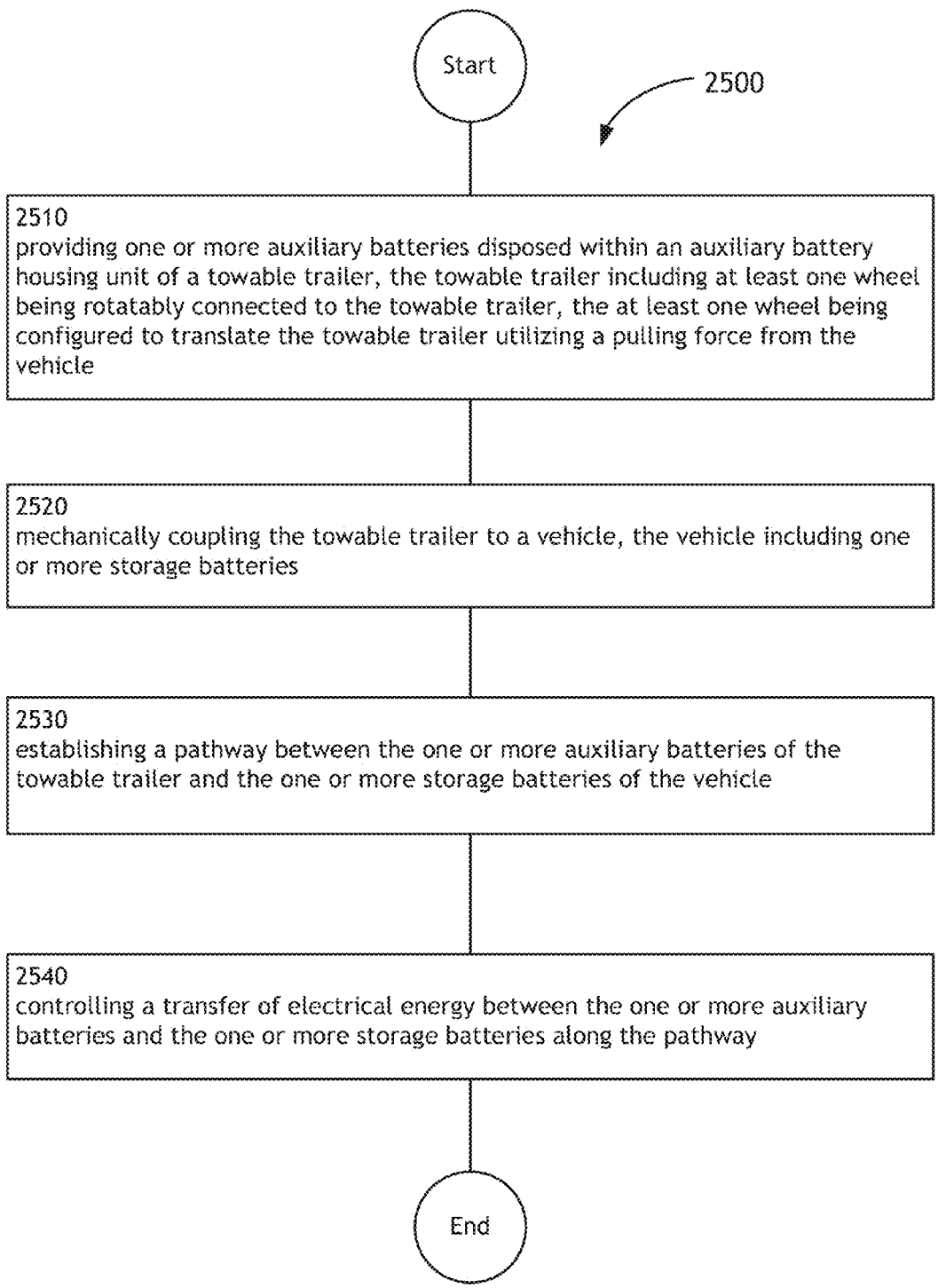
FIG. 25 is a high-level flowchart of a method for supplying auxiliary electrical power to an electric or hybrid vehicle.

FIG. 25 illustrates an operational flow 2500 representing example operations related to supplying auxiliary electrical energy to an electric or hybrid vehicle. In FIG. 25 and in following figures that include various examples of operational flows, discussion and explanation may be provided with respect to the above-described examples of FIGS. 1A through 4, and/or with respect to other examples and contexts.

After a start operation, the operational flow 2500 moves to a providing operation 2510. The providing operation 2510 depicts providing one or more auxiliary batteries disposed within an auxiliary battery housing unit of a towable trailer, the towable trailer including at least one wheel being rotatably connected to the towable trailer, the at least one wheel being configured to translate the towable trailer utilizing a pulling force from the vehicle. For example, as shown in FIGS. 1A through 4, one or more auxiliary batteries 106 (e.g., lithium based batteries) may be provided and disposed within an auxiliary battery housing unit 108 of a towable trailer 102, the towable trailer 102 including at least one wheel 120 (e.g., one wheel, two wheels, or three wheels) being rotatably connected to the towable trailer 120 and configured to translate the trailer 102 utilizing the pull force generated by the movement of the vehicle 104.

Then, mechanical coupling operation 2520 depicts mechanically coupling the towable trailer to a vehicle, the vehicle including one or more storage batteries. For example, as shown in FIGS. 1A through 4, the towable trailer 102 may be mechanically coupled a vehicle 104 including one or more storage batteries 110 (e.g., lithium based batteries).

Then, pathway establishing operation 530 depicts establishing an electrical pathway between the one or more auxiliary batteries of the towable trailer and the one or more storage batteries of the vehicle. For example, as shown in FIGS. 1A through 4, a electrical pathway 302 between the one or more auxiliary batteries 106 of the towable trailer 102 and the one or more storage batteries 110 of the vehicle 104 may be established utilizing an electrical connection (e.g., electrically conducting wire or cable) configured to couple the one or more auxiliary batteries 106 with an electrical port of the vehicle 104.

Then, controlling operation 540 depicts controlling a transfer of electrical energy between the one or more auxiliary batteries and the one or more storage batteries along the pathway. For example, as shown in FIGS. 1A through 4, a control system 116 may be configured to control a transfer of electrical energy between the one or more auxiliary batteries 106 of the towable trailer 102 and the one or more storage batteries 110 of the vehicle 104 along the pathway 302.

Figure 26:
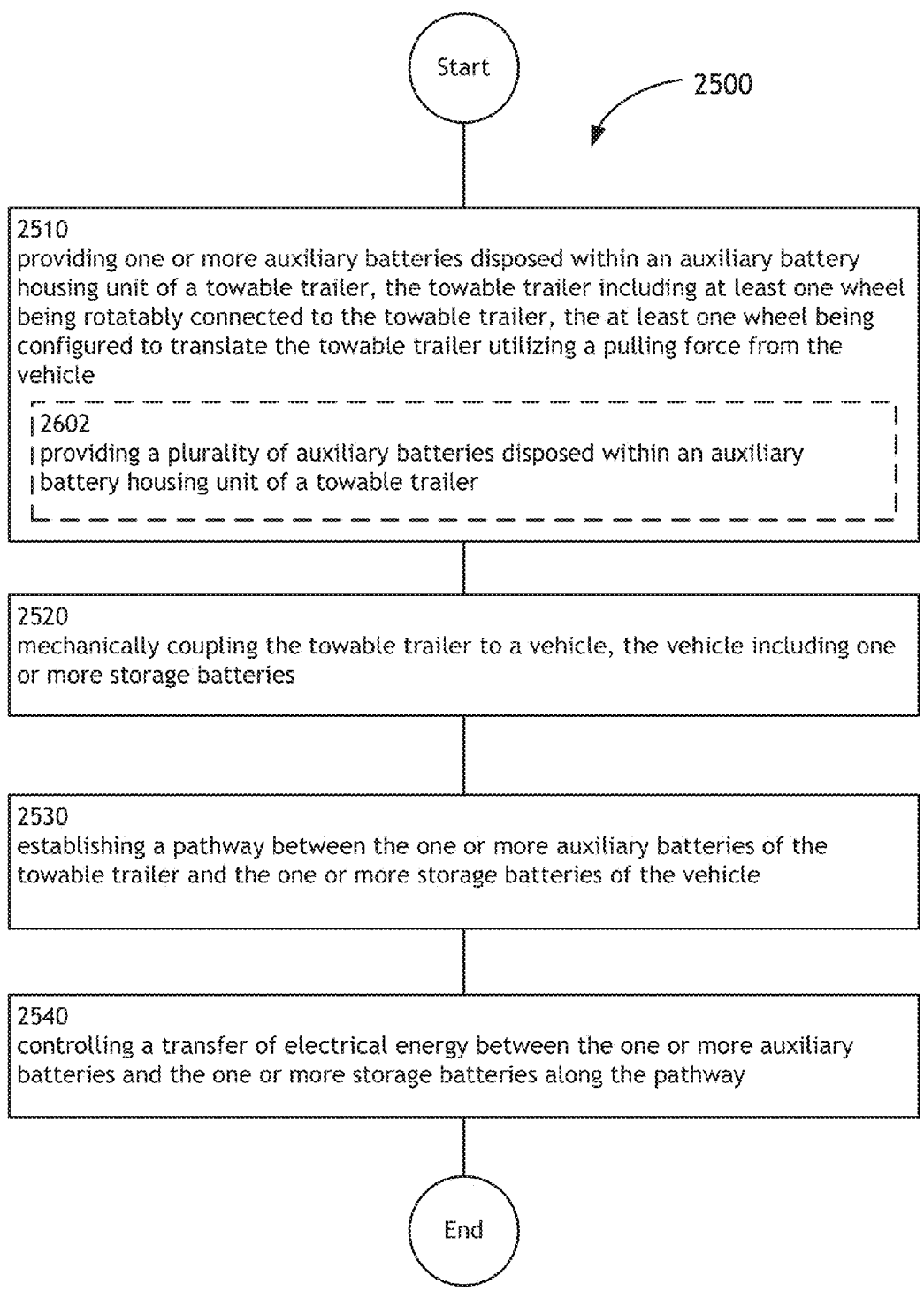
FIGS. 26 through 44 are high-level flowcharts depicting alternate implementations of FIG. 25.

FIG. 26 illustrates alternative embodiments of the example operational flow 2500 of FIG. 25. FIG. 26 illustrates example embodiments where the providing operation 2510 may include at least one additional operation. Additional operations may include an operation 2602.

The operation 2602 illustrates providing a plurality of auxiliary batteries disposed within an auxiliary battery housing unit of a towable trailer, the towable trailer including at least one wheel being rotatably connected to the towable trailer. For example, as shown in FIGS. 1A through 4, a plurality of auxiliary batteries 106 may be provided and disposed within an auxiliary battery housing unit 108 of a towable trailer 102, the towable trailer 102 may include one or more wheels 120 rotatably connected to the towable trailer 102. For instance, two or more series coupled auxiliary batteries (e.g., lithium based batteries) may be provided and disposed with the battery housing unit 108 of the towable trailer 102. In another instance, two or more parallel coupled auxiliary batteries may be provided and disposed with the battery housing unit 108 of the towable trailer 102. Further, two or more series/parallel coupled auxiliary batteries may be provided and disposed with the battery housing unit 108 of the towable trailer 102.

Figure 27:
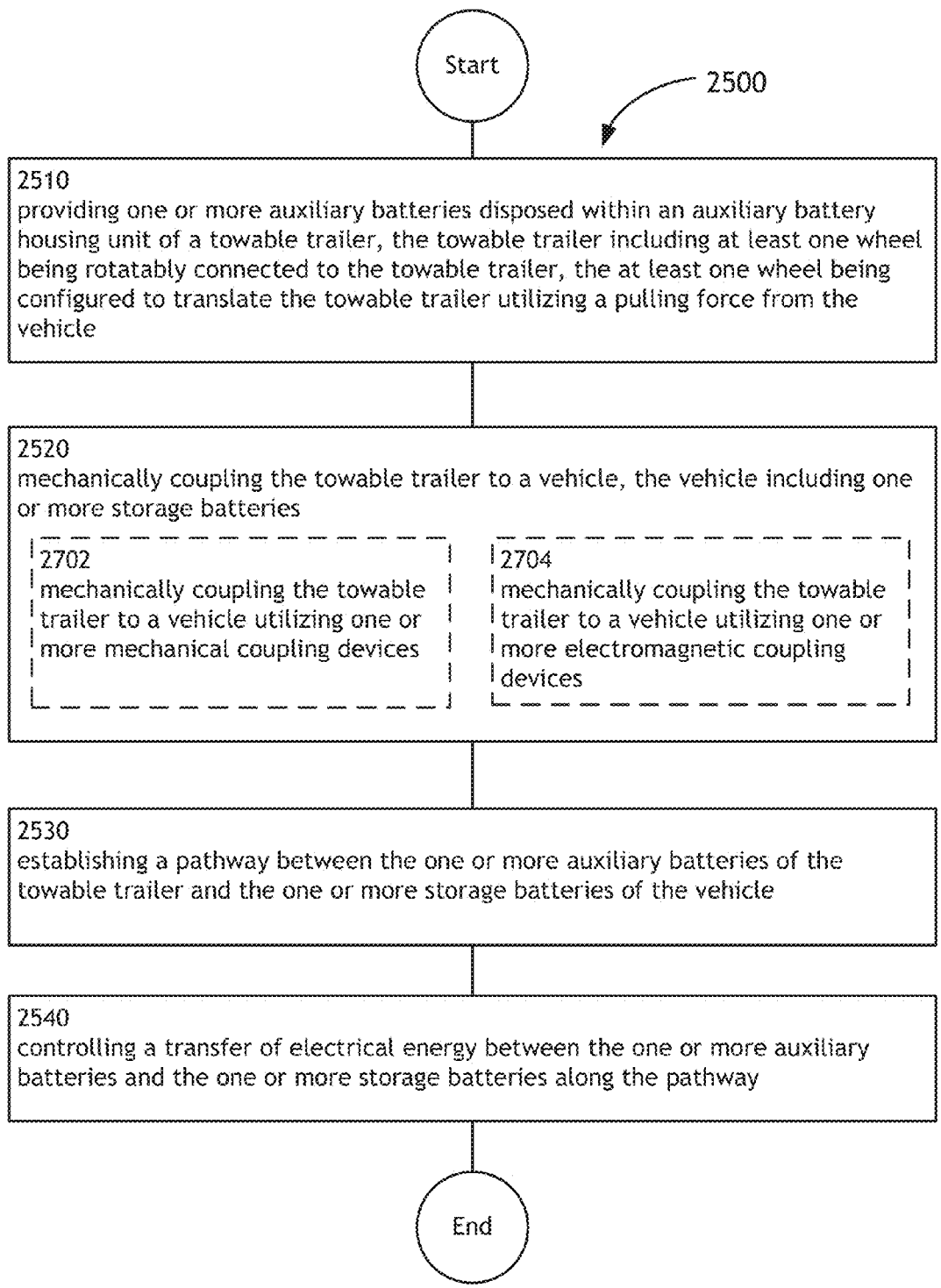

FIG. 27 illustrates alternative embodiments of the example operational flow 2500 of FIG. 25. FIG. 27 illustrates example embodiments where the mechanical coupling operation 2520 may include at least one additional operation. Additional operations may include an operation 2702 and/or operation 2704.

The operation 2702 illustrates mechanically coupling the towable trailer to a vehicle utilizing one or more mechanical coupling devices. For example, as shown in FIGS. 1A through 4, the towable trailer 102 may be mechanically coupled, or attached, to vehicle utilizing one or more mechanical coupling devices. For instance, the towable trailer 102 may be mechanically attached to a rear portion (e.g., bumper) of the vehicle 104 utilizing at least one of a hitch, a latch, or a suction device.

The operation 2704 illustrates mechanically coupling the towable trailer to a vehicle utilizing one or more electromagnetic coupling devices. For example, as shown in FIGS. 1A through 4, the towable trailer 102 may be mechanically coupled, or attached, to vehicle utilizing one or more electromagnetic coupling devices. For instance, the towable trailer 102 may be mechanically attached to a rear portion (e.g., bumper) of the vehicle 104 utilizing at least one of an electromagnet or a permanent magnet disposed within a front portion of the towable trailer 102.

Figure 28:
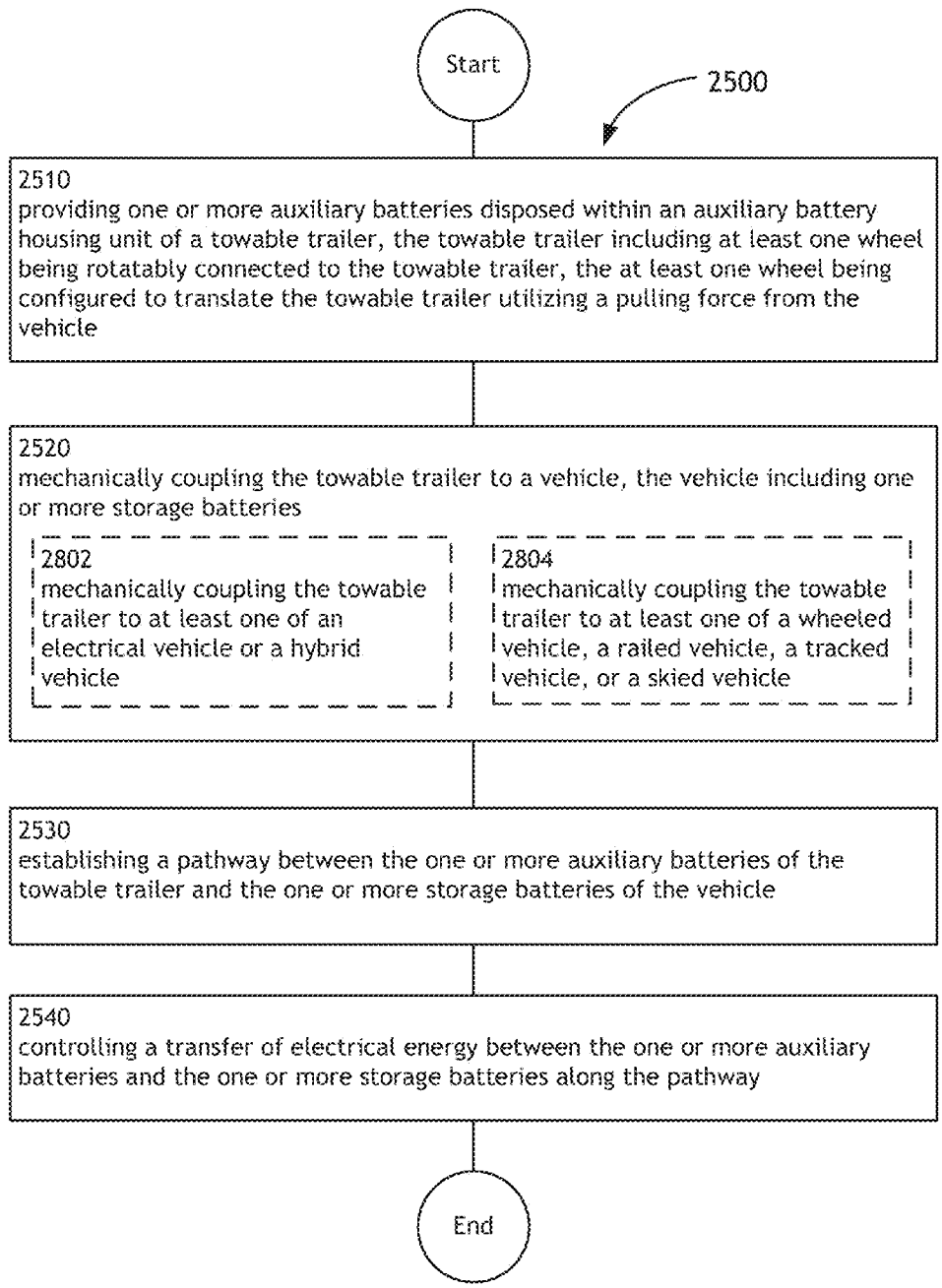

FIG. 28 illustrates alternative embodiments of the example operational flow 2500 of FIG. 25. FIG. 28 illustrates example embodiments where the mechanical coupling operation 2520 may include at least one additional operation. Additional operations may include an operation 2802 and/or operation 2804.

The operation 2802 illustrates mechanically coupling the towable trailer to at least one of an electrical vehicle or a hybrid vehicle. For example, as shown in FIGS. 1A through 4, the towable trailer 102 may be mechanically coupled to a hybrid electric-gasoline vehicle (e.g., parallel configured hybrid electric-gasoline vehicle or series configured hybrid electric-gasoline vehicle). By way of another example, as shown in FIGS. 1A through 4, the towable trailer 102 may be mechanically coupled to an electric vehicle, such as a purely electric vehicle or an electric vehicle including additional energy capture technology, such as a regenerative braking.

The operation 2804 illustrates mechanically coupling the towable trailer to at least one of a wheeled vehicle, a railed vehicle, a tracked vehicle, or a skied vehicle. For example, as shown in FIGS. 1A through 4, the towable trailer 102 may be mechanically coupled to a wheeled vehicle, a railed vehicle, a tracked vehicle, or a skied vehicle. For instance, a wheeled vehicle may include 2-wheeled or 4 wheeled vehicle, such as a motorcycle or car. In another instance, a railed vehicle may include a trolley, a train, or the like. In another instance, a tracked vehicle may include any vehicle equipped with tracking as a means of locomotion, such as a snow plow, a bulldozer, or the like. In another instance, a skied vehicle may include any vehicle equipped with skies, such as, but not limited to, a snow mobile.

Figure 29:
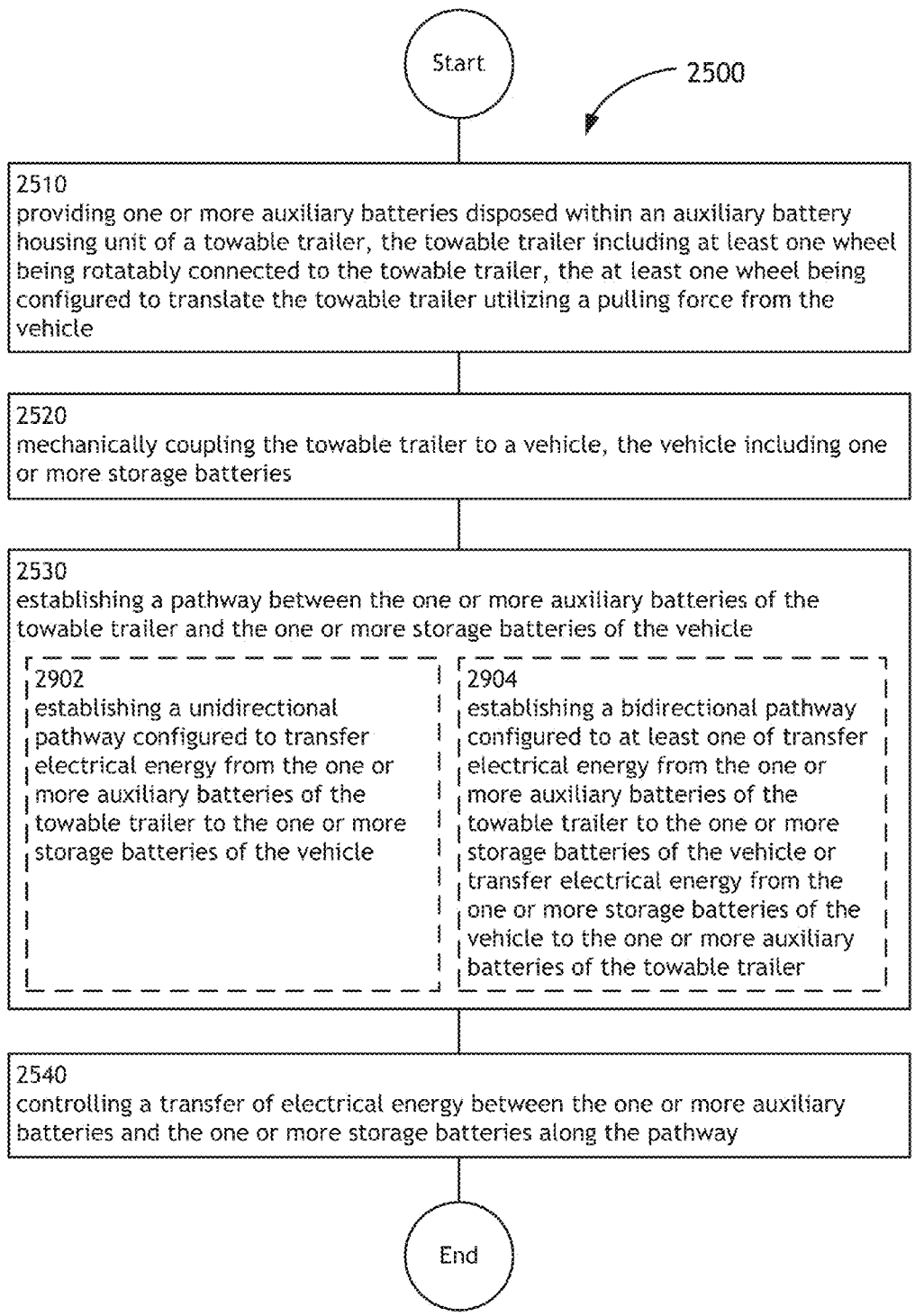

FIG. 29 illustrates alternative embodiments of the example operational flow 2500 of FIG. 25. FIG. 29 illustrates example embodiments where the pathway establishing operation 2530 may include at least one additional operation. Additional operations may include an operation 2902 and/or operation 2904.

The operation 2902 illustrates establishing a unidirectional pathway configured to transfer electrical energy from the one or more auxiliary batteries of the towable trailer to the one or more storage batteries of the vehicle. For example, as shown in FIGS. 1A through 4, a unidirectional electrical pathway between the one or more auxiliary batteries 106 of the towable trailer 102 and the one or more storage batteries 110 of the vehicle 104 may be established utilizing an electrical connection (e.g., electrically conducting wire or cable) configured to couple the one or more auxiliary batteries 106 with an electrical port of the vehicle 104. In this regard, the electrical pathway 302 may be configured to allow charge flow along only one direction. For instance, the electrical pathway 302 may be configured to only allow charge flow from the one or more auxiliary batteries 106 to the one or more storage batteries 110. It should be recognized by those skilled in the art that a unidirectional pathway may be established utilizing a variety of current limiting devices. For instance, one or more diodes may be utilized in order to inhibit current flow along one direction, thereby establishing a unidirectional current flow along the other direction. In another aspect, the unidirectional pathway 302 may be enforced via voltage regulation. For example, the unidirectional pathway 302 may be established by regulating the voltage difference between the one or more auxiliary batteries 106 and the one or more storage batteries 110. In this regard, unidirectional charge flow from the one or more auxiliary batteries 106 to the one or more storage batteries may be established by establishing a voltage of the one or more auxiliary batteries 106 higher than the voltage level of the one or more storage batteries 110. In a further aspect, the unidirectional pathway 302 may be established via passive voltage regulation (e.g., fixed voltage difference between the auxiliary battery 106 and the storage battery 110). In another aspect, the unidirectional pathway 302 may be established via active voltage regulation (e.g., adjustable voltage difference between the auxiliary battery 106 and the storage battery 110 via voltage boosting). For instance, the system 100 may include a voltage booster configured to at least one of i) boost the voltage of the one or more auxiliary batteries 106 or ii) reduce the voltage of the one or more storage batteries 110. It is further contemplated that the current limiting devices and/or this voltage booster may be responsive to a control signal from a control system 116.

The operation 2904 illustrates establishing a bidirectional pathway configured to at least one of transfer electrical energy from the one or more auxiliary batteries of the towable trailer to the one or more storage batteries of the vehicle or transfer electrical energy from the one or more storage batteries of the vehicle to the one or more auxiliary batteries of the towable trailer. For example, as shown in FIGS. 1A through 4, a bidirectional electrical pathway between the one or more auxiliary batteries 106 of the towable trailer 102 and the one or more storage batteries 110 of the vehicle 104 may be established utilizing an electrical connection (e.g., electrically conducting wire or cable) configured to couple the one or more auxiliary batteries 106 with an electrical port of the vehicle 104. In this regard, the electrical pathway 302 may be configured to allow charge flow along both directions of the pathway. This charge flow may be allowed to flow in either direction at any time, or may be controlled to flow in only one direction at a time, and then in the opposite direction at a different time. For instance, the electrical pathway 302 may be configured to control charge flow from the one or more auxiliary batteries 106 to the one or more storage batteries 110, or, alternatively, from the one or more storage batteries to the one or more auxiliary batteries 106. It should be recognized by those skilled in the art that a controllable charge flow may be established utilizing a variety of current limiting devices. For instance, during one time interval, one or more diodes may be utilized in order to controllably inhibit current flow along a first direction, thereby establishing a current flow along the opposite direction; at a different time interval, one or more diodes may be utilized to inhibit current flow along the opposite direction, thereby establishing current flow in the first direction. In a further aspect, the bidirectional pathway 302 may include voltage regulation circuitry for regulating charge flow between the one or more storage batteries 110 and the one or more auxiliary batteries 106. For example, the voltage regulation circuitry may be configured for passive voltage regulation (e.g., fixed voltage difference between the auxiliary battery 106 and the storage battery 110) or active voltage regulation (e.g., adjustable voltage difference between the auxiliary battery 106 and the storage battery 110 via voltage boosting). For instance, the system 100 may include a voltage booster configured to boost the voltage of either the one or more auxiliary batteries 106 or the one or more storage batteries 110 in order to allow charge flow in a selected direction. Alternatively, the booster may be configured to reduce the voltage of either the one or more storage batteries 110 or the one or more auxiliary batteries 106 in order to allow charge flow in a selected direction. It is further contemplated that the current limiting devices and/or this voltage booster may be responsive to a control signal from a control system 116.

Figure 30:
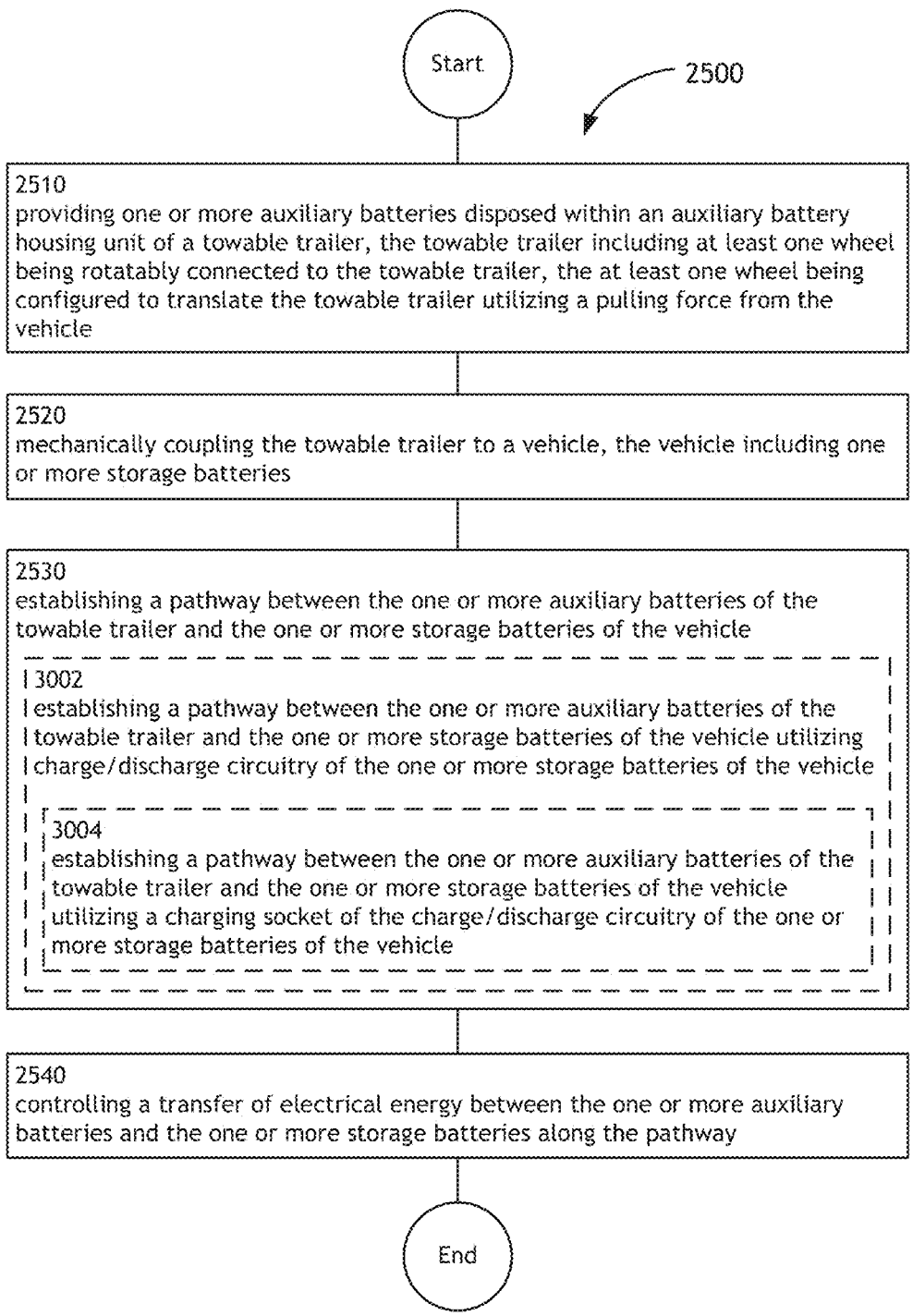

FIG. 30 illustrates alternative embodiments of the example operational flow 2500 of FIG. 25. FIG. 30 illustrates example embodiments where the establishing operation 2530 may include at least one additional operation. Additional operations may include an operation 3002 and/or operation 3004.

The operation 3002 illustrates establishing a pathway between the one or more auxiliary batteries of the towable trailer and the one or more storage batteries of the vehicle utilizing charge/discharge circuitry of the one or more storage batteries of the vehicle. For example, as shown in FIGS. 1A through 2G, a electrical pathway 114 between the one or more auxiliary batteries 106 of the towable trailer 102 and the one or more storage batteries 110 of the vehicle 104 may be established utilizing an electrical connection configured to couple the one or more auxiliary batteries 106 with a portion of the charge/discharge circuitry 128 of the vehicle 104.

Further, the operation 3004 illustrates establishing a pathway between the one or more auxiliary batteries of the towable trailer and the one or more storage batteries of the vehicle utilizing a charging socket of the charge/discharge circuitry of the one or more storage batteries of the vehicle. For example, as shown in FIGS. 1A through 2G, a electrical pathway 114 between the one or more auxiliary batteries 106 of the towable trailer 102 and the one or more storage batteries 110 of the vehicle 104 may be established utilizing a reversibly connectable cable to reversibly couple the one or more auxiliary batteries 106 with a portion of the charge/discharge circuitry 128 of the vehicle 104 via a charging socket 130 of the charge/discharge circuitry 128. In this regard, the charging socket 130 of the vehicle 104 may be configured to receive a connector portion of the pluggable electrical cable, allowing for the reversible electrical coupling of the one or more auxiliary batteries 106 and the one or more storage batteries 110.

Figure 31:
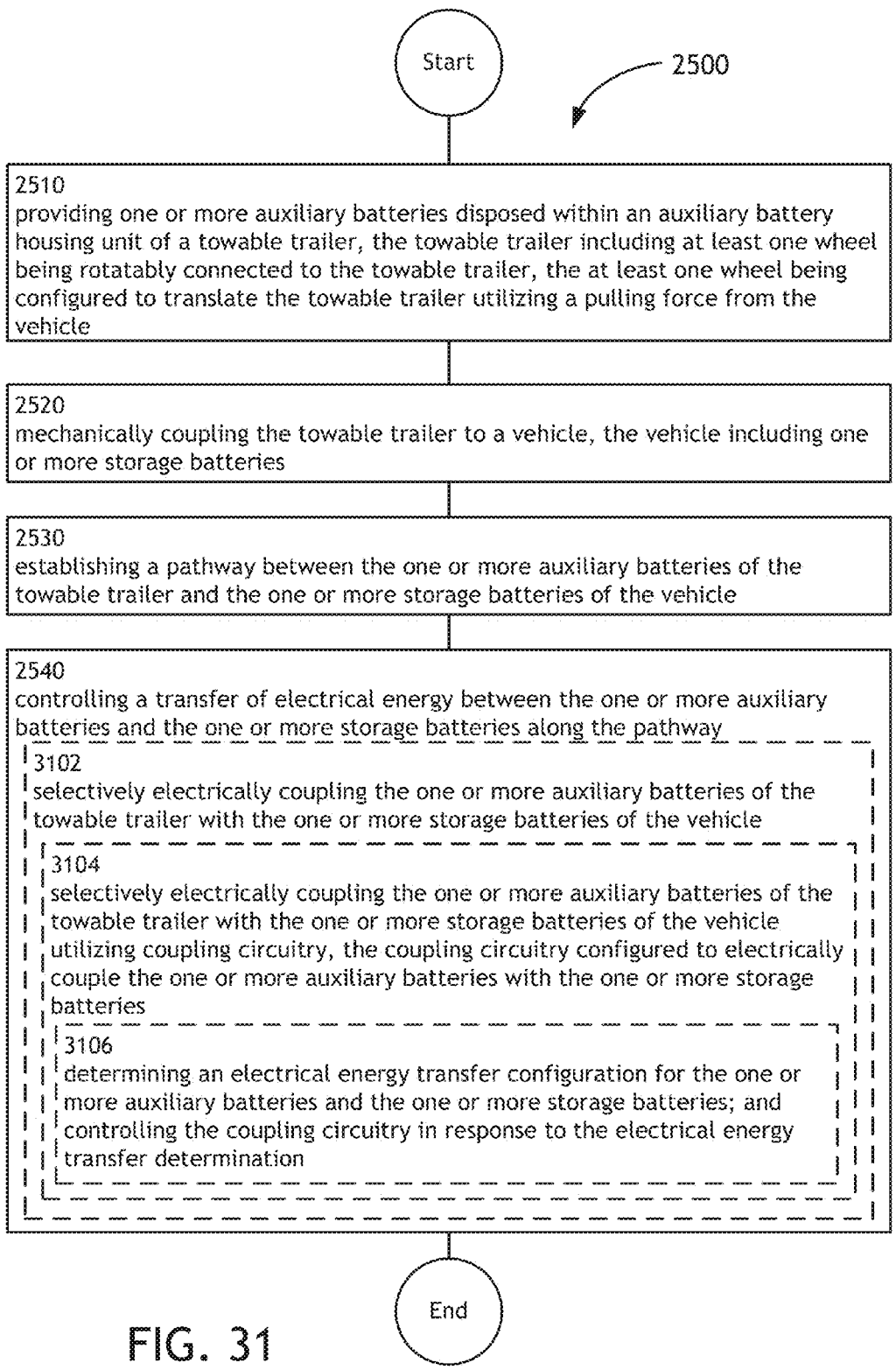

FIG. 31 illustrates alternative embodiments of the example operational flow 2500 of FIG. 25. FIG. 31 illustrates example embodiments where the controlling operation 2540 may include at least one additional operation. Additional operations may include an operation 3102, and operation 3104 and/or operation 3106.

The operation 3102 illustrates selectively electrically coupling the one or more auxiliary batteries of the towable trailer with the one or more storage batteries of the vehicle. For example, as shown in FIGS. 1A through 2G, the control system 116 may selectively electrically couple the one or more auxiliary batteries 106 of the towable trailer 102 with the one or more storage batteries 110 of the vehicle 104.

Further, the operation 3104 illustrates selectively electrically coupling the one or more auxiliary batteries of the towable trailer with the one or more storage batteries of the vehicle utilizing coupling circuitry, the coupling circuitry configured to electrically couple the one or more auxiliary batteries with the one or more storage batteries. For example, as shown in FIGS. 1A through 2G, the control system 116 may transmit a control signal 115 to control circuitry 118, wherein the control circuitry 118 is configured for selectively electrically coupling the one or more auxiliary batteries 106 of the towable trailer 102 with the one or more storage batteries 110 of the vehicle 104 in response to the received control signal 115.

Further, the operation 3106 illustrates determining an electrical energy transfer configuration for the one or more auxiliary batteries and the one or more storage batteries; and controlling the coupling circuitry in response to the electrical energy transfer determination. For example, as shown in FIGS. 1A through 2G, a determination module 204 (e.g., one or more processors configured to execute a preprogrammed algorithm) may determine an energy transfer configuration (i.e., a coupling circuitry configuration) utilizing one or more received signals from the receiving module 202. In response to the energy transfer configuration, the transfer control module 206 of the control system 116 may transmit a control signal 115 to control circuitry 118 in order to control the coupling state (e.g., OPEN circuit or CLOSED circuit) of the coupling circuitry 118.

Figure 32:
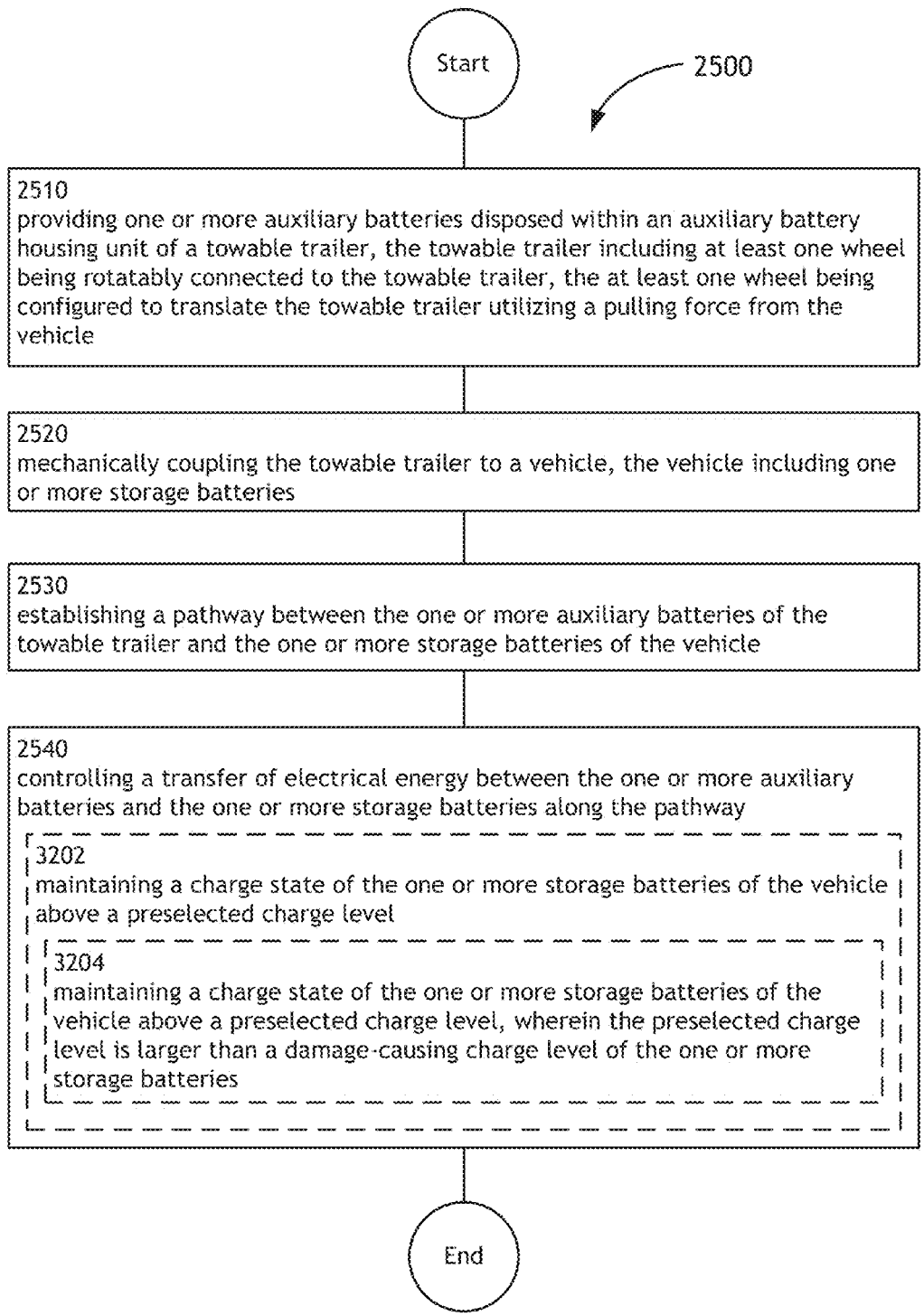

FIG. 32 illustrates alternative embodiments of the example operational flow 2500 of FIG. 25. FIG. 32 illustrates example embodiments where the controlling operation 2540 may include at least one additional operation. Additional operations may include an operation 3202 and/or operation 3204.

The operation 3202 illustrates maintaining a charge state of the one or more storage batteries of the vehicle above a preselected charge level. For example, as shown in FIGS. 1A through 2G, the control system 116 may control the coupling circuitry 118 so as to control the charge flow between the one or more auxiliary batteries 106 of the towable trailer 102 and the one or more storage batteries 110 of the vehicle 104 in order to maintain a charge state of the one or more storage batteries 110 above a selected charge level.

Further, the operation 3204 illustrates maintaining a charge state of the one or more storage batteries of the vehicle above a preselected charge level, wherein the preselected charge level is larger than a damage-causing charge level of the one or more storage batteries. For example, as shown in FIGS. 1A through 2G, the control system 116 may control the coupling circuitry 118 so as to control the charge flow between the one or more auxiliary batteries 106 of the towable trailer 102 and the one or more storage batteries 110 of the vehicle 104 in order to maintain a charge state of the one or more storage batteries 110 above a damage-causing charge level.

Figure 33:
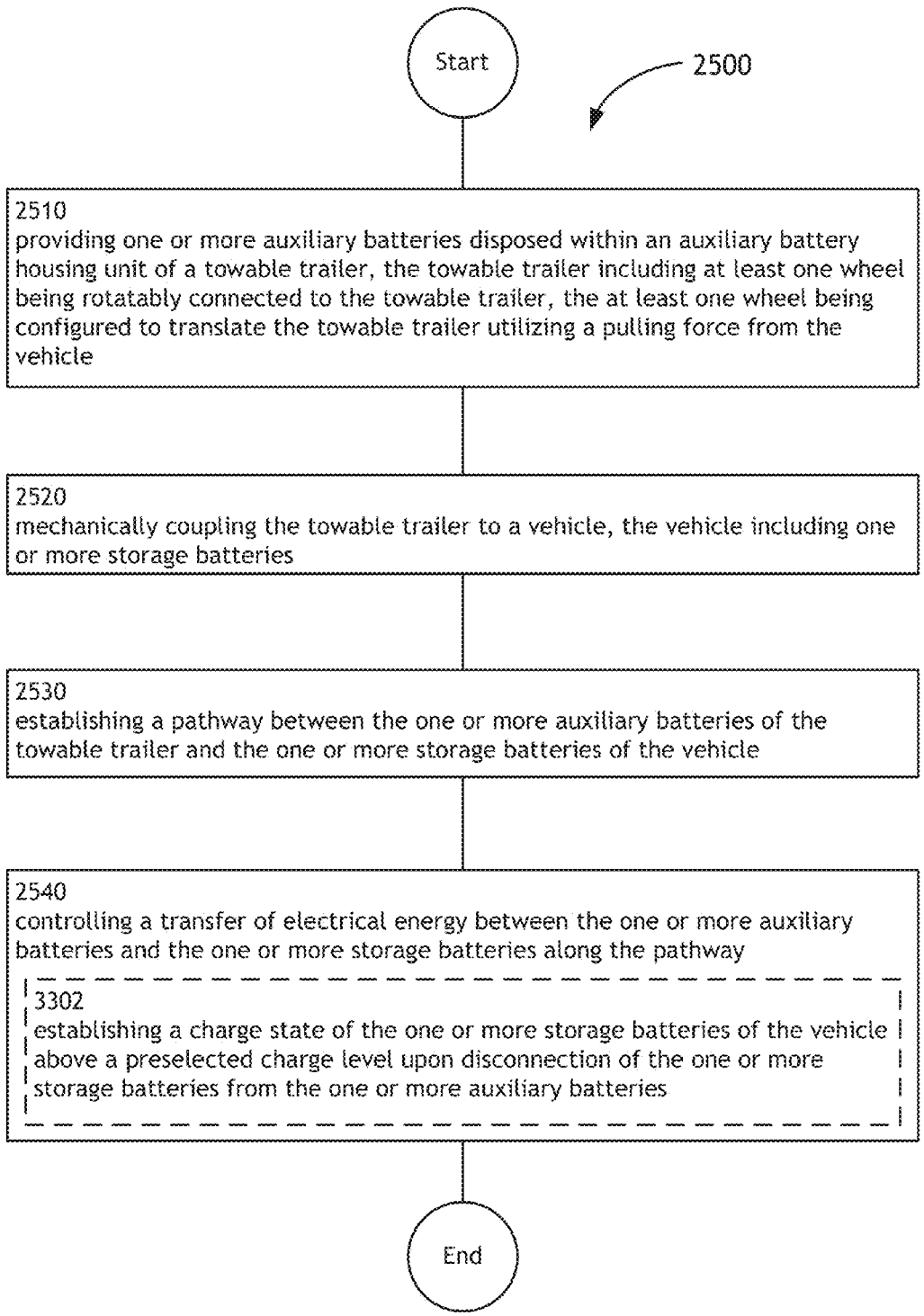

FIG. 33 illustrates alternative embodiments of the example operational flow 2500 of FIG. 25. FIG. 33 illustrates example embodiments where the controlling operation 2540 may include at least one additional operation. Additional operations may include an operation 3302.

The operation 3302 illustrates establishing a charge state of the one or more storage batteries of the vehicle above a preselected charge level upon disconnection of the one or more storage batteries from the one or more auxiliary batteries. For example, as shown in FIGS. 1A through 2G, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more storage batteries of the vehicle above a preselected charge level upon disconnection of the one or more storage batteries 110 from the one or more auxiliary batteries 106. In this regard, the control system 116 may be utilized in order to achieve a minimum charge state in the one or more storage batteries 110 of the vehicle required for driving the vehicle 104 for a selected distance (e.g., selectable via a user input device 224) upon disconnection of the one or more storage batteries 110 from the one or more auxiliary batteries 106.

Figure 34:
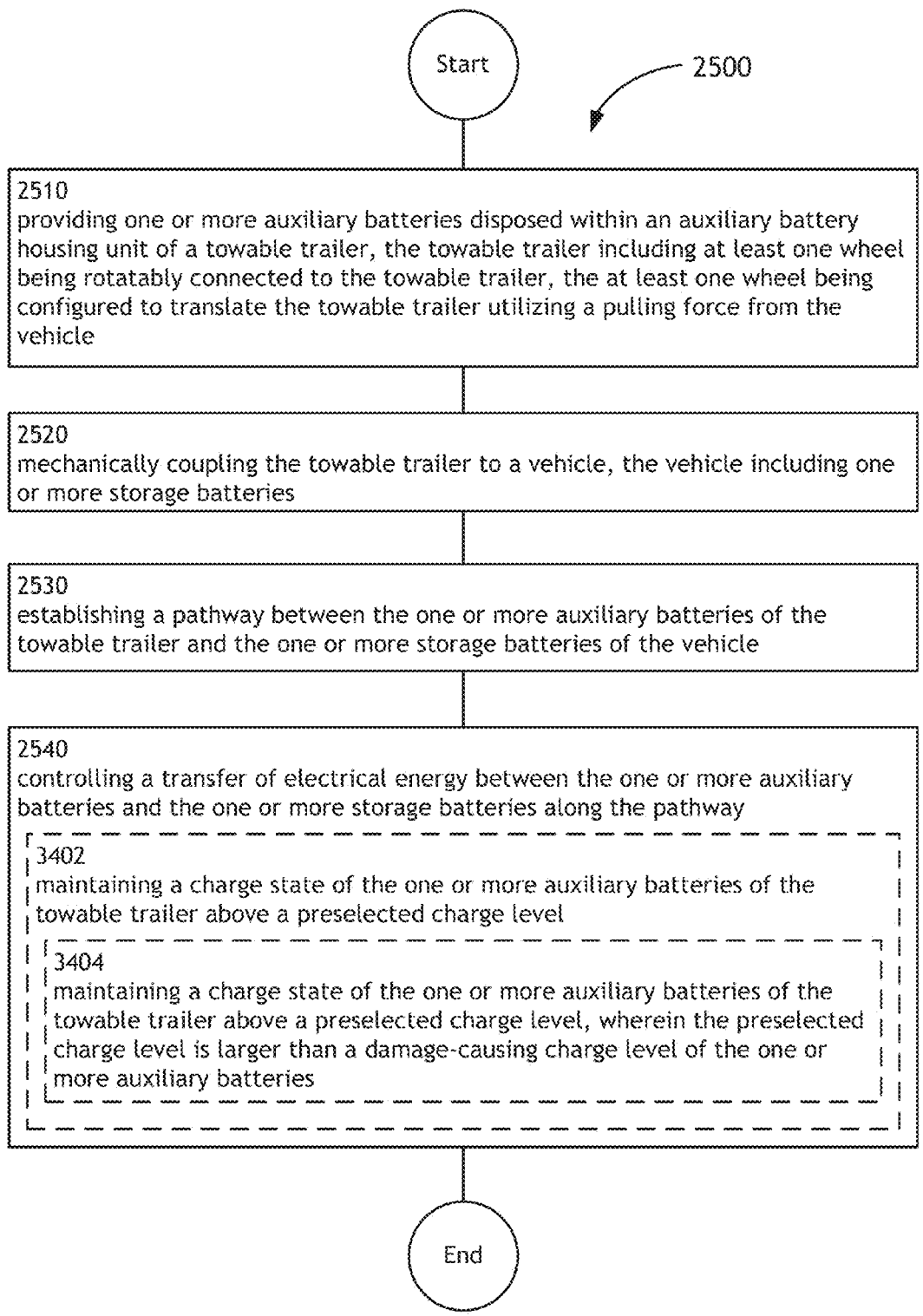

FIG. 34 illustrates alternative embodiments of the example operational flow 2500 of FIG. 25. FIG. 34 illustrates example embodiments where the controlling operation 2540 may include at least one additional operation. Additional operations may include an operation 3402 and/or operation 3404.

The operation 3402 illustrates maintaining a charge state of the one or more auxiliary batteries of the towable trailer above a preselected charge level. For example, as shown in FIGS. 1A through 2G, the control system 116 may control the coupling circuitry 118 so as to control the charge flow between the one or more auxiliary batteries 106 of the towable trailer 102 and the one or more storage batteries 110 of the vehicle 104 in order to maintain a charge state of the one or more auxiliary batteries 106 of the towable trailer 102 above a preselected charge level.

Further, the operation 3404 illustrates maintaining a charge state of the one or more auxiliary batteries of the towable trailer above a preselected charge level, wherein the preselected charge level is larger than a damage-causing charge level of the one or more auxiliary batteries. For example, as shown in FIGS. 1A through 2G, the control system 116 may control the coupling circuitry 118 so as to control the charge flow between the one or more auxiliary batteries 106 of the towable trailer 102 and the one or more storage batteries 110 of the vehicle 104 in order to maintain a charge state of the one or more auxiliary batteries 110 above a damage-causing charge level.

Figure 35:
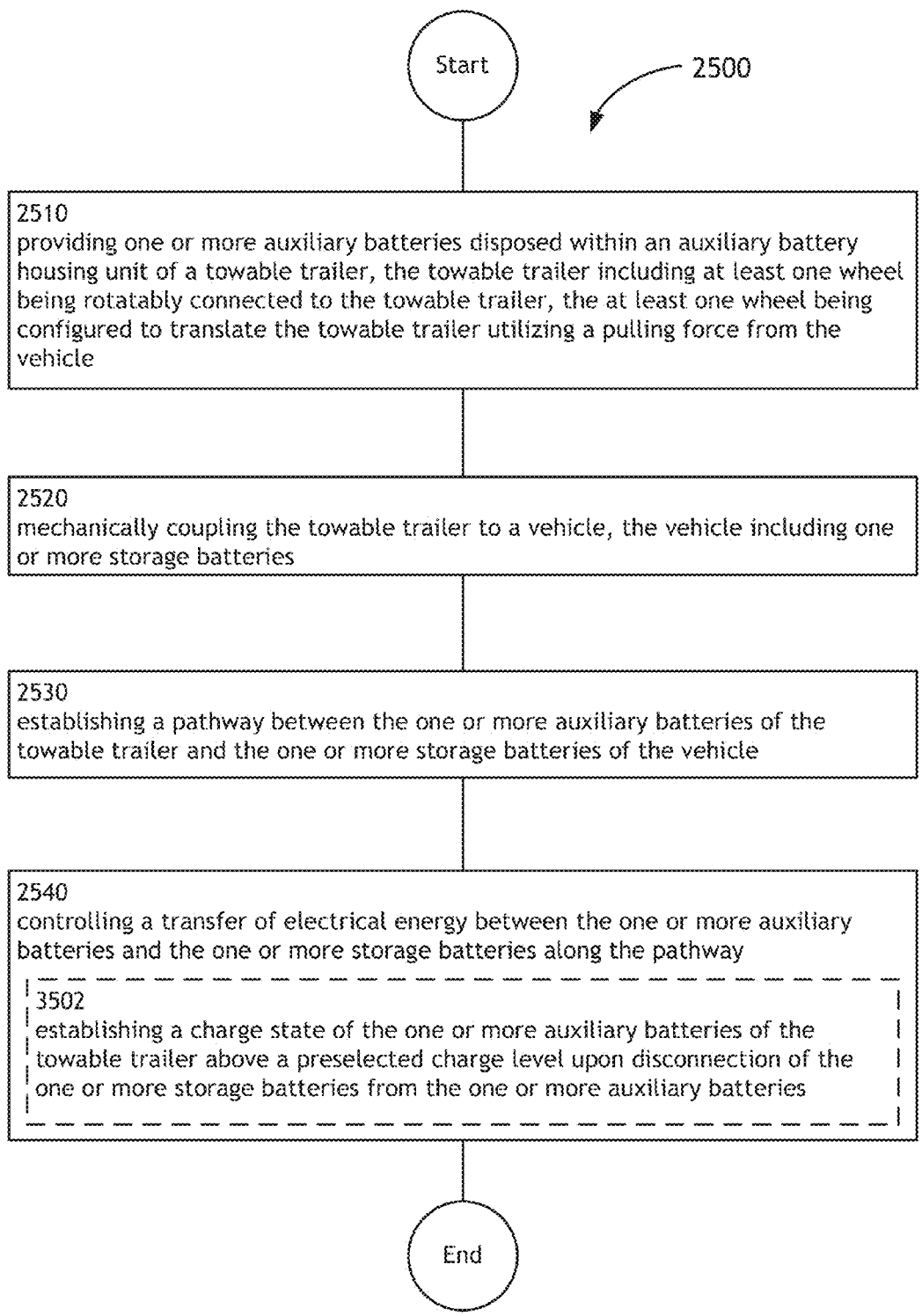

FIG. 35 illustrates alternative embodiments of the example operational flow 2500 of FIG. 25. FIG. 35 illustrates example embodiments where the controlling operation 2540 may include at least one additional operation. Additional operations may include an operation 3502.

The operation 3502 illustrates establishing a charge state of the one or more auxiliary batteries of the towable trailer above a preselected charge level upon disconnection of the one or more storage batteries from the one or more auxiliary batteries. For example, as shown in FIGS. 1A through 4, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more auxiliary batteries 106 of the trailer 102 above a preselected charge level upon disconnection of the one or more storage batteries 110 from the one or more auxiliary batteries 106. In this regard, the control system 116 may be utilized in order to achieve a minimum charge state in the one or more auxiliary batteries 106 of the vehicle 104 upon disconnection of the one or more storage batteries 110 from the one or more auxiliary batteries 106.

Figure 36:
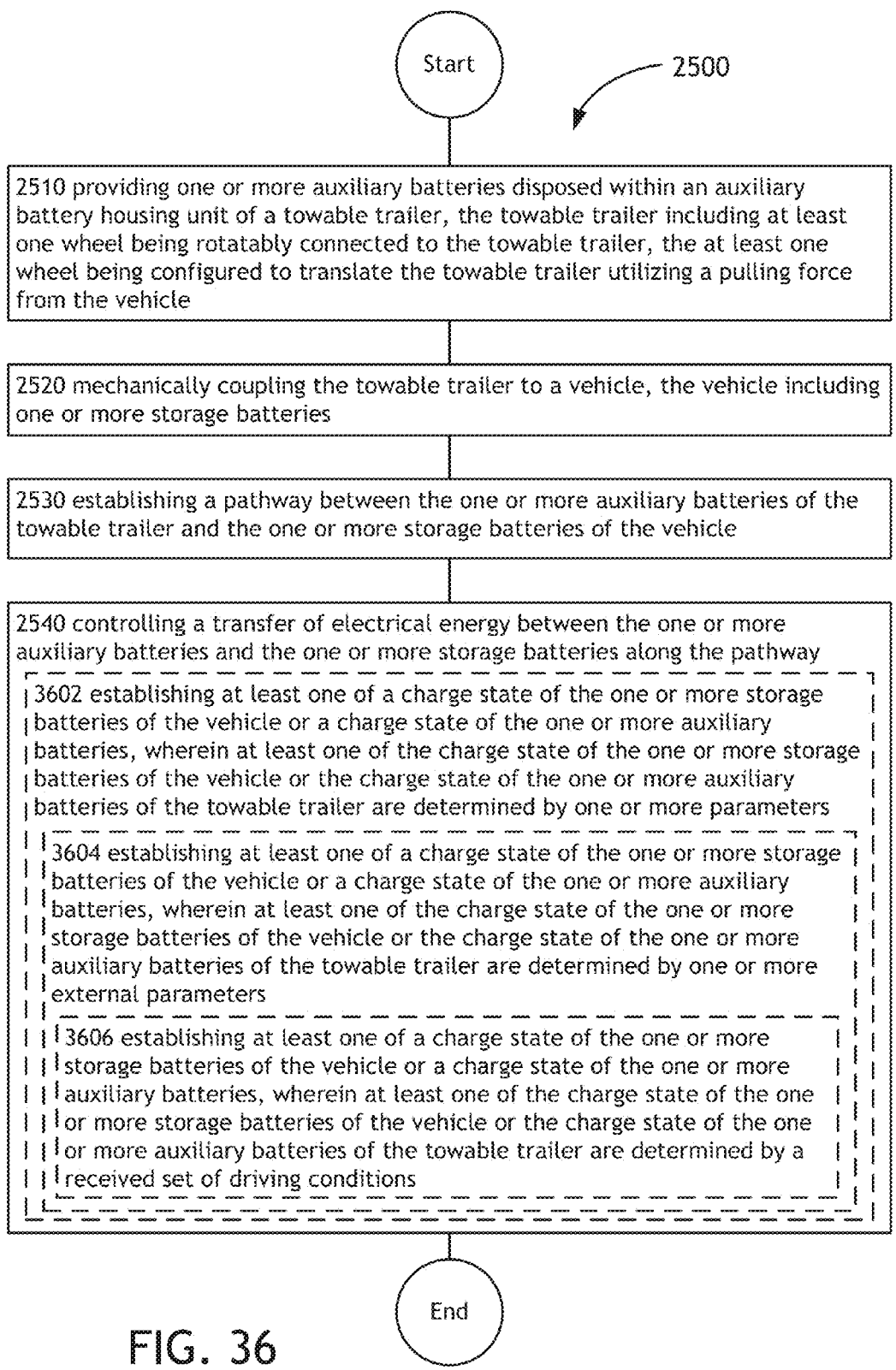

FIG. 36 illustrates alternative embodiments of the example operational flow 2500 of FIG. 25. FIG. 36 illustrates example embodiments where the controlling operation 2540 may include at least one additional operation. Additional operations may include an operation 3602, an operation 3604, and/or an operation 3606.

The operation 3602 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by one or more parameters. For example, as shown in FIGS. 1A through 4, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more auxiliary batteries 106 and a charge state of the one or more storage batteries 110 determined by the control system 116 using one or more parameters (e.g., internal parameters or external parameters).

Further, the operation 3604 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by one or more external parameters. For example, as shown in FIGS. 1A through 4, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more auxiliary batteries 106 and a charge state of the one or more storage batteries 110 determined by the control system 116 using one or more external parameters.

Further, the operation 3606 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by a received set of driving conditions. For example, as shown in FIGS. 1A through 4, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more auxiliary batteries 106 and a charge state of the one or more storage batteries 110 determined by the control system 116 using a received set of driving conditions (e.g., road conditions received from a road condition service or weather information received from a weather service via a wireless internet signal).

Figure 37:
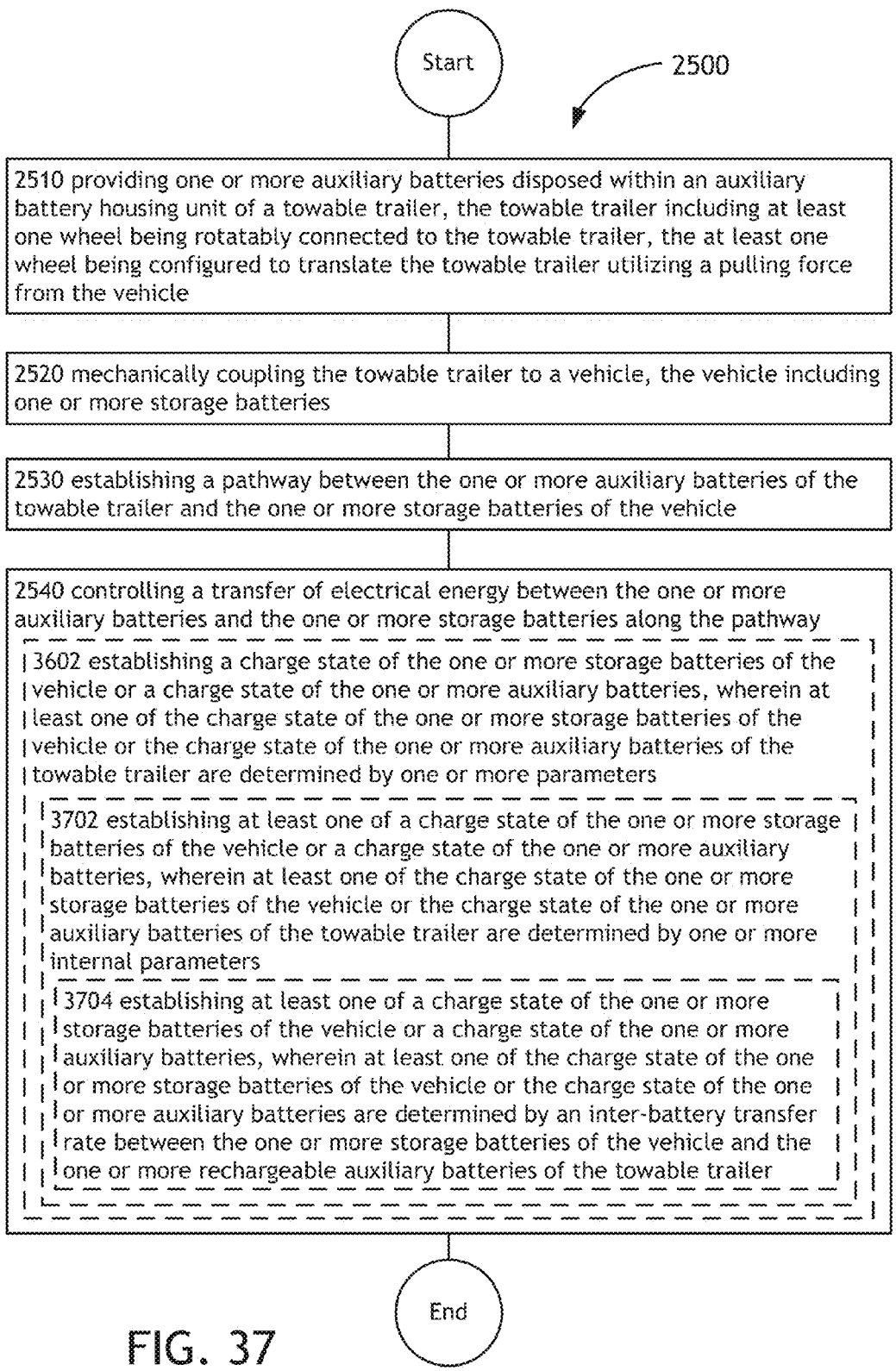
Figure 38A:
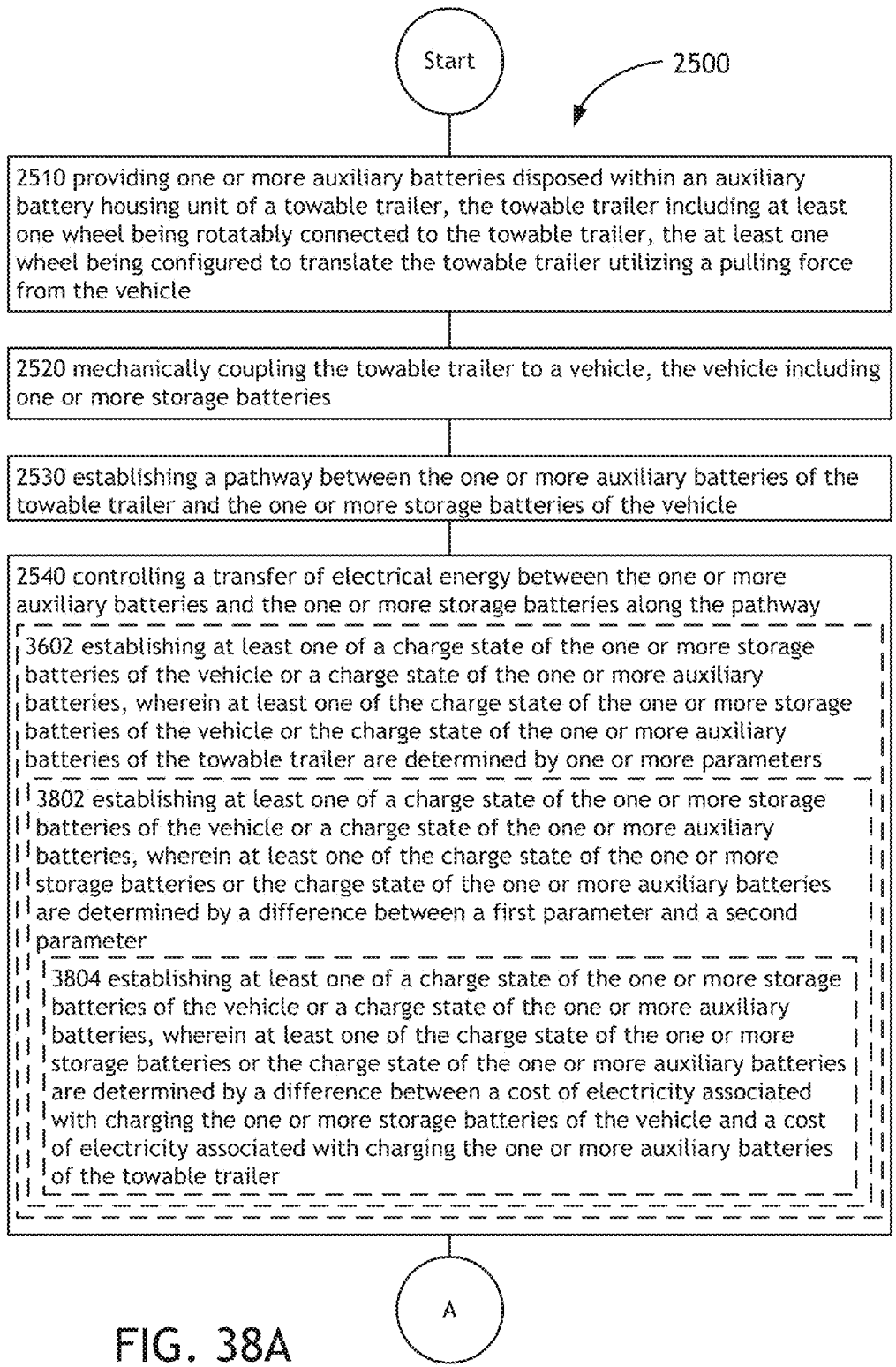
Figure 38B:
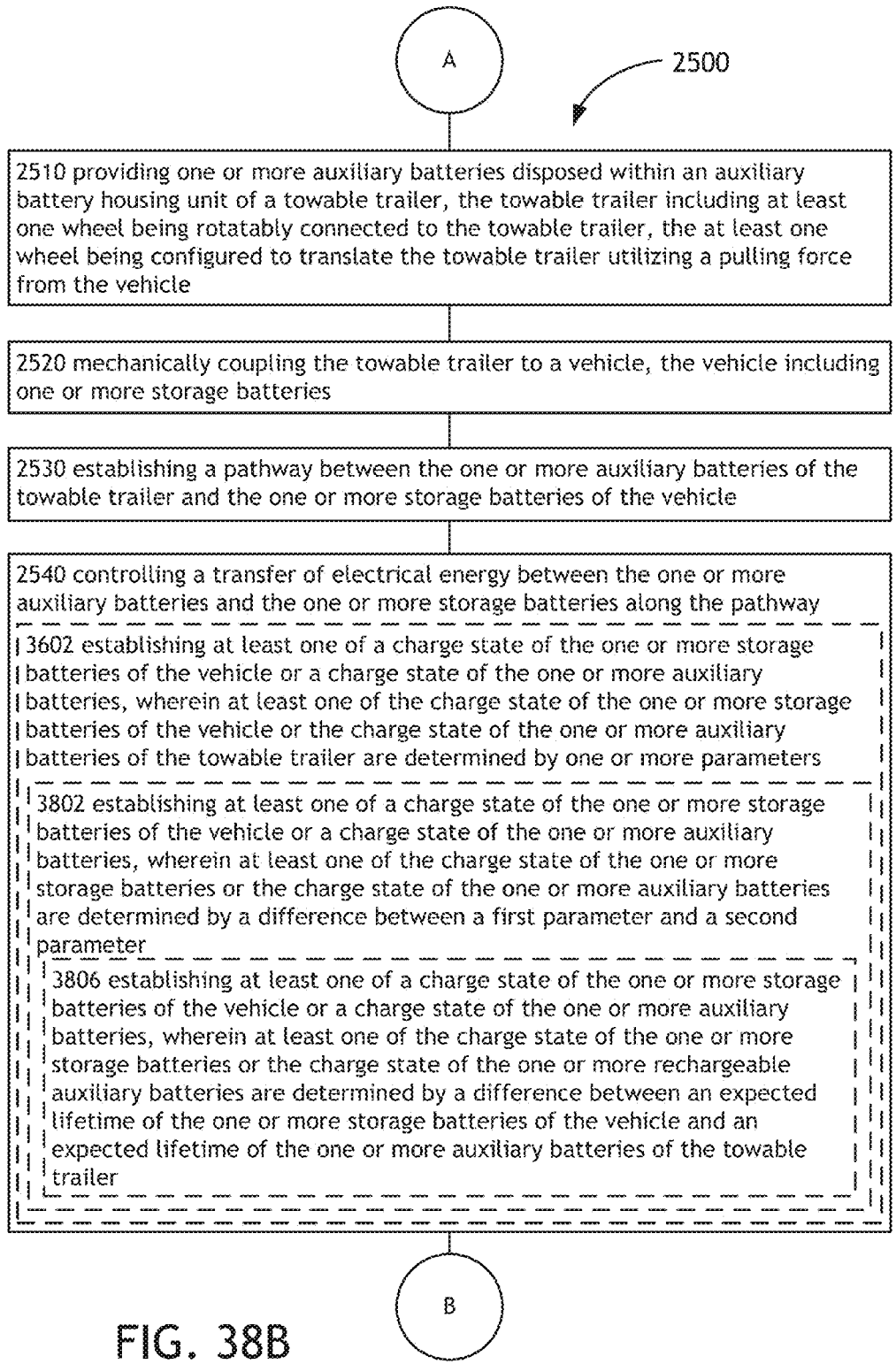
Figure 38D:
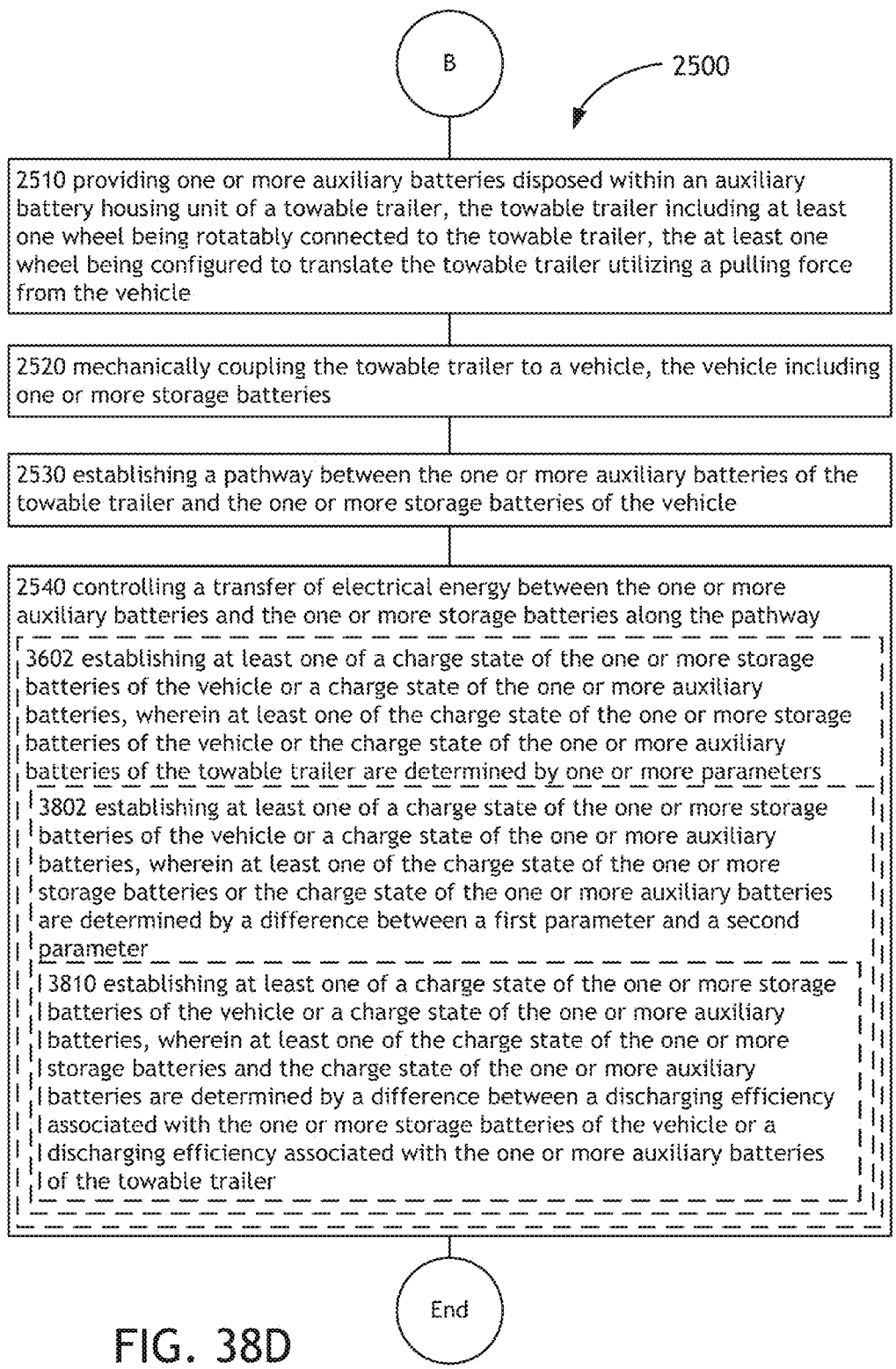

FIG. 37 illustrates alternative embodiments of the example operational flow 2500 of FIG. 25. FIG. 37 illustrates example embodiments where the controlling operation 2540 may include at least one additional operation. Additional operations may include an operation 3702, and/or an operation 3704.

Further, the operation 3702 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by one or more internal parameters. For example, as shown in FIGS. 1A through 4, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more auxiliary batteries 106 and a charge state of the one or more storage batteries 110 determined by the control system 116 using one or more internal parameters.

Further, the operation 3704 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by an inter-battery transfer rate between the one or more storage batteries of the vehicle and the one or more rechargeable auxiliary batteries of the towable trailer. For example, as shown in FIGS. 1A through 4, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more auxiliary batteries 106 and a charge state of the one or more storage batteries 110 determined by the control system 116 using a known or measured inter-battery transfer rate between the one or more storage batteries 110 and the one or more auxiliary batteries 106.

FIGS. 38A-38D illustrate alternative embodiments of the example operational flow 2500 of FIG. 25. FIGS. 38A-38D illustrate example embodiments where the controlling operation 2540 may include at least one additional operation. Additional operations may include an operation 3802, 3804, 3806, 3808, and/or an operation 3810.

The operation 3802 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by a difference between a first parameter and a second parameter. For example, as shown in FIGS. 1A through 4, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more auxiliary batteries 106 and a charge state of the one or more storage batteries 110 determined by the control system 116 using a difference between a first parameter and a second parameter.

Further, the operation 3804 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by a difference between a cost of electricity associated with charging the one or more storage batteries of the vehicle and a cost of electricity associated with charging the one or more auxiliary batteries of the towable trailer. For example, as shown in FIGS. 1A through 4, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more auxiliary batteries 106 and a charge state of the one or more storage batteries 110 determined by the control system 116 using a difference between a cost of electricity associated with charging the one or more storage batteries 110 of the vehicle 104 and a cost of electricity associated with charging the one or more auxiliary batteries 106 of the towable trailer 102.

Further, the operation 3806 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by a difference between an expected lifetime of the one or more storage batteries of the vehicle and an expected lifetime of the one or more auxiliary batteries of the towable trailer. For example, as shown in FIGS. 1A through 4, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more auxiliary batteries 106 and a charge state of the one or more storage batteries 110 determined by the control system 116 using a difference between an expected lifetime of the one or more storage batteries 110 of the vehicle 104 and an expected lifetime of the one or more auxiliary batteries 106 of the towable trailer 102.

Further, the operation 3808 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by a difference between a charging efficiency associated with the one or more storage batteries of the vehicle and a charging efficiency associated with the one or more rechargeable auxiliary batteries of the towable trailer. For example, as shown in FIGS. 1A through 4, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more auxiliary batteries 106 and a charge state of the one or more storage batteries 110 determined by the control system 116 using a difference between a charging efficiency associated with the one or more storage batteries of the vehicle and a charging efficiency associated with the one or more rechargeable auxiliary batteries of the towable trailer.

Further, the operation 3810 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by a difference between a discharging efficiency associated with the one or more storage batteries of the vehicle and a discharging efficiency associated with the one or more rechargeable auxiliary batteries of the towable trailer. For example, as shown in FIGS. 1A through 4, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more auxiliary batteries 106 and a charge state of the one or more storage batteries 110 determined by the control system 116 using a difference between a discharging efficiency associated with the one or more storage batteries 110 of the vehicle 104 and a discharging efficiency associated with the one or more rechargeable auxiliary batteries 106 of the towable trailer 102.

Figure 39:
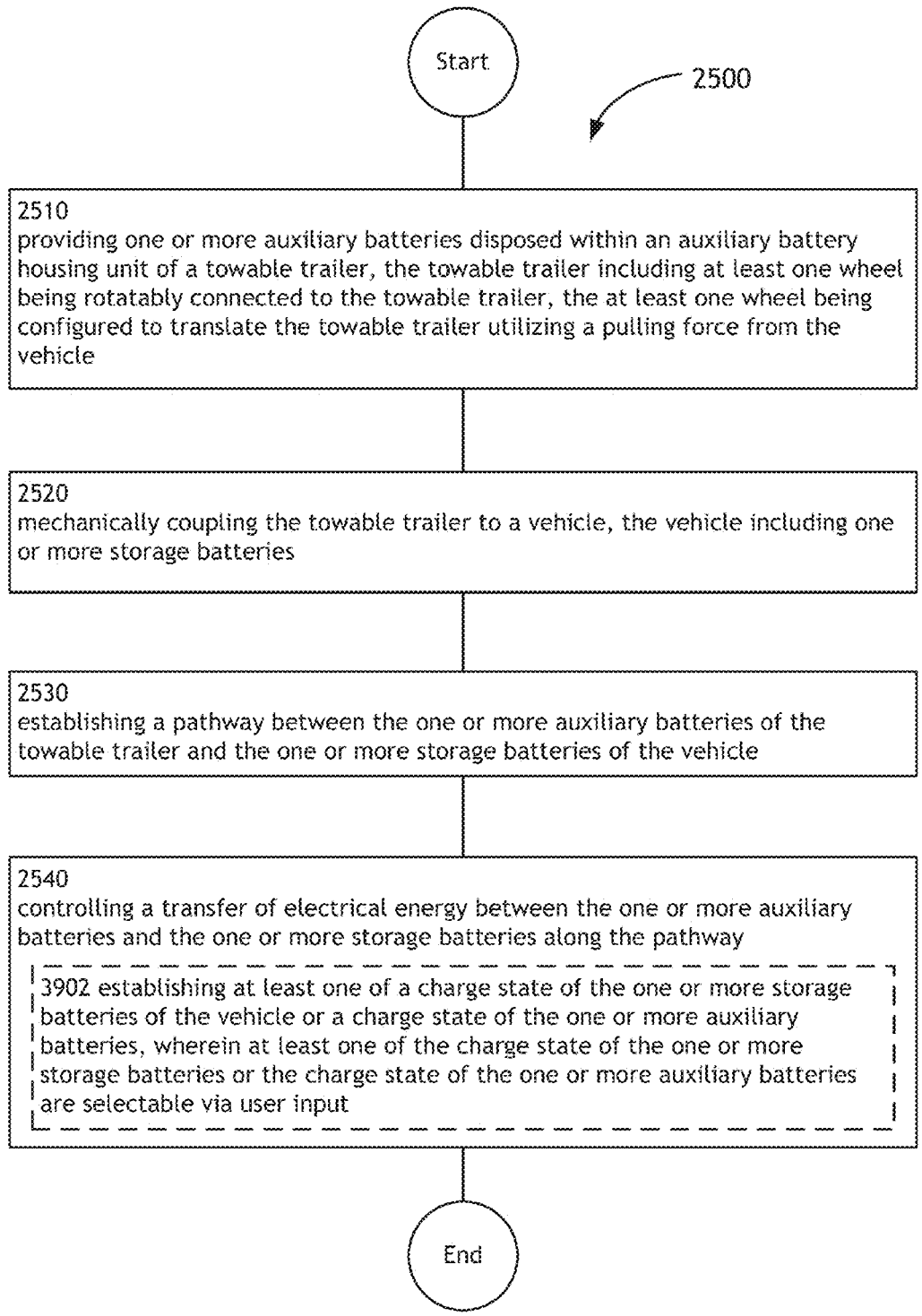

FIG. 39 illustrates alternative embodiments of the example operational flow 2500 of FIG. 25. FIG. 39 illustrates example embodiments where the controlling operation 2540 may include at least one additional operation. Additional operations may include an operation 3902.

The operation 3902 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are selectable via user input. For example, as shown in FIGS. 1A through 4, the control system 116 may control the coupling circuitry 118 so as to control the charge flow between the one or more auxiliary batteries 106 of the towable trailer 102 and the one or more storage batteries 110 of the vehicle 104 in order to establish a charge state of the one or more auxiliary batteries 106 and a charge state of the one or more storage batteries 110 selected by a user via user interface device (e.g., mouse, touchscreen, keyboard, and the like).

Figure 40:
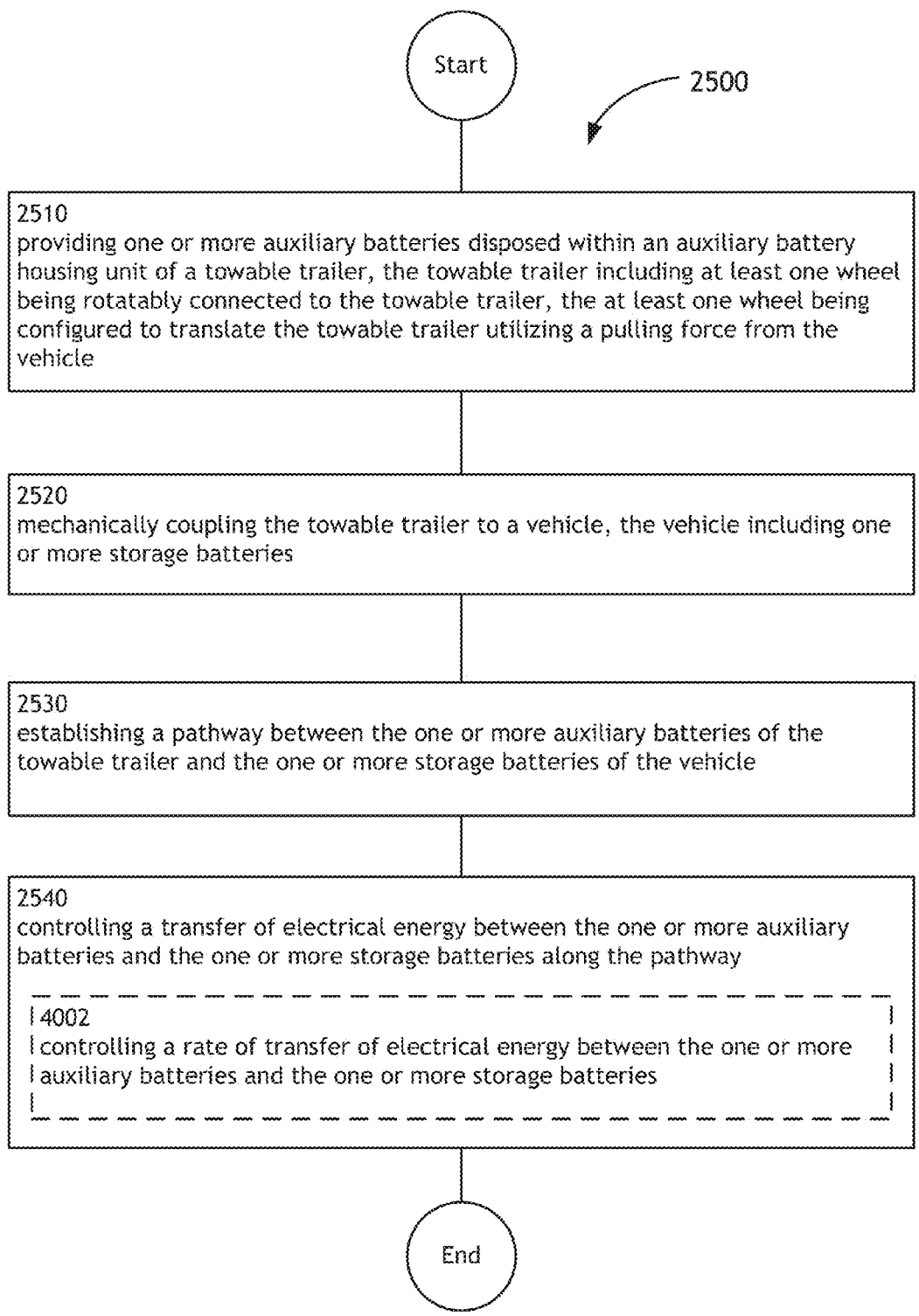

FIG. 40 illustrates alternative embodiments of the example operational flow 2500 of FIG. 25. FIG. 40 illustrates example embodiments where the controlling operation 2540 may include at least one additional operation. Additional operations may include an operation 4002.

The operation 4002 illustrates controlling a rate of transfer of electrical energy between the one or more auxiliary batteries and the one or more storage batteries. For example, as shown in FIGS. 1A through 4, the control system 116 may control the coupling circuitry 118 so as to control the rate of transfer (e.g., rate of transfer required to avoid overheating) of electrical energy between the one or more auxiliary batteries 106 of the towable trailer 102 and the one or more storage batteries 110 of the vehicle 104.

Figure 41:
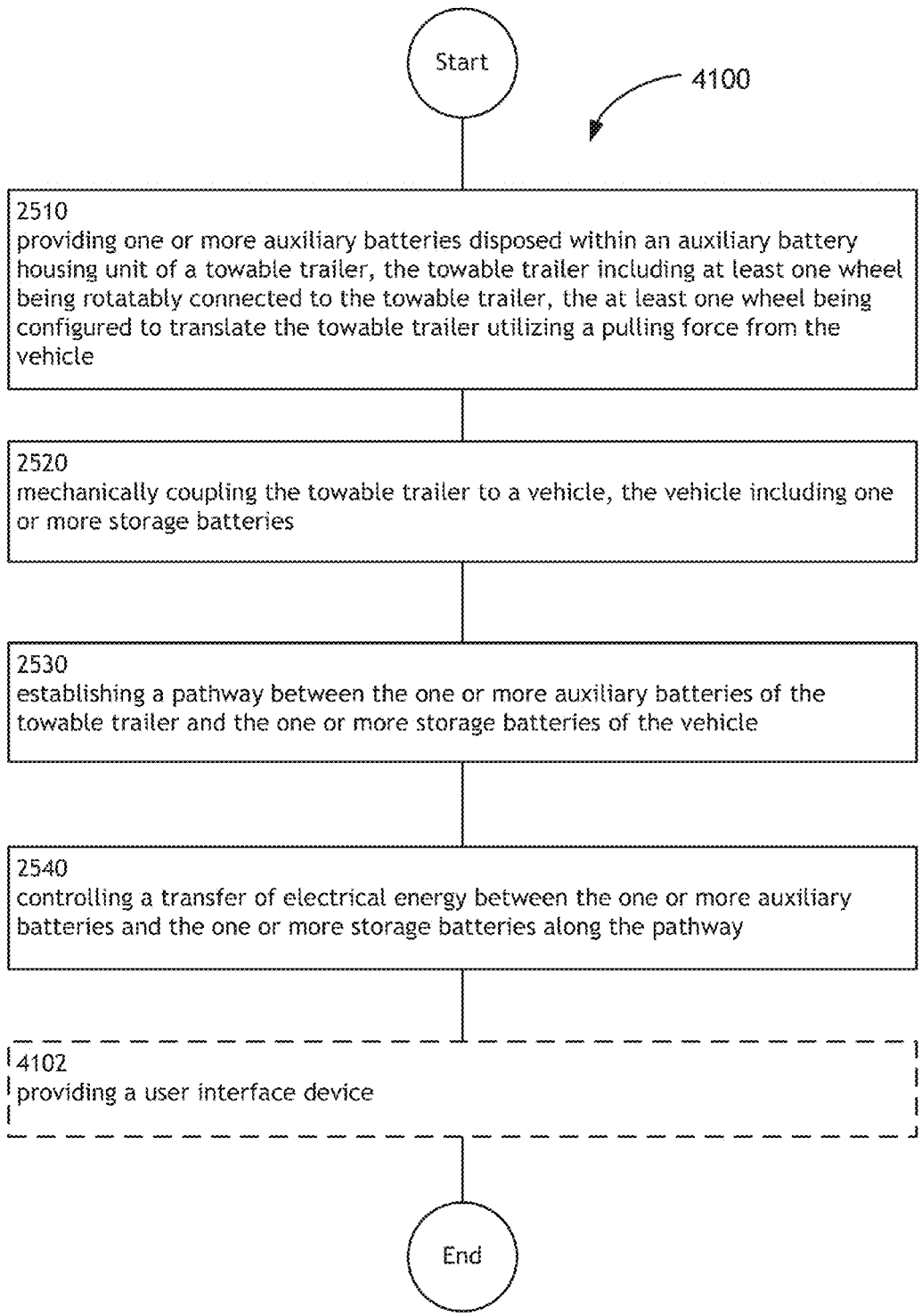

FIG. 41 illustrates an operational flow 4100 representing example operations related to supplying auxiliary electrical energy to an electric or hybrid vehicle. FIG. 41 illustrates an example embodiment where the example operational flow 2500 of FIG. 25 may include at least one additional operation. Additional operations may include a user interface providing operation 4102.

After a start operation, a providing operation 2510, a mechanically coupling operation 2520, a pathway establishing operation 2530, and a controlling operation 2540, the operation flow 4100 moves to user interface providing operation 4102.

The operation 4102 illustrates providing a user interface device. For example, as shown in FIGS. 1A through 4, a user interface 214 may be obtained. For instance, the user interface 214 may be disposed on the towable trailer 102. In another instance, the user interface 214 may be disposed within the vehicle 104. In another instance, the user interface 214 may be integrated into a remote communications device (e.g., smartphone or tablet).

Figure 42:
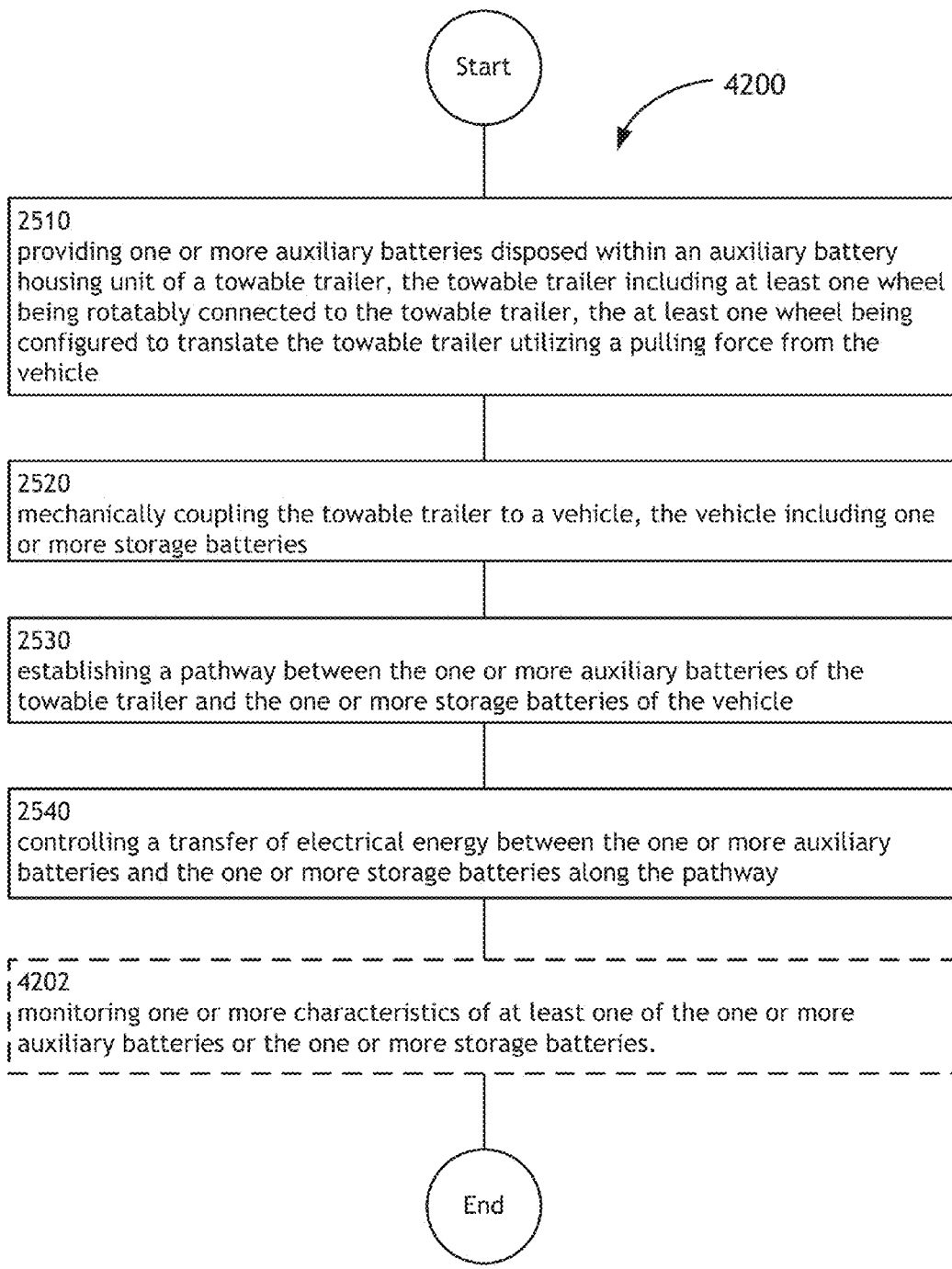

FIG. 42 illustrates an operational flow 4200 representing example operations related to supplying auxiliary electrical energy to an electric or hybrid vehicle. FIG. 42 illustrates an example embodiment where the example operational flow 2500 of FIG. 25 may include at least one additional operation. Additional operations may include a battery monitoring operation 4202.

After a start operation, a providing operation 2510, a mechanically coupling operation 2520, a pathway establishing operation 2530, and a controlling operation 2540, the operation flow 4200 moves to battery monitoring operation 4202.

The operation 4202 illustrates monitoring one or more characteristics of at least one of the one or more auxiliary batteries or the one or more storage batteries. For example, as shown in FIGS. 1A through 4, a battery monitoring system 236 (e.g., state of charge monitoring system) may be utilized to monitor one or more characteristics of at least one or more auxiliary batteries 106 or the one or more storage batteries 110.

Figure 43:
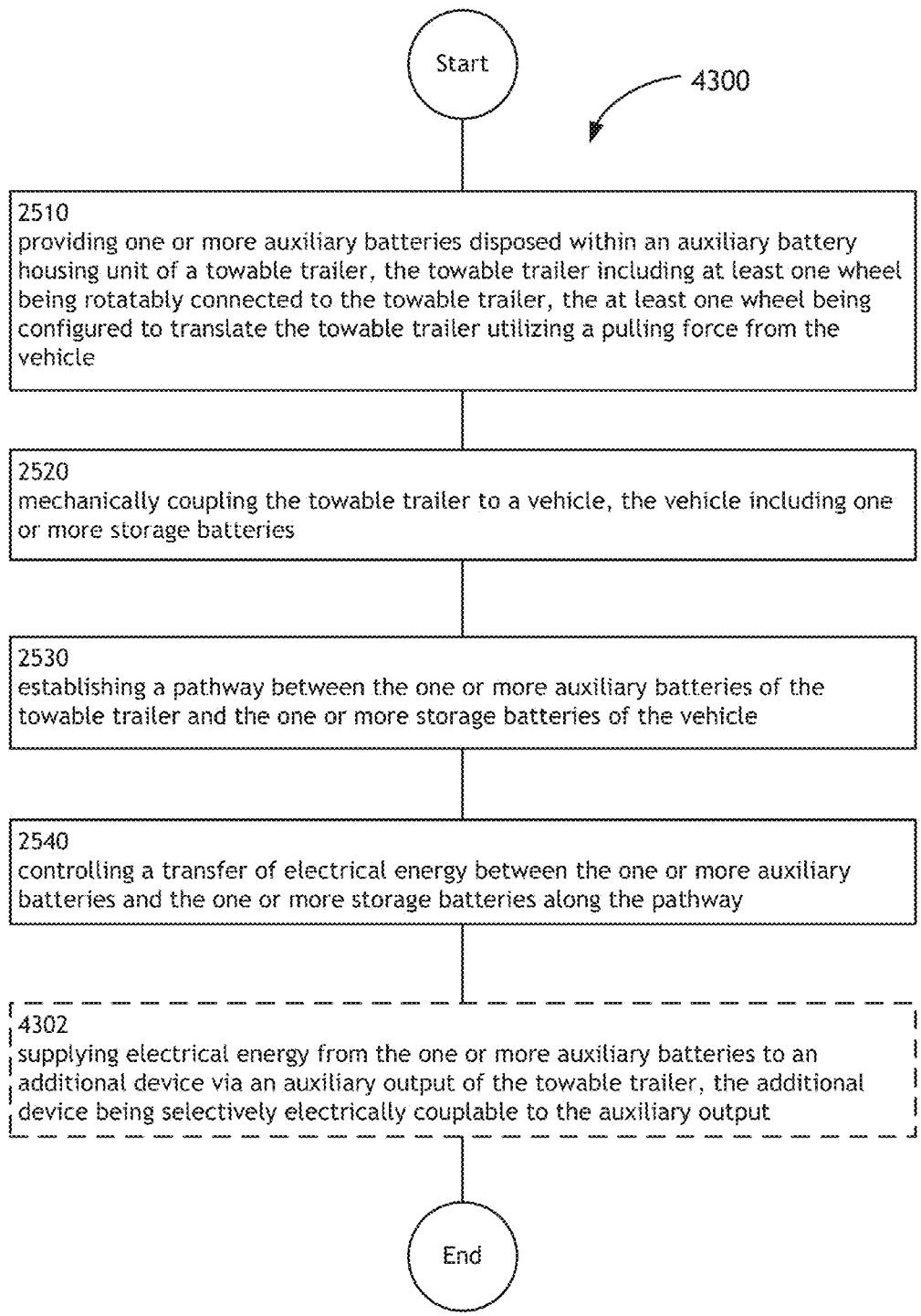

FIG. 43 illustrates an operational flow 4300 representing example operations related to supplying auxiliary electrical energy to an electric or hybrid vehicle. FIG. 43 illustrates an example embodiment where the example operational flow 2500 of FIG. 25 may include at least one additional operation. Additional operations may include a supplying operation 4302.

After a start operation, a providing operation 2510, a mechanically coupling operation 2520, a pathway establishing operation 2530, and a controlling operation 2540, the operation flow 4300 moves to supplying operation 4302.

The operation 4302 illustrates supplying electrical energy from the one or more auxiliary batteries to an additional device via an auxiliary output of the towable trailer, the additional device being selectively electrically couplable to the auxiliary output. For example, as shown in FIGS. 1A through 4, electrical energy stored within the one or more auxiliary batteries 106 may be transferred to an additional device 240 via an auxiliary port 242. For instance, the towable trailer 102 may be equipped with an auxiliary port 242 configured for receiving a connector (e.g., male end of an electric cable) from the additional device 240.

Figure 44:
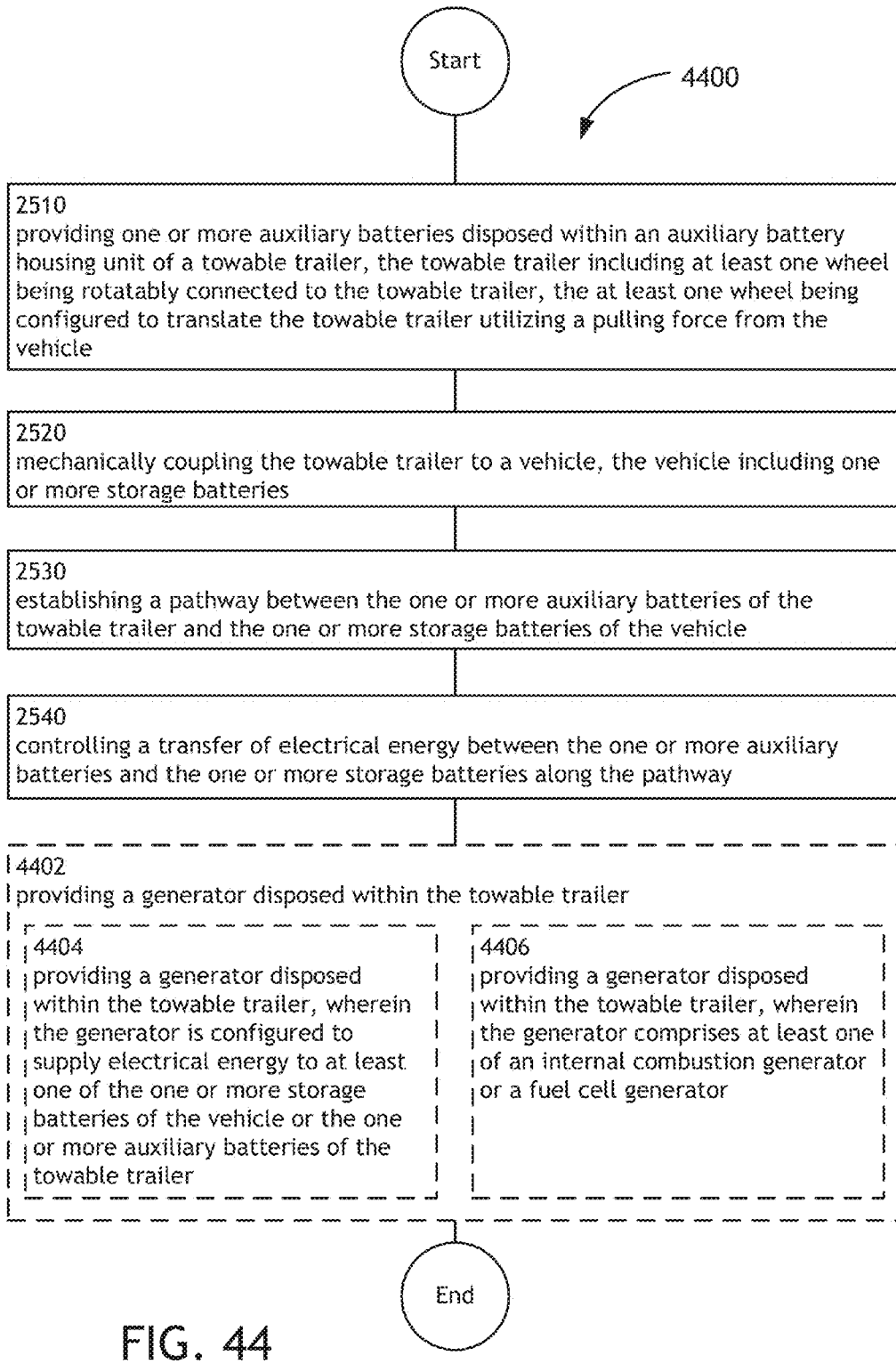

FIG. 44 illustrates an operational flow 4400 representing example operations related to supplying auxiliary electrical energy to an electric or hybrid vehicle. FIG. 44 illustrates an example embodiment where the example operational flow 2500 of FIG. 25 may include at least one additional operation. Additional operations may include a generator providing operation 4402, operation 4404, and/or operation 4406.

After a start operation, a providing operation 2510, a mechanically coupling operation 2520, a pathway establishing operation 2530, and a controlling operation 2540, the operation flow 4400 moves to generator providing operation 4402.

The operation 4402 illustrates providing a generator disposed within the towable trailer. For example, as shown in FIGS. 1A through 4, a generator 246 may be disposed within the towable trailer 102 and operatively connected to the one or more auxiliary batteries 102 and the control system 116. For instance, the generator 246 may be coupled in a parallel configuration with the auxiliary batteries 106 as shown in FIG. 2F. In another instance, the generator 246 may be coupled in a series configuration with the auxiliary batteries 106 as shown in FIG. 2G.

Further, the operation 4404 illustrates providing a generator disposed within the towable trailer, wherein the generator is configured to supply electrical energy to at least one of the one or more storage batteries of the vehicle or the one or more auxiliary batteries of the towable trailer. For example, as shown in FIGS. 1A through 4, a generator 246 disposed within the towable trailer 102 and operatively connected to the one or more auxiliary batteries 102 and the control system 116 may be configured to directly or indirectly supply auxiliary electrical energy to the one or more storage batteries 110 of the vehicle. For instance, the generator 246 may directly supply electrical energy to the one or more storage batteries 110 via electrical connection 114. In another instance, the generator 24 may indirectly supply electrical energy to the one or more storage batteries 110 by supplying electrical energy to the one or more auxiliary batteries 106 of the trailer 102, which in turn may supply auxiliary electrical energy to the one or more storage batteries 110 of the vehicle 104.

Further, the operation 4406 illustrates providing a generator disposed within the towable trailer, wherein the generator comprises at least one of an internal combustion generator or a fuel cell generator. For example, as shown in FIGS. 1A through 4, a generator 246 disposed within the towable trailer 102 and operatively connected to the one or more auxiliary batteries 102 and the control system 116 may include a gasoline or diesel generator. By way of another example, as shown in FIGS. 1A through 4, a generator 246 disposed within the towable trailer 102 and operatively connected to the one or more auxiliary batteries 102 and the control system 116 may include a PEM fuel cell configured to utilized hydrogen as a fuel source.

Figure 45:
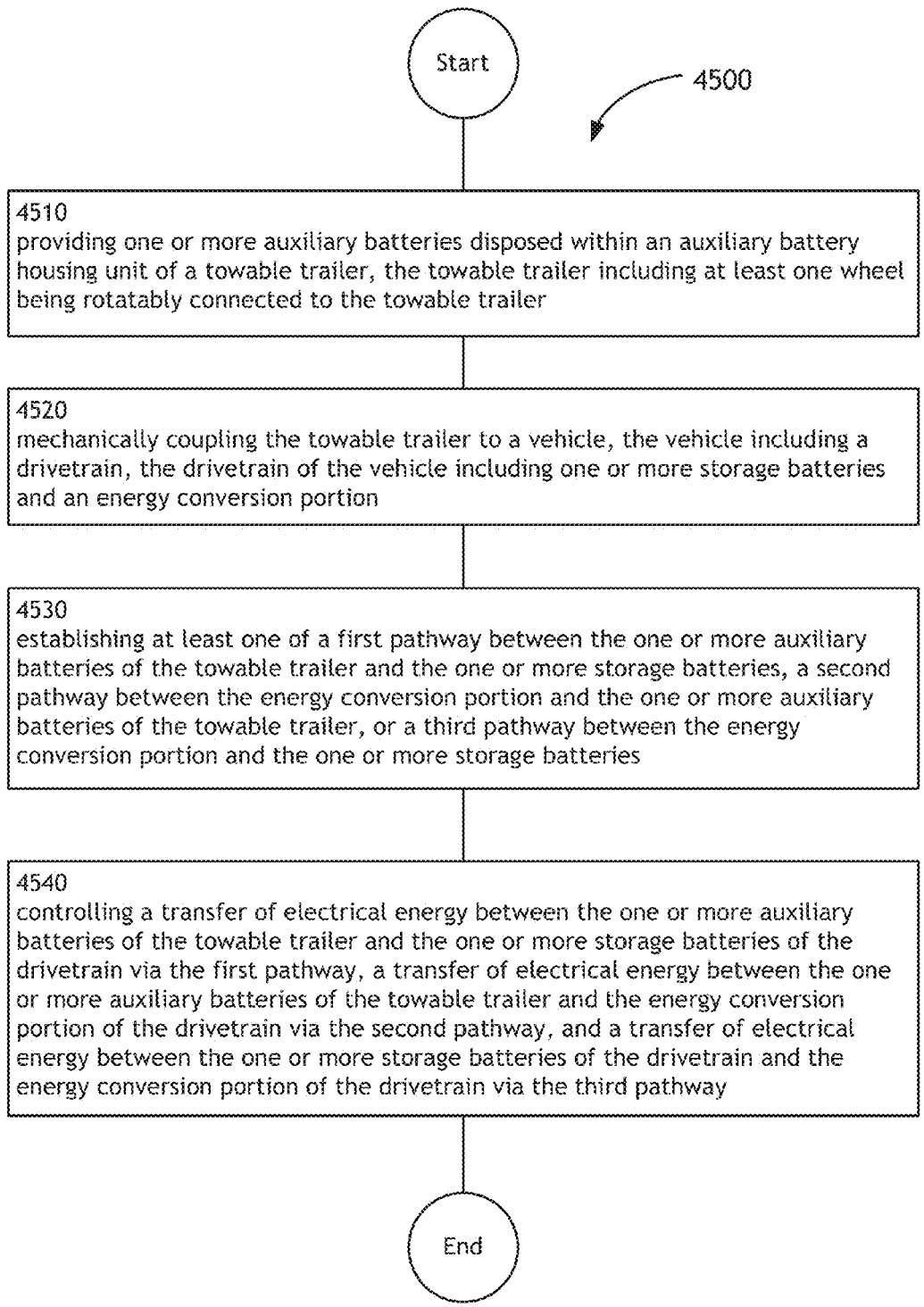
FIG. 45 is a high-level flowchart of a method for supplying auxiliary electrical power to an electric or hybrid vehicle.

FIG. 45 illustrates an operational flow 4500 representing example operations related to supplying auxiliary electrical energy to an electric or hybrid vehicle. In FIG. 45 and in following figures that include various examples of operational flows, discussion and explanation may be provided with respect to the above-described examples of FIGS. 1A through 4, and/or with respect to other examples and contexts.

After a start operation, the operational flow 4500 moves to a providing operation 4510. The providing operation 4510 depicts providing one or more auxiliary batteries disposed within an auxiliary battery housing unit of a towable trailer, the towable trailer including at least one wheel being rotatably connected to the towable trailer. For example, as shown in FIGS. 1A through 4, one or more auxiliary batteries 106 (e.g., lithium based batteries) may be provided and disposed within an auxiliary battery housing unit 108 of a towable trailer 102, the towable trailer 102 including at least one wheel 120 (e.g., one wheel, two wheels, or three wheels) being rotatably connected to the towable trailer 120.

Then, mechanical coupling operation 4520 depicts mechanically coupling the towable trailer to a vehicle, the vehicle including a drivetrain, the drivetrain of the vehicle including one or more storage batteries and an energy conversion portion. For example, as shown in FIGS. 1A through 4, the towable trailer 102 may be mechanically coupled a vehicle 104 including a drivetrain 112, the drivetrain 112 of the vehicle 104 including one or more storage batteries 110 (e.g., lithium based batteries) and an energy conversion portion 122 (e.g., electric motor 124, power converter 126, and the like).

Then, pathway establishing operation 4530 depicts establishing a first pathway between the one or more auxiliary batteries of the towable trailer and the one or more storage batteries, a second pathway between the energy conversion portion and the one or more auxiliary batteries of the towable trailer, and a third pathway between the energy conversion portion and the one or more storage batteries. For example, as shown in FIGS. 1A through 4, a first pathway 410 between the one or more auxiliary batteries of the towable trailer 102 and the one or more storage batteries 110 may be established, a second pathway 414 between the energy conversion portion 122 (e.g., electric motor 124 or converter 126) and the one or more auxiliary batteries 106 of the towable trailer 102 may be established, or a third pathway 412 between the energy conversion portion 122 and the one or more storage batteries 110 of the vehicle 104 may be established.

Then, controlling operation 4540 depicts controlling at least one of a transfer of electrical energy between the one or more auxiliary batteries of the towable trailer and the one or more storage batteries of the drivetrain via the first pathway, a transfer of electrical energy between the one or more auxiliary batteries of the towable trailer and the energy conversion portion of the drivetrain via the second pathway, or a transfer of electrical energy between the one or more storage batteries of the drivetrain and the energy conversion portion of the drivetrain via the third pathway. For example, as shown in FIGS. 1A through 4, a control system 402 may be configured to control one or more of the following: (i) a transfer of electrical energy between the one or more auxiliary batteries 106 of the towable trailer 102 and the one or more storage batteries 110 of the drivetrain 112 via the first pathway 410, (ii) a transfer of electrical energy between the one or more auxiliary batteries 106 of the towable trailer 102 and the energy conversion portion 122 of the drivetrain 112 via the second pathway 414, or (iii) a transfer of electrical energy between the one or more storage batteries 110 of the drivetrain 112 and the energy conversion portion 122 (e.g., power conversion circuitry or electric motor/generator) of the drivetrain 112 via the third pathway 412.

Figure 46:
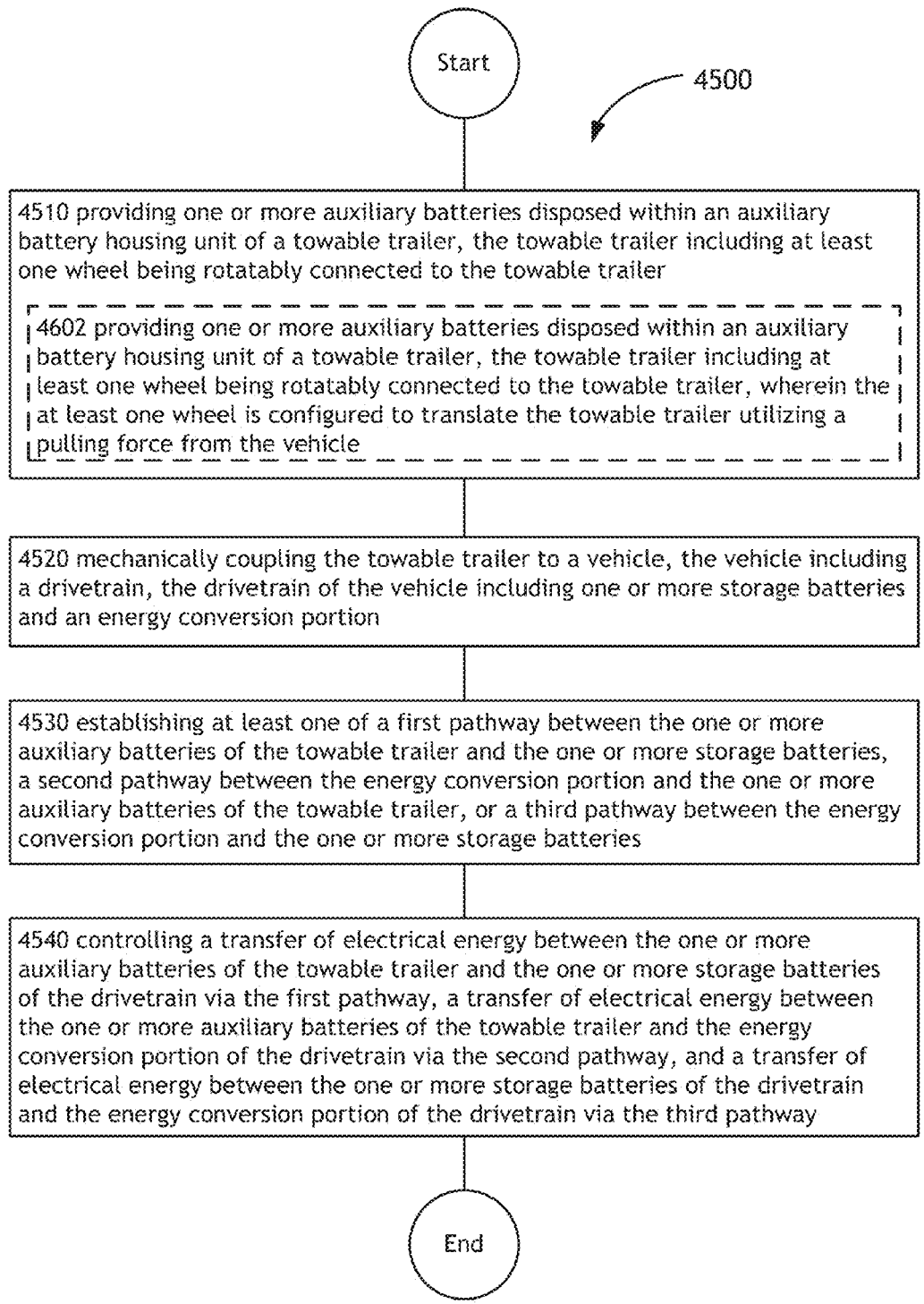

FIG. 46 illustrates alternative embodiments of the example operational flow 4500 of FIG. 45. FIG. 46 illustrates example embodiments where the providing operation 4510 may include at least one additional operation. Additional operations may include an operation 4602.

The operation 4602 illustrates providing one or more auxiliary batteries disposed within an auxiliary battery housing unit of a towable trailer, the towable trailer including at least one wheel being rotatably connected to the towable trailer, wherein the at least one wheel is configured to translate the towable trailer utilizing a pulling force from the vehicle. For example, as shown in FIGS. 1A through 4, one or more auxiliary batteries 106 may be provided and disposed within an auxiliary battery housing unit 108 of a towable trailer 102, the towable trailer 102 including at least one wheel 120 (e.g., one wheel, two wheels, three wheels, or four wheels) being rotatably connected to the towable trailer 120, wherein the at least one wheel 120 is configured to passively translate the towable trailer 102 utilizing a pulling force from the vehicle 102.

Figure 47A:
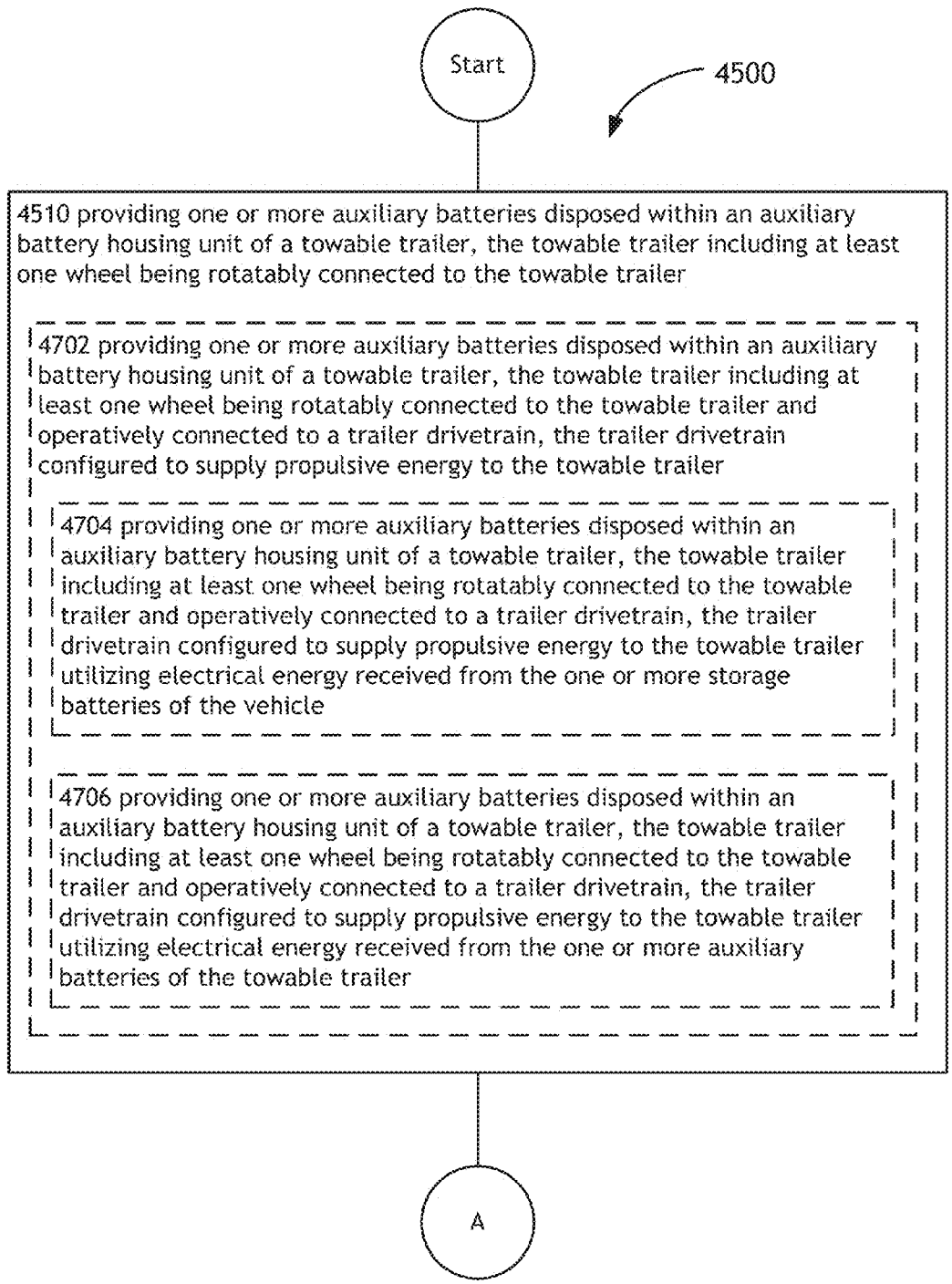
Figure 47B:
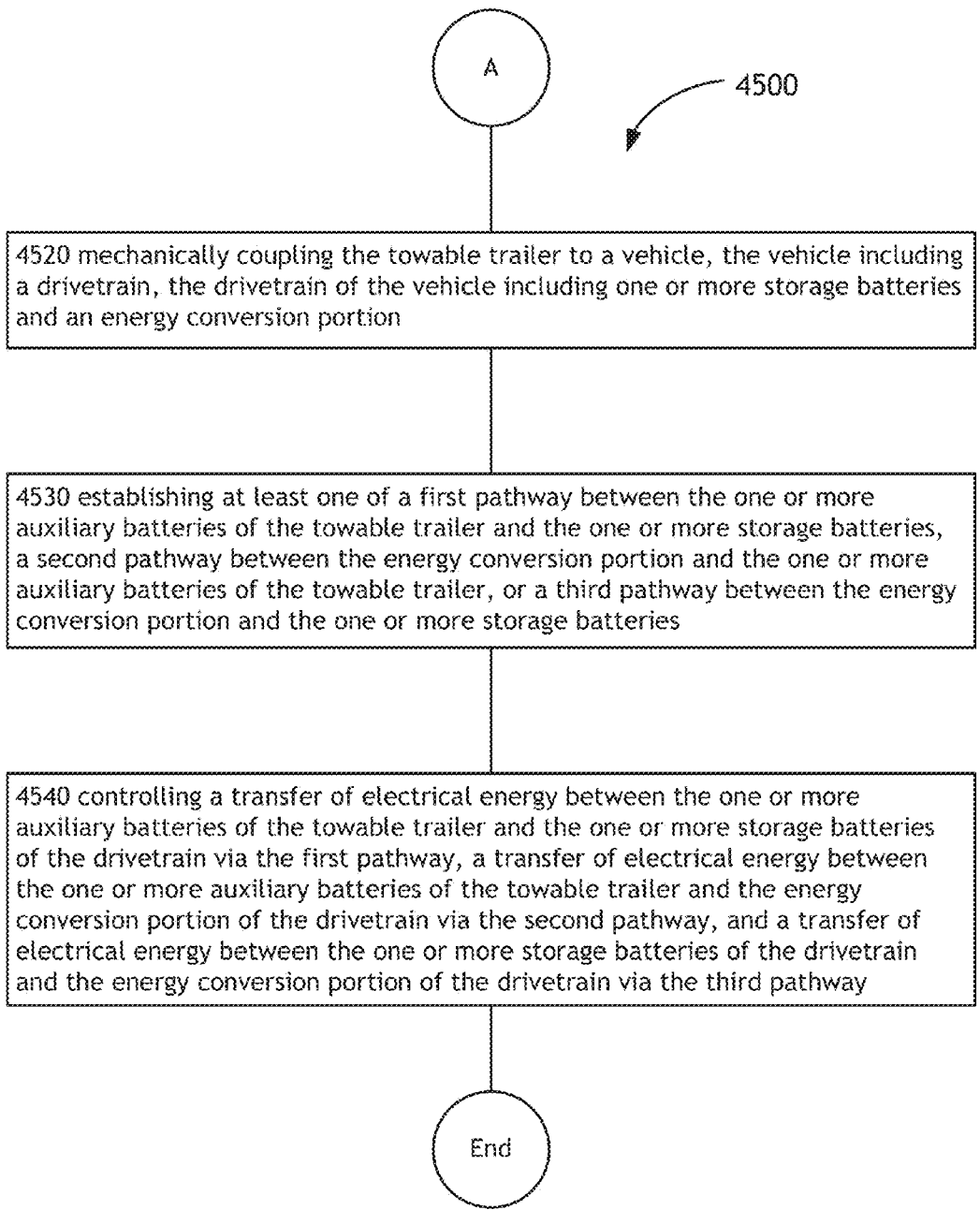

FIGS. 47A and 47B illustrate alternative embodiments of the example operational flow 4500 of FIG. 45. FIGS. 47A and 47B illustrate example embodiments where the providing operation 4510 may include at least one additional operation. Additional operations may include an operation 4702, an operation 4704, and/or an operation 4706.

The operation 4702 illustrates providing one or more auxiliary batteries disposed within an auxiliary battery housing unit of a towable trailer, the towable trailer including at least one wheel being rotatably connected to the towable trailer and operatively connected to a trailer drivetrain, the trailer drivetrain configured to supply propulsive energy to the towable trailer. For example, as shown in FIGS. 1A through 4, one or more auxiliary batteries 106 may be provided and disposed within an auxiliary battery housing unit 108 of a towable trailer 102, the towable trailer 102 may include one or more wheels 120 rotatably connected to the towable trailer 102 and mechanically connected to a trailer drivetrain (e.g., connected to a transmission of the trailer drivetrain) such that the drivetrain of the trailer 102 may supply propulsive energy to the towable trailer 102.

Further, the operation 4704 illustrates providing one or more auxiliary batteries disposed within an auxiliary battery housing unit of a towable trailer, the towable trailer including at least one wheel being rotatably connected to the towable trailer and operatively connected to a trailer drivetrain, the trailer drivetrain configured to supply propulsive energy to the towable trailer utilizing electrical energy received from the one or more storage batteries of the vehicle. For example, as shown in FIGS. 1A through 4, one or more auxiliary batteries 106 may be provided and disposed within an auxiliary battery housing unit 108 of a towable trailer 102. The towable trailer 102 may include one or more wheels 120 rotatably connected to the towable trailer 102 and mechanically connected to a trailer drivetrain (e.g., connected to a transmission of the trailer drivetrain) such that an electric motor of the trailer 102 powered by electrical energy from the one or more storage batteries 110 of the vehicle 104 may supply propulsive energy to the towable trailer 102.

Further, the operation 4706 illustrates providing one or more auxiliary batteries disposed within an auxiliary battery housing unit of a towable trailer, the towable trailer including at least one wheel being rotatably connected to the towable trailer and operatively connected to a trailer drivetrain, the trailer drivetrain configured to supply propulsive energy to the towable trailer utilizing electrical energy received from the one or more auxiliary batteries of the towable trailer. For example, as shown in FIGS. 1A through 4, one or more auxiliary batteries 106 may be provided and disposed within an auxiliary battery housing unit 108 of a towable trailer 102. The towable trailer 102 may include one or more wheels 120 rotatably connected to the towable trailer 102 and mechanically connected to a trailer drivetrain (e.g., connected to a transmission of the trailer drivetrain) such that an electric motor of the trailer 102 powered by electrical energy from the one or more auxiliary batteries 106 of the trailer may supply propulsive energy to the towable trailer 102.

Figure 48:
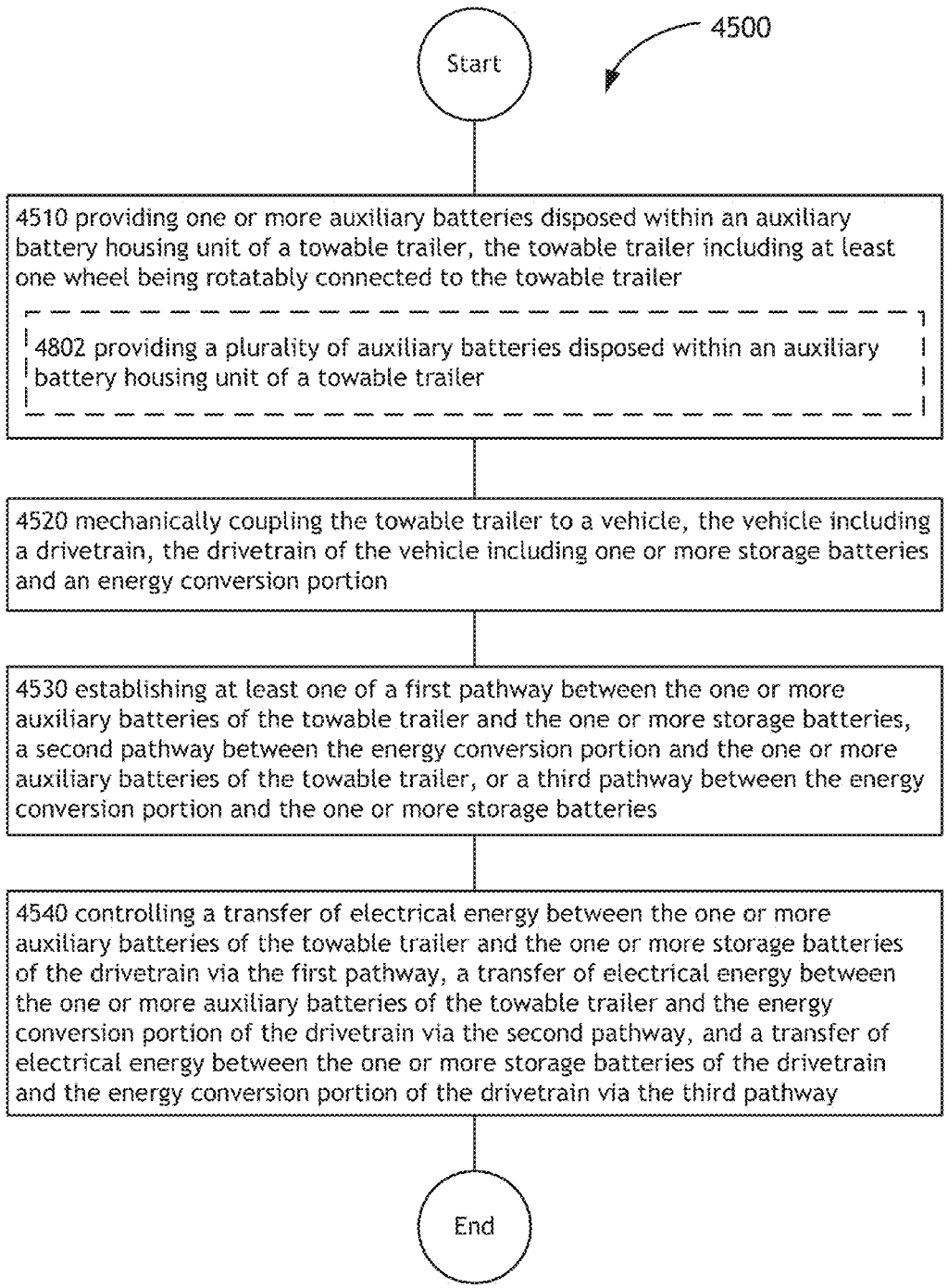

FIG. 48 illustrates alternative embodiments of the example operational flow 4500 of FIG. 45. FIG. 48 illustrates example embodiments where the providing operation 4510 may include at least one additional operation. Additional operations may include an operation 4802.

The operation 4802 illustrates providing a plurality of auxiliary batteries disposed within an auxiliary battery housing unit of a towable trailer, the towable trailer including at least one wheel being rotatably connected to the towable trailer. For example, as shown in FIGS. 1A through 4, a plurality of auxiliary batteries 106 may be provided and disposed within an auxiliary battery housing unit 108 of a towable trailer 102, the towable trailer 102 may include one or more wheels 120 rotatably connected to the towable trailer 102. For instance, two or more series coupled batteries (e.g., lithium based batteries) auxiliary batteries may be provided and disposed with the battery housing unit 108 of the towable trailer 102. In another instance, two or more parallel coupled auxiliary batteries may be provided and disposed with the battery housing unit 108 of the towable trailer 102. Further, two or more series/parallel coupled auxiliary batteries may be provided and disposed with the battery housing unit 108 of the towable trailer 102.

Figure 49:
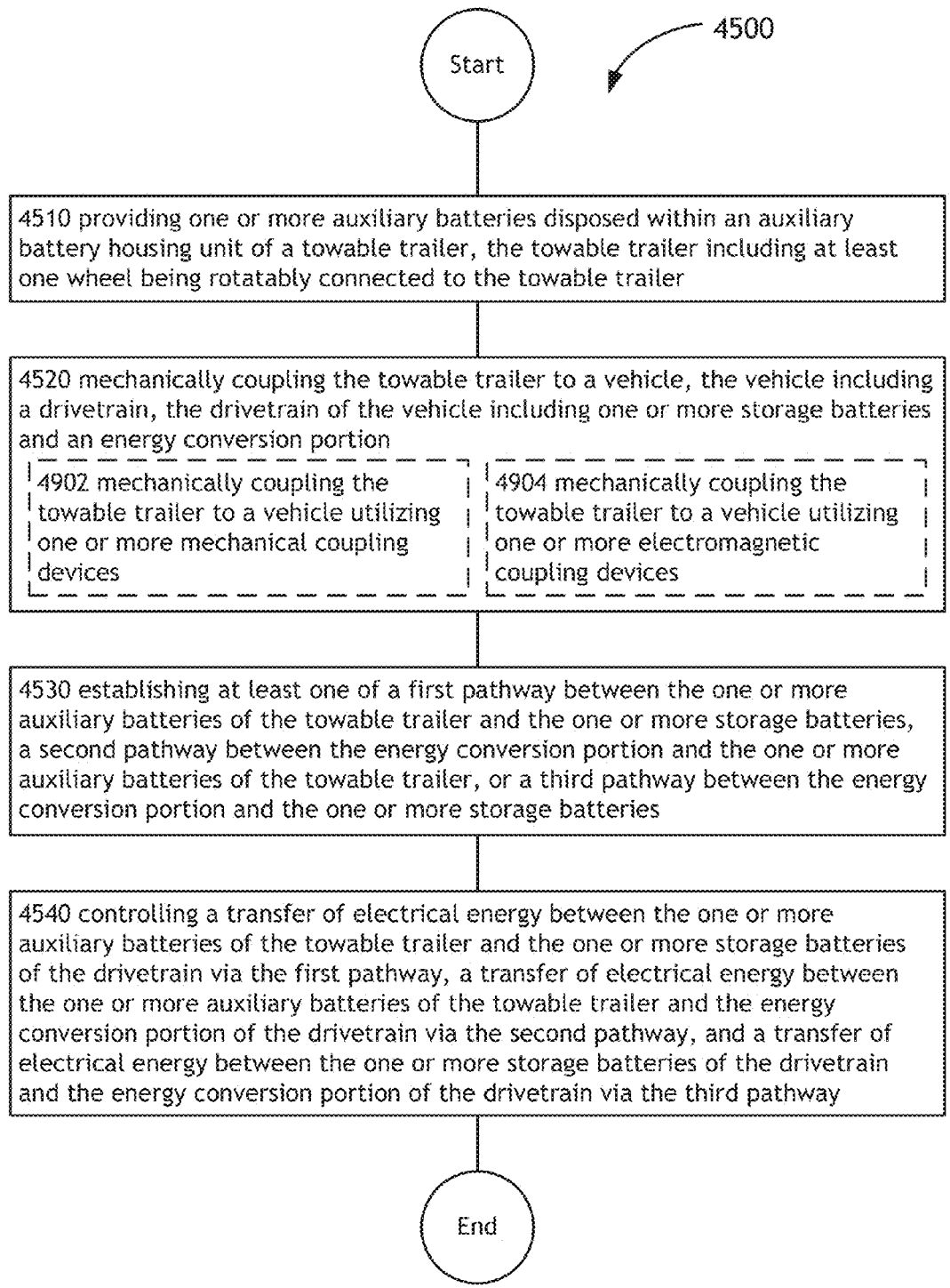

FIG. 49 illustrates alternative embodiments of the example operational flow 4500 of FIG. 45. FIG. 49 illustrates example embodiments where the mechanical coupling operation 4520 may include at least one additional operation. Additional operations may include an operation 4902 and/or operation 4904.

The operation 4902 illustrates mechanically coupling the towable trailer to a vehicle utilizing one or more mechanical coupling devices. For example, as shown in FIGS. 1A through 4, the towable trailer 102 may be mechanically coupled, or attached, to vehicle utilizing one or more mechanical coupling devices. For instance, the towable trailer 102 may be mechanically attached to a rear portion (e.g., bumper) of the vehicle 104 utilizing at least one of a hitch, a latch, or a suction device.

The operation 4904 illustrates mechanically coupling the towable trailer to a vehicle utilizing one or more electromagnetic coupling devices. For example, as shown in FIGS. 1A through 4, the towable trailer 102 may be mechanically coupled, or attached, to vehicle utilizing one or more electromagnetic coupling devices. For instance, the towable trailer 102 may be mechanically attached to a rear portion (e.g., bumper) of the vehicle 104 utilizing at least one of an electromagnet or a permanent magnet disposed within a front portion of the towable trailer 102.

Figure 50:
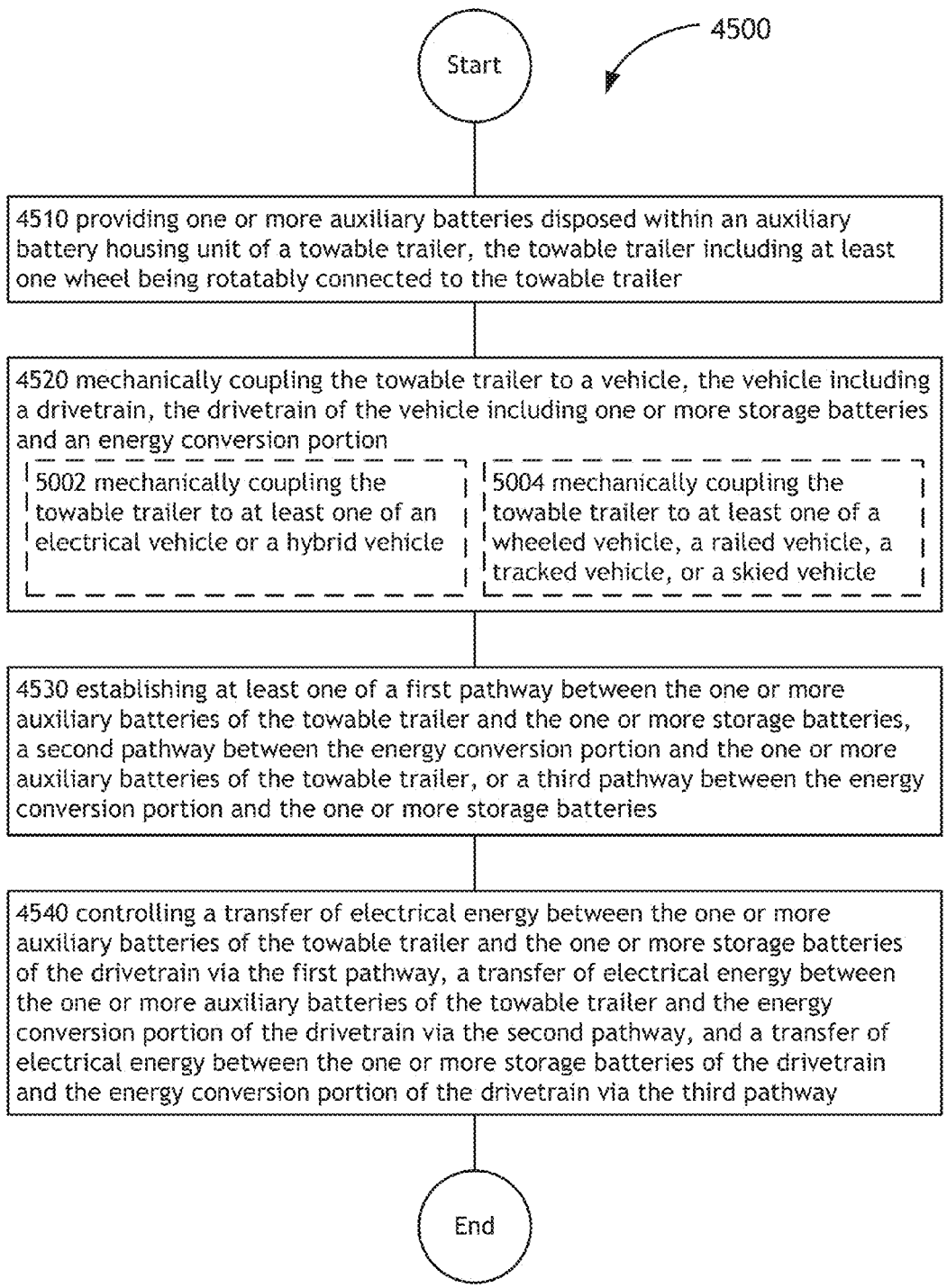

FIG. 50 illustrates alternative embodiments of the example operational flow 4500 of FIG. 45. FIG. 50 illustrates example embodiments where the mechanical coupling operation 4520 may include at least one additional operation. Additional operations may include an operation 5002 and/or operation 5004.

The operation 5002 illustrates mechanically coupling the towable trailer to at least one of an electrical vehicle or a hybrid vehicle. For example, as shown in FIGS. 1A through 4, the towable trailer 102 may be mechanically coupled to a hybrid electric-gasoline vehicle (e.g., parallel configured hybrid electric-gasoline vehicle or series configured hybrid electric-gasoline vehicle). By way of another example, as shown in FIGS. 1A through 4, the towable trailer 102 may be mechanically coupled to an electric vehicle, such as a purely electric vehicle or an electric vehicle including additional energy capture technology, such as a regenerative braking.

The operation 5004 illustrates mechanically coupling the towable trailer to at least one of a wheeled vehicle, a railed vehicle, a tracked vehicle, or a skied vehicle. For example, as shown in FIGS. 1A through 4, the towable trailer 102 may be mechanically coupled to a wheeled vehicle, a railed vehicle, a tracked vehicle, or a skied vehicle. For instance, a wheeled vehicle may include a 2-wheeled or 4 wheeled vehicle, such as a motorcycle or car. In another instance, a railed vehicle may include a trolley, a train, or the like. In another instance, a tracked vehicle may include any vehicle equipped with tracking as a means of locomotion, such as a snow plow, a bulldozer, or the like. In another instance, a skied vehicle may include any vehicle equipped with skies, such as, but not limited to, a snow mobile.

Figure 51A:
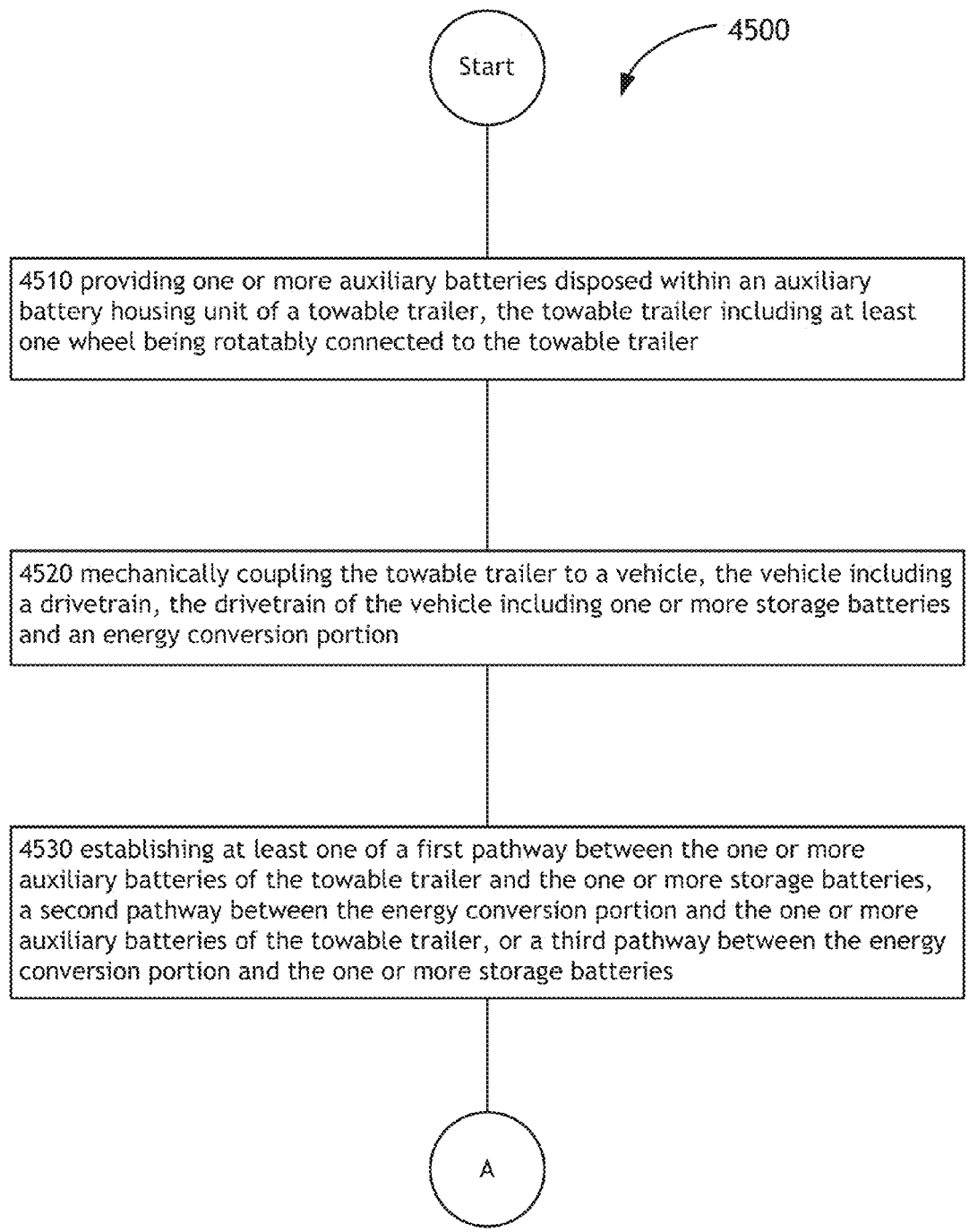
Figure 51B:
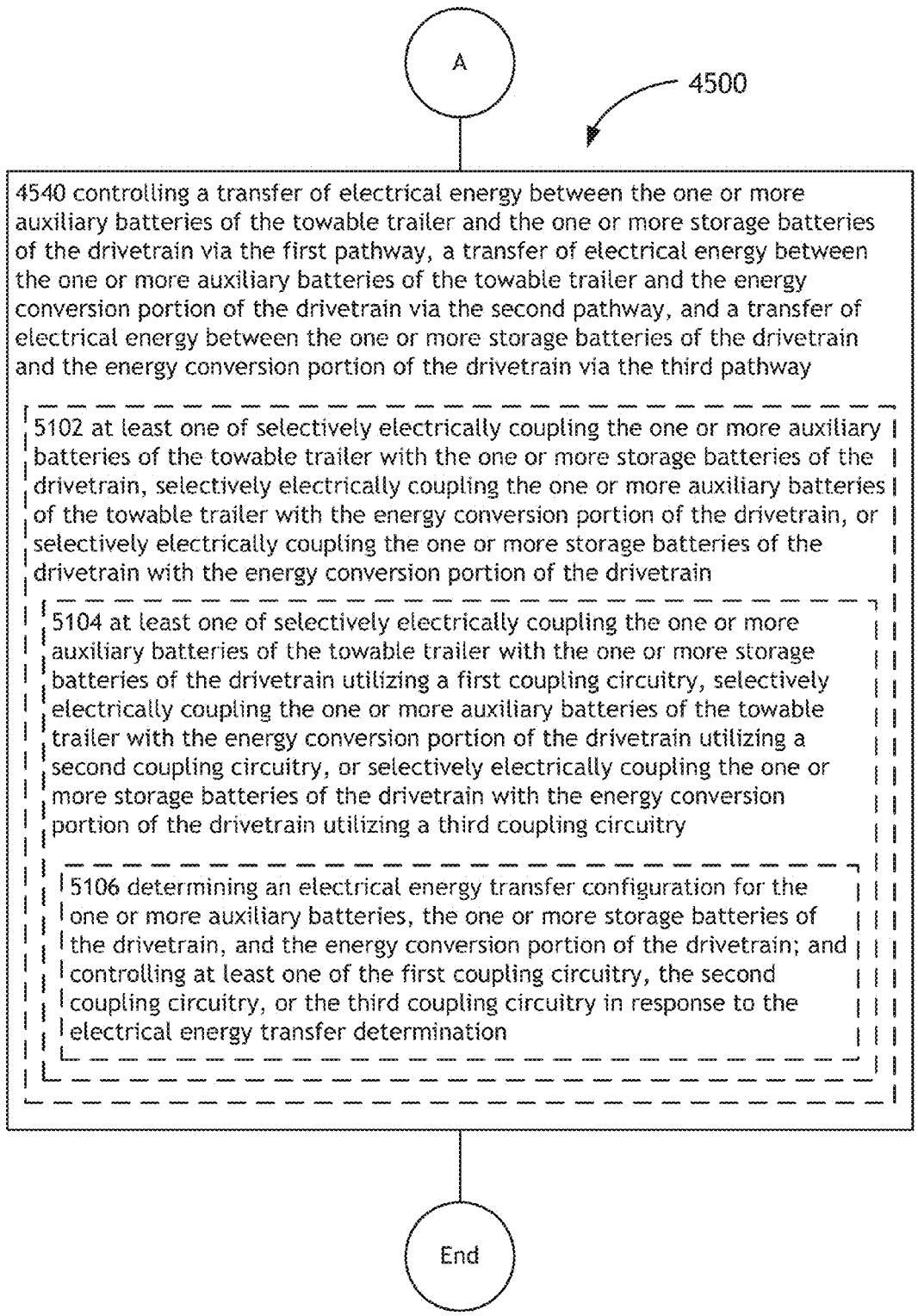

FIGS. 51A and 51B illustrate alternative embodiments of the example operational flow 4500 of FIG. 45. FIGS. 51A and 51B illustrate example embodiments where the controlling operation 4540 may include at least one additional operation. Additional operations may include an operation 5102, an operation 5104 and/or operation 5106.

The operation 5102 illustrates selectively electrically coupling the one or more auxiliary batteries of the towable trailer with the one or more storage batteries of the drivetrain, selectively electrically coupling the one or more auxiliary batteries of the towable trailer with the energy conversion portion of the drivetrain, or selectively electrically coupling the one or more storage batteries of the drivetrain with the energy conversion portion of the drivetrain. For example, as shown in FIGS. 1A through 4, the control system 402 of system 400 may be configured to at least one of (i) selectively electrically couple the one or more auxiliary batteries 106 of the towable trailer 102 with the one or more storage batteries 110 of the drivetrain 112, (ii) selectively electrically couple the one or more auxiliary batteries 106 of the towable trailer 102 and the energy conversion portion 122 of the drivetrain 112, or (iii) selectively electrically couple the one or more storage batteries 110 of the drivetrain 112 and the energy conversion portion 122 of the drivetrain 112.

Further, the operation 5104 illustrates selectively electrically coupling the one or more auxiliary batteries of the towable trailer with the one or more storage batteries of the drivetrain utilizing a first coupling circuitry, selectively electrically coupling the one or more auxiliary batteries of the towable trailer with the energy conversion portion of the drivetrain utilizing a second coupling circuitry, or selectively electrically coupling the one or more storage batteries of the drivetrain with the energy conversion portion of the drivetrain utilizing a third coupling circuitry. For example, as shown in FIGS. 1A through 4, the control system 402 of system 400 may be configured to at least one of (i) selectively electrically couple the one or more auxiliary batteries 106 of the towable trailer 102 with the one or more storage batteries 110 of the drivetrain 112 using first coupling circuitry 404, (ii) selectively electrically couple the one or more auxiliary batteries 106 of the towable trailer 102 and the energy conversion portion 122 of the drivetrain 112 using second coupling circuitry 406, or (iii) selectively electrically couple the one or more storage batteries 110 of the drivetrain 112 and the energy conversion portion 122 of the drivetrain 112 using third coupling circuitry 408. Further, it is recognized that the first coupling circuitry 404, the second coupling circuitry 406, of the third coupling circuitry 408 may comprise any switching circuitry know in the art (see switching circuitry described in FIG. 2C of the present disclosure). It is further contemplated that the control system 402 may be configured to operate the coupling circuitries 404, 406, and 408 described above independently or conjunctively. In this regard, control system 116 may be used to control the flow of charge along the pathways 404, 406, and 408 using the coupling circuitries 410, 414, and 412 respectively. For instance, the control system 116 may control a single pathway (e.g., 404) using a single coupling circuitry (e.g., 404). Alternatively, the control system 116 may simultaneously control two or more pathways (e.g., two or more of 404, 406, and 408) using two or more coupling circuitries (e.g., two or more of 410, 414, and 412).

Further, the operation 5106 illustrates determining an electrical energy transfer configuration for the one or more auxiliary batteries, the one or more storage batteries of the drivetrain, and the energy conversion portion of the drivetrain; and controlling at least one of the first coupling circuitry, the second coupling circuitry, or the third coupling circuitry in response to the electrical energy transfer determination. For example, as shown in FIGS. 1A through 4, a determination module of the control system 402 may determine an energy transfer configuration (i.e., a coupling circuitry configuration) utilizing one or more received signals from the receiving module of the control system 402. Upon receiving a signal indicative of a generated coupling circuitry configuration result from the determination module, the transfer control module of the control system 402 may in turn transmit one or more of the control signals 403, 405, and 407 to the coupling control circuitries 404, 406, and 408 respectively in order to control the coupling states (e.g., OPEN circuit or CLOSED circuit) of each of the coupling circuitries 404, 406, and 408.

FIG. 52 illustrates alternative embodiments of the example operational flow 4500 of FIG. 45. FIG. 52 illustrates example embodiments where the controlling operation 4540 may include at least one additional operation. Additional operations may include an operation 5202 and/or operation 5204.

The operation 5202 illustrates maintaining a charge state of the one or more storage batteries of the vehicle above a preselected charge level. For example, as shown in FIGS. 1A through 4, the control system 402 may control the coupling circuitries 404, 406, and/or 408 such that the electric charge of the one or more storage batteries 110 is maintained above a preselected charge level.

Further, the operation 5204 illustrates maintaining a charge state of the one or more storage batteries of the vehicle above a preselected charge level, wherein the preselected charge level is larger than a damage-causing charge level of the one or more storage batteries. For example, as shown in FIGS. 1A through 4, the control system 402 may control the coupling circuitries 404, 406, and/or 408 such that the electric charge of the one or more storage batteries 110 is maintained above a damage-causing charge level.

Figure 53:
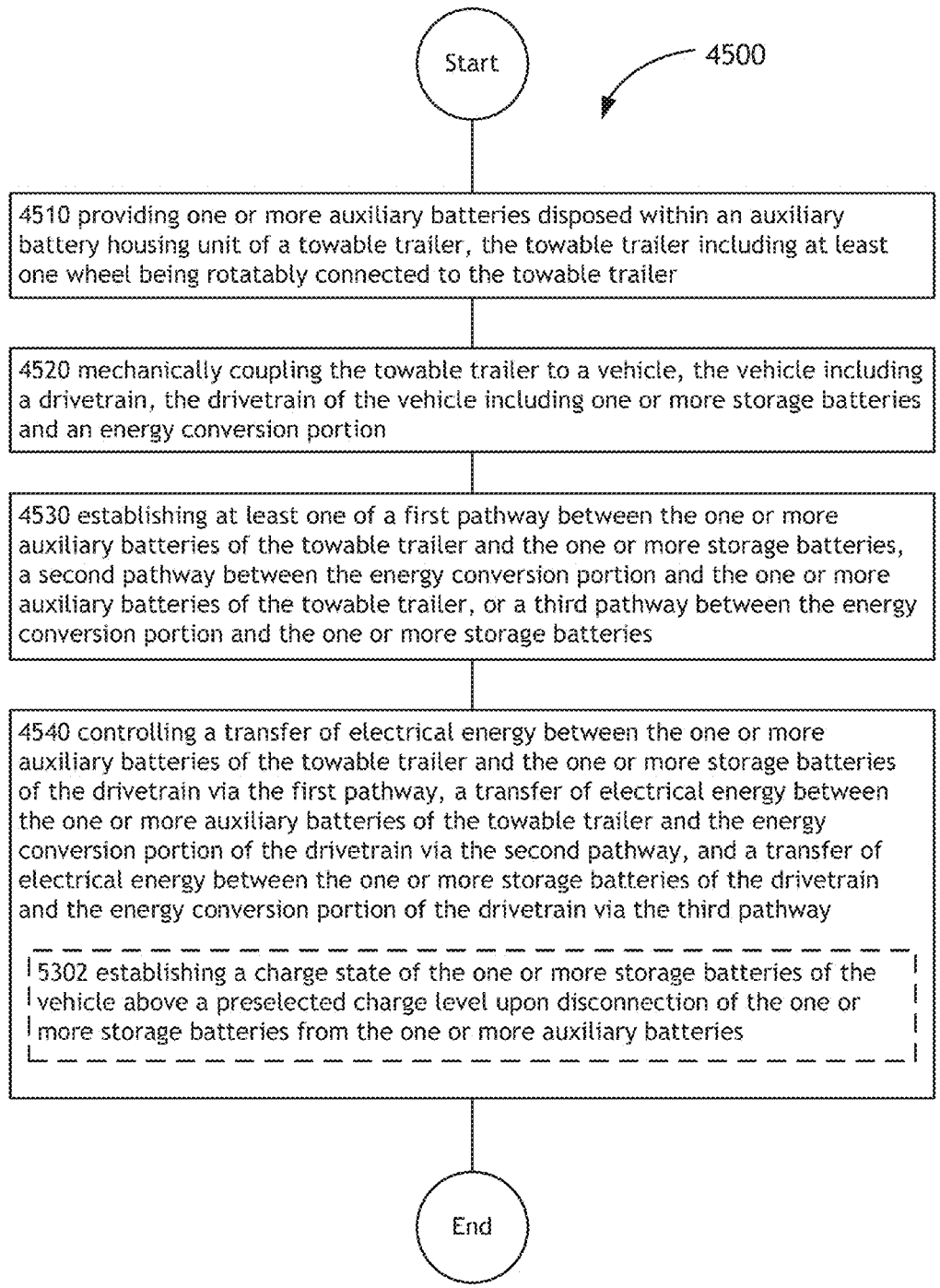

FIG. 53 illustrates alternative embodiments of the example operational flow 4500 of FIG. 45. FIG. 53 illustrates example embodiments where the controlling operation 4540 may include at least one additional operation. Additional operations may include an operation 5302.

The operation 5302 illustrates establishing a charge state of the one or more storage batteries of the vehicle above a preselected charge level upon disconnection of the one or more storage batteries from the one or more auxiliary batteries. For example, as shown in FIGS. 1A through 4, the control system 402 may control the coupling circuitries 404, 406, and/or 408 in order to establish a charge state of the one or more storage batteries of the vehicle above a preselected charge level upon disconnection of the one or more storage batteries 110 from the one or more auxiliary batteries 106. In this regard, the control system 402 may be utilized in order to achieve a minimum charge state in the one or more storage batteries 110 of the vehicle required for driving the vehicle 104 for a selected distance (e.g., selectable via a user input device 224) upon disconnection of the one or more storage batteries 110 from the one or more auxiliary batteries 106.

Figure 54:
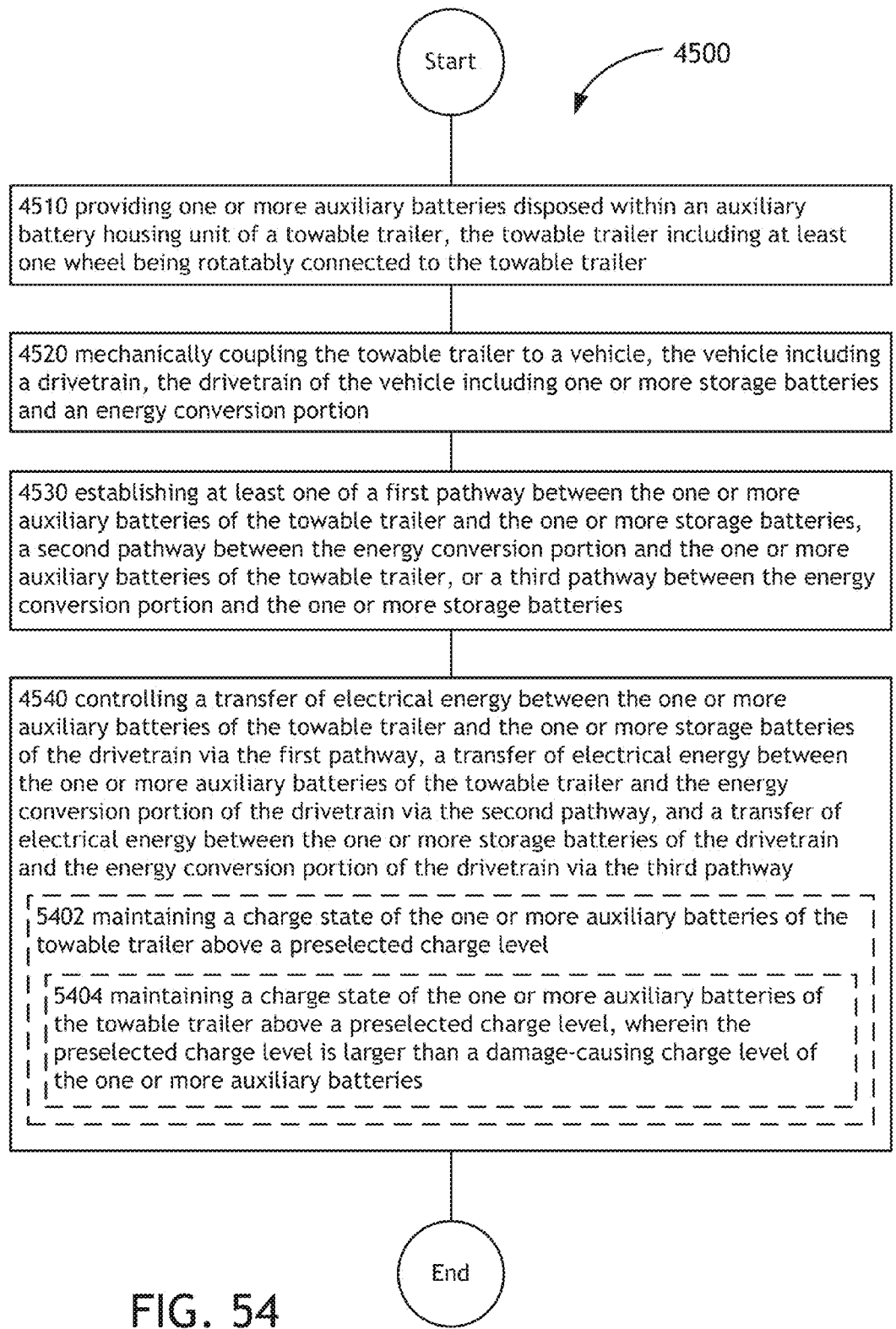

FIG. 54 illustrates alternative embodiments of the example operational flow 4500 of FIG. 45. FIG. 54 illustrates example embodiments where the controlling operation 4540 may include at least one additional operation. Additional operations may include an operation 5402 and/or operation 5404.

The operation 5204 illustrates maintaining a charge state of the one or more auxiliary batteries of the vehicle above a preselected charge level. For example, as shown in FIGS. 1A through 4, the control system 402 may control the coupling circuitries 404, 406, and/or 408 such that the electric charge of the one or more auxiliary batteries 106 is maintained above a preselected charge level.

Further, the operation 5204 illustrates maintaining a charge state of the one or more auxiliary batteries of the vehicle above a preselected charge level, wherein the preselected charge level is larger than a damage-causing charge level of the one or more auxiliary batteries. For example, as shown in FIGS. 1A through 4, the control system 402 may control the coupling circuitries 404, 406, and/or 408 such that the electric charge of the one or more auxiliary batteries 106 is maintained above a damage-causing charge level.

Figure 55:
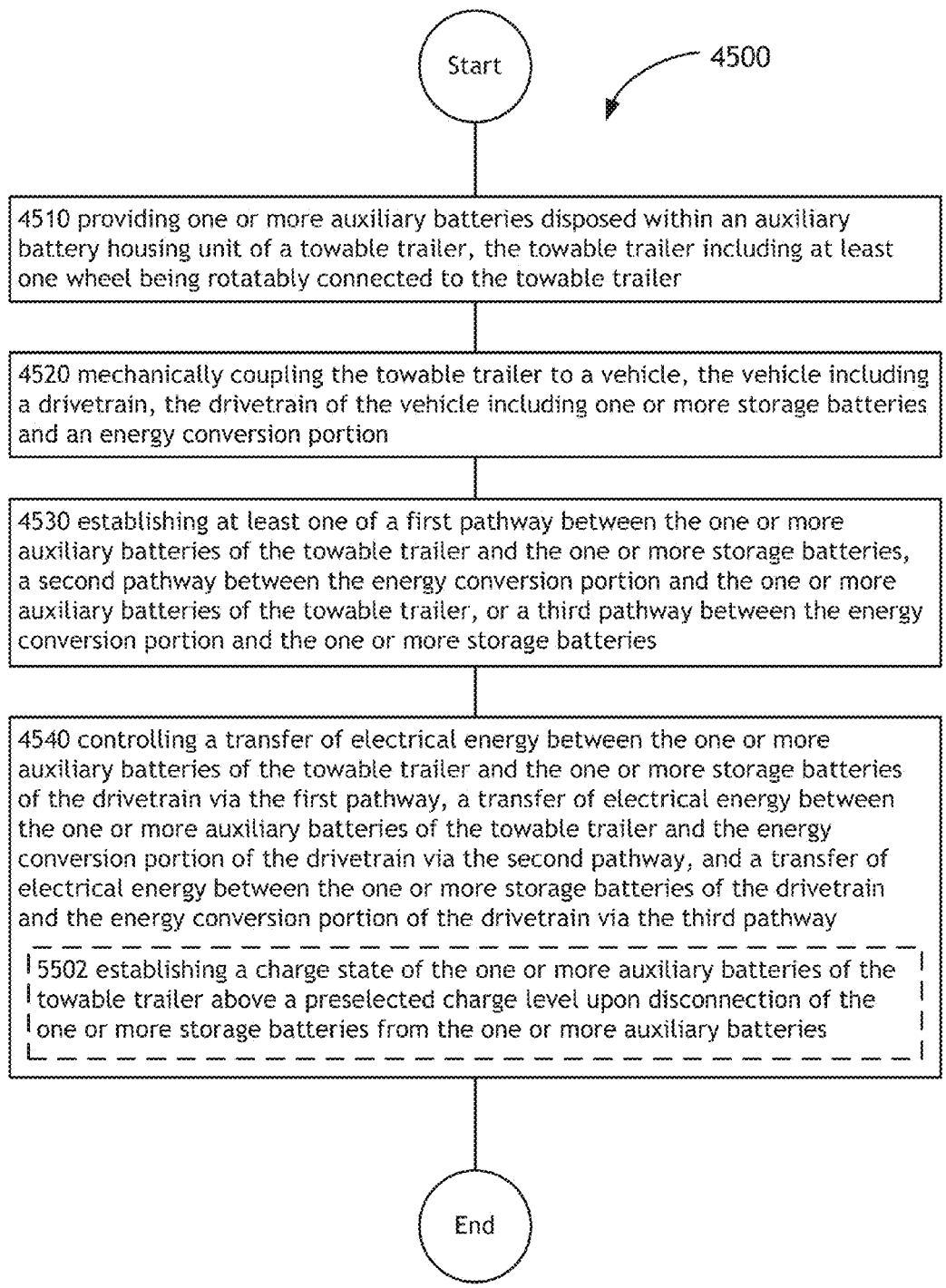

FIG. 55 illustrates alternative embodiments of the example operational flow 4500 of FIG. 45. FIG. 55 illustrates example embodiments where the controlling operation 4540 may include at least one additional operation. Additional operations may include an operation 5502.

The operation 5502 illustrates establishing a charge state of the one or more auxiliary batteries of the towable trailer above a preselected charge level upon disconnection of a portion of the drivetrain of the vehicle from the one or more auxiliary batteries. For example, as shown in FIGS. 1A through 4, the control system 402 may control the coupling circuitries 404, 406, and/or 408 in order to establish a charge state of the one or more auxiliary batteries of the towable trailer above a preselected charge level upon disconnection of a portion (e.g., the one or more storage batteries 110, the power conversion circuitry 126, or the electric motor/generator 124) of the drivetrain 122 of the vehicle from the one or more auxiliary batteries 106. In this regard, the control system 402 may be utilized in order to achieve a minimum charge state in the one or more auxiliary batteries 106 of the trailer 102 upon disconnection of a portion of the drivetrain of the vehicle from the one or more auxiliary batteries 106. For instance, a user may desire to return a rented trailer 102 to a vendor such that the charge state of the auxiliary batteries 106 of the trailer 102 is at or above a selected charge state (e.g., selectable via a user input device 224).

Figure 56A:
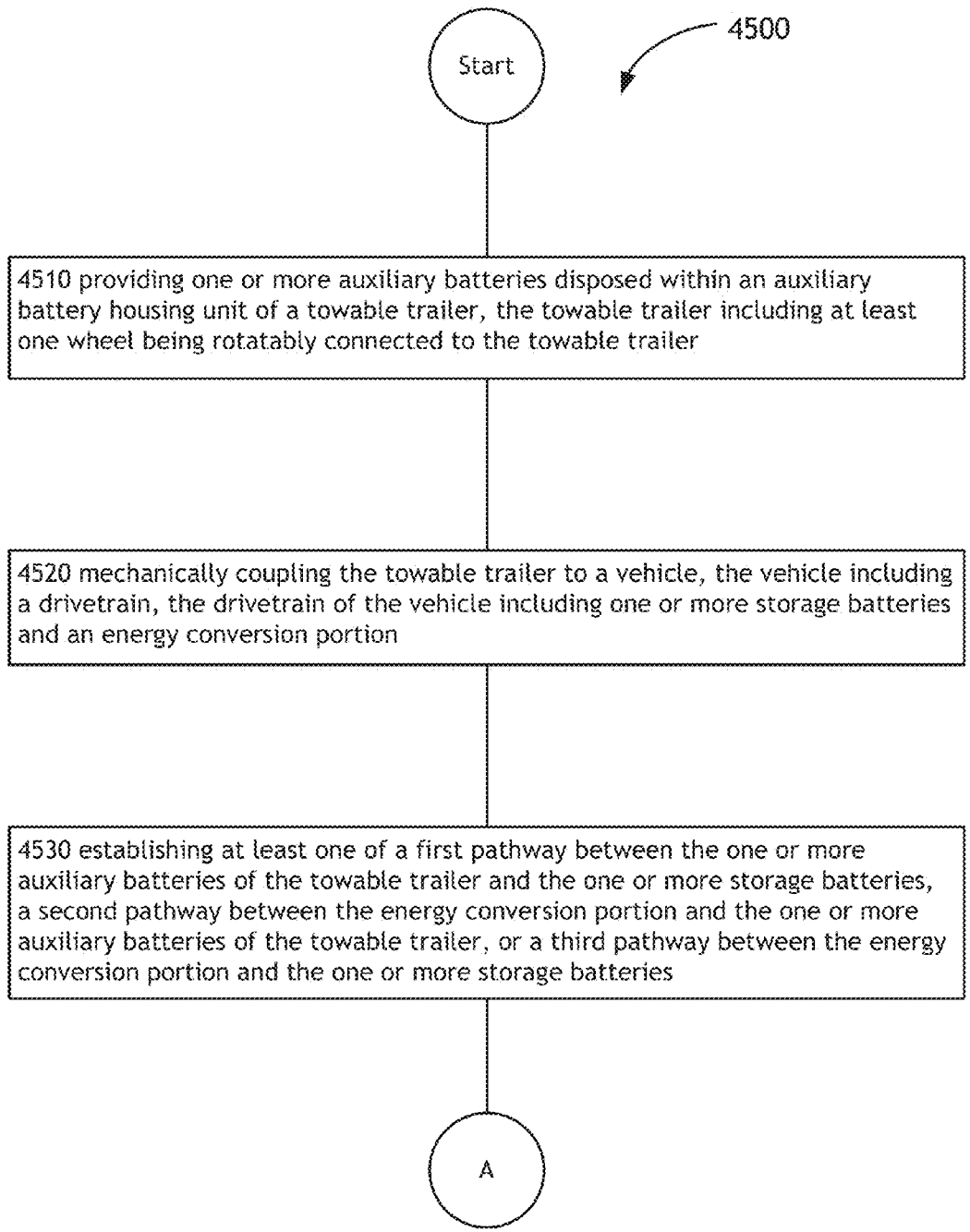
Figure 56B:
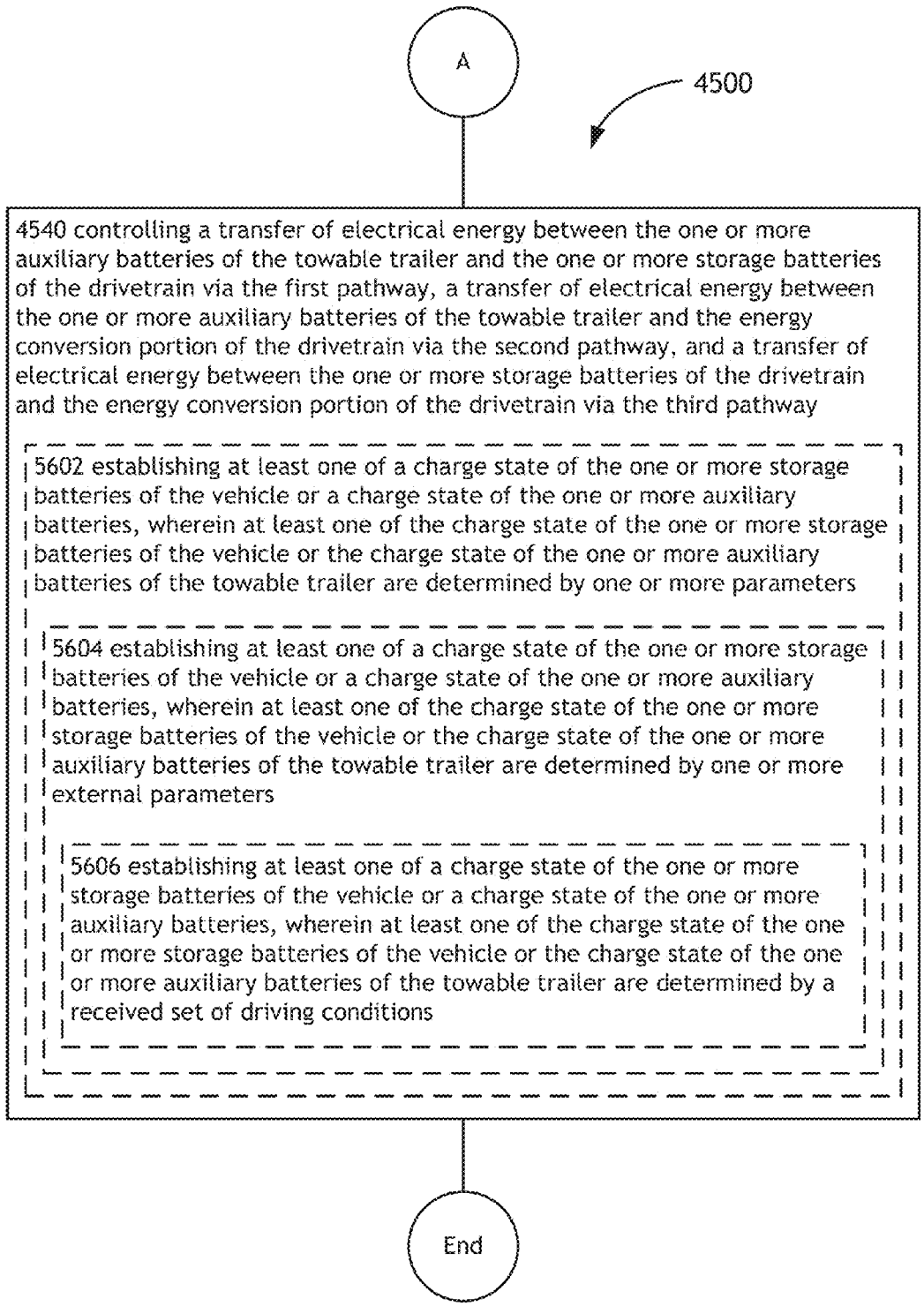

FIGS. 56A and 56B illustrate alternative embodiments of the example operational flow 4500 of FIG. 45. FIGS. 56A and 56B illustrate example embodiments where the controlling operation 4540 may include at least one additional operation. Additional operations may include an operation 5602, an operation 5604, and/or an operation 5606.

The operation 5602 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by one or more parameters. For example, as shown in FIGS. 1A through 4, the control system 402 may control the coupling circuitries 404, 406, and/or 408 in order to establish a charge state of the one or more auxiliary batteries 106 and a charge state of the one or more storage batteries 110 determined by the control system 402 utilizing one or more parameters (e.g., internal parameters or external parameters).

Further, the operation 5604 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by one or more external parameters. For example, as shown in FIGS. 1A through 4, the control system 402 may control the coupling circuitries 404, 406, and/or 408 in order to establish a charge state of the one or more auxiliary batteries 106 and a charge state of the one or more storage batteries 110 determined by the control system 402 utilizing one or more external parameters.

Further, the operation 5606 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by a received set of driving conditions. For example, as shown in FIGS. 1A through 4, the control system 402 may control the coupling circuitries 404, 406, and/or 408 in order to establish a charge state of the one or more auxiliary batteries 106 and a charge state of the one or more storage batteries 110 determined by the control system 402 utilizing a received set of driving conditions (e.g., road conditions received from a road condition service or weather information received from a weather service via a wireless internet signal).

Figure 57A:
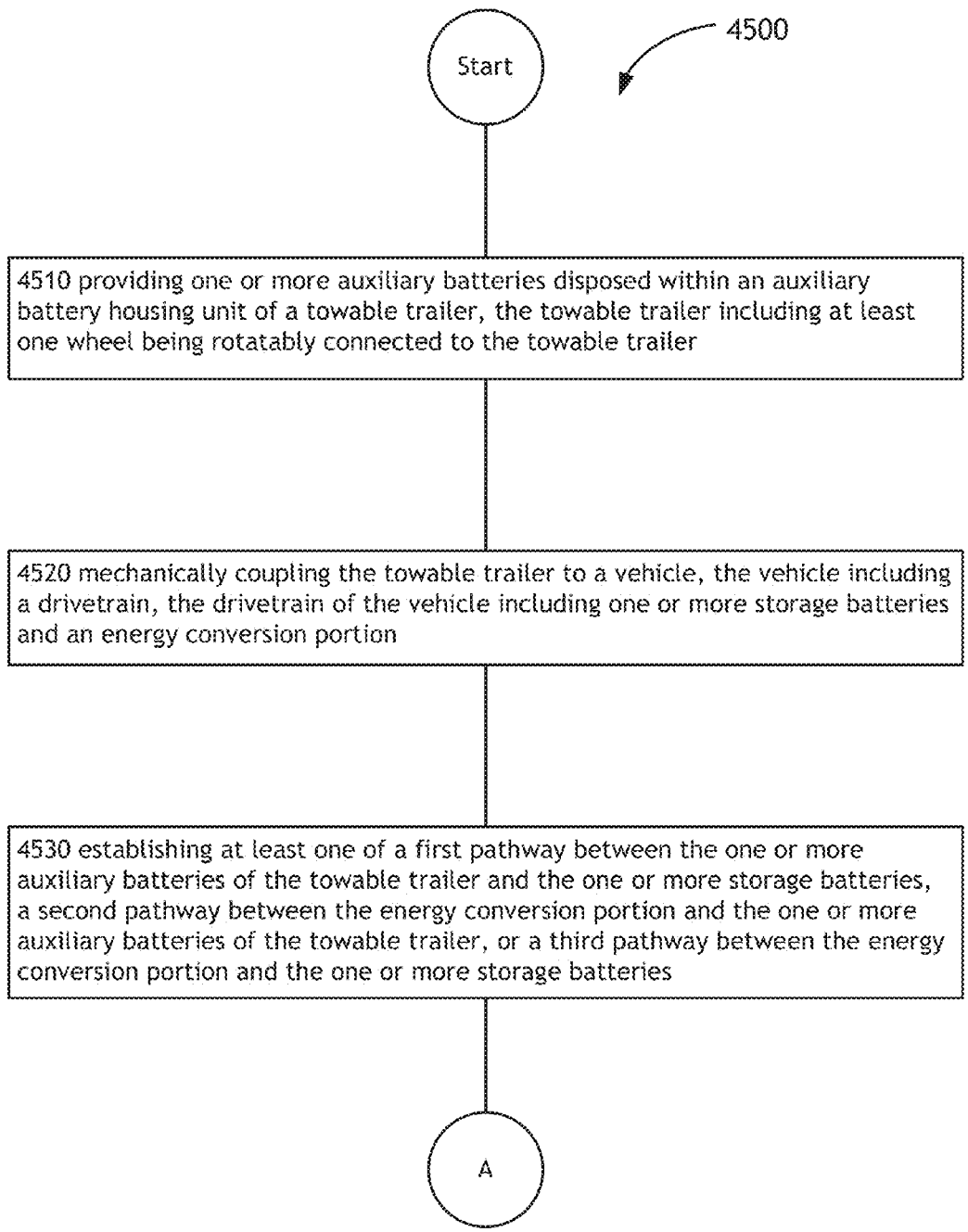
Figure 57B:
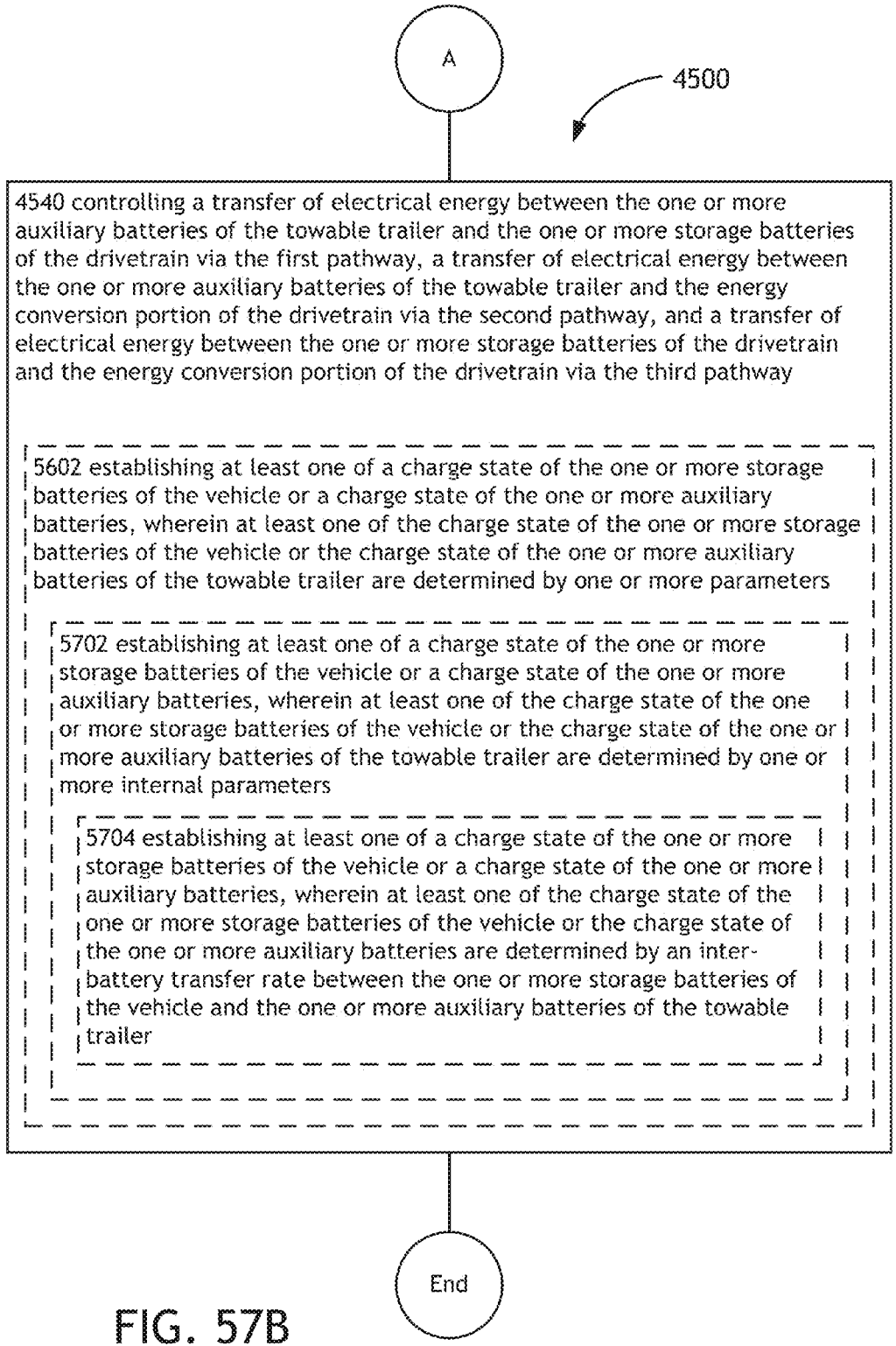

FIGS. 57A and 57B illustrate alternative embodiments of the example operational flow 4500 of FIG. 45. FIGS. 57A and 57B illustrate example embodiments where the controlling operation 4540 may include at least one additional operation. Additional operations may include an operation 5702, and/or an operation 5704.

The operation 5702 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by one or more internal parameters. For example, as shown in FIGS. 1A through 4, the control system 402 may control the coupling circuitries 404, 406, and/or 408 in order to establish a charge state of the one or more auxiliary batteries 106 and a charge state of the one or more storage batteries 110 determined by the control system 402 utilizing one or more internal parameters.

Further, the operation 5704 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by an inter-battery transfer rate between the one or more storage batteries of the vehicle and the one or more rechargeable auxiliary batteries of the towable trailer. For example, as shown in FIGS. 1A through 4, the control system 402 may control the coupling circuitries 404, 406, and/or 408 in order to establish a charge state of the one or more auxiliary batteries 106 and a charge state of the one or more storage batteries 110 determined by the control system 402 utilizing an inter-battery transfer rate (measured by the battery monitoring system 236) between the one or more storage batteries 110 of the vehicle 104 and the one or more auxiliary batteries 106 of the towable trailer 102.

Figure 58A:
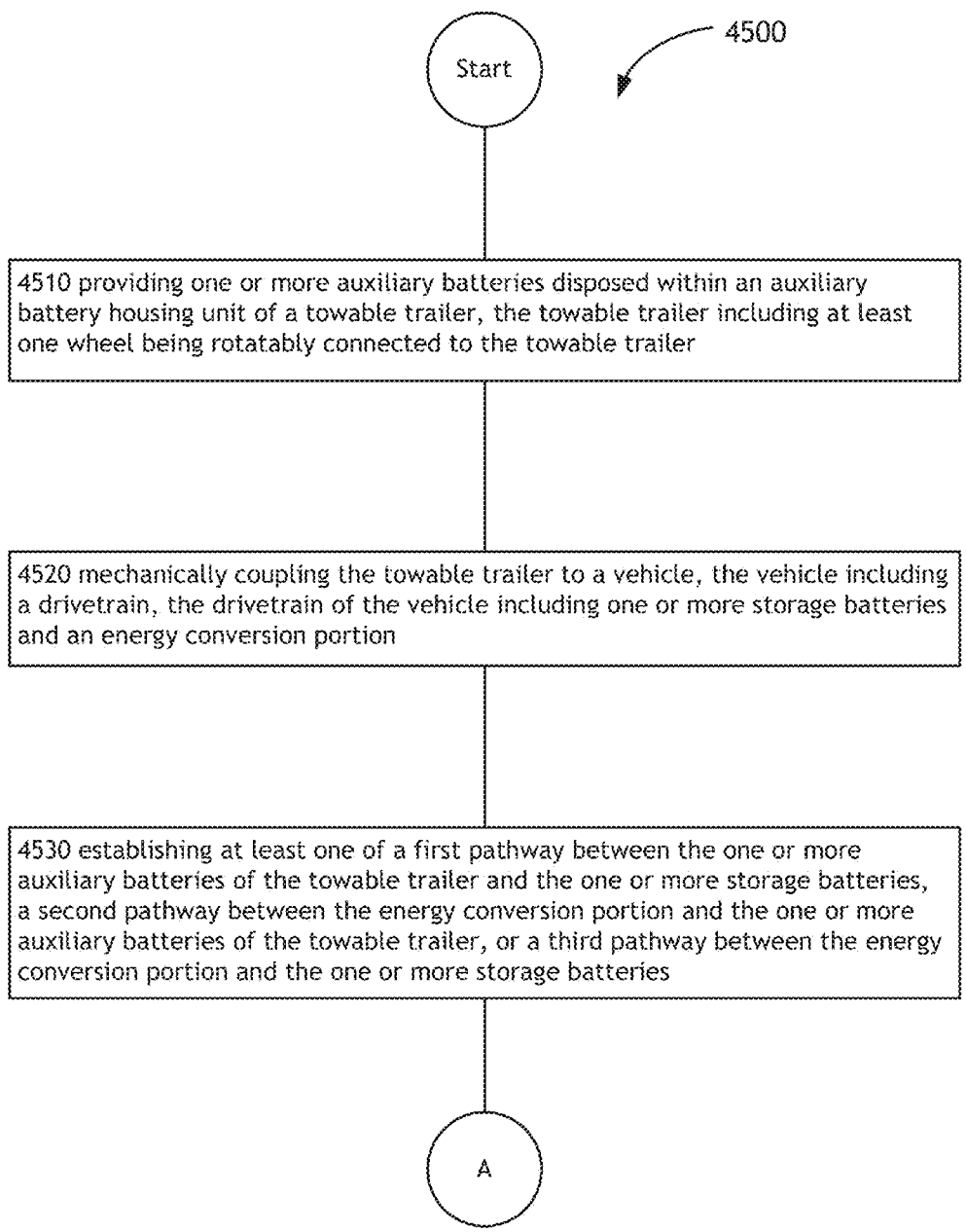
Figure 58B:
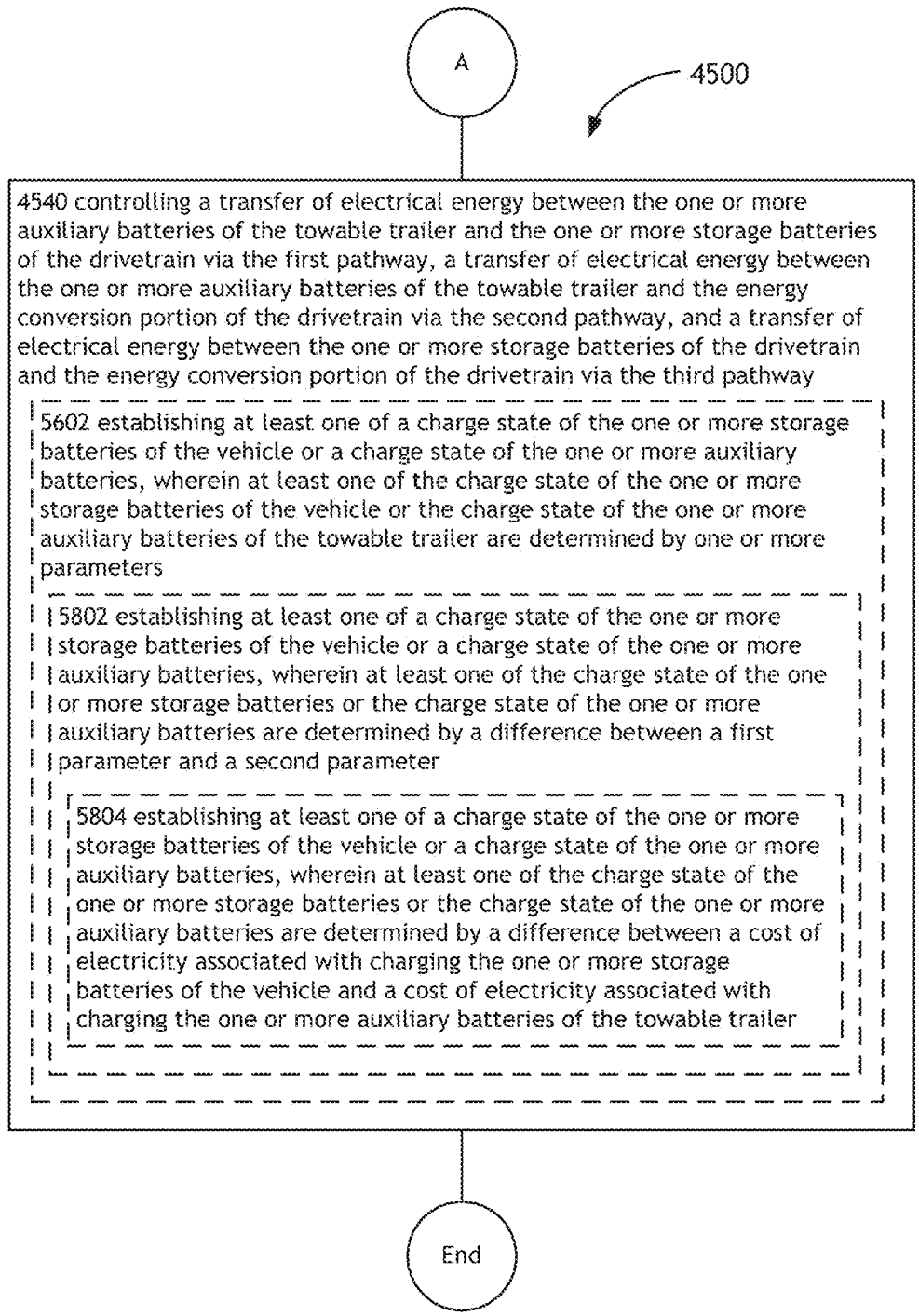

FIGS. 58A and 58B illustrate alternative embodiments of the example operational flow 4500 of FIG. 45. FIGS. 58A and 58B illustrate example embodiments where the controlling operation 4540 may include at least one additional operation. Additional operations may include an operation 5802, and/or an operation 5804.

The operation 5802 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by a difference between a first parameter and a second parameter. For example, as shown in FIGS. 1A through 4, the control system 402 may control the coupling circuitries 404, 406, and/or 408 in order to establish a charge state of the one or more auxiliary batteries 106 and a charge state of the one or more storage batteries 110 determined by a difference between a first parameter and a second parameter.

Further, the operation 5804 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by a difference between a cost of electricity associated with charging the one or more storage batteries of the vehicle and a cost of electricity associated with charging the one or more auxiliary batteries of the towable trailer. For example, as shown in FIGS. 1A through 4, the control system 402 may control the coupling circuitries 404, 406, and/or 408 in order to establish a charge state of the one or more auxiliary batteries 106 and a charge state of the one or more storage batteries 110 determined by a difference between a cost of electricity associated with charging the one or more storage batteries 110 of the vehicle 104 and a cost of electricity associated with charging the one or more auxiliary batteries 106 of the towable trailer 102.

Figure 59A:
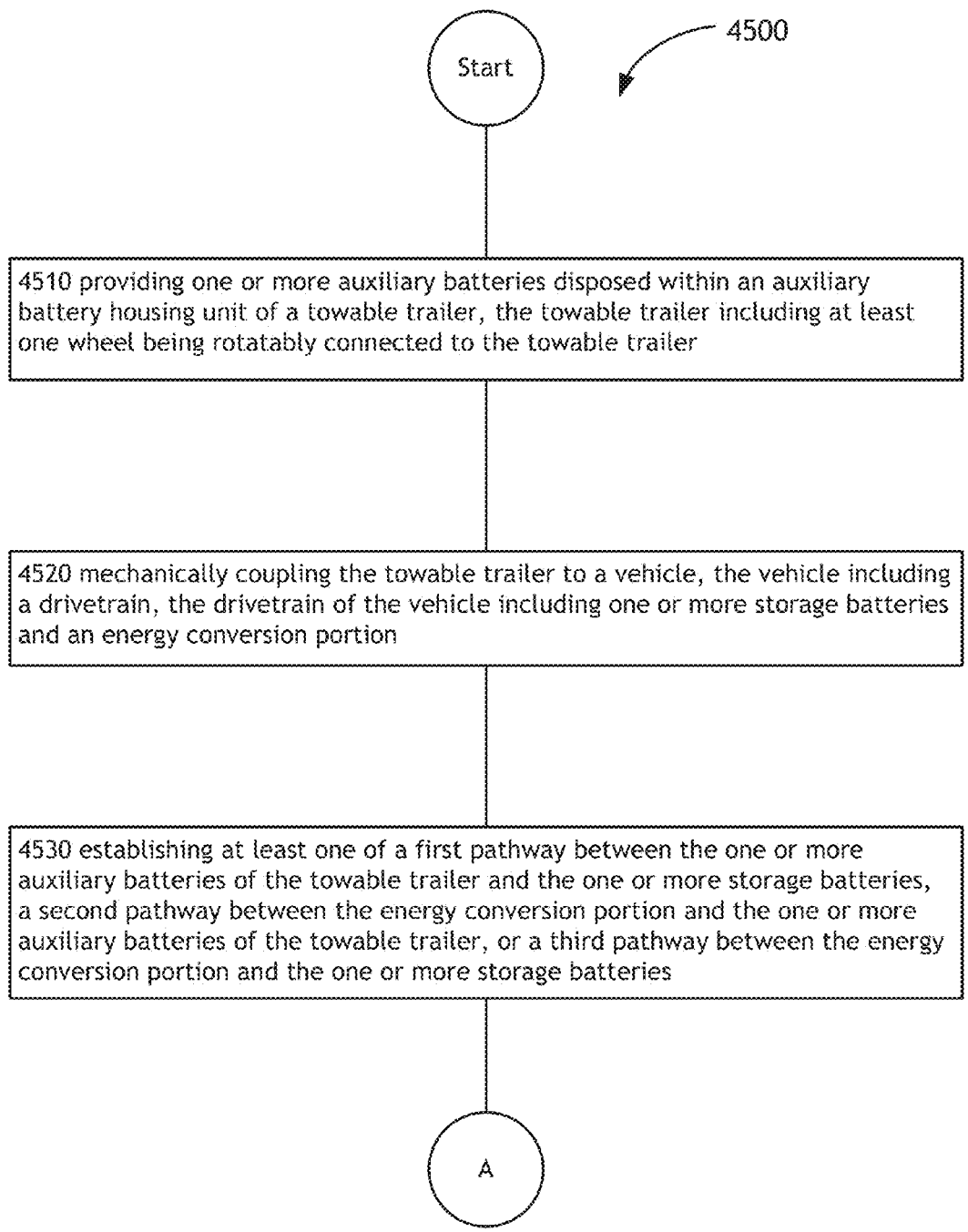
Figure 59B:
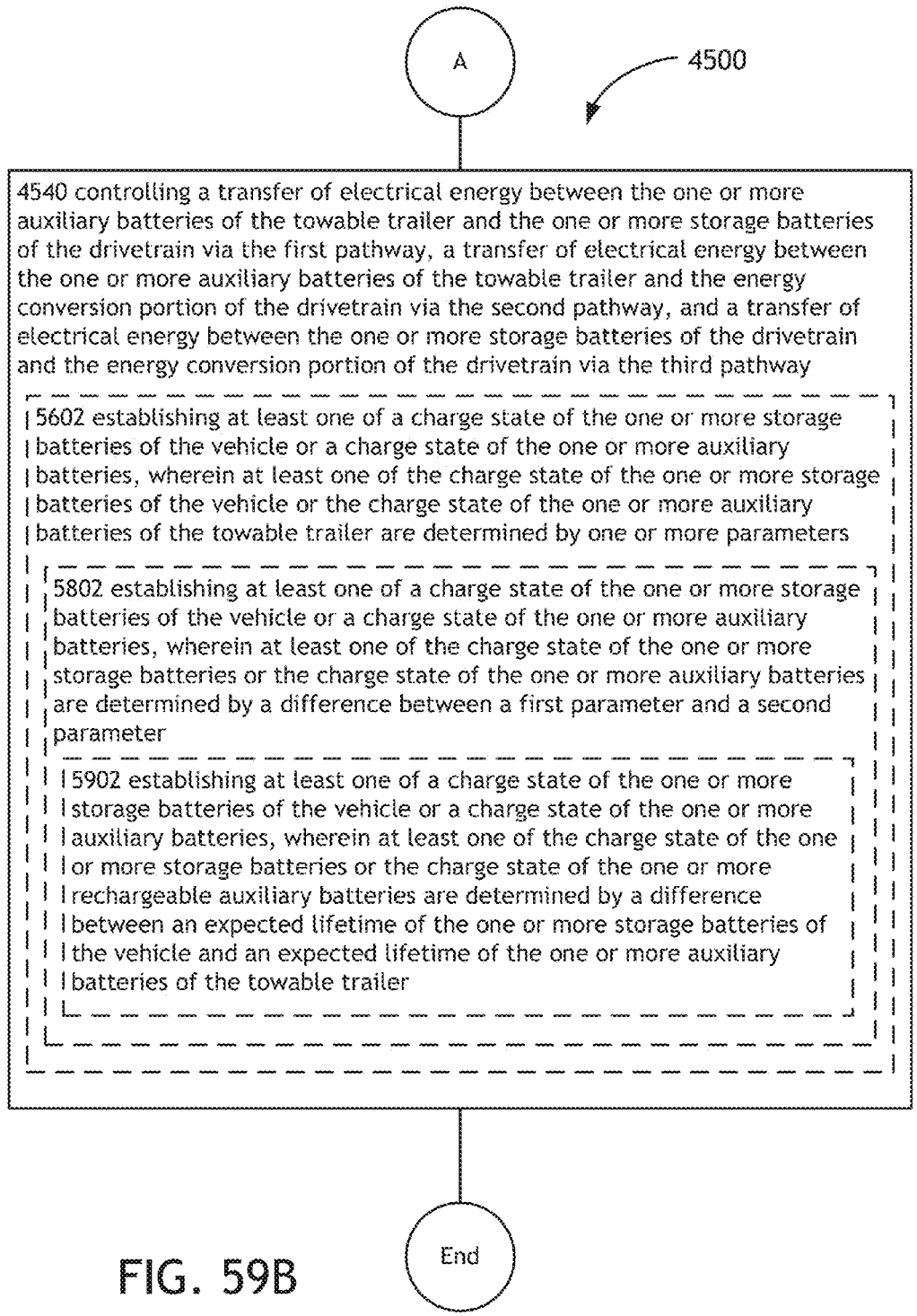

FIGS. 59A and 59B illustrate alternative embodiments of the example operational flow 4500 of FIG. 45. FIGS. 59A and 59B illustrate example embodiments where the controlling operation 4540 may include at least one additional operation. Additional operations may include an operation 5902.

Further, the operation 5902 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by a difference between an expected lifetime of the one or more storage batteries of the vehicle and an expected lifetime of the one or more auxiliary batteries of the towable trailer. For example, as shown in FIGS. 1A through 4, the control system 402 may control the coupling circuitries 404, 406, and/or 408 in order to establish a charge state of the one or more auxiliary batteries 106 and a charge state of the one or more storage batteries 110 determined by a difference between an expected lifetime of the one or more storage batteries 110 of the vehicle 104 and an expected lifetime of the one or more auxiliary batteries 106 of the towable trailer 102.

Figure 60A:
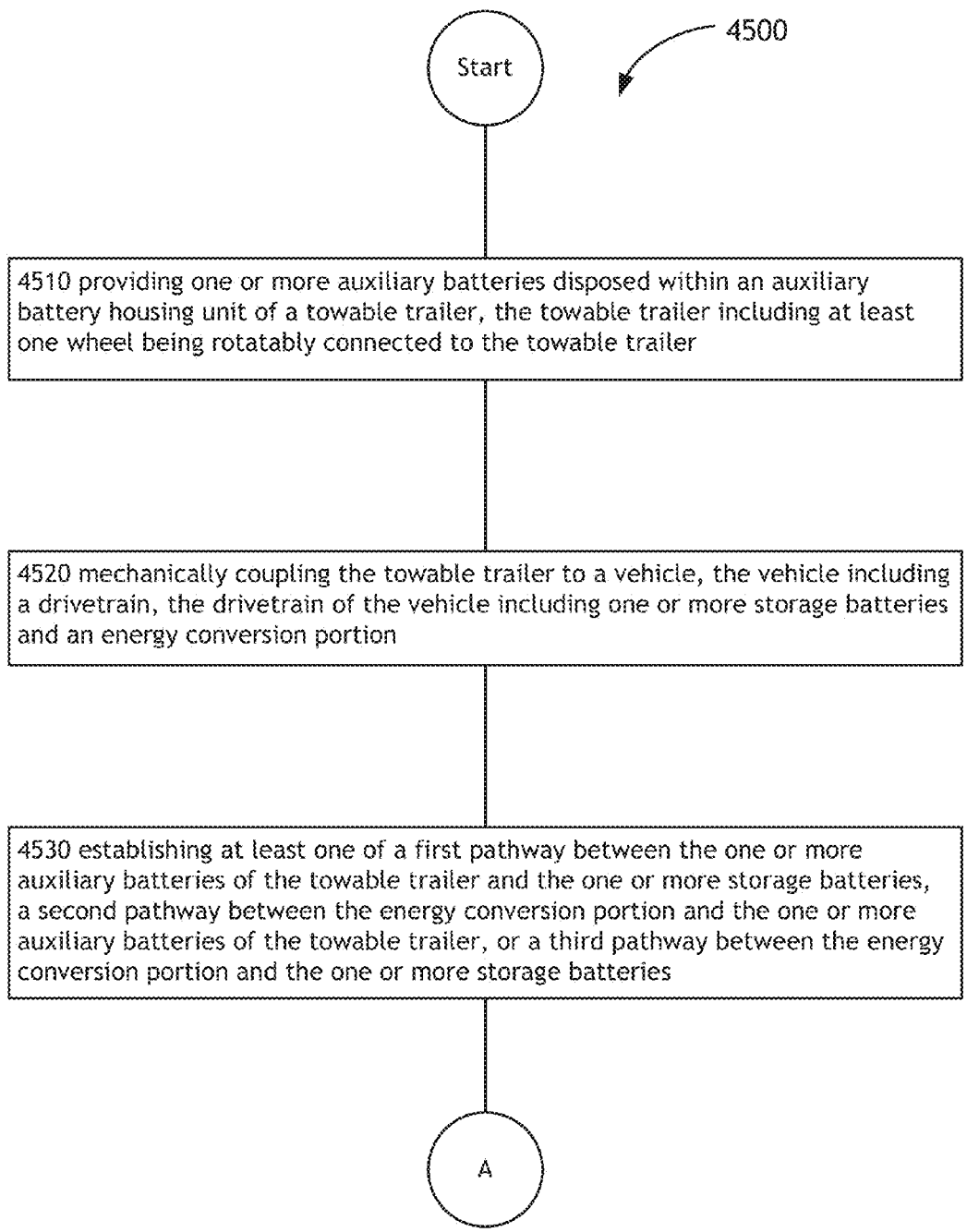

FIGS. 60A and 60B illustrate alternative embodiments of the example operational flow 4500 of FIG. 45. FIGS. 60A and 60B illustrate example embodiments where the controlling operation 4540 may include at least one additional operation. Additional operations may include an operation 6002.

Further, the operation 6002 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by a difference between a charging efficiency associated with the one or more storage batteries of the vehicle and a charging efficiency associated with the one or more rechargeable auxiliary batteries of the towable trailer. For example, as shown in FIGS. 1A through 4, the control system 402 may control the coupling circuitries 404, 406, and/or 408 in order to establish a charge state of the one or more auxiliary batteries 106 and a charge state of the one or more storage batteries 110 determined by a difference between a charging efficiency associated with the one or more storage batteries 110 of the vehicle 104 and a charging efficiency associated with the one or more auxiliary batteries of the towable trailer 102.

Figure 61A:
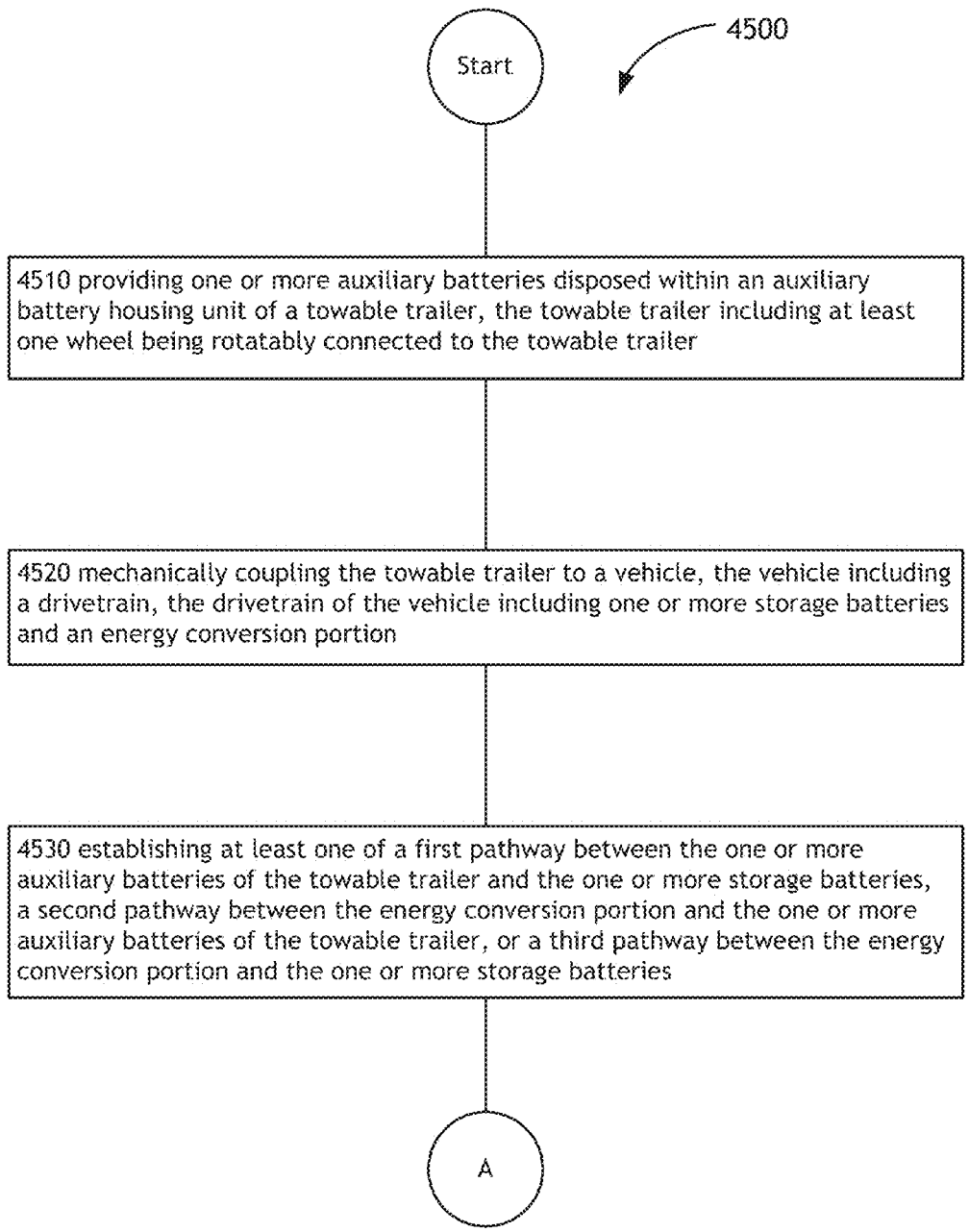

FIGS. 61A and 61B illustrate alternative embodiments of the example operational flow 4500 of FIG. 45. FIGS. 61A and 61B illustrate example embodiments where the controlling operation 4540 may include at least one additional operation. Additional operations may include an operation 6102.

Further, the operation 6102 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by a difference between a discharging efficiency associated with the one or more storage batteries of the vehicle and a discharging efficiency associated with the one or more auxiliary batteries of the towable trailer. For example, as shown in FIGS. 1A through 4, the control system 402 may control the coupling circuitries 404, 406, and/or 408 in order to establish a charge state of the one or more auxiliary batteries 106 and a charge state of the one or more storage batteries 110 determined by a difference between a discharging efficiency associated with the one or more storage batteries 110 of the vehicle 104 and a discharging efficiency associated with the one or more auxiliary batteries of the towable trailer 102.

Figure 62:
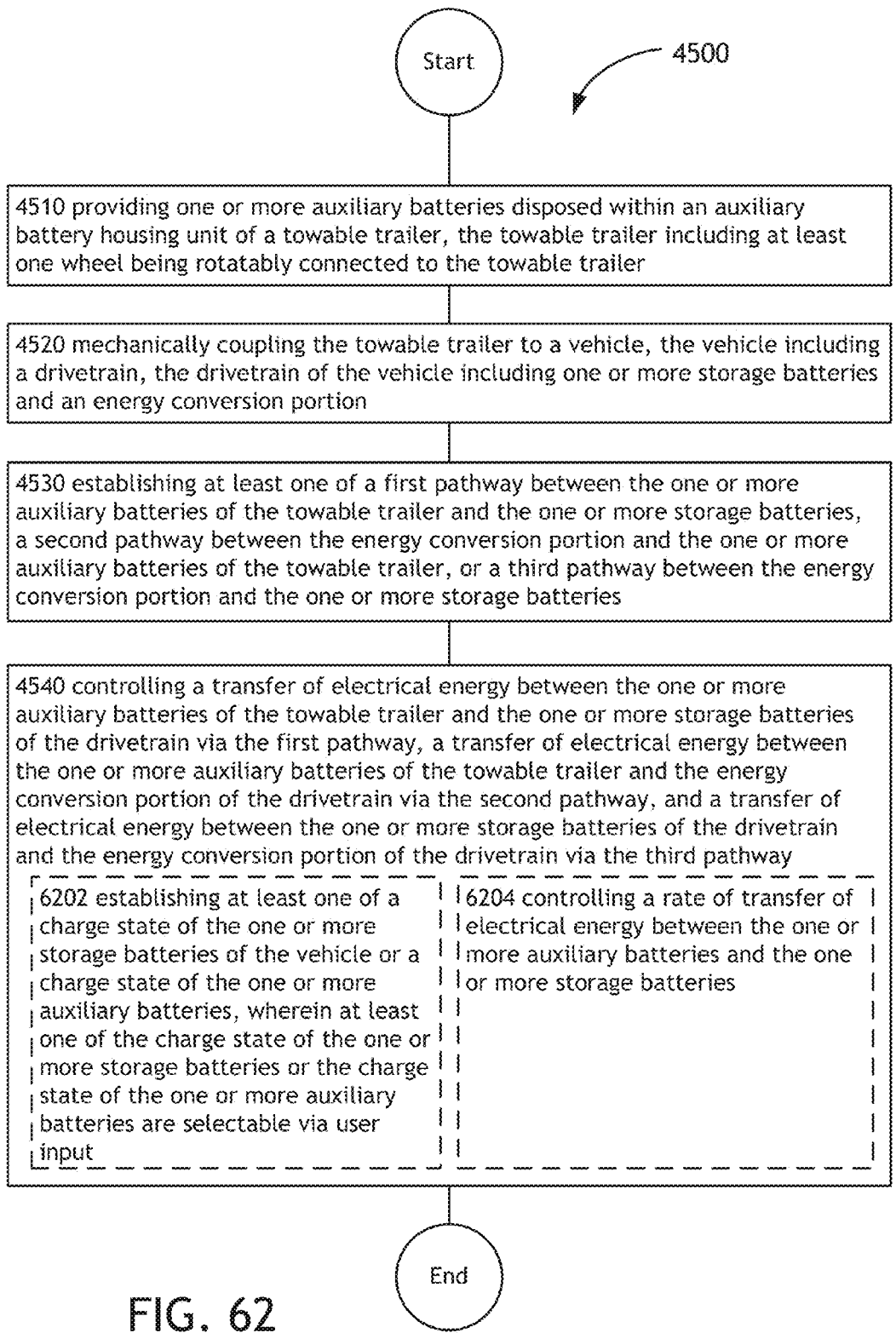

FIG. 62 illustrates alternative embodiments of the example operational flow 4500 of FIG. 45. FIG. 45 illustrates example embodiments where the controlling operation 4540 may include at least one additional operation. Additional operations may include an operation 6202, and/or an operation 6204.

The operation 6202 illustrates establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are selectable via user input. For example, as shown in FIGS. 1A through 4, the control system 402 may control the coupling circuitries 404, 406, and/or 408 in order to establish a charge state of the one or more auxiliary batteries 106 and a charge state of the one or more storage batteries 110 selected by a user via user interface device (e.g., mouse, touchscreen, keyboard, and the like).

Further, the operation 6204 illustrates controlling a rate of transfer of electrical energy between the one or more auxiliary batteries and a portion of the drivetrain of the vehicle. For example, as shown in FIGS. 1A through 4, the control system 402 may control the coupling circuitries 404, 406, and/or 408 in order to control the rate of transfer (e.g., rate of transfer required to avoid overheating) of electrical energy between the one or more auxiliary batteries 106 of the towable trailer 102 and the one or more storage batteries 110 of the vehicle 104.

Figure 63:
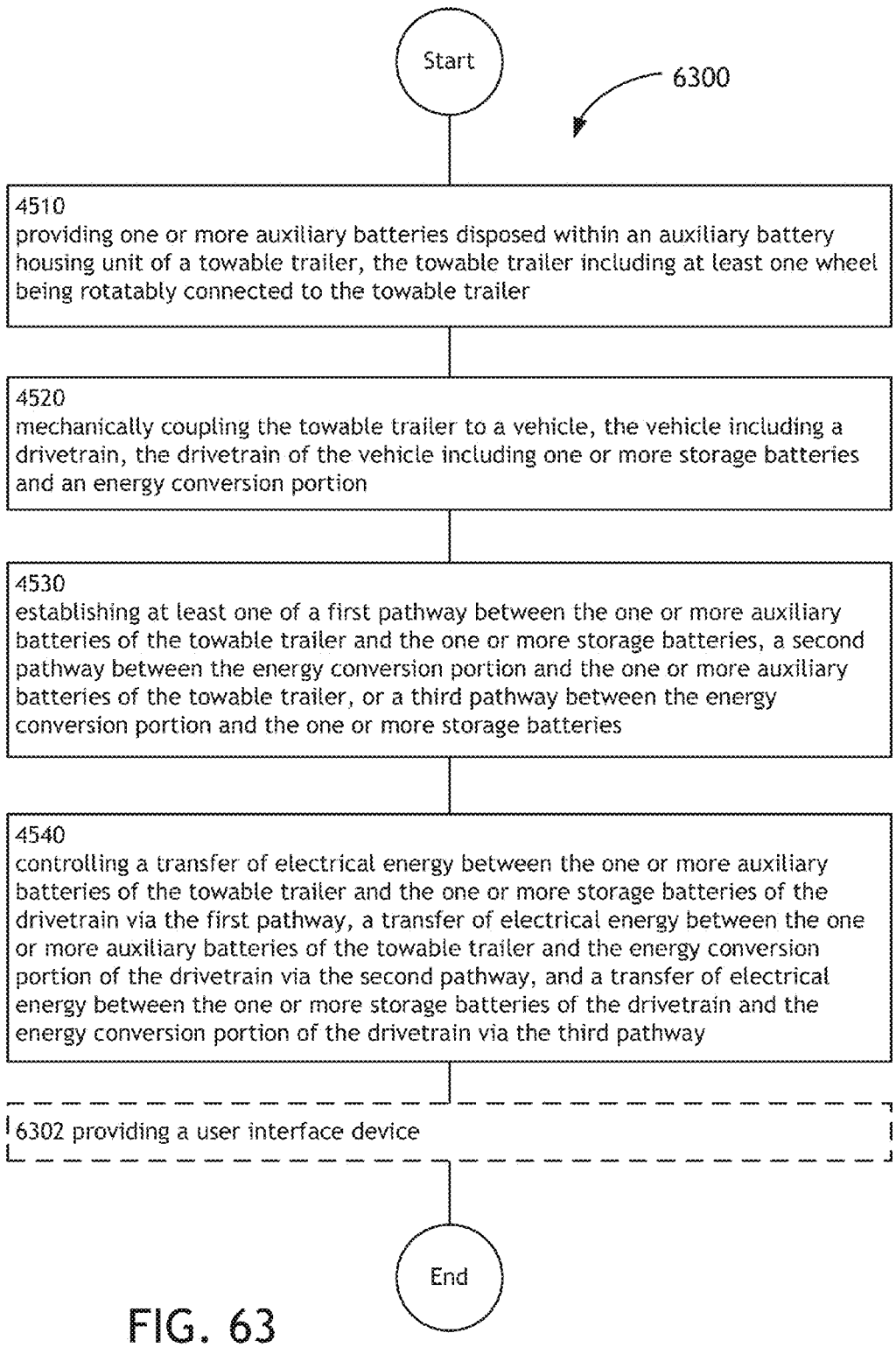

FIG. 63 illustrates an operational flow 6300 representing example operations related to supplying auxiliary electrical energy to an electric or hybrid vehicle. FIG. 63 illustrates an example embodiment where the example operational flow 4500 of FIG. 45 may include at least one additional operation. Additional operations may include a user interface providing operation 6302.

After a start operation, a providing operation 4510, a mechanically coupling operation 4520, a pathway establishing operation 4530, and a controlling operation 4540, the operation flow 6300 moves to user interface providing operation 6302.

The operation 6302 illustrates providing a user interface device. For example, as shown in FIGS. 1A through 4, a user interface 214 may be obtained. For instance, the user interface 214 may be disposed on or within the towable trailer 102. In another instance, the user interface 214 may be disposed within the vehicle 104. In another instance, the user interface 214 may be integrated into a remote communications device (e.g., smartphone or tablet).

Figure 64:
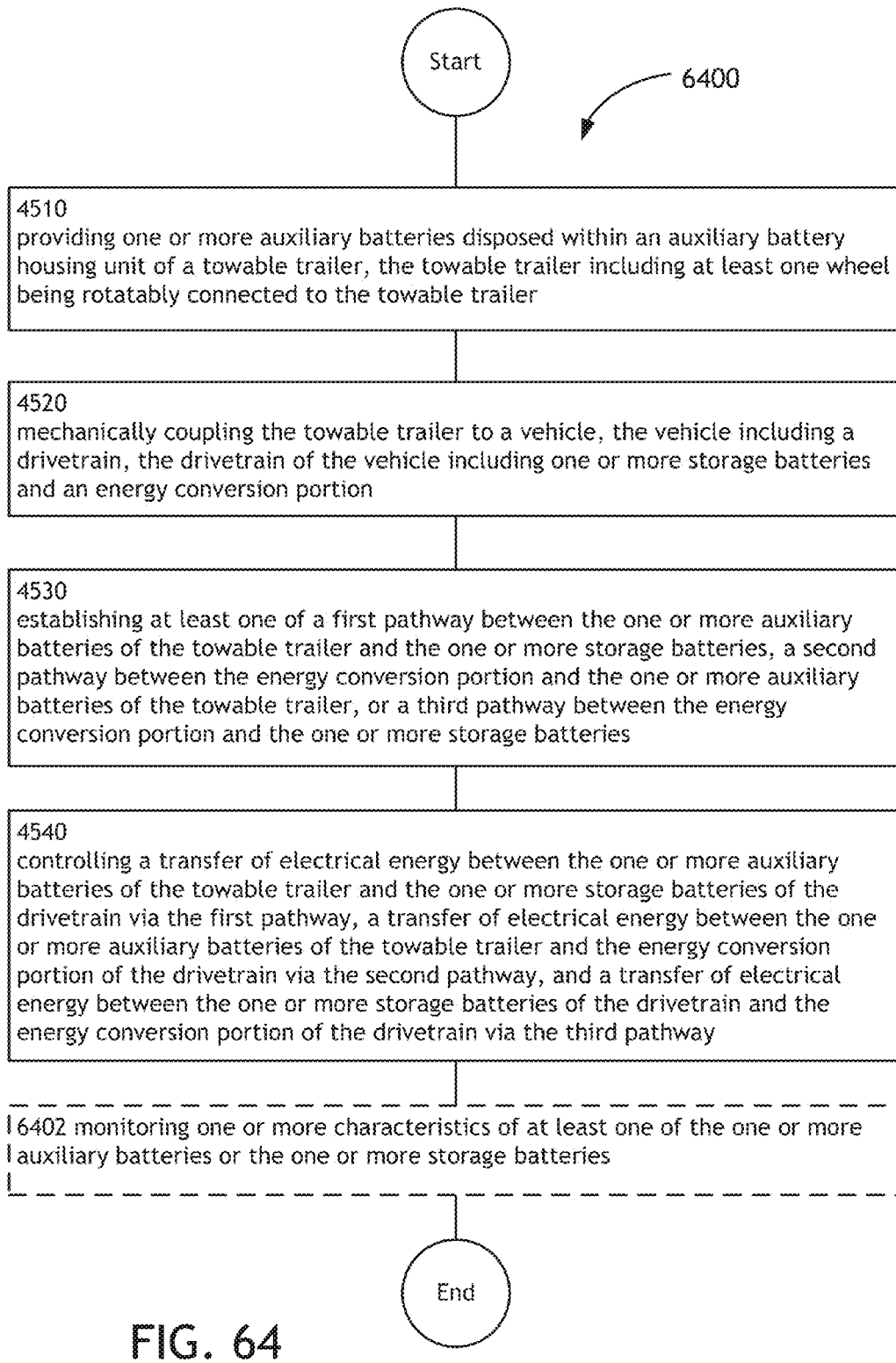

FIG. 64 illustrates an operational flow 6400 representing example operations related to supplying auxiliary electrical energy to an electric or hybrid vehicle. FIG. 64 illustrates an example embodiment where the example operational flow 4500 of FIG. 45 may include at least one additional operation. Additional operations may include a battery monitoring operation 6402.

After a start operation, a providing operation 4510, a mechanically coupling operation 4520, a pathway establishing operation 4530, and a controlling operation 4540, the operation flow 6400 moves to battery monitoring operation 6402.

The operation 6402 illustrates monitoring one or more characteristics of at least one of the one or more auxiliary batteries or the one or more storage batteries. For example, as shown in FIGS. 1A through 4, a battery monitoring system 236 (e.g., state of charge monitoring system) may be utilized to monitor one or more characteristics of at least one or more auxiliary batteries 106 or the one or more storage batteries 110.

Figure 65:
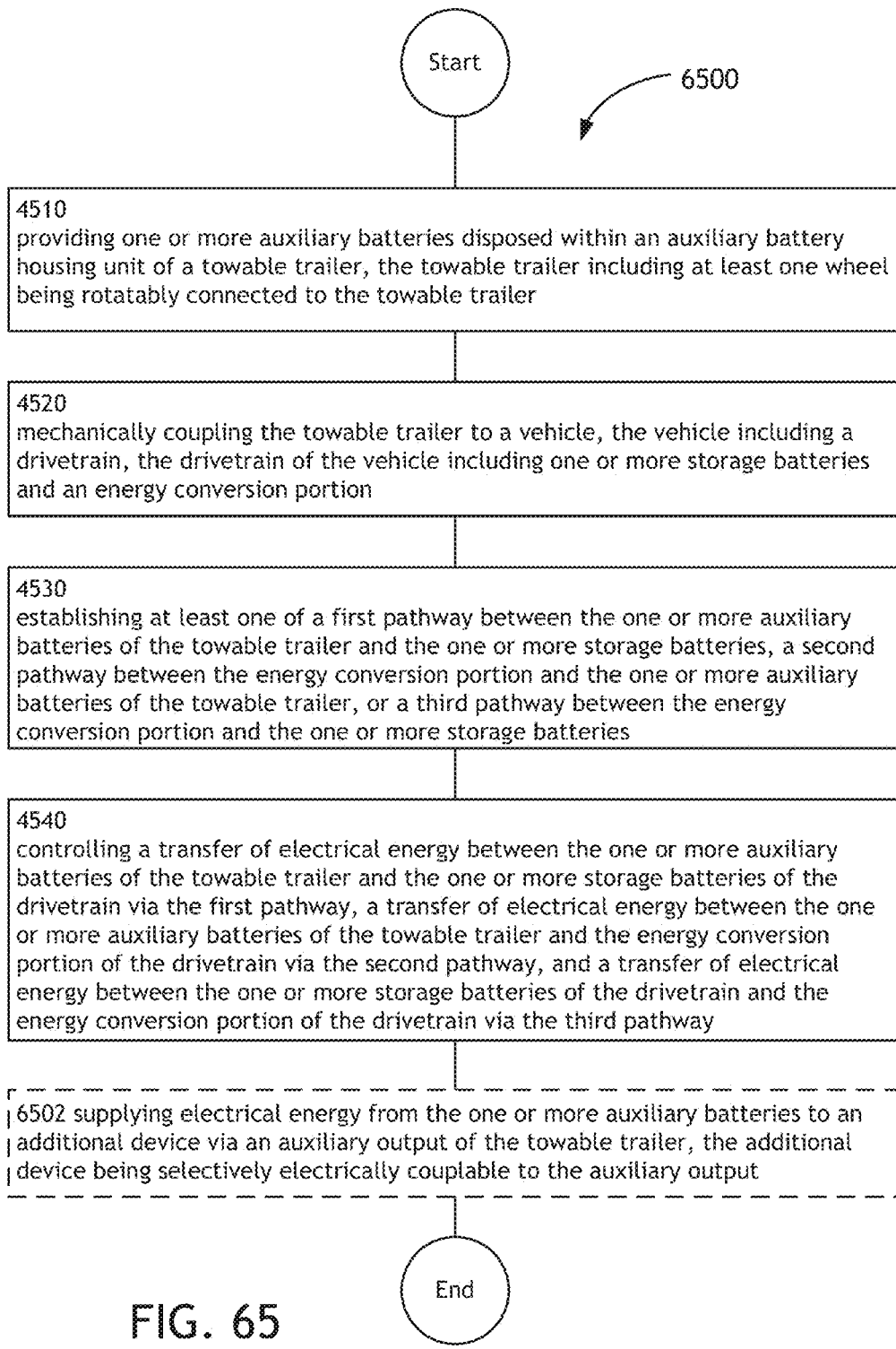

FIG. 65 illustrates an operational flow 6500 representing example operations related to supplying auxiliary electrical energy to an electric or hybrid vehicle. FIG. 65 illustrates an example embodiment where the example operational flow 4500 of FIG. 45 may include at least one additional operation. Additional operations may include a supplying operation 6502.

After a start operation, a providing operation 4510, a mechanically coupling operation 4520, a pathway establishing operation 4530, and a controlling operation 4540, the operation flow 6500 moves to supplying operation 6502.

The operation 6502 illustrates supplying electrical energy from the one or more auxiliary batteries to an additional device via an auxiliary output of the towable trailer, the additional device being selectively electrically couplable to the auxiliary output. For example, as shown in FIGS. 1A through 4, electrical energy stored within the one or more auxiliary batteries 106 may be transferred to an additional device 240 via an auxiliary port 242. For instance, the towable trailer 102 may be equipped with an auxiliary port 242 configured for receiving a connector (e.g., male end of an electric cable) from the additional device 240.

Figure 66:
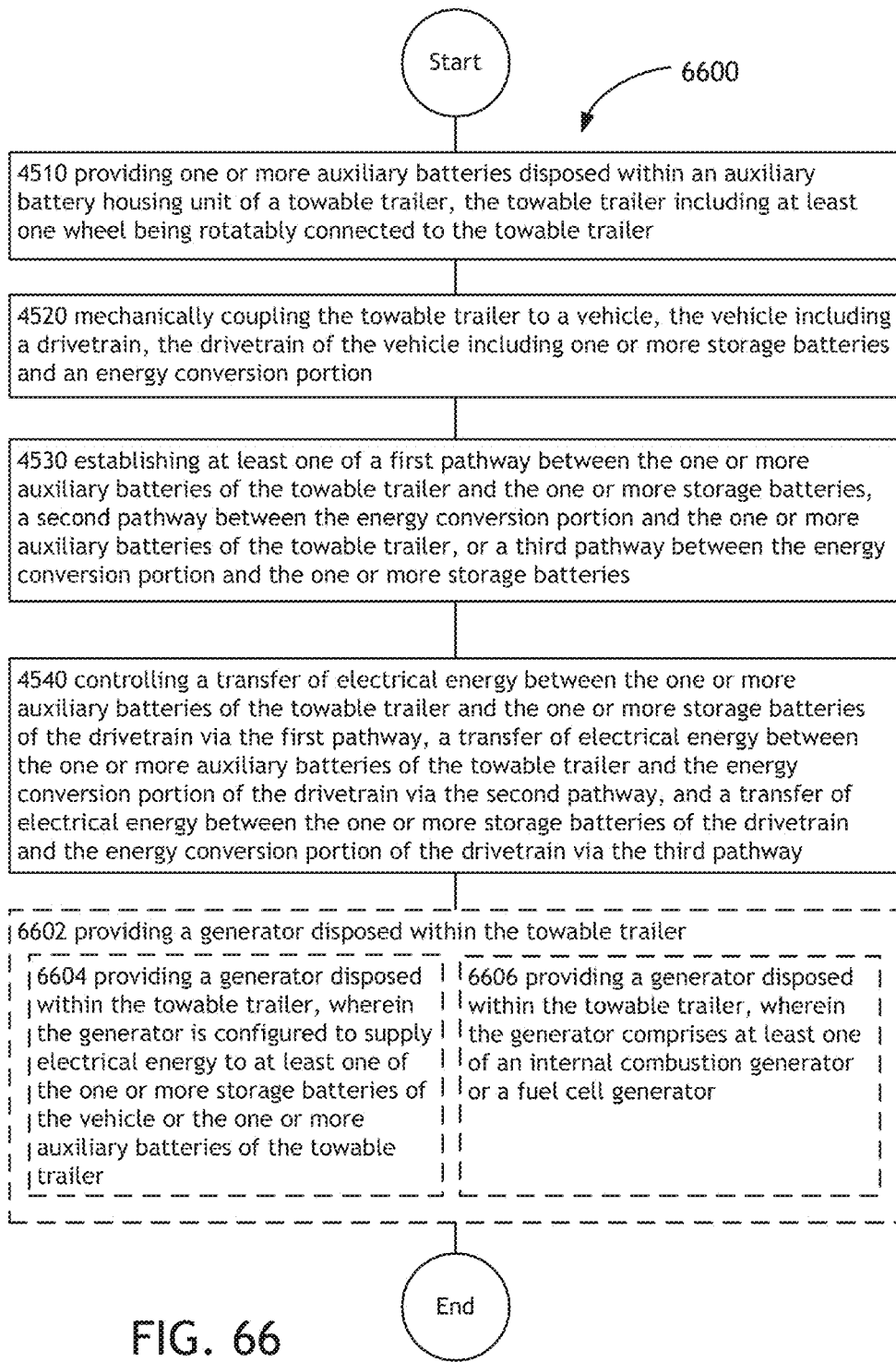

FIG. 66 illustrates an operational flow 6600 representing example operations related to supplying auxiliary electrical energy to an electric or hybrid vehicle. FIG. 66 illustrates an example embodiment where the example operational flow 4500 of FIG. 45 may include at least one additional operation. Additional operations may include a generator providing operation 6602, operation 6604, and/or operation 6606.

After a start operation, a providing operation 4510, a mechanically coupling operation 4520, a pathway establishing operation 4530, and a controlling operation 4540, the operation flow 6600 moves to generator providing operation 6602.

The operation 6602 illustrates providing a generator disposed within the towable trailer. For example, as shown in FIGS. 1A through 4, a generator 246 may be disposed within the towable trailer 102 and operatively connected to the one or more auxiliary batteries 102 and the control system 116. For instance, the generator 246 may be coupled in a parallel configuration with the auxiliary batteries 106 as shown in FIG. 2F. In another instance, the generator 246 may be coupled in a series configuration with the auxiliary batteries 106 as shown in FIG. 2G.

Further, the operation 6604 illustrates providing a generator disposed within the towable trailer, wherein the generator is configured to supply electrical energy to at least one of a portion of the drivetrain of the vehicle or the one or more auxiliary batteries of the towable trailer. For example, as shown in FIGS. 1A through 4, a generator 246 disposed within the towable trailer 102 and operatively connected to the one or more auxiliary batteries 102 and the control system 116 may be configured to directly or indirectly supply auxiliary electrical energy to a portion (e.g., one or more storage batteries 110) of the drivetrain 112 of the vehicle 104. For instance, the generator 246 may directly supply electrical energy to the one or more storage batteries 110 via electrical connection 114. In another instance, the generator 246 may indirectly supply electrical energy to the one or more storage batteries 110 by supplying electrical energy to the one or more auxiliary batteries 106 of the trailer 102, which in turn may supply auxiliary electrical energy to the one or more storage batteries 110 of the vehicle 104.

Further, the operation 6606 illustrates providing a generator disposed within the towable trailer, wherein the generator comprises at least one of an internal combustion generator or a fuel cell generator. For example, as shown in FIGS. 1A through 4, a generator 246 disposed within the towable trailer 102 and operatively connected to the one or more auxiliary batteries 102 and the control system 116 may include a gasoline or diesel generator. By way of another example, as shown in FIGS. 1A through 4, a generator 246 disposed within the towable trailer 102 and operatively connected to the one or more auxiliary batteries 102 and the control system 116 may include a PEM fuel cell configured to utilized hydrogen as a fuel source.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention claimed is:

1. An auxiliary power system for supplying auxiliary electrical power to an electric or hybrid vehicle, comprising:
   a towable trailer being mechanically couplable to a vehicle including a drivetrain, the drivetrain of the vehicle including one or more storage batteries and an energy conversion portion electrically couplable with the one or more storage batteries via a third pathway, the towable trailer including an auxiliary battery housing unit;
   at least one wheel being rotatably connected to the towable trailer;
   one or more auxiliary batteries disposed within the auxiliary battery housing unit of the towable trailer,
   a bidirectional electrical pathway electronically coupling the towable trailer and the vehicle, the bidirectional electrical pathway comprising:
      a first pathway electrically coupling the one or more auxiliary batteries of the towable trailer to the one or more storage batteries via a first coupling control circuitry; and
      a second pathway electrically coupling the energy conversion portion to the one or more auxiliary batteries of the towable trailer via a second coupling control circuitry; and
   a control system configured to control a transfer of electrical energy between the one or more auxiliary batteries of the towable trailer and the one or more storage batteries of the drivetrain via the first pathway, a transfer of electrical energy between the one or more auxiliary batteries of the towable trailer and the energy conversion portion of the drivetrain via the second pathway, or a transfer of electrical energy between the one or more storage batteries of the drivetrain and the energy conversion portion of the drivetrain via the third pathway.

2. The auxiliary power system claim 1, wherein the energy conversion portion of the drive train comprises:
an electric machine.

3. The auxiliary power system claim 1, wherein the energy conversion portion of the drive train comprises:
power conversion circuitry.

4. The auxiliary power system claim 1, wherein at least one of the first pathway, the second pathway or the third pathway comprises:
a unidirectional pathway.

5. The auxiliary power system claim 1, wherein at least one of the first pathway, the second pathway or the third pathway comprises:
a bidirectional pathway.

6. The auxiliary power system of claim 1, wherein the control system configured to control at least one of a transfer of electrical energy between the one or more auxiliary batteries of the towable trailer and the one or more storage batteries of the drivetrain via the first pathway, a transfer of electrical energy between the one or more auxiliary batteries of the towable trailer and the energy conversion portion of the drivetrain via the second pathway, or a transfer of electrical energy between the one or more storage batteries of the drivetrain and the energy conversion portion of the drivetrain via the third pathway comprises:
a control system configured to at least one of selectively electrically couple the one or more auxiliary batteries of the towable trailer with the one or more storage batteries of the drivetrain, selectively electrically couple the one or more auxiliary batteries of the towable trailer and the energy conversion portion of the drivetrain, or selectively electrically couple the one or more storage batteries of the drivetrain and the energy conversion portion of the drivetrain.

7. The auxiliary power system of claim 6, wherein the control system configured to at least one of selectively electrically couple the one or more auxiliary batteries of the towable trailer with the one or more storage batteries of the drivetrain, selectively electrically couple the one or more auxiliary batteries of the towable trailer and the energy conversion portion of the drivetrain, or selectively electrically couple the one or more storage batteries of the drivetrain and the energy conversion portion of the drivetrain comprises:
a control system configured to at least one of selectively electrically couple the one or more auxiliary batteries of the towable trailer with the one or more storage batteries of the drivetrain utilizing a first coupling circuitry communicatively coupled with the control system, selectively electrically couple the one or more auxiliary batteries of the towable trailer and the energy conversion portion of the drivetrain utilizing a second coupling circuitry communicatively coupled with the control system, or selectively electrically couple the one or more storage batteries of the drivetrain and the energy conversion portion of the drivetrain utilizing a third coupling circuitry communicatively coupled with the control system.

8. The auxiliary power system claim 1, wherein the control system is configured to maintain a charge state of the one or more storage batteries of the vehicle above a preselected charge level.

9. The auxiliary power system claim 1, wherein the control system is configured to maintain a charge state of the one or more auxiliary batteries of the towable trailer above a preselected charge level.

10. The auxiliary power system claim 1, wherein the control system is configured to establish at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by one or more parameters.

11. The auxiliary power system claim 10, wherein the control system is configured to establish at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by one or more external parameters.

12. The auxiliary power system claim 10, wherein the control system is configured to establish at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by one or more internal parameters.

13. The auxiliary power system claim 10, wherein the control system is configured to establish at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by a difference between a first parameter and a second parameter.

14. The auxiliary power system claim 13, wherein the control system is configured to establish at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by a difference between a cost of electricity associated with charging the one or more storage batteries of the vehicle and a cost of electricity associated with charging the one or more auxiliary batteries of the towable trailer.

15. The auxiliary power system claim 13, wherein the control system is configured to establish at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by a difference between an expected lifetime of the one or more storage batteries of the vehicle and an expected lifetime of the one or more auxiliary batteries of the towable trailer.

16. The auxiliary power system claim 13, wherein the control system is configured to establish at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by a difference between a charging efficiency associated with the one or more storage batteries of the vehicle and a charging efficiency associated with the one or more rechargeable auxiliary batteries of the towable trailer.

17. The auxiliary power system claim 13, wherein the control system is configured to establish at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by a difference between a discharging efficiency associated with the one or more storage batteries of the vehicle and a discharging efficiency associated with the one or more rechargeable auxiliary batteries of the towable trailer.

18. The auxiliary power system claim 1, wherein the control system is configured to establish at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are selectable via user input.

19. The auxiliary power system claim 1, further comprising: a user interface device, the user interface device being communicatively coupled to the control system.

20. The auxiliary power system claim 1, wherein the towable trailer includes at least one wheel being rotatably connected to the towable trailer.

21. The auxiliary power system claim 20, wherein the at least one wheel being rotatably connected to the towable trailer comprises at least one wheel being rotatably connected to the towable trailer, wherein the at least one wheel is configured to translate the towable trailer utilizing a pulling force from the vehicle.

22. The auxiliary power system claim 20, the at least one wheel being rotatably connected to the towable trailer comprises:
at least one wheel being rotatably connected to the towable trailer and operatively connected to a trailer drivetrain, the trailer drivetrain configured to supply propulsive energy to the towable trailer.

23. The auxiliary power system claim 1, wherein the one or more auxiliary batteries comprise:
a plurality of auxiliary batteries.

24. The auxiliary power system of claim 1, further comprising:
an auxiliary output operatively connected to the one or more auxiliary batteries of the towable trailer, the auxiliary output configured to supply electrical energy from the one or more auxiliary batteries to an additional device selectively electrically couplable to the auxiliary output.

25. The auxiliary power system of claim 1, further comprising:
a generator disposed within the towable trailer.

26. The auxiliary power system of claim 25, wherein the generator is configured to supply electrical energy to at least one of a portion of the drivetrain of the vehicle or the one or more auxiliary batteries of the towable trailer.

27. The auxiliary power system of claim 25, wherein the generator comprises at least one of an internal combustion generator or a fuel cell generator.

28. The auxiliary power system of claim 1, further comprising:
a battery monitoring system configured to monitor one or more characteristics of at least one of the one or more auxiliary batteries or the one or more storage batteries.

29. A method for supplying auxiliary electrical power to an electrical or hybrid vehicle, comprising:
providing one or more auxiliary batteries disposed within an auxiliary battery housing unit of a towable trailer, the towable trailer including at least one wheel being rotatably connected to the towable trailer;
mechanically coupling the towable trailer to a vehicle, the vehicle including a drivetrain, the drivetrain of the vehicle including one or more storage batteries and an energy conversion portion;
electrically coupling the towable trailer to the vehicle using a bidirectional electrical pathway, the electrically coupling comprising:
establishing a first pathway between the one or more auxiliary batteries of the towable trailer and the one or more storage batteries via a first coupling control circuitry and a second pathway between the energy conversion portion and the one or more auxiliary batteries of the towable trailer via a second coupling control circuitry;
establishing a third pathway between the energy conversion portion and the one or more storage batteries; and
controlling a transfer of electrical energy between the one or more auxiliary batteries of the towable trailer and the one or more storage batteries of the drivetrain via the first pathway, a transfer of electrical energy between the one or more auxiliary batteries of the towable trailer and the energy conversion portion of the drivetrain via the second pathway, or a transfer of electrical energy between the one or more storage batteries of the drivetrain and the energy conversion portion of the drivetrain via the third pathway.

30. The method of claim 29, wherein the controlling at least one of a transfer of electrical energy between the one or more auxiliary batteries of the towable trailer and the one or more storage batteries of the drivetrain via the first pathway, a transfer of electrical energy between the one or more auxiliary batteries of the towable trailer and the energy conversion portion of the drivetrain via the second pathway, or a transfer of electrical energy between the one or more storage batteries of the drivetrain and the energy conversion portion of the drivetrain via the third pathway comprises:
at least one of selectively electrically coupling the one or more auxiliary batteries of the towable trailer with the one or more storage batteries of the drivetrain, selectively electrically coupling the one or more auxiliary batteries of the towable trailer with the energy conversion portion of the drivetrain, or selectively electrically coupling the one or more storage batteries of the drivetrain with the energy conversion portion of the drivetrain.

31. The method of claim 30, wherein the at least one of selectively electrically coupling the one or more auxiliary batteries of the towable trailer with the one or more storage batteries of the drivetrain, selectively electrically coupling the one or more auxiliary batteries of the towable trailer with the energy conversion portion of the drivetrain, or selectively electrically coupling the one or more storage batteries of the drivetrain with the energy conversion portion of the drivetrain comprises:
at least one of selectively electrically coupling the one or more auxiliary batteries of the towable trailer with the one or more storage batteries of the drivetrain utilizing a first coupling circuitry, selectively electrically coupling the one or more auxiliary batteries of the towable trailer with the energy conversion portion of the drivetrain utilizing a second coupling circuitry, or selectively electrically coupling the one or more storage batteries of the drivetrain with the energy conversion portion of the drivetrain utilizing a third coupling circuitry.

32. The method of claim 31, wherein the at least one of selectively electrically coupling the one or more auxiliary batteries of the towable trailer with the one or more storage batteries of the drivetrain utilizing a first coupling circuitry, selectively electrically coupling the one or more auxiliary batteries of the towable trailer with the energy conversion portion of the drivetrain utilizing a second coupling circuitry, or selectively electrically coupling the one or more storage batteries of the drivetrain with the energy conversion portion of the drivetrain utilizing a third coupling circuitry comprises:
   determining an electrical energy transfer configuration for the one or more auxiliary batteries, the one or more storage batteries of the drivetrain, and the energy conversion portion of the drivetrain; and
   controlling at least one of the first coupling circuitry, the second coupling circuitry, or the third coupling circuitry in response to the electrical energy transfer determination.

33. The method of claim 29, wherein the controlling at least one of a transfer of electrical energy between the one or more auxiliary batteries of the towable trailer and the one or more storage batteries of the drivetrain via the first pathway, a transfer of electrical energy between the one or more auxiliary batteries of the towable trailer and the energy conversion portion of the drivetrain via the second pathway, or a transfer of electrical energy between the one or more storage batteries of the drivetrain and the energy conversion portion of the drivetrain via the third pathway comprises:
   maintaining a charge state of the one or more storage batteries of the vehicle above a preselected charge level.

34. The method of claim 33, wherein the maintaining a charge state of the one or more storage batteries of the vehicle above a preselected charge level comprises:
   maintaining a charge state of the one or more storage batteries of the vehicle above a preselected charge level, wherein the preselected charge level is larger than a damage-causing charge level of the one or more storage batteries.

35. The method of claim 29, wherein the controlling at least one of a transfer of electrical energy between the one or more auxiliary batteries of the towable trailer and the one or more storage batteries of the drivetrain via the first pathway, a transfer of electrical energy between the one or more auxiliary batteries of the towable trailer and the energy conversion portion of the drivetrain via the second pathway, or a transfer of electrical energy between the one or more storage batteries of the drivetrain and the energy conversion portion of the drivetrain via the third pathway comprises:
   establishing a charge state of the one or more storage batteries of the vehicle above a preselected charge level upon disconnection of the one or more storage batteries from the one or more auxiliary batteries.

36. The method of claim 29, wherein the controlling at least one of a transfer of electrical energy between the one or more auxiliary batteries of the towable trailer and the one or more storage batteries of the drivetrain via the first pathway, a transfer of electrical energy between the one or more auxiliary batteries of the towable trailer and the energy conversion portion of the drivetrain via the second pathway, or a transfer of electrical energy between the one or more storage batteries of the drivetrain and the energy conversion portion of the drivetrain via the third pathway comprises:
   maintaining a charge state of the one or more auxiliary batteries of the towable trailer above a preselected charge level.

37. The method of claim 36, wherein the maintaining a charge state of the one or more auxiliary batteries of the towable trailer above a preselected charge level comprises:
   maintaining a charge state of the one or more auxiliary batteries of the towable trailer above a preselected charge level, wherein the preselected charge level is larger than a damage-causing charge level of the one or more auxiliary batteries.

38. The method of claim 29, wherein the controlling at least one of a transfer of electrical energy between the one or more auxiliary batteries of the towable trailer and the one or more storage batteries of the drivetrain via the first pathway, a transfer of electrical energy between the one or more auxiliary batteries of the towable trailer and the energy conversion portion of the drivetrain via the second pathway, or a transfer of electrical energy between the one or more storage batteries of the drivetrain and the energy conversion portion of the drivetrain via the third pathway comprises:
   establishing a charge state of the one or more auxiliary batteries of the towable trailer above a preselected charge level upon disconnection of a portion of the drivetrain from the one or more auxiliary batteries.

39. The method of claim 29, wherein the controlling at least one of a transfer of electrical energy between the one or more auxiliary batteries of the towable trailer and the one or more storage batteries of the drivetrain via the first pathway, a transfer of electrical energy between the one or more auxiliary batteries of the towable trailer and the energy conversion portion of the drivetrain via the second pathway, or a transfer of electrical energy between the one or more storage batteries of the drivetrain and the energy conversion portion of the drivetrain via the third pathway comprises:
   establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by one or more parameters.

40. The method of claim 39, wherein the establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by one or more parameters comprises:
   establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by one or more external parameters.

41. The method of claim 39, wherein the establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by one or more parameters comprises:

establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by one or more internal parameters.

42. The method of claim 39, wherein the establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by one or more parameters comprises:

establishing at least one of a charge state of the one or more storage batteries of the vehicle or a charge state of the one or more auxiliary batteries, wherein at least one of the charge state of the one or more storage batteries of the vehicle or the charge state of the one or more auxiliary batteries of the towable trailer are determined by a difference between a first parameter and a second parameter.

43. The method of claim 29, wherein the controlling at least one of a transfer of electrical energy between the one or more auxiliary batteries of the towable trailer and the one or more storage batteries of the drivetrain via the first pathway, a transfer of electrical energy between the one or more auxiliary batteries of the towable trailer and the energy conversion portion of the drivetrain via the second pathway, or a transfer of electrical energy between the one or more storage batteries of the drivetrain and the energy conversion portion of the drivetrain via the third pathway comprises:

controlling a rate of transfer of electrical energy between the one or more auxiliary batteries and a portion of the drivetrain.

44. The method of claim 29, further comprising:

supplying electrical energy from the one or more auxiliary batteries to an additional device via an auxiliary output of the towable trailer, the additional device being selectively electrically couplable to the auxiliary output.

* * * * *